US010296319B2

(12) United States Patent
Wabe et al.

(10) Patent No.: US 10,296,319 B2
(45) Date of Patent: *May 21, 2019

(54) INFORMATION PROCESSING TERMINAL, INFORMATION PROCESSING SYSTEM, COMPUTER-READABLE STORAGE MEDIUM HAVING STORED THEREON INFORMATION PROCESSING PROGRAM, AND INFORMATION PROCESSING METHOD

(71) Applicant: NINTENDO CO., LTD., Kyoto (JP)

(72) Inventors: Kazuhiro Wabe, Kyoto (JP); Eiji Tokunaga, Kyoto (JP); Takahiro Yamazaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 346 days.

This patent is subject to a terminal disclaimer.

(21) Appl. No.: 15/413,155

(22) Filed: Jan. 23, 2017

(65) Prior Publication Data

US 2017/0131990 A1    May 11, 2017

Related U.S. Application Data

(63) Continuation of application No. 13/027,723, filed on Feb. 15, 2011, now Pat. No. 9,588,748.

(30) Foreign Application Priority Data

Jun. 11, 2010  (JP) ................................ 2010-134563
Sep. 24, 2010  (JP) ................................ 2010-214528

(51) Int. Cl.
*G06F 8/60* (2018.01)
*G06F 8/61* (2018.01)
(Continued)

(52) U.S. Cl.
CPC .............. *G06F 8/61* (2013.01); *G06F 1/3265* (2013.01); *G06F 8/60* (2013.01); *G06F 8/65* (2013.01); *Y02D 10/42* (2018.01)

(58) Field of Classification Search
CPC . G06F 1/3265; G06F 8/60; G06F 8/61; G06F 8/62; G06F 8/65; Y02D 10/42
(Continued)

(56) References Cited

U.S. PATENT DOCUMENTS 5,396,225 A    3/1995 Okada et al.
5,618,045 A    4/1997 Kagan et al.
(Continued)

FOREIGN PATENT DOCUMENTS

CN    1619489    5/2005
CN    1905925    1/2007
(Continued)

OTHER PUBLICATIONS

Konno et al., U.S. Appl. No. 12/816,672, filed Jun. 16, 2010—now U.S. Pat. No. 9,089,773.
(Continued)

*Primary Examiner* — Qing Chen
(74) *Attorney, Agent, or Firm* — Nixon & Vanderhye, P.C.

(57) ABSTRACT

An example information processing apparatus includes a display and processing circuitry. The processing circuitry is configured to control the information processing apparatus to perform operations including automatically connecting to a server; automatically receiving, from the server, one or more programs, without user selection of the one or more programs, the received programs including at least one new program, other than an update program, not already installed on the information processing apparatus; and automatically,
(Continued)

and without user request, installing the received programs on the information processing apparatus.

28 Claims, 56 Drawing Sheets

(51) Int. Cl.
*G06F 8/65* (2018.01)
*G06F 1/3234* (2019.01)

(58) Field of Classification Search
USPC .................................................. 717/174–178
See application file for complete search history.

(56) References Cited

U.S. PATENT DOCUMENTS

| | | |
|---|---|---|
| 5,666,293 A | 9/1997 | Metz et al. |
| 5,732,275 A | 3/1998 | Kullick et al. |
| 6,018,720 A | 1/2000 | Fujimoto |
| 6,438,573 B1 | 8/2002 | Nilsen |
| 6,733,382 B2 | 5/2004 | Oe et al. |
| 6,736,727 B1 | 5/2004 | Doi et al. |
| 6,886,036 B1 | 4/2005 | Santamaki et al. |
| 7,054,831 B2 | 5/2006 | Koenig |
| 7,114,090 B2 | 9/2006 | Kardach et al. |
| 7,290,072 B2 | 10/2007 | Quraishi et al. |
| 7,346,708 B2 | 3/2008 | Minamisawa |
| 7,457,410 B2 | 11/2008 | Yamauchi et al. |
| 7,493,613 B2 | 2/2009 | D'Souza et al. |
| 7,565,653 B2 | 7/2009 | Inoue et al. |
| 7,620,027 B2 | 11/2009 | Igarashi et al. |
| 7,704,147 B2 | 4/2010 | Quraishi et al. |
| 7,725,078 B2 | 5/2010 | Kuwahara et al. |
| 7,729,661 B2 | 6/2010 | Tanaka et al. |
| 7,746,834 B1 | 6/2010 | Moore et al. |
| 7,794,328 B2 | 9/2010 | Horigome |
| 7,801,818 B2 | 9/2010 | Tsukazaki et al. |
| 7,811,171 B2 | 10/2010 | Mitsuyoshi et al. |
| 7,813,300 B2 | 10/2010 | Takayama et al. |
| 7,819,750 B2 | 10/2010 | Lam et al. |
| 7,854,657 B2 | 12/2010 | Shiraiwa |
| 7,862,433 B2 | 1/2011 | Sato et al. |
| 7,901,293 B2 | 3/2011 | Oe |
| 7,929,911 B2 | 4/2011 | Tanaka et al. |
| 7,934,995 B2 | 5/2011 | Suzuki |
| 8,052,528 B2 | 11/2011 | Shiraiwa et al. |
| 8,075,405 B2 | 12/2011 | Sasaki et al. |
| 8,078,160 B2 | 12/2011 | Quinn |
| 8,116,679 B2 | 2/2012 | Dunko |
| 8,185,165 B2 | 5/2012 | Beninghaus et al. |
| 8,229,962 B1 | 7/2012 | Cavalancia, II |
| 8,261,258 B1 | 9/2012 | Jianu et al. |
| 8,433,375 B2 | 4/2013 | Yamazaki et al. |
| 8,505,008 B2 | 8/2013 | Yamazaki et al. |
| 8,700,478 B2 | 4/2014 | Kubo et al. |
| 8,874,037 B2 | 10/2014 | Fujiwara et al. |
| 8,903,934 B2 | 12/2014 | Konno et al. |
| 8,954,118 B2 | 2/2015 | Yamazaki et al. |
| 8,990,299 B2 | 3/2015 | Konno et al. |
| 9,089,773 B2 | 7/2015 | Konno et al. |
| 9,433,861 B2 | 9/2016 | Fujiwara et al. |
| 9,450,917 B2 | 9/2016 | Ooe et al. |
| 9,588,748 B2 | 3/2017 | Wabe et al. |
| 2001/0003714 A1 | 6/2001 | Takata et al. |
| 2001/0048744 A1 | 12/2001 | Kimura et al. |
| 2002/0016166 A1 | 2/2002 | Uchida et al. |
| 2002/0065137 A1 | 5/2002 | Tonomura |
| 2002/0083160 A1 | 6/2002 | Middleton |
| 2003/0033413 A1 | 2/2003 | Wilson, Jr. et al. |
| 2003/0038731 A1 | 2/2003 | Sako et al. |
| 2003/0126218 A1 | 7/2003 | Sakonsaku |
| 2003/0134623 A1 | 7/2003 | Kanamaru et al. |
| 2003/0207700 A1 | 11/2003 | Yamanaka |
| 2004/0002774 A1 | 1/2004 | Conti et al. |
| 2004/0082383 A1 | 4/2004 | Muncaster et al. |
| 2004/0122931 A1 | 6/2004 | Rowland et al. |
| 2004/0127288 A1 | 7/2004 | Furuhashi et al. |
| 2004/0151126 A1 | 8/2004 | Matsubara |
| 2004/0215735 A1 | 10/2004 | Nakahara et al. |
| 2004/0224769 A1 | 11/2004 | Hansen et al. |
| 2004/0259642 A1 | 12/2004 | Tanaka et al. |
| 2005/0047356 A1 | 3/2005 | Fujii et al. |
| 2005/0068928 A1 | 3/2005 | Smith et al. |
| 2005/0070327 A1 | 3/2005 | Watanabe |
| 2005/0073764 A1 | 4/2005 | Ogawa et al. |
| 2005/0129010 A1 | 6/2005 | Maeda et al. |
| 2005/0154759 A1 | 7/2005 | Hofmeister et al. |
| 2005/0282639 A1 | 12/2005 | Tanaka et al. |
| 2006/0068702 A1 | 3/2006 | Miwa et al. |
| 2006/0106963 A1 | 5/2006 | Sasaki et al. |
| 2006/0166739 A1 | 7/2006 | Lin |
| 2006/0168574 A1 | 7/2006 | Giannini et al. |
| 2006/0234631 A1 | 10/2006 | Dieguez |
| 2006/0247059 A1 | 11/2006 | Nogami et al. |
| 2006/0282518 A1 | 12/2006 | Karaoguz et al. |
| 2006/0282834 A1 | 12/2006 | Cheng et al. |
| 2007/0078004 A1 | 4/2007 | Suzuki et al. |
| 2007/0082723 A1 | 4/2007 | Ohashi et al. |
| 2007/0105623 A1 | 5/2007 | Tanaka et al. |
| 2007/0118587 A1 | 5/2007 | Ishikawa et al. |
| 2007/0121534 A1 | 5/2007 | James et al. |
| 2007/0123168 A1 | 5/2007 | Takehara et al. |
| 2007/0136817 A1 | 6/2007 | Nguyen |
| 2007/0149183 A1 | 6/2007 | Dunko et al. |
| 2007/0174471 A1 | 7/2007 | Van Rossum |
| 2007/0195724 A1 | 8/2007 | Yang et al. |
| 2007/0203969 A1 | 8/2007 | Wakasa et al. |
| 2007/0204279 A1 | 8/2007 | Warshavsky et al. |
| 2007/0213795 A1 | 9/2007 | Bradley et al. |
| 2007/0213975 A1 | 9/2007 | Shimoda et al. |
| 2007/0232310 A1 | 10/2007 | Schiff et al. |
| 2007/0249365 A1 | 10/2007 | Jendbro |
| 2007/0271234 A1 | 11/2007 | Ravikiran |
| 2007/0288423 A1 | 12/2007 | Kimoto |
| 2008/0039202 A1 | 2/2008 | Sawano et al. |
| 2008/0076455 A1 | 3/2008 | Kim et al. |
| 2008/0119281 A1 | 5/2008 | Hirose et al. |
| 2008/0123582 A1 | 5/2008 | Maekawa |
| 2008/0139310 A1 | 6/2008 | Kando et al. |
| 2008/0143512 A1 | 6/2008 | Wakisaka et al. |
| 2008/0148350 A1 | 6/2008 | Hawkins et al. |
| 2008/0188301 A1 | 8/2008 | Kawamoto et al. |
| 2008/0209071 A1 | 8/2008 | Kubota |
| 2008/0222571 A1 | 9/2008 | Yoshioka |
| 2008/0261658 A1 | 10/2008 | Jin et al. |
| 2009/0011709 A1 | 1/2009 | Akasaka et al. |
| 2009/0011770 A1 | 1/2009 | Jung |
| 2009/0017767 A1 | 1/2009 | Mashimo |
| 2009/0028094 A1 | 1/2009 | Okada et al. |
| 2009/0037526 A1 | 2/2009 | Elliott et al. |
| 2009/0049442 A1* | 2/2009 | Shimasaki ............... G06F 8/61 717/174 |
| 2009/0058639 A1 | 3/2009 | Tanaka et al. |
| 2009/0061870 A1 | 3/2009 | Finkelstein et al. |
| 2009/0064299 A1 | 3/2009 | Begorre et al. |
| 2009/0093310 A1 | 4/2009 | Tanaka et al. |
| 2009/0124393 A1 | 5/2009 | Tanaka et al. |
| 2009/0137321 A1 | 5/2009 | Katsume et al. |
| 2009/0143114 A1 | 6/2009 | Vargas et al. |
| 2009/0143140 A1 | 6/2009 | Kitahara |
| 2009/0158430 A1 | 6/2009 | Borders |
| 2009/0186603 A1 | 7/2009 | Usami et al. |
| 2009/0193365 A1 | 7/2009 | Sugiura |
| 2009/0217307 A1 | 8/2009 | Ooe |
| 2009/0221298 A1 | 9/2009 | Hanner |
| 2009/0253518 A1 | 10/2009 | Sasaki et al. |
| 2009/0254953 A1 | 10/2009 | Lin |
| 2009/0271111 A1 | 10/2009 | Takanishi et al. |
| 2009/0307105 A1 | 12/2009 | Lemay et al. |
| 2009/0310594 A1 | 12/2009 | Nakata et al. |
| 2010/0022302 A1 | 1/2010 | Iwakiri et al. |
| 2010/0083181 A1 | 4/2010 | Matsushima et al. |
| 2010/0111057 A1 | 5/2010 | Nakamura et al. |

(56) References Cited

U.S. PATENT DOCUMENTS

| | | | |
|---|---|---|---|
| 2010/0129067 A1 | 5/2010 | Nagano | |
| 2010/0130254 A1 | 5/2010 | Kamada et al. | |
| 2010/0167697 A1 | 7/2010 | Ishikawa et al. | |
| 2010/0182260 A1 | 7/2010 | Kiyuna | |
| 2010/0184379 A1 | 7/2010 | Shimomura | |
| 2010/0185977 A1 | 7/2010 | Ito | |
| 2010/0312817 A1 | 12/2010 | Steakley | |
| 2010/0325235 A1 | 12/2010 | Konno et al. | |
| 2011/0045910 A1 | 2/2011 | McKenna et al. | |
| 2011/0060825 A1 | 3/2011 | Ooe et al. | |
| 2011/0070950 A1 | 3/2011 | Tanaka et al. | |
| 2011/0143840 A1 | 6/2011 | Sotoike et al. | |
| 2011/0176455 A1 | 7/2011 | Matsunada | |
| 2011/0205953 A1 | 8/2011 | Kuwahara et al. | |
| 2011/0212773 A1 | 9/2011 | Hjelm et al. | |
| 2011/0231559 A1 | 9/2011 | Yamaguchi | |
| 2011/0256829 A1 | 10/2011 | Shimomura | |
| 2011/0275316 A1 | 11/2011 | Suumaki | |
| 2011/0275358 A1 | 11/2011 | Faenger | |
| 2011/0292033 A1 | 12/2011 | Umezu et al. | |
| 2011/0295709 A1 | 12/2011 | Kubo et al. | |
| 2011/0306294 A1 | 12/2011 | Yamazaki et al. | |
| 2011/0307554 A1 | 12/2011 | Konno et al. | |
| 2011/0307884 A1 | 12/2011 | Wabe | |
| 2011/0307892 A1 | 12/2011 | Yamazaki et al. | |
| 2012/0010000 A1 | 1/2012 | Masuda et al. | |
| 2012/0011256 A1 | 1/2012 | Masuda et al. | |
| 2012/0015778 A1 | 1/2012 | Lee et al. | |
| 2012/0021703 A1 | 1/2012 | Yamazaki et al. | |
| 2012/0054297 A1 | 3/2012 | Konno et al. | |
| 2012/0071242 A1 | 3/2012 | Fujiwara et al. | |
| 2013/0295927 A1 | 11/2013 | Ekici et al. | |
| 2014/0164181 A1 | 6/2014 | Kubo et al. | |
| 2014/0194189 A1 | 7/2014 | Kubo et al. | |
| 2014/0328337 A1 | 11/2014 | Yamazaki et al. | |
| 2015/0229707 A1 | 8/2015 | Konno et al. | |

FOREIGN PATENT DOCUMENTS

| | | |
|---|---|---|
| CN | 1979414 | 6/2007 |
| CN | 101089815 | 12/2007 |
| CN | 101345565 | 1/2009 |
| CN | 101425933 | 5/2009 |
| CN | 101616018 | 12/2009 |
| EP | 0 710 017 | 5/1996 |
| EP | 1 493 474 | 1/2005 |
| EP | 1 513 066 | 3/2005 |
| EP | 1 810 732 | 7/2007 |
| EP | 1 872 838 | 1/2008 |
| EP | 2 135 650 | 12/2009 |
| EP | 2 395 795 | 12/2011 |
| JP | 11-053184 | 2/1999 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |
| JP | 2001-357223 | 12/2001 |
| JP | 2002-015371 | 1/2002 |
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-122588 | 4/2003 |
| JP | 2003-196217 | 7/2003 |
| JP | 2003-219465 | 7/2003 |
| JP | 2003-229809 | 8/2003 |
| JP | 2004-005110 | 1/2004 |
| JP | 2004-057515 | 2/2004 |
| JP | 2004-118291 | 4/2004 |
| JP | 2004-221671 | 8/2004 |
| JP | 2004-329948 | 11/2004 |
| JP | 2004-348203 | 12/2004 |
| JP | 2005-018377 | 1/2005 |
| JP | 2005-028103 | 2/2005 |
| JP | 2005-242399 | 9/2005 |
| JP | 2005-242886 | 9/2005 |
| JP | 2005-251167 | 9/2005 |
| JP | 2005-266160 | 9/2005 |
| JP | 2006-005630 | 1/2006 |
| JP | 2006-072685 | 3/2006 |
| JP | 2006-101474 | 4/2006 |
| JP | 2006-146306 | 6/2006 |
| JP | 2006-228113 | 8/2006 |
| JP | 2007-004316 | 1/2007 |
| JP | 2007-507982 | 3/2007 |
| JP | 2007-088900 | 4/2007 |
| JP | 2007-125185 | 5/2007 |
| JP | 2007-142613 | 6/2007 |
| JP | 2007-164699 | 6/2007 |
| JP | 2007-175508 | 7/2007 |
| JP | 2007-293737 | 11/2007 |
| JP | 2007-330642 | 12/2007 |
| JP | 2008-016040 | 1/2008 |
| JP | 2008-077524 | 4/2008 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2008-242707 | 10/2008 |
| JP | 2008-310499 | 12/2008 |
| JP | 2009-015551 | 1/2009 |
| JP | 2009-026178 | 2/2009 |
| JP | 2009-065306 | 3/2009 |
| JP | 2009-512239 | 3/2009 |
| JP | 2009-111530 | 5/2009 |
| JP | 2009-147828 | 7/2009 |
| JP | 2009-225000 | 10/2009 |
| JP | 2010-022704 | 2/2010 |
| JP | 2010-028171 | 2/2010 |
| JP | 2010-028672 | 2/2010 |
| JP | 2010-079546 | 4/2010 |
| JP | 2010-086327 | 4/2010 |
| JP | 2010-113728 | 5/2010 |
| JP | 2011-509541 | 3/2011 |
| WO | 93/23125 | 11/1993 |
| WO | 2005/111815 | 11/2005 |
| WO | 2008/103858 | 8/2008 |
| WO | 2009/048473 | 4/2009 |
| WO | 2009/070601 | 6/2009 |
| WO | 2009/148781 | 12/2009 |
| WO | 2010/010645 | 1/2010 |
| WO | 2010/053427 | 5/2010 |
| WO | 2010/055720 | 5/2010 |

OTHER PUBLICATIONS

Ooe et al., U.S. Appl. No. 12/871,243, filed Aug. 30, 2010—now U.S. Pat. No. 9,450,917.

Kubo et al., U.S. Appl. No. 12/940,426, filed Nov. 5, 2010—now U.S. Pat. No. 8,700,478.

Yamazaki et al., U.S. Appl. No. 12/948,050, filed Nov. 17, 2010—now U.S. Pat. No. 8,433,375.

Yamazaki et al., U.S. Appl. No. 12/948,371, filed Nov. 17, 2010—now U.S. Pat. No. 8,505,008.

Fujiwara et al., U.S. Appl. No. 12/969,855, filed Dec. 16, 2010—now U.S. Pat. No. 9,433,861.

Wabe et al., U.S. Appl. No. 13/027,723, filed Feb. 15, 2011—now U.S. Pat. No. 9,588,748.

Konno et al., U.S. Appl. No. 13/101,811, filed May 5, 2011—now U.S. Pat. No. 8,990,299.

Fujiwara et al., U.S. Appl. No. 13/111,033, filed May 19, 2011—now U.S. Pat. No. 8,874,037.

Konno et al., U.S. Appl. No. 13/251,204, filed Oct. 1, 2011—now U.S. Pat. No. 8,903,934.

(56) References Cited

OTHER PUBLICATIONS

Yamazaki et al., U.S. Appl. No. 13/251,205, filed Oct. 1, 2011—now U.S. Pat. No. 8,954,118.
Kubo et al., U.S. Appl. No. 14/181,690, filed Feb. 16, 2014—non-final office action dated Oct. 18, 2016.
Kubo et al., U.S. Appl. No. 14/181,692, filed Feb. 16, 2014—allowed.
Yamazaki et al., U.S. Appl. No. 14/334,520, filed Jul. 17, 2014—non-final office action dated Apr. 3, 2017.
Konno et al., U.S. Appl. No. 14/690,997, filed Apr. 20, 2015—final office action dated Mar. 24, 2017.
Dissidia Final Fantasy Ultimania, Japan, Square Enix Co., Ltd., Feb. 19, 2009, First Edition, p. 502 and partial English-language translation thereof.
Miki, "Oideyo Doubutsu No Mori Kanpeki Guidebook", First Edition, Enterbrain, Inc., Hamamura Kouichi, Jan. 9, 2006 (partial English-language translation), 6 pages.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo Dream, Mainichi Communications, Inc., Jul. 1, 2010, vol. 15, No. 7, Serial No. 195, pp. 52-59, with a partial English translation, 12 pages.
Game Broadway Stage27, Gamaga, Softbank Creative Corp., Jun. 1, 2010, vol. 27, No. 6, Serial No. 475, pp. 36-37, with a partial English translation, 6 pages.
Bhupender Virk, "Development of Low Power Consumption Wireless IC for Realization of Sensor Network with Wireless LAN." *Nikkei Electronics*, vol. 997, Feb. 9, 2009, pp. 87-94, published by Nikkei Business Publications, Inc., and partial English-language translation.
Saeki, K., "Apparent and Substantial Improvement in Function! Report on Nintendo DSi Giving Impression of Development," Impress Watch Corporation, Game Watch, uploaded on Nov. 1, 2008 [retrieved Feb. 4, 2014]; http://game.watch.impress.co.jp/docs/20081101/dsil.htm with partial English-language translation thereof.
English-language machine translation of http://game.watch.impress.co.jp/docs/20081101/dsil.htm [retrieved Apr. 15, 2014].
Yu Kuribayashi, Check in: Castanet [English ver.] Noteworthy push-type system for automatically delivering Java application comes to Japan, netPC, Japan, ASCII corporation, Jul. 1, 1997, vol. 2, No. 7, pp. 66-67 and partial English-language translation of same.
Nintendo 3DS, formal announcement!! E3 2010 report ~Perfect analysis of veiled fascinating hardware! This changes portable game devices!?~, Weekly Famitsu, Japan, Enterbrain, Inc., Jun. 24, 2010, vol. 25, No. 27, pp. 12-13 and partial English-language translation of same.
"Enjoy! DS life!! No. 118: Download software by simple operation. Let's play with DSi wares!!," Weekly Famitsu, Japan, Enterbrain, Jan. 30, 2009, vol. 24, No. 6 (1050th issue), p. 52 and partial English-language translation.
Saeki, K., "Functions are enhanced for both appearance and contents! Nintendo DSi report that makes you feel evolution," Game Watch, Japan, Impress Corporation, Nov. 1, 2008, pp. 1-8 and partial English-language translation.
An Explanation of Circumstances Concerning Accelerated Examination was filed in Japan in priority document No. 2010-134563 on Dec. 24, 2010, 3 pages.
English-language machine translation of JP 11-207031.
English-language machine translation of JP 2000-167233.
English-language machine translation of JP 2002-102530.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
English-language machine translation of JP 2010-022704.
English-language machine translation of JP 2007-125185.
English-language machine translation of JP 2006-072685.
English-language machine translation of JP 2007-164699.
English-language machine translation of JP 2004-221671.
English-language machine translation of JP 2010-028672.
English-language machine translation of JP 2007-175508.
English-language machine translation of JP 2010-028171.
English-language machine translation of JP 2007-507982.
English-language machine translation of JP 2002-297483.
English-language machine translation of JP 2005-242886.
English-language machine translation of JP 2006-146306.
English-language machine translation of JP 2009-225000.
English-language machine translation of JP 2010-079546.
English-language machine translation of JP 2007-004316.
English-language machine translation of JP 2007-293737.
English-language machine translation of JP 2010-113728.
English-language machine translation of JP 2002-015371.
English-language machine translation of JP 2001-357223.
English-language machine translation of CN 1979414.
English-language machine translation of CN 101425933.
English-language machine translation of JP 2004-005110.
English-language machine translation of JP 2004-118291.
English-language machine translation of JP 2008-077524.
English-language machine translation of JP 2008-310499.
English-language machine translation of JP 2008-016040.
English-language machine translation of JP 2008-242707.
English-language abstract and machine translation of JP2003-122588.

* cited by examiner

F I G. 4
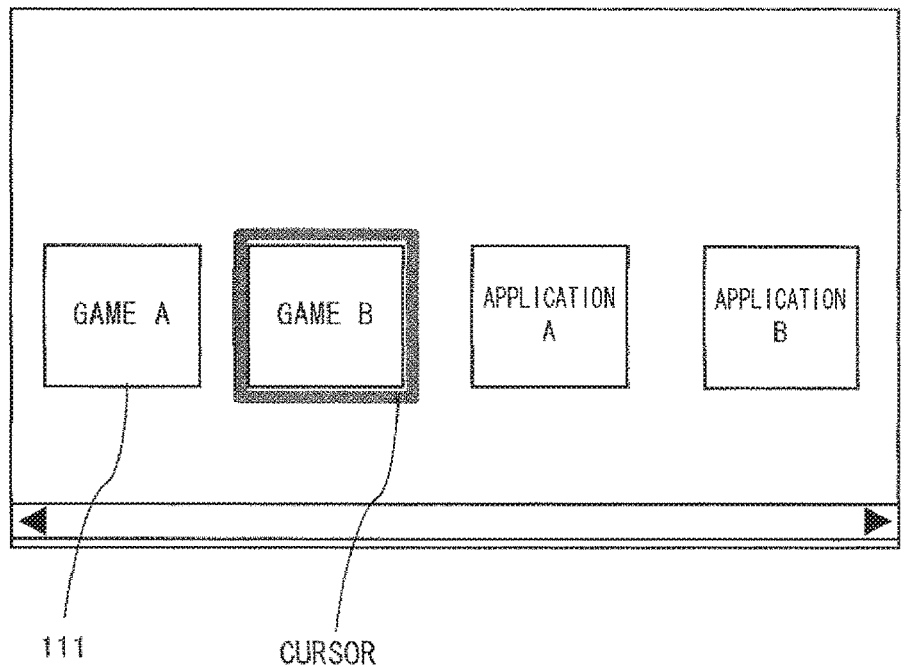
F I G. 5
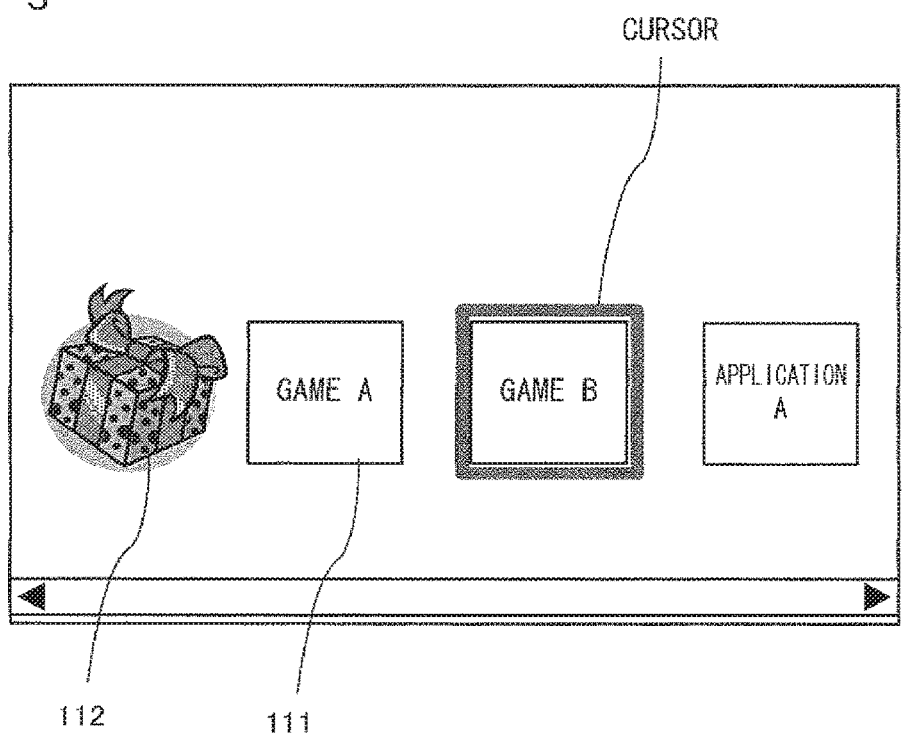

F I G. 1 4
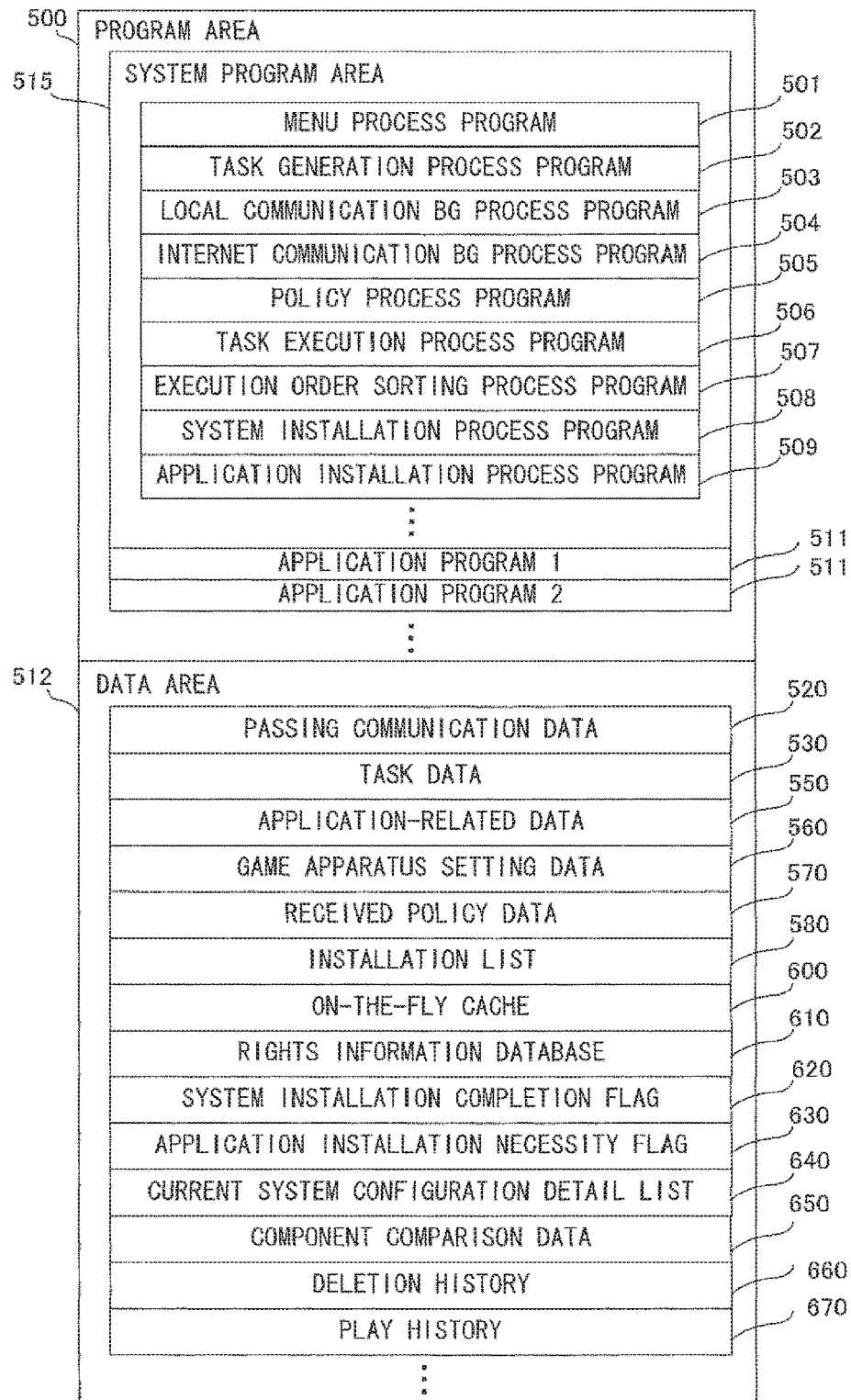

INFORMATION PROCESSING TERMINAL, INFORMATION PROCESSING SYSTEM, COMPUTER-READABLE STORAGE MEDIUM HAVING STORED THEREON INFORMATION PROCESSING PROGRAM, AND INFORMATION PROCESSING METHOD

CROSS REFERENCE TO RELATED APPLICATIONS

This application is a continuation of application Ser. No. 13/027,723, filed Feb. 15, 2011, now U.S. Pat. No. 9,588,748, which claims priority to Japanese Patent Application Nos. 2010-214528 and 2010-134563, filed on Sep. 24, 2010 and Jun. 11, 2010, respectively. The contents of each of these applications are incorporated by reference herein in their entirety.

BACKGROUND

Technical Field

The present invention relates to an information processing terminal having the function of communication, and in particular relates to an information processing terminal and the like capable of performing installation processes of a system and an application.

Description of the Background Art

In recent years, systems for distributing a digital content via a network are becoming mainstream. Among them, there is a technique of pushing a content. For example, in a system disclosed in Japanese Laid-Open Patent Publication No. 2005-242399, when an e-mail is transmitted to a server after a content has been searched for in a search screen, if a new content satisfying the search conditions of the search is distributed thereafter, a trial version of the content attached to an e-mail is transmitted from the server.

However, in most systems for distributing a content using a network, a user needs to actively access a content that they wish to obtain, and download the content. That is, even if there is an attractive content, there is no way to inform a user who does not actively access the content. Consequently, there are: a demand of users that they do not wish to actively access, but wish to easily know of attractive contents; and a demand of content creators that they wish to let many people know of contents created by means of numerous human and monetary resources. In the system disclosed in Japanese Laid-Open Patent Publication No. 2005-242399 described above, it is not taken into account whether or not, after the content has been transmitted, the content is made immediately executable (for example, when a program that needs to be installed has been transmitted, a user needs to manually execute an installation program).

SUMMARY

Therefore, it is an object of the present invention to provide an information processing apparatus and the like capable of newly installing a new application and updating various applications and a system, without the need for any particular operation of a user.

To achieve the object described above, the present invention has the following configurations.

An information processing apparatus of the present aspect includes connection means, reception means, and installation means. The connection means automatically connects to a server. The reception means automatically performs processes of receiving one or more programs from the server. The installation means automatically performs processes of installing the programs on the information processing apparatus.

With the above configuration, the programs are automatically received and installed. This makes it possible to provide a new application and an update program without any operation of a user (without a user actively accessing). Further, from a software developer's point of view, this has the following advantages. In an environment where a user needs to actively access in order to install a new application, it is unlikely that when, for example, a new function is added to an application thereafter, the user performs an operation of adding the new function (actively accesses). Accordingly, to provide an application to most users owing hardware, it is necessary to pre-install the development schedule of software in time for the release of the hardware. Based on the present invention, however, it is possible to set the development schedule of software after the release of the hardware, and therefore possible to reduce the burden on the software development of a software developer.

As another configuration example, the information processing apparatus may further include switching means for switching between an unused state and a used state. The connection means may automatically connect to the server when the information processing apparatus is operating at least in the unused state, the reception means may automatically perform the reception processes when the information processing apparatus is at least in the unused state, and the installation means may automatically perform the installation processes of the programs received by the reception means, at least in the unused state.

With the above configuration example, the programs are received and installed even in the unused state, and therefore, it is possible to efficiently perform installations. In addition, the programs are newly installed without a user's knowledge, and therefore, it is possible to bring a surprise to the user.

As yet another configuration example, power may be less consumed in the unused state than in the used state.

With the above configuration example, it is possible to automatically install the programs even in the state where power consumption is small, such as in a so-called power saving mode.

As yet another configuration example, the information processing apparatus can be opened and closed by an operation of a user, and the switching means may switch to the used state when the information processing apparatus is in the open state, and the switching means may switch to the unused state when the information processing apparatus is in the closed state.

With the above configuration example, it is possible to automatically install the programs even in the closed state.

As yet another configuration example, the information processing apparatus may further include a display device. The switching means may switch between the used state and the unused state in accordance with a predetermined operation of a user, and power may be supplied to the display device in the used state, and power may not be supplied to the display device in the unused state.

With the above configuration example, it is possible to automatically install the programs even in the state where power is not supplied to the display device.

As yet another configuration example, the information processing apparatus may be a mobile information terminal, and may further include search means for automatically and repeatedly searching for a predetermined access point.

When the search means has detected the access point, the connection means may connect to the access point, and may connect to the server via the access point.

With the above configuration example, the access point is automatically and repeatedly searched for. This makes it possible for even a mobile information terminal, which always travels and therefore is not present in a fixed connection environment, to automatically install the programs without any need for an operation of a user.

As yet another configuration example, the information processing apparatus further includes reception state storage means for storing reception states of the reception processes of the programs, each reception state indicating whether or not the corresponding reception is completed. When any of the reception states indicates that the reception of the corresponding reception process is not completed, the reception means performs the reception process again.

With the above configuration example, in the information processing apparatus, which frequently travels from place to place and therefore is not always in similar radio wave environments, even if a connection is terminated in the middle of a reception process, it is possible to perform again the uncompleted reception process in the middle when the connection is restored thereafter. This makes it possible to implement an efficient reception process, without wasting the reception process performed before the termination.

As yet another configuration example, the information processing apparatus may further include task setting means for setting one or more tasks of defining the reception processes of the one or more programs, respectively. The reception state storage means may store reception states on a task-by-task basis, each reception state indicating whether or not the reception process defined by the corresponding task is completed, and when any of the reception state is stored that indicates that the reception of the reception process defined by the corresponding task is not completed, the reception means may perform reception process again.

With the above configuration example, in the information processing apparatus, which frequently travels from place to place and therefore is not always in similar radio wave environment, even if a connection is terminated in the middle of a reception process, it is possible to perform again the incomplete reception process in the middle when the connection is restored thereafter. This makes it possible to implement an efficient reception process without wasting the reception process performed before the termination.

As yet another configuration example, the information processing apparatus may further include: distribution information reception means for, when the connection means has connected to the server, receiving currently-distributed program information about receivable programs from the server; and reception determination means for, when the currently-distributed program information has been received, determining based on predetermined conditions whether or not a process is to be performed of receiving a receivable program specified by the currently-distributed program information. When the reception determination means has determined that the reception process of the receivable program is to be performed, the reception means may perform the reception process.

With the above configuration example, when there are updates of a plurality of programs, it is possible to receive only the updates satisfying predetermined conditions. This makes it possible to efficiently perform reception processes and installation processes. It should be noted that examples of the predetermined conditions as used herein include: whether or not a certain type of program is owned; whether or not the same version is owned; and whether or not the age of the user of the information processing apparatus coincides with the age of a user assumed in the program.

As yet another configuration example, the information processing apparatus may further include execution history storage means for storing execution history data indicating an execution history of a predetermined program. The currently-distributed program information may include: information specifying the receivable program having reception conditions; and conditions concerning the execution history of the predetermined program that are necessary for receiving the receivable program, and when the execution history indicated by the execution history data satisfies the conditions for the reception, the reception determination means may determine that the reception process of the receivable program having the reception conditions is to be performed; and when the execution history does not satisfy the conditions for the reception, the reception determination means may determine that the reception process of the receivable program having the reception conditions is not to be performed.

With the above configuration example, when predetermined conditions concerning the execution history of an application is satisfied, a predetermined program is automatically installed. This makes it possible to bring a surprise to a user, and also makes it possible to give the user a motivation to play a program, such as a game, more in order to install a new program.

As yet another configuration example, the information processing apparatus may further include: distribution information reception means for, when the connection means has connected to the server, receiving currently-distributed program information about receivable programs from the server; and installation state determination means for determining whether or not the receivable programs specified by the currently-distributed program information have already been installed on the information processing apparatus. The reception means may perform processes of receiving the receivable programs specified by the currently-distributed program information, and when the installation state determination means has determined that a program among the programs received by the reception means has already been installed, the installation means may perform a process of updating the program; and when the installation state determination means has determined that a program among the programs received by the reception means has yet to be installed, the installation means may perform a process of newly installing the program.

With the above configuration example, among a plurality of distributed programs, one not owned by a user is automatically newly installed, and one already owned is automatically updated. This makes it possible to increase convenience for the user.

As yet another configuration example, the information processing apparatus may further include: distribution information reception means for, when the connection means has connected to the server, receiving currently-distributed application information indicating a list of receivable application programs, from the server; and reception determination means for, when the currently-distributed application information has been received, determining based on predetermined conditions whether or not a process is to be performed of receiving a receivable application program specified by the currently-distributed application information. When the reception determination means has determined that the reception process of the receivable application program is to be performed, the reception means may perform the reception process.

With the above configuration example, when a plurality of application programs are distributed, it is possible to receive only those satisfying conditions. This makes it possible to efficiently perform reception processes and installation processes.

As yet another configuration example, the information processing apparatus may further include age information storage means for storing in the information processing apparatus an age of a user of the information processing apparatus as user age information. The currently-distributed program information may include information indicating target ages of the receivable programs, respectively, and the reception determination means may compare the user age information to the target age of each receivable program, and, when the comparison result satisfies predetermined conditions, may determine that a process is to be performed of receiving the receivable program.

With the above configuration example, an age limit is set. This makes it possible to prevent a program unsuitable for the user from being not only executed but also received, and therefore makes it possible to efficiently perform reception processes.

As yet another configuration example, the information processing apparatus may further include distribution information reception means for, when the connection means has connected to the server, receiving from the server: currently-distributed program information about receivable programs; and priority information indicating an order of receiving the receivable programs indicated by the currently-distributed program information. The reception means may receive the receivable programs specified by the currently-distributed program information in the order indicated by the priority information.

With the above configuration example, priorities are set. This makes it possible to receive and install an urgent program and a recommended program (of a distributor) earlier (by the distributor controlling the priority information in the server).

As yet another configuration example, the information processing apparatus may further include: list creation means for creating and outputting a list of the installed programs; selection means for selecting any of the programs from the list in accordance with a predetermined operation performed on the information processing apparatus; and uninstallation means for performing a process of uninstalling the selected program.

With the above configuration example, it is possible to uninstall an automatically installed program by an operation of a user. This makes it easy to return the present state to the past state when the user is dissatisfied with the introduction of a new program. Further, conventionally, the user is caused to actively introduce a program, whereas it is possible to cause the user to actively delete a program.

As yet another configuration example, the information processing apparatus may further include deletion history storage means for storing deleted program specification information specifying the program uninstalled by the uninstallation means. The reception means may not perform a process of receiving, among programs indicated by currently-distributed program information, a program specified by the deleted program specification information.

With the above configuration example, it is possible to prevent the program deleted by the user's intention from being automatically installed. This makes it possible to increase convenience for the user.

As yet another configuration example, in accordance with a predetermined operation of a user, the information processing apparatus may connect to a predetermined server in which programs for the information processing apparatus are registered, and may receive a program desired by the user, regardless of whether or not the desired program is included in the deleted program specification information.

With the above configuration example, it is possible to install again even the program that has been deleted by the user's intention and is not to be automatically received and installed, if the user has the intention of installing it again.

As yet another configuration example, the information processing apparatus may further include storage means. The installation means may store in the storage means the programs received by the reception means, and may complete the installations by performing an execution environment setting process for making the programs executable.

With the above configuration example, the execution environments are automatically set. This makes it possible to make the programs executable without any special operation of a user.

As yet another configuration example, the information processing apparatus may further include: storage means for storing the installed programs; list creation means for, when the information processing apparatus is started, creating and outputting a list of the programs stored in the storage means; selection means for selecting any of the programs from the list in accordance with a predetermined operation performed on the information processing apparatus; and program execution means for executing the selected program. The installation means may automatically store the received programs in the storage means.

With the above configuration example, the newly received programs are stored in the storage means and appear on a list (e.g., a menu displayed when the information processing apparatus is started). This enables a user to notice the newly received programs.

As yet another configuration example, the information processing apparatus may further include: storage means for storing the installed programs; list creation means for creates and outputs a list of the programs stored in the storage means, in accordance with a predetermined operation performed on the information processing apparatus; selection means for selecting any of the programs from the list in accordance with a predetermined operation performed on the information processing apparatus; and program execution means for executing the selected program. The installation means may automatically store the received program in the storage means.

With the above configuration example, the programs stored in the storage means are included in a list of the programs that is output in accordance with a predetermined operation. This enables a user to notice the newly received programs.

As yet another configuration example, the installation means may complete the installations by automatically making a setting such that the received program is to appear on the list created by the list creation means.

With the above configuration example, as the installation process, even a setting is made such that the newly received program is to be on the list of the programs. This enables the user to notice the newly received program.

As yet another configuration example, the information processing apparatus may further include storage means for storing a rights information database and a plurality of programs. The reception means may receive the programs together with rights information for executing the programs, and the installation means may automatically store the received programs in the storage means, and automatically registers the received rights information in the rights information database. The information processing apparatus may further include: execution instruction receiving means for receiving an instruction to execute at least one of the programs stored in the storage means; authentication means for, when the execution instruction has been received, authenticating the rights information using the rights information registered in the rights information database; and program execution means for, when the authentication is successful, executing the program that the instruction has been given to execute.

With the above configuration example, the program is executed when the authentication of the rights information is successful. This makes it possible to prevent an illegitimate use.

As yet another configuration example, the information processing apparatus may further include storage means for storing a rights information database and a plurality of programs. The reception means may receive the programs together with rights information for executing the programs, and the installation means may includes: legitimacy confirmation means for, when the reception means has received the programs and the rights information, automatically determining whether or not the rights information is legitimate; rights information storage means for, when it is determined that the rights information is legitimate, automatically storing the programs and the rights information in the storage means; and rights information discard means for, when it is determined that the rights information is illegitimate, discarding contents of the rights information. The information processing apparatus may further include: execution instruction receiving means for receiving an instruction to execute at least one of the programs stored in the storage means; authentication means for, when the execution instruction has been received, reading the rights information from the storage means, and authenticating the rights information; and program execution means for, when the authentication is successful, executing the program that the instruction has been given to execute.

With the above configuration example, the legitimacy of the rights information is checked as part of the installation processes, and the program is executed when the authentication of the rights information is successful. This makes it possible to prevent an illegitimate use.

As yet another configuration example, the information processing apparatus may further include storage means for storing a plurality of programs. The reception means may receive the programs, and the installation means may include: legitimacy confirmation means for, when the reception means has received the programs, automatically determining whether or not the received programs are legitimate; rights information storage means for, when it is determined that the received programs are legitimate, automatically storing the programs in the storage means; and discard means for, when it is determined that the received programs are illegitimate, discarding the received programs. The information processing apparatus may further include: execution instruction receiving means for receiving an instruction to execute at least one of the programs stored in the storage means; and program execution means for, when the execution instruction has been received, executing the program that the instruction has been given to execute.

With the above configuration, the legitimacy of a received program file is checked as part of the installation processes. This makes it possible to prevent an illegitimate program from being executed.

As yet another configuration example, the connection means may automatically connect to the server without requesting a user to perform any operation concerning the connection, the reception means may automatically perform the reception processes of the one or more programs without requesting the user to perform any operation concerning the reception processes, and the installation means may automatically perform the processes of installing the programs on the information processing apparatus, by performing processes without requesting the user to perform any operation concerning the installation processes.

With the above configuration example, it is possible to make the programs executable without requesting the user to perform any special operation.

As yet another configuration example, the information processing apparatus may further include: distribution information reception means for, when the connection means has connected to the server, receiving currently-distributed application information indicating a list of receivable application programs, from the server; and application installation state determination means for determining whether or not the receivable application programs specified by the currently-distributed application information have already been installed on the information processing apparatus. The reception means may perform processes of receiving the receivable application programs specified by the currently-distributed application information, and when the application installation state determination means has determined that an application program among the application programs received by the reception means has already been installed, the installation means may update the application program; and when the application installation state determination means has determined that an application program among the application programs received by the reception means has yet to be installed, the installation means may newly install the application program.

With the above configuration example, among a plurality of distributed applications, one not owned by a user is automatically newly installed, and one already owned is automatically updated. This makes it possible to increase convenience for the user.

As yet another configuration example, the programs received from the server may include two types: system programs and application programs, the reception means may automatically receive the application programs, and the installation means may automatically perform processes of installing the application programs on the information processing apparatus.

With the above configuration example, the application programs are automatically received and installed. This makes it possible to provide a new application without any operation of a user.

An information processing apparatus according to the present invention includes switching means, connection means, reception means, and application installation means. The switching means switches between an unused state and a used state. The connection means automatically connects to a server when the information processing apparatus is operating at least in the unused state. The reception means automatically performs processes of receiving one or more application programs from the server when the information processing apparatus is operating at least in the unused state. The application installation means automatically performs processes of installing the application programs on the information processing apparatus when the information processing apparatus is operating in at least the unused state.

With the above configuration, the application programs are automatically received and installed. This makes it possible to provide a new application and an update program without any operation of a user. Further, the application programs are received and installed even in the unused state, and therefore, it is possible to efficiently perform installations. In addition, the application programs are newly installed without a user's knowledge, and therefore, it is possible to bring a surprise to the user.

An information processing apparatus according to the present invention includes connection means, reception means, and application installation means. The connection means automatically connects to a server. The reception means automatically performs processes of receiving one or more application programs from the server. The application installation means automatically performs processes of installing the application programs on the information processing apparatus.

With the above configuration, the applications are automatically received and installed. This makes it possible to provide a new application without any operation of a user.

A system according to the present invention includes an information processing apparatus and a server. The information processing apparatus includes connection means, reception means, installation means, and program execution means. The connection means automatically connects to a server. The reception means automatically performs processes of receiving one or more programs from the server. The installation means automatically performs processes of installing the programs on the information processing apparatus. The program execution means executes a program selected by a user. Further, the server includes reception means for, when the information processing apparatus has connected to the server, performing processes of transmitting the one or more programs.

With the above configuration, the programs are automatically received and installed. This makes it possible to provide a new application and an update program without any operation of a user (without a user actively accessing). Further, from a software developer's point of view, this has the following advantages. In an environment where a user needs to actively access in order to install a new application, it is unlikely that when, for example, a new function is added to an application thereafter, the user performs an operation of adding the new function (actively accesses). Accordingly, to provide an application to most users owing hardware, it is necessary to pre-install the development schedule of software in time for the release of the hardware. Based on the present invention, however, it is possible to set the development schedule of software after the release of the hardware, and therefore possible to reduce the burden on the software development of a software developer.

As another configuration example, the programs transmitted from the server, and received, installed, and executed by the information processing apparatus may include: content data; and a reproduction process program that causes the information processing apparatus to function as reproduction means for reproducing the content data.

With the above configuration, it is possible to reproduce even a content file in a form in which the reproduction means is not originally installed. This makes it possible to automatically distribute various contents.

As yet another configuration example, the programs transmitted from the server, and received, installed, and executed by the information processing apparatus may cause the information processing apparatus to function as uninstallation receiving means for receiving instructions from a user to uninstall the programs themselves, and the information processing apparatus may further include uninstallation means for, when the uninstallation receiving means has received the instructions to uninstall the programs, uninstalling the programs.

With the above configuration, the installed and executed programs receive the uninstallations of the programs themselves. Thus, when a user tries a program automatically installed (against the user's intention) but does not become interested in it, the user can easily uninstall it.

As yet another configuration example, the programs transmitted from the server, and received, installed, and executed by the information processing apparatus may include a program that introduces an application program to be manually received by the user, and cause the information processing apparatus to function as detailed information instruction receiving means for receiving an instruction to access detailed information about the application program to be manually received by the user, and the information processing apparatus may further include detailed information output means for, when the detailed information instruction receiving means has received the instruction to access the detailed information, outputting the detailed information about the application program to be manually received.

With the above configuration, even if the application per se is to be manually downloaded, it is possible to inform the user of the presence of the application by automatically installing an introductory program.

As yet another configuration example, the detailed information output means may acquire the detailed information from the server, and may output the detailed information.

As yet another configuration example, the information processing apparatus may further include: reception instruction receiving means for, when the detailed information is being output, receiving an instruction from the user to receive and install the application program to be manually received; and manual reception means for, when the instruction has been received to receive and install the application program, connecting to a predetermined server in which the application program to be manually received is registered, receives the application program, and automatically installs the received application program.

With the above configuration, it is possible to receive and install the application program by giving an instruction based on the detailed information. This makes it possible to easily obtain an application actually desired after an introductory application has been automatically received.

As yet another configuration example, the programs transmitted from the server, and received, installed, and executed by the information processing apparatus may include a program that introduces an application program or a content to be purchased by the user, and may cause the information processing apparatus to function as access instruction receiving means for, in the program executed by the program execution means, receiving an instruction to access a purchase site for the application program to be purchased by the user, and the information processing apparatus may further include purchase site connection means for, when the access instruction receiving means has received the instruction to access the purchase site, connecting to the purchase site for the application program to be purchased by the user.

With the above configuration, although an application that requires purchase is not suitable for automatic distribution, if the user executes an introductory program of an application automatically installed and likes the application, the user can access a site for purchasing the application. This makes it possible to inform the user of the presence of the application to be purchased, using the mechanism of the automatic installation for the advertisement of the application.

An information processing apparatus according to the present invention includes connection means, reception means, and installation means. The connection means automatically connects to a server. The reception means automatically performs processes of receiving one or more programs from the server. The installation means, when the programs received by the reception means are not installed on the information processing apparatus, automatically performs processes of newly installing the programs.

With the above configuration, it is possible to automatically newly installing a predetermined program distributed by the server.

An information processing method according to the present invention is a function updating method for updating a function of an information processing apparatus, using a system including a server and the information processing apparatus. The information processing apparatus causes a processor included therein to, at least in a power saving state, automatically and repeatedly attempt to connect to the server in accordance with a predetermined schedule. When having connected to the server, the processor automatically downloads programs and automatically install the downloaded programs, without asking permission from a user or requesting an operation of the user. Further, in a power non-saving state, the processor automatically displays the programs already installed at least in the power saving state, so as to be included in a list of the programs for the user to select a program to be executed from a plurality of programs stored in the information processing apparatus. Furthermore, the processor uninstalls a program desired by the user, among the automatically installed programs.

With the above configuration, it is possible to update a function by a manufacturer's intention, without any operation of the user and even when the user is not using the information processing apparatus. This makes it possible to make the updated function readily available to the user. Conventionally, in an environment where the user needs to actively access in order to install a new function, it is unlikely that the user performs an operation of adding a function. Accordingly, it is necessary to set the development schedule of software in time for the release of hardware. With the above configuration, however, it is also possible to set the development schedule of software after the release of the hardware. Further, although the above function is automatically downloaded and installed, the user can uninstall the function. Thus, even if automatically installed, the function can be sorted thereafter by the user.

As yet another configuration example, the server may be managed by a manufacturer of the information processing apparatus, and under the management of the manufacturer of the information processing apparatus, the programs for the information processing apparatus may be registered in the server so as to be added after release of the information processing apparatus.

With the above configuration, it is possible to update a function by a manufacturer's intention, without any operation of the user and even when the user is not using the information processing apparatus. This makes it possible to make the updated function readily available to the user.

As yet another configuration example, in accordance with a predetermined operation of the user, the information processing apparatus may further cause the processor to: connect to a predetermined server in which the programs for the information processing apparatus are registered; download a program desired by the user; and automatically install the downloaded program.

With the above configuration example, the user can also voluntarily download and install a desired program.

An information processing program according to the present invention is an information processing program to be executed by a computer of an information processing apparatus, and causes the computer to function as connection means, reception means, and installation means. The connection means automatically connects to a server. The reception means automatically performs processes of receiving one or more programs from the server. The installation means automatically performs processes of installing the programs on the information processing apparatus.

With the above configuration, the programs are automatically received and installed. This makes it possible to provide a new application and an update program without any operation of a user (without a user actively accessing). Further, from a software developer's point of view, this has the following advantages. In an environment where a user needs to actively access in order to install a new application, it is unlikely that when, for example, a new function is added to an application thereafter, the user performs an operation of adding the new function (actively accesses). Accordingly, to provide an application to most users owing hardware, it is necessary to pre-install the development schedule of software in time for the release of the hardware. Based on the present invention, however, it is possible to set the development schedule of software after the release of the hardware, and therefore possible to reduce the burden on the software development of a software developer.

As another configuration example, the programs automatically received from the server by the reception means, and automatically installed by the installation means may include content data, and may cause the computer to function as reproduction means for reproducing the content data.

With the above configuration, it is possible to reproduce even a content file in a form in which the reproduction means is not originally installed. This makes it possible to automatically distribute various contents.

As yet another configuration example, the programs automatically received from the server by the reception means, and automatically installed by the installation means may further cause the computer to function as uninstallation receiving means for receiving instructions from a user to uninstall the programs themselves, and the information processing program may further cause the computer to function as uninstallation means for, when the uninstallation receiving means has received the instructions to uninstall the programs, uninstalling the programs.

With the above configuration, the installed and executed programs receive the uninstallations of the programs themselves. Thus, when a user tries a program automatically installed (against the user's intention) but does not become interested in it, the user can easily uninstall it.

As yet another configuration example, the programs automatically received from the server by the reception means, and automatically installed by the installation means may further cause the computer to function as detailed information instruction receiving means for receiving an instruction to access detailed information about an application program to be manually received by a user, and the information processing program may further cause the computer to function as detailed information output means for, when the instruction has been received, outputting the detailed information about the application program to be manually received.

With the above configuration, even if the application per se is to be manually downloaded, it is possible to inform the user of the presence of the application by automatically installing an introductory program.

As yet another configuration example, the information processing program may further cause the computer to function as: reception instruction receiving means for, when the detailed information is being output, receiving an instruction from the user to receive and install the application program to be manually received; and manual reception means for, when the instruction has been received to receive and install the application program, connecting to a predetermined server in which the application program to be manually received is registered, receiving the application program, and automatically installing the received application program.

With the above configuration, it is possible to receive and install the application program by giving an instruction based on the detailed information. This makes it possible to easily obtain an application actually desired after an introductory application has been automatically received.

As yet another configuration example, the programs automatically received from the server by the reception means, and automatically installed by the installation means may further cause the computer to function as access instruction receiving means for, in a program executed by program execution means, receiving an instruction to access a purchase site for an application program to be purchased by a user, and the information processing program may further cause the computer to function as purchase site connection means for, when the instruction has been received, connecting to the purchase site for the application program to be purchased by the user.

With the above configuration, although an application that requires purchase is not suitable for automatic distribution, if the user executes an introductory program of an application automatically installed and likes the application, the user can access a site for purchasing the application. This makes it possible to inform the user of the presence of the application to be purchased, using the mechanism of the automatic installation for the advertisement of the application.

An information processing system according to the present invention includes connection means, reception means, and installation means. The connection means automatically connects to a server. The reception means automatically performs processes of receiving one or more programs from the server. The installation means automatically performs processes of installing the programs on the information processing apparatus.

With the above configuration, the programs are automatically received and installed. This makes it possible to provide a new application and an update program without any operation of a user (without a user actively accessing). Further, from a software developer's point of view, there are the following advantages. In an environment where a user needs to actively access in order to install a new application, it is unlikely that when, for example, a new function is added to an application thereafter, the user performs an operation of adding the new function (actively accessing). Accordingly, to provide an application to most of the users owing hardware, it is necessary to pre-install a development schedule of software in time for the release of the hardware. However, based on the present invention, it is possible to set the development schedule of software after the release of the hardware, and therefore possible to reduce the burden on the software development of a software developer.

An information processing method according to the present invention includes a connection step, a reception step, and an installation step. The connection step automatically connects to a server. The reception step automatically performs processes of receiving one or more programs from the server. The installation step automatically performs processes of installing the programs on the information processing apparatus.

With the above configuration, the programs are automatically received and installed. This makes it possible to provide a new application and an update program without any operation of a user (without a user actively accessing). Further, from a software developer's point of view, there are the following advantages. In an environment where a user needs to actively access in order to install a new application, it is unlikely that when, for example, a new function is added to an application thereafter, the user performs an operation of adding the new function (actively accessing). Accordingly, to provide an application to most of the users owing hardware, it is necessary to pre-install a development schedule of software in time for the release of the hardware. However, based on the present invention, it is possible to set the development schedule of software after the release of the hardware, and therefore possible to reduce the burden on the software development of a software developer.

Based on the present invention, programs are automatically received and installed. This makes it possible to provide a new application and the like without any operation of a user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an example of a menu screen;

FIG. 5 shows another example of the menu screen;

FIG. 14 is a diagram showing programs and data stored in a NAND flash memory 33;

DETAILED DESCRIPTION OF EXAMPLE EMBODIMENTS

With reference to the drawings, embodiments of the present invention are described below. It should be noted that the present invention is not limited to the embodiments.

First Embodiment

Figure 1:
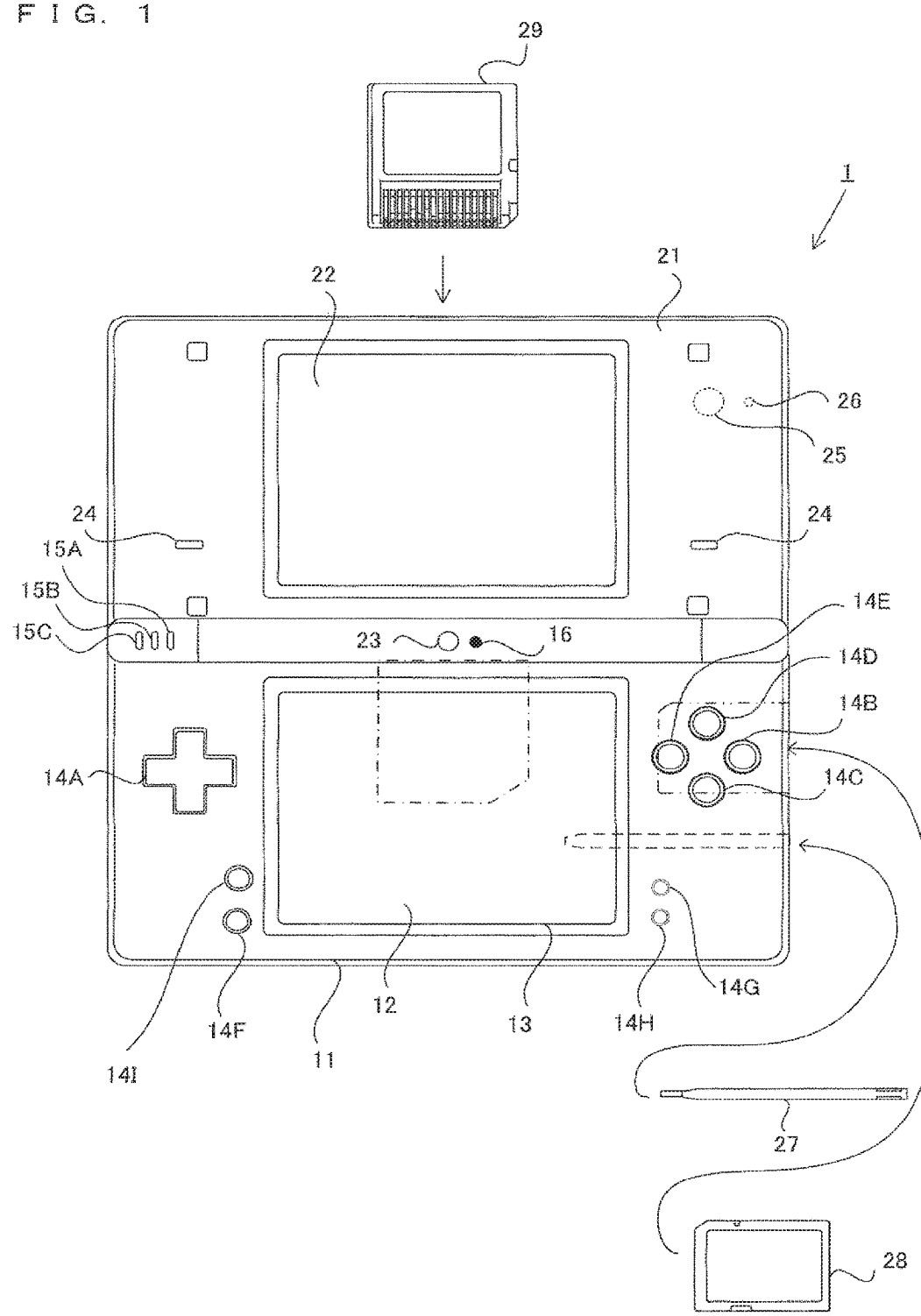
FIG. 1 is an external view of a game apparatus 1 according to a first embodiment of the present invention.

FIG. 1 shows an example of a hand-held game apparatus (hereinafter referred to simply as a "game apparatus"), which is an example of a mobile terminal according to the present invention. Referring to FIG. 1, a game apparatus 1 is a foldable hand-held game apparatus, and is open (in an open state). The game apparatus 1 is of a size that allows a user to hold it with one hand or both hands even in the open state.

The game apparatus 1 includes a lower housing 11 and an upper housing 21. The lower housing 11 and the upper housing 21 are connected to each other so as to be able to of being open or closed (foldable). In the example in FIG. 1, the lower housing 11 and the upper housing 21 are each formed in a plate-like shape of a horizontally long rectangle, and foldably connected to each other at long side portions thereof. Unusually, the user uses the game apparatus 1 in the open state. When not using the game apparatus 1, the user keeps the game apparatus 1 in a closed state. In the example shown in FIG. 1, in addition to the closed state and the open state, the game apparatus 1 is capable of maintaining an angle between the lower housing 11 and the upper housing 21 at any angle ranging between the closed state and the open state by frictional force generated at a connection portion and the like. That is, the upper housing 21 can be stationary at any angle with respect to the lower housing 11.

The game apparatus 1 includes a lower housing 11 and an upper housing 21. The lower housing 11 and the upper housing 21 are connected to each other by hinge so that the game apparatus 1 is openable and closable in a folding manner (foldable). In the example in FIG. 1, the lower housing 11 and the upper housing 21 each have a wider-than-high rectangular plate shape, and one long side of the lower housing 11 and one long side of the upper housing 21 are rotatably connected to each other. Normally, the user uses the game apparatus 1 in the open state. On the other hand, the user stores away the game apparatus 1 in a closed state when not using it. Additionally, in the example in FIG. 1, as well as the closed state and the open state that are described above, the game apparatus 1 can maintain the lower housing 11 and the upper housing 21 at any angle formed between the housings in the closed state and the housings in the open state, due to a frictional force generated at the connecting part and the like. That is, the upper housing 21 can be maintained stationary at any angle with respect to the lower housing 11.

The lower housing 11 includes operation buttons 14A through 14L and a touch panel 13 as input devices. As shown in FIG. 1, among the operation buttons 14A through 14L, the direction input button 14A, the operation button 14B, the operation button 14C, the operation button 14D, the operation button 14E, the power button 14F, the start button 14G, and the select button 14H are provided on the inner main surface of the lower housing 11, the inner main surface being located inside the game apparatus 1 when the game apparatus 1 is folded. The direction input button 14A is used for, for example, a selection operation. The operation buttons 14B through 14E are used for, for example, a determination operation or a cancel operation. The power button 14F is used to switch power control modes of the game apparatus 1. Although described in detail later, there are a "normal power mode" and a "sleep mode" as the power control modes in the present embodiment. The home button 14I is used to return to a menu screen when an application such as a game is executed. In the example in FIG. 1, the direction input button 14A, the power button 14F, and the home button 14I are provided on the inner main surface of the lower housing 11 and to one of the right and the left (to the left in FIG. 1) of the lower LCD 12, provided around the center of the inner main surface. The operation buttons 14B through 14E, the start button 14G, and the select button 14H are provided on the inner main surface of the lower housing 11 and to the other one of the right and the left (to the right in FIG. 1) of the lower LCD 12. The direction input button 14A, the operation buttons 14B through 14E, the start button 14G, and the select button 14H are used to perform various operations on the game apparatus 1.

It should be noted that the operation buttons 14J through 14L are not shown in FIG. 1. For example, the L button 14J is provided at the left end of the upper side surface of the lower housing 11. The R button 14K is provided at the right end of the upper side surface of the lower housing 11. The L button 14J and the R button 14K are used to perform, for example, a capturing instruction operation (a shutter operation) on the game apparatus 1. In addition, the volume button 14L is provided on the left side surface of the lower housing 11. The volume button 14L is used to adjust the volume of speakers included in the game apparatus 1.

The game apparatus 1 further includes the touch panel 13 as an input device other than the operation buttons 14A through 14L. The touch panel 13 is mounted so as to cover the screen of the lower LCD 12. In the present embodiment, for example, a resistive touch panel is used as the touch panel 13. As the touch panel 13, however, not only a resistive touch panel but also any pressure-type touch panel may be used. In the present embodiment, the touch panel 13 has, for example, the same resolution (detection accuracy) as that of the lower LCD 12. The resolutions of the touch panel 13 and the lower LCD 12, however, do not necessarily need to be the same. Additionally, on the right side surface of the lower housing 11, an opening (a dashed line shown in FIG. 1) is provided. The opening can accommodate a stylus 27 that is used to perform an operation on the touch panel 13. Normally, an input is provided to the touch panel 13 using the stylus 27. The touch panel 13, however, can be operated not only by the stylus 27 but also by a finger of the user.

On the right side surface of the lower housing 11, an insertion slot (a dashed double-dotted line in FIG. 1) is provided for accommodating a memory card 28. Inside the insertion slot, a connector (not shown) is provided for electrically connecting the game apparatus 1 and the memory card 28. The memory card 28 is, for example, an SD (Secure Digital) memory card, and is detachably attached to the connector. The memory card 28 is used to, for example, store (save) therein an image captured by the game apparatus 1 or load an image generated by another device into the game apparatus 1.

On the upper side surface of the lower housing 11, an insertion slot (a dashed dotted line in FIG. 1) is provided for accommodating a cartridge 29. Also inside the insertion slot, a connector (not shown) is provided for electrically connecting the game apparatus 1 and the cartridge 29. The cartridge 29 is a storage medium having stored therein a game program or the like, and is detachably inserted into the insertion slot provided in the lower housing 11.

At the left of the connecting part between the lower housing 11 and the upper housing 21, three LEDs 15A through 15C are provided. Here, the game apparatus 1 can wirelessly communicate with another device. The first LED 15A is lit when the power to the game apparatus 1 is on. The second LED 15B is lit while the game apparatus 1 is being charged. The third LED 15C is lit when wireless communication is established. Thus the three LEDs 15A through 15C can notify the user of the on/off status of the power to the game apparatus 1, the state of the charge, and the state of the establishment of communication.

On the other hand, the upper housing 21 includes an upper LCD 22. The upper LCD 22 has a wider-than-high shape, and is located so that the direction along the long side of the upper LCD 22 coincides with the direction along the long side of the upper housing 21. It should be noted that as in the lower LCD 12, a display device employing any other method and having any resolution may be used instead of the upper LCD 22. It should be noted that a touch panel may be provided so as to cover the upper LCD 22. On the upper LCD 22, for example, an operation instruction screen is displayed to inform the user of the functions of the operation buttons 14A through 14L and the touch panel 13.

The upper housing 21 includes two cameras (an inner camera 23 and an outer camera 25). As shown in FIG. 1, the inner camera 23 is provided on the inner main surface of the upper housing 21 around the connecting part. On the other hand, the outer camera 25 is provided on the surface opposite to the inner main surface, of the upper housing 21, on which the inner camera 23 is provided. That is, the outer camera 25 is provided on the outer main surface (which faces outward when the game apparatus 1 is closed and which corresponds to the back surface of the upper housing 21 shown in FIG. 1) of the upper housing 21. In FIG. 1, the outer camera 25 is shown by a dotted line. Thus the inner camera 23 can perform capturing in the direction that the inner main surface of the upper housing 21 faces, and the outer camera 25 can perform capturing in the direction opposite to the capturing direction of the inner camera 23, i.e., in the direction that the outer main surface of the upper housing 21 faces. Thus in the present embodiment, two cameras, i.e., the inner camera 23 and the outer camera 25, are provided so as to have the capturing directions opposite to each other. For example, the user can capture a view seen in the direction from the game apparatus 1 to the user, using the inner camera 23, and can also capture a view seen in the direction from the game apparatus 1 to the direction opposite to the user, using the outer camera 25.

On the inner main surface around the connecting part, a microphone (a microphone 44 shown in FIG. 2) is provided as an audio input device. Further on the inner main surface around the connecting part, a microphone hole 16 is formed so as to detect a sound from outside the game apparatus 1. The microphone 44 and the microphone hole 16 do not necessarily need to be located at the connecting part. For example, the microphone 44 may be provided in the lower housing 11, and the microphone hole 16 may be provided in the lower housing 11 so as to correspond to the position of the microphone 44.

On the outer main surface of the upper housing 21, a fourth LED 26 (a dotted line in FIG. 1) is provided. The fourth LED 26 is lit when capturing has been performed by the outer camera 25 (when a shutter button has been pressed). In addition, the fourth LED 26 is lit while a moving image is being captured by the outer camera 25. The fourth LED 26 can notify a person to be captured or a person around the person to be captured that capturing has been performed (is being performed) by the game apparatus 1.

On the inner main surface of the upper housing 21, sound holes 24 are formed to the right and left, respectively, of the upper LCD 22, provided around the center of the inner main surface. In the upper housing 21, speakers are provided at the back of the sound holes 24. The sound holes 24 are provided so as to release a sound output from the speakers to the outside of the game apparatus 1.

As described above, the upper housing 21 includes the inner camera 23 and the outer camera 25 for capturing an image, and also includes the upper LCD 22, which is display means for displaying, for example, an operation instruction screen when capturing is performed. On the other hand, the lower housing 11 includes the input devices (the touch panel 13 and the buttons 14A through 14L) for providing an operation input to the game apparatus 1, and also includes the lower LCD 12, which is display means for displaying a game screen. Thus, when using the game apparatus 1, the user can provide an input to the input devices, holding the lower housing 11 while viewing a captured image (an image captured by one of the cameras) displayed on the lower LCD 12.

Figure 2:
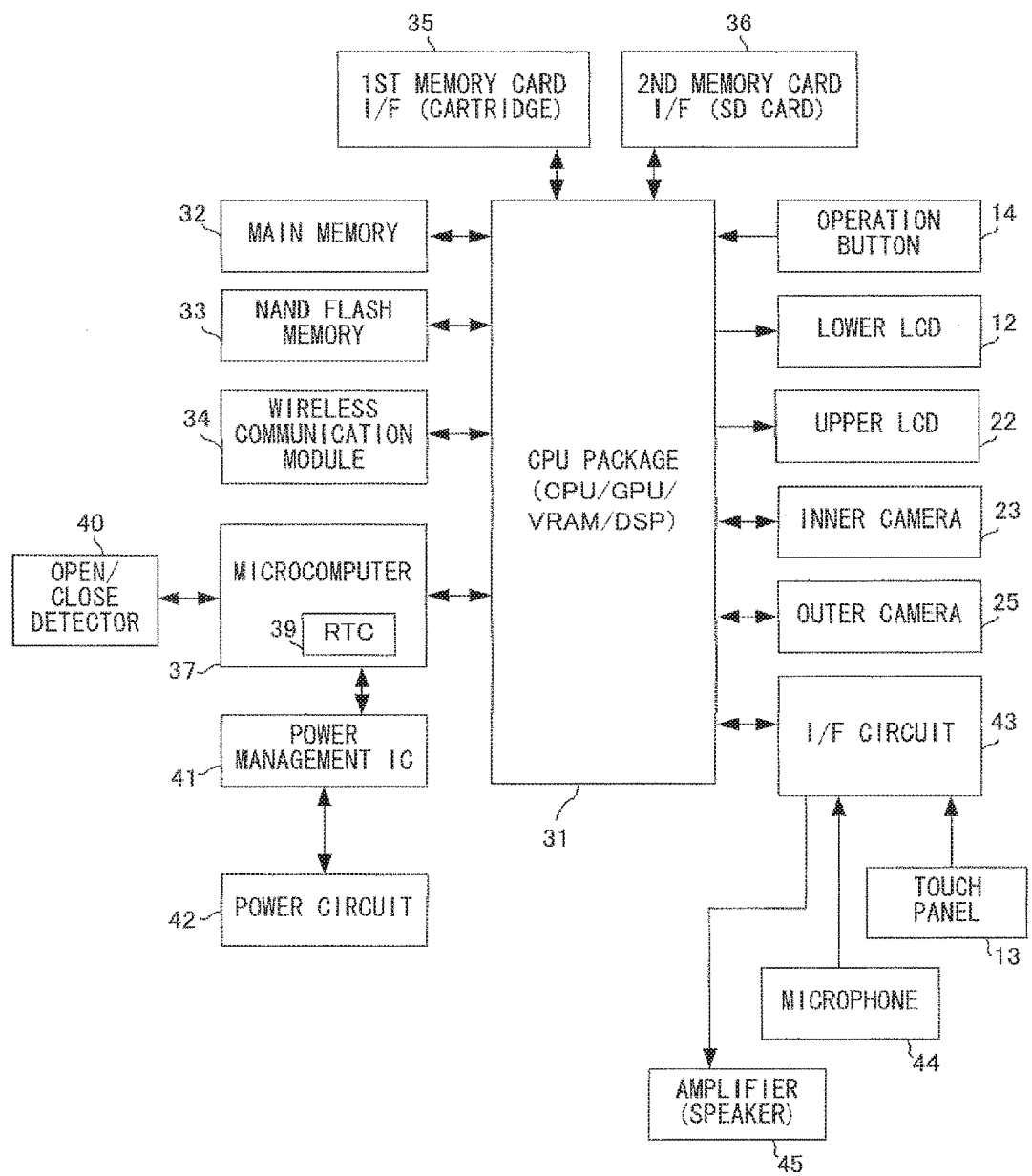
FIG. 2 is a block diagram of the game apparatus 1 according to the first embodiment of the present invention.

Next, with reference to FIG. 2, a description is given of the internal configuration of the game apparatus 1. FIG. 2 is a block diagram showing an example of the internal configuration of the game apparatus 1.

Referring to FIG. 2, the game apparatus 1 includes electronic components, such as a CPU package 31, a main memory 32, a NAND flash memory 33, a wireless communication module 34, a first memory card interface (memory card I/F) 35, a second memory card I/F 36, a microcomputer 37, an open/close detector 40, a power management IC 41, a power circuit 42, and an interface circuit (I/F circuit) 43. These electronic components are mounted on an electronic circuit board and accommodated in the lower housing 11 (or may be accommodated in the upper housing 21).

In the CPU package 31, a CPU is provided, which is information processing means for executing predetermined programs. In the present embodiment, the CPU has two cores therein (is a so-called dual core processor), and causes one of the two cores to mainly perform a process concerning system control, and the other core to mainly perform a process concerning the execution of applications. In addition, in the CPU package 31, a GPU (Graphics Processor Unit), a DSP (Digital Signal Processor), and a VRAM (Video RAM) are provided. Further, an internal main memory and the like are also provided therein. Although not shown in the figures, these components are connected to each other via an internal bus in the CPU package 31 (i.e., integrated into a single chip). These components, however, may not be integrated into a single chip, and the number of the cores of the CPU is not limited to two.

The GPU is a part of drawing means, and generates an image in accordance with a graphics command (command to create an image) from the CPU. The VRAM stores therein data (such as polygon data and texture data) that is necessary for the GPU to execute the graphics command. When generating the image, the GPU generates image data, using the data stored in the VRAM.

The DSP functions as an audio processor, and generates audio data, using sound data and acoustic waveform (timbre) data stored in the internal main memory and in the main memory 32.

It should be noted that in the following descriptions, the CPU package 31 is referred to simply as a "CPU 31".

Here, the program executed by the CPU 31 may be stored in the NAND flash memory 33 included in the game apparatus 1 in advance, or may be acquired from the memory card 28 and/or the cartridge 29, or may be acquired from another device by communication with said another device. For example, the program may be downloaded and acquired from a predetermined server via the Internet. Alternatively, the predetermined program stored in a stationary game apparatus may be downloaded and acquired from the stationary game apparatus by communication with the stationary game apparatus.

The main memory 32, the NAND flash memory 33, and the wireless communication module 34 are connected to the CPU 31. The main memory 32 is storage means used as a work area or a buffer area of the CPU 31. In the present embodiment, for example, a PSRAM (Pseudo-SRAM) is used as the main memory 32.

The NAND flash memory 33 is composed of, for example, a NAND flash memory. In accordance with an instruction from the CPU 31, a memory control circuit not shown in the figures controls the reading of data from or the writing of data into the NAND flash memory 33.

The wireless communication module 34 has the function of establishing a connection to a wireless LAN by, for example, a method complying with the IEEE 802.11b/g standard. The wireless communication module 34 also has the function of wirelessly communicating with another game apparatus of the same type by a predetermined communication method (this method is used for "local communication" described later). The wireless communication module 34 is connected to the CPU 31. The CPU 31 is capable of transmitting and receiving data to and from another device via the Internet using the wireless communication module 34, and is capable of transmitting and receiving data to and from another game apparatus of the same type using the wireless communication module 34. Further, although not shown in the figures, the wireless communication module 34 has a microcomputer chip that performs a predetermined process during a sleep mode described later.

The first memory card I/F 35 is connected to the CPU 31. The first memory card I/F 35 reads data from the cartridge 29 mounted to the connector or writes data into the cartridge 29 in accordance with an instruction from the CPU 31. For example, an application program executable by the game apparatus 1 is read from the cartridge 29 and executed by the CPU 31, and data concerning the application program (e.g., saved data of a game) is written into the cartridge 29.

The second memory card I/F 36 is connected to the CPU 31. In accordance with an instruction from the CPU 31, the second memory card I/F 36 reads data from or writes data into the memory card 28 connected to the connector. For example, data of an image captured by the outer camera 25 is written into the memory card 28, and the image data stored in the memory card 28 is read from the memory card 28 and then is stored in the NAND flash memory 3e.

The microcomputer 37 is connected to the CPU 31. The microcomputer 37 performs processes, such as a process concerning the power management of the game apparatus 1, a process concerning time, a process of detecting the opening or closing of the housing. In addition, the microcomputer 37 receives a notification concerning these processes from the CPU 31, and also provides a notification to the CPU 31. The microcomputer 37 has a real time clock (RTC) 39. The RTC 39 counts time, and outputs the counted time to the CPU 31 via the microcomputer 37. For example, the CPU 31 is capable of calculating the current time (date) and the like on the basis of the time counted by the RTC 39.

The microcomputer 37 is also connected to the open/close detector 40 and the power management IC 41. The power management IC 41 is further connected to the power circuit 42. The open/close detector 40 detects the opening or closing of the housing, and notifies the microcomputer 37 (and also the CPU 31) of the detection result. The power management IC 41 is notified of a shift to the sleep mode or a cancellation of the sleep mode, from the microcomputer 37 (from the CPU 31 via the microcomputer 37). Then, the power management IC 41 performs control for appropriately supplying power, on the basis of the notification. The power circuit 42 controls power supplied from a power supply (typically, a battery accommodated in the lower housing 11) of the game apparatus 1 to supply the power to each component of the game apparatus 1.

Here, a description is given of the power control modes of the game apparatus 1 according to the present embodiment. After the power supply such as a battery is mounted to the game apparatus 1 so as to allow power to be supplied to each component, the game apparatus 1 operates basically in either one of the two power control modes: a "normal power mode" and a "power saving mode". The "normal power mode" is the state where power is supplied to all the components. For example, when the user actually operates the game apparatus 1 and plays a predetermined game, or when the user actually operates various applications, the power control mode is the "normal power mode". The "power saving mode" is the state where the supply of power to only some of the components is continued and the supply of power to the other components is stopped. In the present embodiment, the "power saving mode" includes a "sleep mode". The "sleep mode" is the state where power is supplied to only the microcomputer 37 and the wireless communication module 34, and the supply of power to the other components, such as the CPU 31 and the LCDs, is stopped (however, the CPU 31 is capable of receiving an instruction to cancel the "sleep mode"). Further, in the "sleep mode", the microcomputer 37 and the wireless communication module 34 repeatedly perform processes termed a "microcomputer process" and a "wireless module process", respectively, in a cycle of a predetermined period of time. These processes will be described in detail later.

In the present embodiment, as well as the method of shifting to the sleep mode and canceling the sleep mode on the basis of the detection result of the open/close detector 40 as described above, it is possible to change the power control modes between the "normal power mode" and the "sleep mode" in accordance with an operation of the power button 14F. Further, as well as an operation of the power button 14F, it is possible to automatically cancel the "sleep mode" or shift to the "sleep mode" by a process as will be described later. For example, after the user has finished playing a predetermined game, if the user presses the power button 14F (it seems to the user that this operation is an operation of turning off the power), the game apparatus 1 shifts to the "sleep mode". In this state, the user can close and, for example, carry the game apparatus 1. Then, if the user opens the game apparatus 1 and presses the power button 14F again, the "sleep mode" is canceled, and the game apparatus 1 shifts to the "normal power mode". Alternatively, the game apparatus 1 may shift to the "sleep mode" when a predetermined period of time has elapsed since the last operation.

It should be noted that in addition to the "sleep mode", as one type of the "power saving mode", a "monitor-off mode" may be possible, in which the supply of power to only each LCD is stopped. In this case, power is supplied to the CPU 31 and the main memory 32 (it should be noted that power may be supplied to only the CPU cores and the internal memory within the CPU 31 and may not be supplied to the GPU). Further, by performing a long press on the power button 14F, it is also possible to shift to a "complete stop mode" in which the supply of power to all the components including the microcomputer 37 and the wireless communication module 34 is stopped (i.e., the power is completely turned off). In this case, if a long press is performed on the power button 14F again, the game apparatus 1 shifts to the "normal power mode" and is started.

Here, in view of whether or not the user is using the game apparatus 1, the power control mode can be rephrased as follows. That is, the game apparatus 1 has two states, namely, a "used state" and an "unused state". The "used state" is the state where the normal power mode continues since the user directly uses the game apparatus 1 with the housing of the game apparatus 1 open. For example, the state where the user plays a game or the like by operating the operation button 14 or the like corresponds to this state. On the other hand, the "unused state" is the state where the user does not voluntarily or directly use the game apparatus 1. The "unused state" also includes: the state where the power control mode is the "sleep mode" since the housing is closed; and the state where, in execution of a task as will be described later, a process concerning the task is performed while the "sleep mode" is temporarily canceled (with the housing closed), and the game apparatus 1 returns to the "sleep mode" after the execution of the task. For example, the "unused state" is the state where the user has the game apparatus 1 in a bag with the housing of the game closed when the user goes out. Further, the "unused state" is also the state where the "sleep mode" is temporarily canceled as described above while the game apparatus 1 is put in the bag and the user goes out, and the state where the game apparatus 1 shifts to the "sleep mode" again after the execution of a task (the user does not use the game apparatus 1 during this state). Further, in addition to the opening or closing of the housing, the trigger for switching the state of the game apparatus 1 between the "used state" and the "unused state" also includes an operation of the power button 14F. That is, after the user has been playing a game (the used state), the user finishes the play of the game, and presses the power button 14F of the game apparatus 1, whereby the state of the game apparatus 1 switches from the "used state" to the "unused state". Further, for example, when the user has not performed an operation for a certain period of time, the state of the game apparatus 1 may switch from the "used state" to the "unused state".

In the following descriptions, the power control mode will be described using an example where only the "normal power mode" and the "sleep mode" are used, for ease of description.

The game apparatus 1 includes a microphone 44 and an amplifier 45. The microphone 44 and the amplifier 45 are each connected to the I/F circuit 43. The microphone 44 detects a sound produced toward the game apparatus 1 by the user, and outputs to the I/F circuit 43 an audio signal representing the sound. The amplifier 45 amplifies the audio signal from the I/F circuit 43, and outputs the amplified audio signal through the speakers (not shown). The I/F circuit 43 is connected to the CPU 31.

The touch panel 13 is connected to the I/F circuit 43. That is, the I/F circuit 43 includes an audio control circuit for controlling the microphone 44 and the amplifier 45 (the speakers), and a touch panel control circuit for controlling the touch panel 13. The audio control circuit performs A/D conversion and D/A conversion on an audio signal, and converts an audio signal into audio data in a predetermined format. The touch panel control circuit generates touch position data in a predetermined format on the basis of a signal from the touch panel 13, and outputs the touch position data to the CPU 31. For example, the touch position data indicates the coordinates of the position, on the input surface of the touch panel 13, at which an input has been provided. The touch panel control circuit reads a signal from the touch panel 13 and generates touch position data, once in a predetermined period of time. The CPU 31 acquires touch position data from the I/F circuit 43, and therefore can recognize the position, on the touch panel 13, at which an input has been provided.

An operation button 14 includes the operation buttons 14A through 14L described above, and is connected to the CPU 31. Operation data is output from the operation button 14 to the CPU 31, the operation data indicating the states of inputs provided to the operation buttons 14A through 14L (representing whether or not the operation buttons have been pressed), respectively. The CPU 31 acquires the operation data from the operation button 14 to thereby perform processes in accordance with the inputs provided to the operation button 14.

The inner camera 23 and the outer camera 25 are connected to the CPU 31. The inner camera 23 or the outer camera 25 captures an image in accordance with an instruction from the CPU 31, and outputs data of the captured image to the CPU 31. In the present embodiment, the CPU 31 gives either one of the inner camera 23 and the outer camera 25 an instruction to perform capturing, and the camera that is given the instruction captures an image and outputs data of the captured image to the CPU 31.

The lower LCD 12 and the upper LCD 22 are connected to the CPU 31. The lower LCD 12 and the upper LCD 22 each display an image in accordance with an instruction from the CPU 31.

Next, a description is given of an outline of a process assumed in the present embodiment.

[Entire Configuration of Network]

Figure 3:
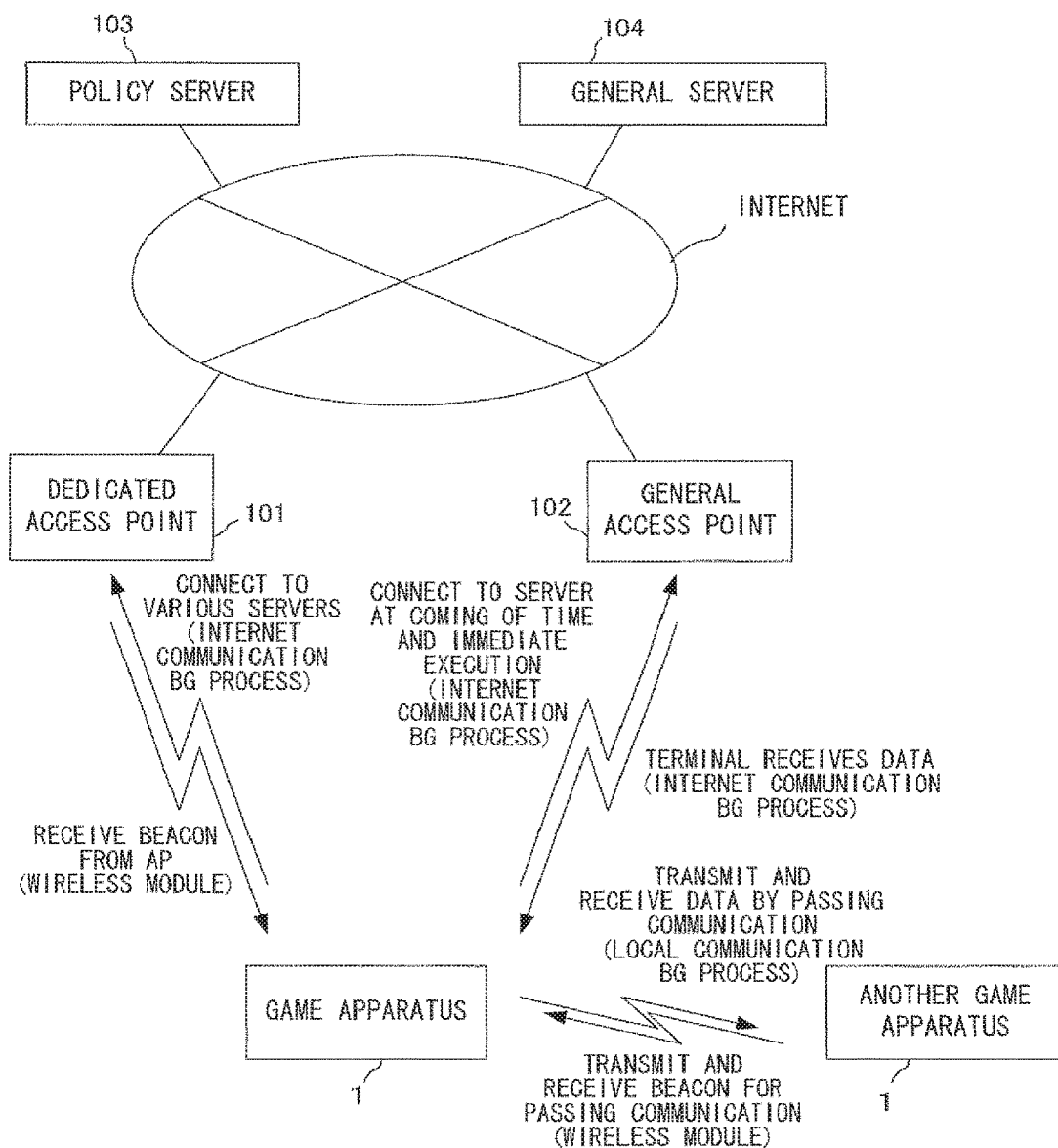
FIG. 3 is a schematic diagram showing the entirety of a network configuration according to the first embodiment.

First, a description is given of the entire configuration of a network assumed in the present embodiment. FIG. 3 is a schematic diagram showing the entirety of the network configuration according to the present embodiment. The game apparatus 1 shown in FIG. 3 uses two main types of communication modes. A first communication mode is "Internet communication", in which the Internet is used. A second communication mode is "local communication", in which game apparatuses are wirelessly connected directly to each other not via the Internet.

[Internet Communication]

First, the "Internet communication" is described. In the "Internet communication", the game apparatus 1 connects to an access point (hereinafter referred to as an "AP") by the method based on the IEEE 802.11 standard described above, and connects to the Internet via the AP. Further, the game apparatus 1 communicates with a predetermined server via the Internet.

In the present embodiment, the AP is classified into two main types, specifically, into two types: a dedicated AP 101 and a general AP 102, with reference to FIG. 3. In the present embodiment, the dedicated AP 101 refers to, for example, an AP managed by the manufacturer of the game apparatus 1. That is, the manufacturer of the game apparatus 1 knows and manages the location and the configuration of each dedicated AP, and the like. Such dedicated APs are set at specific places, such as electronics retail stores and fast food restaurants. On the other hand, in the present embodiment, the general AP 102 refers to an AP in general other than the dedicated AP. For example, the general AP 102 corresponds to an AP set at the user's home, or an AP set by a company or the like other than the manufacturer of the game apparatus 1.

In each AP, a so-called ESSID and a frequency channel, at which the AP emits radio waves, are set in advance and stored in a storage medium (e.g., a flash memory) of the AP. In addition, in the dedicated AP 101, vendor specific information described later is also stored, and a beacon including the contents of this information is transmitted.

Further, in the present embodiment, the server is also classified into two main types, specifically, into two types: a policy server 103 and a general server 104, with reference to FIG. 3. The policy server 103 is a dedicated server for acquiring data termed "policy data". In the present embodiment, the game apparatus 1 acquires data termed "policy data" from the policy server 103, and performs processes on the basis of the data. These processes will be described later. The general server 104 is a server other than the policy server 103. It should be noted that each server includes an arithmetic processing section such as a CPU, a storage section such as a memory or an HDD, and a communication section for connecting to the Internet (these components are not shown).

It should be noted that the reason why the dedicated AP as described above is set in the present embodiment is so that it is possible to define "policy data" corresponding to the dedicated AP. That is, the reason is so that when the game apparatus 1 accesses a policy server via a specific AP, it is possible to use "policy data" corresponding to the AP used for the connection (and to also the place where the AP is set, or the like).

[Local Communication]

Next, a description is given below of the "local communication", which is the other communication mode. In the "local communication", a direct connection is established between game apparatuses 1, and communication is performed between the game apparatuses 1. In the example in FIG. 3, the communication between the game apparatus 1 and another game apparatus 1 corresponds to the "local communication".

With the network configuration and the communication modes as described above, the following process is mainly performed in the present embodiment. First, as a process using the "Internet communication", there is a process of executing a task. The task in the present embodiment refers to a process involving the transmission and reception of predetermined data. Specifically, the task is classified into two types: a "transmission task" and a "reception task". In the following descriptions, however, these tasks may be collectively referred to simply as a "task". Since the task in the present embodiment is a process involving the transmission and reception of predetermined data as described above, data indicating the contents of the task includes the URL of a server that is a connection destination, and the like. Some examples of the task in the present embodiment are as follows. First, there is a task of "receiving announcement data" for the purpose of notifying the user of an announcement of a campaign or the like from the provider of a network service. Alternatively, this "announcement data" can also include a notification of the termination of a predetermined network service. In such a case, a task concerning a network application related to the termination of the service is deleted. Further, for a process concerning a game, the case is assumed, for example, where a national convention of a racing game is held during a certain period. During this period, there are tasks of "transmitting racing data" and "receiving current ranking data" for the purpose of periodically entering the user's racing data into a national ranking (in such a case, the two tasks, i.e., the "transmission task" and the "reception task", are executed).

Further, there is also a task of "confirming an additional content". This is a task assuming the case, for example, where an additional scenario of an RPG or the like is distributed. In this case, there is a task of "receiving information indicating the presence or absence of an additional content". As a result of the task, if an additional content is present, data of the additional content is downloaded.

Further, in the present embodiment, as another task, there is a task of "acquiring an installation list". This is a task set in advance as a setting before shipment of the game apparatus 1. Here, a description is given of an "installation list" and an "installation" as used in the present embodiment. First, in the present embodiment, a program executed by the game apparatus 1 is classified into two main types: a system program and an application program. The system program refers to a program included in the system of the game apparatus 1 (which may be referred to as a "module"). In the following descriptions, this system program may be referred to as a "component of the system". On the other hand, the application program is various programs not included in the category of the system program, and examples of the application program include various game programs and various application programs (paid or free) other than game applications, such as a painting application, a camera application, and an online shopping application. Further, examples of the application program also include trial versions of the game application and other applications. In the following descriptions, these application programs are collectively referred to simply as an "application". Further, in the present embodiment, examples of the "program" include not only a directly executable file, such as an "exe" file, but also a so-called archive file (e.g., a so-called "zip" file) that can generate a group of files including a program file, by being expanded. Thus, in the following descriptions, for example, the description "downloading an application" includes not only downloading a directly executable application program (e.g., an exe file) as described above, but also downloading an archive file capable of generating a group of files configuring an application by being expanded.

Next, the "installation list" is information including: information indicating the presence of installable applications (a list of currently distributed applications); and update information about the system; and the like. In the present embodiment, it is possible to confirm the presence or absence of updates of these installable applications and the system by periodically acquiring the installation list from a predetermined server. Further, not only such a confirmation, but also the download and installation processes of these updates and applications are performed.

Next, a description is given of an "installation" as used in the present embodiment. In the present embodiment, an "installation" refers to a process of: storing the system program and the application program in a storage medium, such as the NAND flash memory 33; associating the system program and the application program with the system; and making the system program and the application program executable. The association with the system refers to processes such as: setting so-called metadata; setting a registry; setting a driver; a process of checking the legitimacy of rights information (described later) corresponding to the program to be installed; and a process of registering the rights information. Taking as an example a new game that has not been installed in the game apparatus 1, the association with the system means not only acquiring programs of the new game and storing the programs in a storage medium, but also completing various settings such that the user can immediately execute the newly acquired game without using a so-called interactive installation program, which requires various instructions from the user (i.e., the user is not caused to perform an operation concerning the installation process, and is not asked for permission, either).

As described above, the task in the present embodiment is a process of connecting to a predetermined server and transmitting and receiving predetermined data, and such a task is generated as appropriate and executed. The times of executing the task include the following three main types.

(1) Time-designated execution
(2) Immediate execution
(3) Execution when the dedicated AP is involved Processes performed at these three types of times will be described later.

Next, a description is given of a process using the "local communication". As described above, in the "local communication", the game apparatuses 1 wirelessly connect to each other and communicate with each other. Thus, the "local communication" is used for various situations, such as a versus game through communication. In the present embodiment, however, descriptions are given, in particular, on the premise that the "local communication" is communication termed "passing communication" described later.

Next, a description is given of the three types of execution times of a task executed in the "Internet communication"

described above, and an outline of processes thereof. Prior to this description, a description is given of a parameter "execution priority" and a parameter "number of uses", which are set for the task. The execution priority indicates the priority of the execution of the task. When there are a plurality of tasks to be executed at the same time, the execution priority is used to determine the execution order of the tasks. In the present embodiment, the execution priority is defined on five levels. Specifically, the five levels are "EXPEDITE", "HIGH", "MEDIUM", "LOW", and "STOPPED", in order of priority from highest to lowest. Among them, "EXPEDITE" indicates a highest execution priority. In addition, "STOPPED" indicates that the task is not executed. That is, the execution priority "STOPPED" is used when a task per se is present, but is not desired to be executed. "HIGH" indicates a high priority, "MEDIUM" indicates a standard priority, and "LOW" indicates a low priority. In the present embodiment, the execution priority of a task is set, basically, using "HIGH", "MEDIUM", and "LOW". The other two execution priorities, "EXPEDITE" and "STOPPED", are used for special circumstances. For example, when the update of the system of the game apparatus 1 is desired to be urgently performed, the execution priority of a task concerning the update of the system is set as "EXPEDITE". Further, for example, it is assumed that a national convention of a racing game as described above is held once a year. In this case, during the period of the national convention, the execution priorities of the tasks of transmitting the user's racing data and receiving ranking data are set as appropriate using "HIGH", "MEDIUM", and "LOW". On the other hand, after the national convention has ended, the execution of the tasks are stopped by setting the execution priorities of the tasks as "STOPPED". Then, when the national convention is started again a year later, the execution priorities of the tasks are set as appropriate using "HIGH", "MEDIUM", and "LOW", so that it is possible to execute the tasks only during the period of the national convention.

Next, a description is given of the number of uses. When the task is generated, a predetermined numerical value is set as an initial value for the number of uses. For example, 1 is subtracted from the number of uses, every time the task is executed. In addition, every time a game or the like corresponding to the task is started, the number of uses is reset to the initial value. Then, a task whose number of uses has become 0 (in other words, it is indicated that the game or the like corresponding to such a task has not been executed for a long period of time) is not executed regardless of the execution priority the task (the task per se is not deleted).

As described above, in the present embodiment, it is possible to control the execution of tasks using parameters for execution control of tasks, such as the execution priority and the number of uses. In addition, these parameters for execution control are variable by policy data described later.

On the basis of the execution priority and the number of uses described above, a description is given below of the three types of execution times of a task executed in the "Internet communication" described above and an outline of processes thereof.

[Time-Designated Execution]

First, in the time-designated execution, when the task is generated, an execution time is designated for the task. At the coming of the designated time, the task is executed. The time-designated execution is carried out even during the "sleep mode". In addition, depending on the contents of the task, an installation process as will be described later may be performed. Thus, in the present embodiment, the following operation is possible.

For example, an assumption is made as follows. When the game apparatus 1 is in the normal power mode, a task of "confirming the presence or absence of a new free game" is generated in accordance with an operation of the user, or the like (as described above, data of the task also includes URL information about a server that is a confirmation destination). In this case, a scheduled execution time of the task is designated as 15:00. Then, the user presses the power button 14F of the game apparatus 1 to shift to the "sleep mode", and goes out with the game apparatus 1, for example, around 12:00. At this time, a menu screen as shown in FIG. 4 is displayed in the game apparatus 1 immediately before shifting to the "sleep mode".

Then, at 15:00, the game apparatus 1 attempts to execute the task. That is, at 15:00, first, the game apparatus 1 restarts supplying power to the CPU 31 and the main memory 32. Then, in order to connect to the Internet, the game apparatus 1 starts searching for a connectable AP. Here, the game apparatus 1 searches for a general AP 102 whose ESSID or the like is registered in advance on a setting screen or the like. When a connectable AP is found, the game apparatus 1 connects to the policy server 103 via the found AP. Then, the game apparatus 1 acquires "policy data" from the policy server 103. Although described in detail later, the policy data includes information defining the execution priority of the task, that is, a parameter for execution control of the task. It should be noted that it is difficult to define different policy data for each general AP, but it is possible to acquire policy data common to general APs, and it is also possible to acquire different policy data, depending on country information set in the game apparatus 1, or the like. Thereafter, the game apparatus 1 connects to the server in accordance with the URL information included in the task, and acquires data indicating the presence or absence of a new free game. Subsequently, the game apparatus 1 determines the presence or absence of a new free game on the basis of the data. When a free game is present, the game apparatus 1 connects to a predetermined server on which the program of the free game is uploaded. Then, the game apparatus 1 acquires data of the free game, and installs the free game on the game apparatus 1. Thereafter, the game apparatus 1 stops the supply of power to the CPU 31. As a result, for example, when the user comes back home at 18:00 and turns on the game apparatus 1 (to shift the sleep mode to the normal power mode), a menu is displayed as shown in FIG. 5, in which a present icon 112 is added that indicates that there is a newly installed application. Then, if the user selects the present icon 112 and presses a predetermined button, an animation effect of opening a present box is displayed, and thereafter, an icon representing the new free game installed this time is displayed so as to replace the present icon 112.

Further, the following operation is also possible in the present embodiment. For example, an assumption is made as follows. Concerning an already installed game, a task of "confirming the presence or absence of an additional content" is generated. Similarly to the above, a scheduled execution time of the task is 15:00. Then, similarly to the above, the user causes the game apparatus 1 to shift to the sleep mode, and goes out with the game apparatus 1 around 12:00. Thereafter, the task is executed around 15:00, and an additional content of a certain game, here, for example, a game indicated by an icon 111 in FIG. 4 (e.g., an additional scenario of an RPG), is downloaded. In such a case, when the user comes back home at 18:00 and causes the game apparatus 1 to shift the sleep mode to the normal power mode, a mark "New!" indicating the presence of the additional content is displayed near the icon 111. This mark notifies the user of the arrival of a certain new content concerning the game indicated by the icon 111.

By the process as described above, the configuration of the menu of the game apparatus 1 can be different between before the user goes out and after the user comes back.

As a matter of course, the time-designated execution is also possible in the "normal power mode". For example, even when the user plays a game at home around 15:00 without going out, the game apparatus 1 may acquire and install a free game as described above (i.e., as a background process) in parallel with the processing of the game. In this case, when a transfer to the menu screen is performed after the user has finished playing the game, the user notices that the menu configuration has changed, that is, the present icon 112 (i.e., a certain new software element) has been added to the menu without the user's knowledge.

It should be noted that when a situation occurs that a plurality of tasks are executed at the same time, the execution order of each task is determined as appropriate on the basis of the execution priority, accordingly.

[Immediate Execution]

Next, a description is given of the immediate execution of the task. In the immediate execution, the task is executed immediately in accordance with an instruction from the user, or the like. For example, the case is one where the user manually gives an instruction to execute a predetermined task.

[Task Execution when Dedicated AP is Involved]

Next, a description is given of a task execution when a dedicated AP is involved. As described above, power is supplied to the wireless communication module 34 even in the "sleep mode", and therefore, the wireless communication module 34 constantly operates unless the power is completely turned off. Thus, in the present embodiment, the wireless communication module 34 repeatedly performs the scanning (so-called passive scanning) of a beacon in either the "normal power mode" or the "sleep mode". Here, a beacon transmitted from the above dedicated AP 101 includes information indicating that the AP 101 is managed by the manufacturer of the game apparatus 1. For example, such information (hereinafter referred to as "vendor specific information") is included in "Vendor Specific", which is one of information elements of the beacon and is defined in the IEEE 802.11 standard. In the present embodiment, using the vendor specific information about the beacon, it is determined whether or not the beacon is a beacon transmitted from the dedicated AP. That is, it is determined whether or not the user (carrying the game apparatus 1) is near the dedicated AP 101. As a result, when it is determined that the beacon is a beacon transmitted from the dedicated AP 101, the game apparatus 1 establishes a connection to the dedicated AP 101, and further connects to the policy server 103 via the Internet. Then, the game apparatus 1 acquires "policy data" from the policy server 103. Although described in detail later, the policy data includes information defining the execution priority of the task. In addition, as described above, in the present embodiment, it is possible to define different policy data for each dedicated AP. For example, when the game apparatus 1 connects to the policy server 103 via a dedicated AP 101 set at a store A, "policy data A" is acquired. When the game apparatus 1 connects to the policy server 103 via a dedicated AP 101 set at a store B, "policy data B" is acquired. In this case, for example, it is assumed that in the "policy data A", the execution priorities of the tasks are set such that "task A>task B", and in the "policy data B", the execution priorities of the tasks are set such that "task B>task A". As a result, a task to be preferentially executed is different between when the user is at the store A and when the user is at the store B. As a result, it is possible to control the execution of tasks in accordance with each store (to be exact, in accordance with the dedicated AP 101 set at each store). Further, it is possible to acquire policy data that is different on the basis of both the dedicated AP 101 and information such as the country information set in the game apparatus 1.

Further, in the present embodiment, the policy data may include information for changing the number of uses. When such information is included, for example, the number of uses of a task that has become 0 is set to 1. As a result, it is also possible to execute the task only once.

As described above, in the present embodiment, when the user carrying the game apparatus 1 approaches the dedicated AP 101, the game apparatus 1 acquires the policy data from the policy server 103. Then, in accordance with the dedicated AP 101 used for the connection to the policy server 103, it is possible to change the execution priorities of tasks to be executed in the game apparatus 1. This makes it possible to, as described above, change a task to be preferentially executed (and also the execution order of tasks) in accordance with the store. In addition, for example, when the user stops in at the store A where the dedicated AP 101 is set, it is possible to most preferentially execute a task of downloading data specific to the store A (e.g., an item in a game available only via the dedicated AP 101 at the store A). Further, it is possible to change the number of uses, and therefore, for example, it is possible to make executable again a task whose number of uses has become 0 and which has not been executed for a long period of time, and to cause the task to be executed when the user visits a store. Then, a certain notification is displayed as the execution result of the task, whereby it is possible to bring a surprise to the user, or draw "attention" of a user who does not positively collect information. As a result, for example, it is possible to give the user a motivation to play again a game that has not been played for a long period of time.

As described above, in the present embodiment, although the game apparatus 1 is not actually a constant-connection-type terminal, it is possible to exhibit to the user a behavior of the game apparatus 1 as if being constantly in connection, by performing the "Internet communication" and the execution of a task (transmitting and receiving data to and from the server) even when the game apparatus 1 is in the "sleep mode" as described above. As a result, the user can acquire various notifications, free applications, and the like, without voluntarily or positively performing an operation of connecting to the network. In addition, it is possible to bring a surprise and fun to the user by a change in the software configuration of the game apparatus 1 without the user's knowledge.

Figure 7:
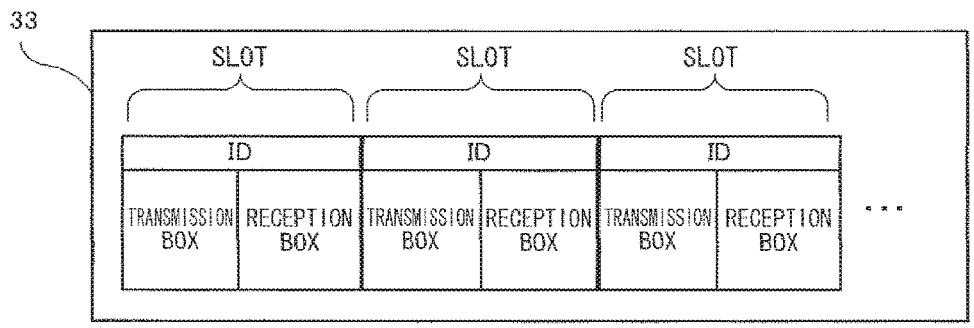
FIG. 7 is a diagram illustrating "passing communication"

Next, a description is given of an outline of a process of "passing communication" using the "local communication" described above. FIGS. 7 to 10 are diagrams for illustrating the "passing communication". First, in the present embodiment, a data area for the "passing communication" is secured in the NAND flash memory 33. FIG. 7 is a schematic diagram showing the data area for the "passing communication". In FIG. 7, the area is constituted of a set of a plurality of "slots". Each slot is associated with a predetermined application or game. The user can optionally make this association by performing a predetermined operation. Each slot is constituted of an ID indicating the associated application or game, a transmission box, and a reception box. In the "passing communication", when the game apparatuses 1 automatically and repeatedly search for each other and detect each other, data in the boxes are automatically transmitted and received.

Figure 8:
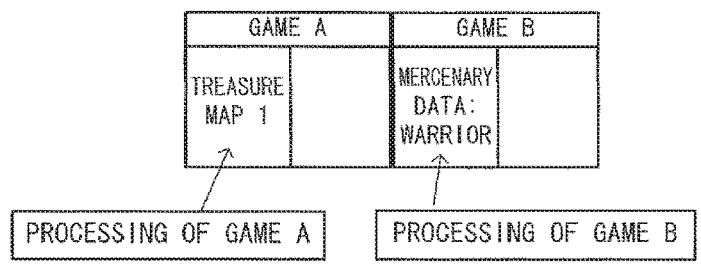
FIG. 8 is another diagram illustrating the "passing communication"

An example of this is shown below. For example, it is assumed that a user A plays a game A by using their own game apparatus A. As a result, in the processing of the game A, data indicating a "treasure map 1" is stored in the transmission box of the slot associated with the game A. Further, the user A plays another game B, and in the processing of the game B, data of a "warrior", which is a "mercenary" usable in the game B, is stored in the transmission box of the slot associated with the game B. FIG. 8 is a schematic diagram showing such a storage state of the game apparatus A of the user A.

Figure 9:
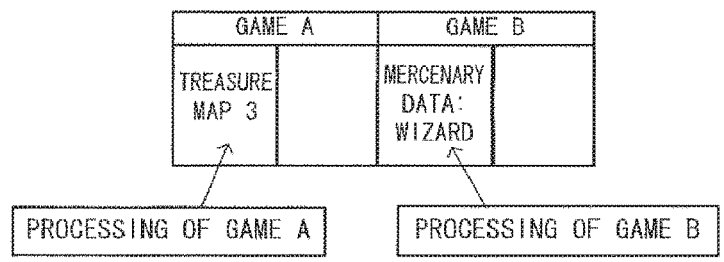
FIG. 9 is another diagram illustrating the "passing communication"

Similarly, a user B plays the game A by using their own game apparatus B, and, as a result, data indicating a "treasure map 3" is stored in the transmission box of the slot associated with the game A. In addition, as a result of the user B playing the game B, mercenary data of a "wizard" is stored in the transmission box of the slot associated with the game B. FIG. 9 is a schematic diagram showing a storage state of the game apparatus B of the user B.

Figure 10:
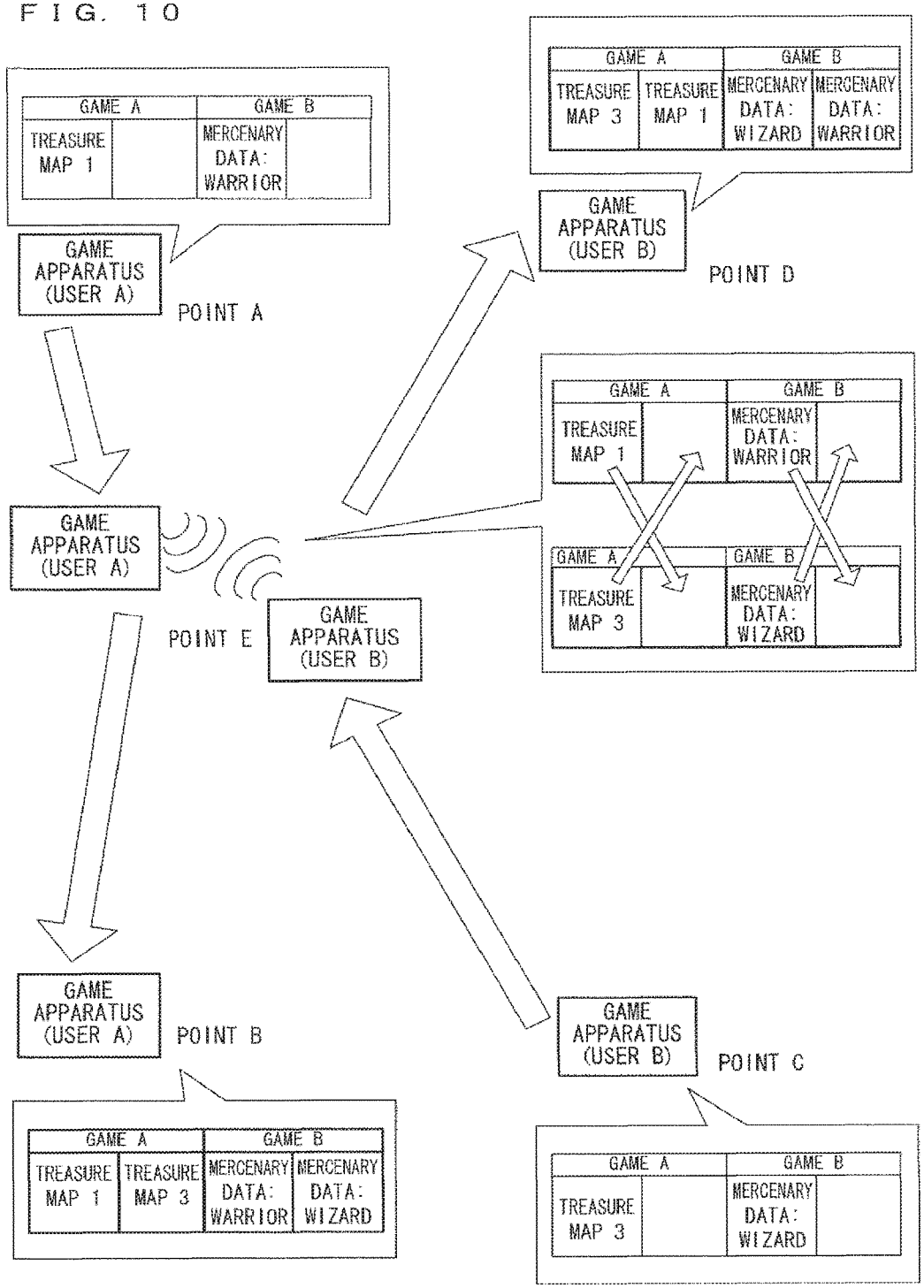
FIG. 10 is another diagram illustrating the "passing communication"

On the premise of the storage states as described above, an assumption is made as follows. The user A and the user B go out with their own game apparatuses, respectively. Each game apparatus has shifted to the "sleep mode". Further, in each game apparatus, a setting has been performed so as to permit the "passing communication" to be performed. In addition, during the "sleep mode", each game apparatus periodically transmits a signal of a "passing connection request" (a passing communication beacon). FIG. 10 is a schematic diagram illustrating the "passing communication" on such an assumption. It is assumed that in FIG. 10, the starting point of the user A is a point A, and the starting point of the user B is a point C. Then, both users arrive at a point E, and approach each other within the range where the game apparatuses are can perform local communication with each other. At this time, the "passing connection request" transmitted from one of the game apparatuses is received by the other game apparatus, and a connection for "local communication" is established between the game apparatuses on the basis of the "passing connection request". Then, data is exchanged as follows. That is, data in the transmission box in the game apparatus A of the user A is transmitted to the reception box of the slot of the corresponding game in the game apparatus B. Specifically, the "treasure map 1" of the game A is transmitted to the reception box of the slot in the game apparatus B, the slot associated with the game A. Similarly, the "mercenary data of the warrior" of the game B in the game apparatus A is transmitted to the reception box of the slot of the game B in the game apparatus B. Similarly, the "treasure map 3" and the "mercenary data of the wizard" are transmitted from the game apparatus B to the reception boxes of the slots of the corresponding games in the game apparatus A.

As a result, for example, as shown at a point B in FIG. 10, after the "passing communication" has been performed, in the slot of the game A in the game apparatus A, the "treasure map 1" is stored in the transmission box, and the "treasure map 3" is stored in the reception box. Further, in the slot of the game B, the "mercenary data of the warrior" is stored in the transmission box, and the "mercenary data of the wizard" is stored in the reception box. This enables the user A to use these pieces of data stored in the reception boxes, for the corresponding games. Similarly, in the game apparatus B, as shown at a point D, the "treasure map 3" and the "mercenary data of the warrior" received from the game apparatus A are stored, and this enables the user B to use these pieces of data for the corresponding games.

As described above, in the "passing communication" in the present embodiment, when the game apparatus 1 is in the "sleep mode", predetermined data stored in the storage area for the passing communication is transmitted and received using the "local communication". However, the applications to be communicated are limited to games set in the slots in both game apparatuses. For example, in the case where the user B associates only the game B with one of the slots as described above and does not own the game A per se, only data concerning the game B is transmitted and received, and data concerning the game A is not transmitted or received.

Next, a description is given of details of the processes described above performed by the game apparatus 1. First, main programs and data used in these processes are described, but prior to this description, a description is given of components that perform the processes in the present embodiment. In the present embodiment, the microcomputer 37, the wireless communication module 34, and the CPU 31 independently perform processes described below, and these processes are performed in cooperation with and in parallel with each other. Describing the allotment of main process contents, the microcomputer 37 mainly performs processes concerning: the detection of the opening/closing of the game apparatus 1; the switching control of the power control mode of the game apparatus 1; the management of a task execution time; and the like. The wireless communication module 34 mainly performs processes such as: the monitoring of execution start conditions for the passing communication; the scanning of a beacon from an AP in the Internet communication; and the like. The CPU 31 mainly performs overall processes other than the processes performed by the microcomputer 37 and the wireless communication module 34. For example, the CPU 31 executes applications and tasks.

Figure 11:
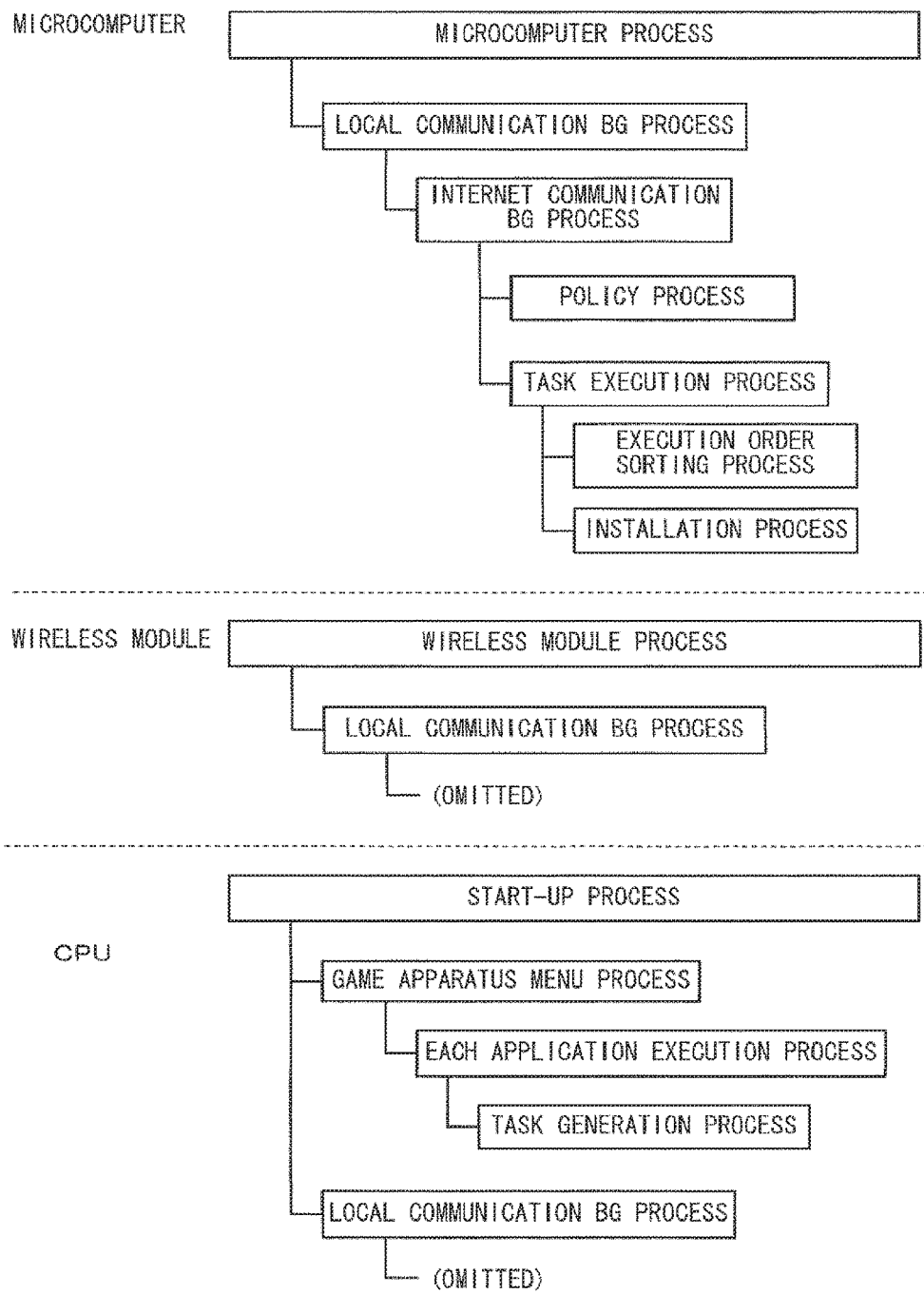
FIG. 11 is a diagram showing the correlations among various functions (programs) executed in the present embodiment.

For a help to the following description, FIG. 11 shows the relationships between various functions (programs) executed in the present embodiment. FIG. 11 shows that the following can be performed in parallel with one another: a microcomputer process performed by the microcomputer 37; and a wireless module process performed by the wireless communication module 34; and a start-up process performed by the CPU 31. Elements in FIG. 11 correspond to various programs described later with reference to FIGS. 12 to 14. FIG. 11 shows that, for example, in a program of the "microcomputer process" performed by the microcomputer 37, a "local communication BG (Back Ground) process" is called up and performed. In addition, FIG. 11 shows that in the "local communication BG process", an "Internet communication BG process" is called up and performed. Further, FIG. 11 shows that the "local communication BG process" may be called up also in the "wireless module process" performed by the wireless communication module 34 and also in the "start-up process" performed by the CPU 31.

Figure 12:
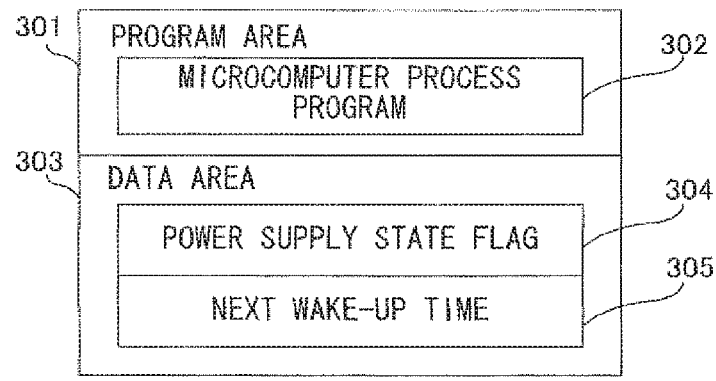
FIG. 12 is a diagram showing main data stored in a storage area included in a microcomputer 37.

A description is given below of the main programs and data used in these processes. FIG. 12 is a diagram showing main data stored in a storage area (not shown) included in the microcomputer 37. Within the microcomputer 37, a program area 301 and a data area 303 are present. In the program area 301, a microcomputer process program 302 is stored for the microcomputer 37 to perform the processes as described above. In the data area 303, a power supply state flag 304 and a next wake-up time 305 are stored. The power supply state flag 304 is a flag indicating whether or not the game apparatus 1 is in the "sleep mode". When the power supply state flag 304 is set to ON, the game apparatus 1 is in the "normal power mode", and when the power supply state flag 304 is set to OFF, the game apparatus 1 is in the "sleep mode". The next wake-up time 305 is data indicating the time when the "sleep mode" is to be canceled. Basically, among next execution times set for respective tasks, the earliest time is set as the next wake-up time 305. As will be described later, however, when the period of time from the current time to a next execution time is too short or too long, a slight adjustment is made.

Figure 13:
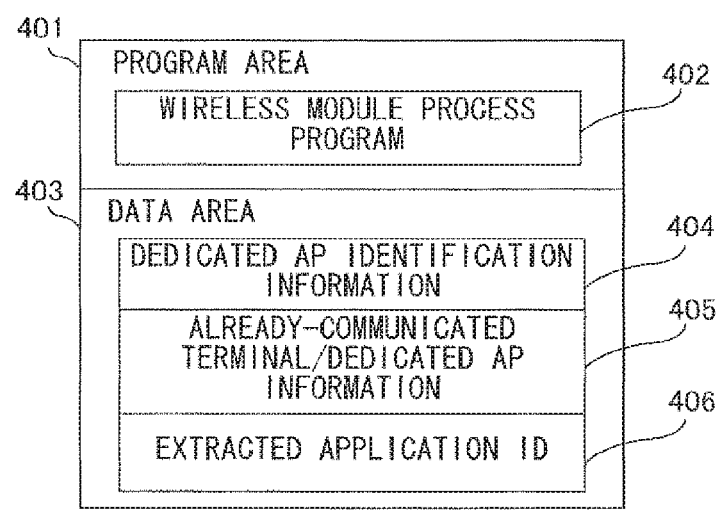
FIG. 13 is a diagram showing main data stored in a storage area included in a wireless communication module 34.

FIG. 13 is a diagram showing main data stored in a storage area (not shown) included in the wireless communication module 34. In the storage area in the wireless communication module 34, a program area 401 and a data area 403 are present. In the program area 401, a wireless module process program 402 is stored for the wireless communication module 34 to perform the processes as described above. In the data area 403, dedicated AP identification information 404, already-communicated terminal/dedicated AP information 405, and an extracted application ID 406 are stored.

The dedicated AP identification information 404 is a character string for identifying the dedicated AP 101. By matching the vendor specific information included in the above beacon with the dedicated AP identification information 404, it is possible to determine whether or not an AP is the dedicated AP 101. The already-communicated terminal/dedicated AP information 405 is information for preventing consecutive communication with the same communication partner within a short period of time. Specifically, when communication is performed with a predetermined communication partner, the MAC address of the communication partner and the communication time are stored as the already-communicated terminal/dedicated AP information 405 for a predetermined period of time (the already-communicated terminal/dedicated AP information 405 can be stored for a plurality of communication partners). Control is performed such that no communication is performed with a communication partner whose MAC address has been stored as the already-communicated terminal/dedicated AP information 405, even when the presence of the communication partner is detected. This makes it possible to avoid repeated communication with the same communication partner.

The extracted application ID 406 is data in which an application ID 522 of passing communication data 520 described later is extracted and stored. This data indicates applications and games that are objects of the "passing communication" as described above.

FIG. 14 is a diagram showing programs and data stored in the NAND flash memory 33. It should be noted that these pieces of data are expanded in the main memory 32 and executed, where necessary. The NAND flash memory 33 includes a program area 500 and a data area 512. The program area 500 includes a system program area 515. Further, in the program area 500, a plurality of application programs 511 are stored.

In the system program area 515, the following are stored: a menu process program 501; a task generation process program 502; a local communication BG process program 503; an Internet communication BG process program 504; a policy process program 505; a task execution process program 506; an execution order sorting process program 507; a system installation process program 508; an application installation process program 509; and the like.

The menu process program 501 is a program for performing a process concerning the menu of the game apparatus 1. The task generation process program 502 is a program for generating each task.

The local communication BG process program 503 and the Internet communication BG process program 504 are programs for performing processes concerning the "local communication" and the "Internet communication" described above, respectively.

The policy process program 505 is a program for performing processes, such as acquiring the "policy data" described above and changing the execution priorities of tasks on the basis of the "policy data". The task execution process program 506 is a program for executing each task. The execution order sorting process program 507 is a program for determining the execution order of the tasks when the tasks are executed. The installation process program 508 is a program for performing processes concerning the update of the system.

The application installation process program 509 is a program for performing a process of newly installing applications, such as a trial version of a game and a free application, and a process of updating a game and an application that have already been installed.

The application program 511 is a program for executing various applications such as games. It should be noted that the term "program" is used herein for convenience, but a part of data used for the execution of the applications is also included in the application program.

Further, although not shown in the figures, in the system program area 515, as well as the various data described above, an update file of the system program may be stored with a filename different from the filename of the update object system program. Although described in detail later, when a process of reflecting an update of the system is performed, the update of the system program is reflected by modifying reference information about an update object system element (e.g., "execution of the menu") (the reference information is the filename of a program that is the substance of the system element "execution of the menu"), such that the reference information indicates the filename stored with the different name. For example, it is assumed that the system element "execution of the menu" is used, and the filename of an execution program for executing the system element is "menu0101.exe" before an update. In addition, the element "execution of the menu" is associated with "menu0101.exe", as so-called registry information (such registry information is hereinafter referred to as "substantial program reference information". Thereafter, an update file is downloaded and stored with a filename "menu0201.exe". In such a case, the update of the system program is reflected by modifying the "substantial program reference information" from "menu0101.exe" to "menu0201.exe" (i.e., modifying the registry information).

Next, the data area 512 is described. In the data area 512, the following are stored: passing communication data 520; task data 530; application-related data 550; game apparatus setting data 560; received policy data 570; an installation list 580; an on-the-fly cache 600; a rights information database 610; a system installation completion flag 620; an application installation necessity flag 630; a current system configuration detail list 640; component comparison data 650; a deletion history 660; a play history 670; and the like.

Figure 15:
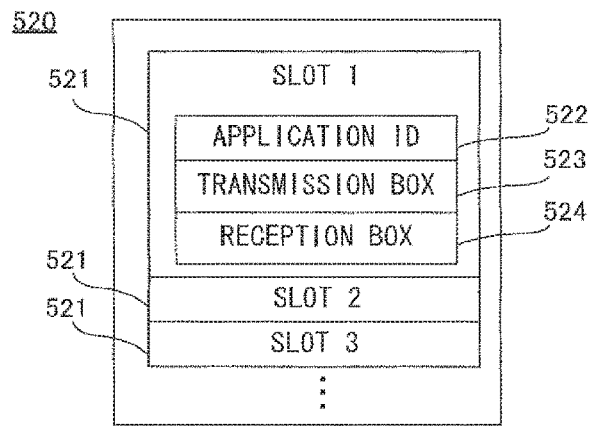
FIG. 15 is a diagram showing an example of the data structure of passing communication data 520 in FIG. 14.

The passing communication data 520 is data for performing transmission and reception in the "passing communication" as described above. FIG. 15 is a diagram showing an example of the data structure of the passing communication data 520. The passing communication data 520 is constituted of a set of slots 521. Each slot 521 includes an application ID 522, a transmission box 523, and a reception box 524. The application ID 522 is an ID for identifying an application or a game associated with the slot 521. In the transmission box 523, data to be transmitted to another game apparatus 1 in the "passing communication" is stored. In the reception box 524, data received from another game apparatus 1 in the "passing communication" is stored.

Figure 16:
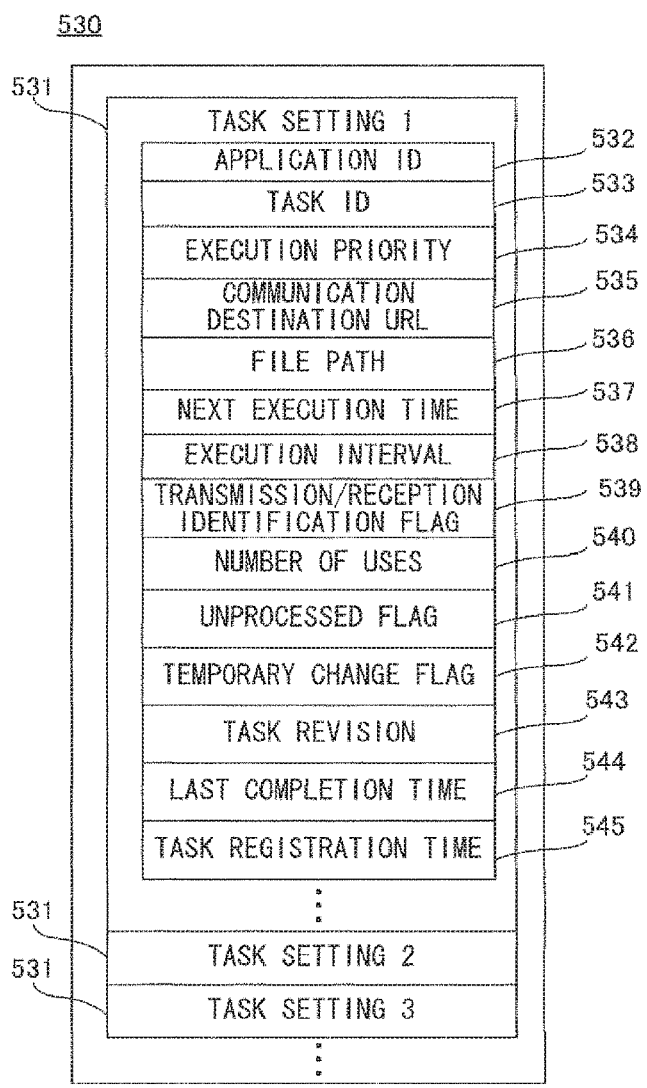
FIG. 16 is a diagram showing an example of the data structure of task data 530 in FIG. 14.

Referring back to FIG. 14, the task data 530 is data defining the contents of a task executed in the present embodiment. FIG. 16 is a diagram showing an example of the data structure of the task data 530. In the task data 530, a plurality of task settings 531 are stored. Each task setting 531 includes an application ID 532, a task ID 533, an execution priority 534, a communication destination URL 535, a file path 536, a next execution time 537, an execution interval 538, a transmission/reception identification flag 539, the number of uses 540, an unprocessed flag 541, a temporary change flag 542, a task revision 543, a last completion time 544, a task registration time 545, and the like.

The application ID 532 is an ID indicating an application or a game related to the task (typically, an application or a game on the basis of which the task has been generated). The task ID 533 is an ID for identifying the task.

The execution priority 534 is data indicating the execution priority of the task, and information indicating "EXPEDITE", "HIGH", "MEDIUM", "LOW", or "STOPPED" as described above is stored therein.

The communication destination URL 535 indicates a communication destination of the task (typically, an upload destination of data, or a server that is a download source). The file path 536 is data indicating the location where data to be uploaded or downloaded data is stored in the game apparatus 1. That is, the file path 536 is data indicating the location where data to be uploaded to the communication destination is present in the game apparatus 1, or the location where downloaded data is stored in the game apparatus 1.

The next execution time 537 is data indicating the time when the task is to be executed next. The execution interval 538 is data indicating the execution interval of the task. For example, data indicating every day, every three days, every week, or the like, is stored therein. The execution interval 538 is used to determine the next execution time 537.

The transmission/reception identification flag 539 is a flag indicating whether the task is a "transmission task" of transmitting predetermined data, or a "reception task" of receiving predetermined data. For example, when the flag is set to ON, it is indicated that the task is the "reception task", and when the flag is set to OFF, it is indicated that the task is the "transmission task".

The number of uses 540 is the number of uses for the task as described above. A task whose number of uses has become 0 is not executed, regardless of the contents of the execution priority 534 of the task. The unprocessed flag 541 is a flag indicating whether or not the task has been executed. When the flag is set to ON, it is indicated that the task has been executed, and when the flag is set to OFF, it is indicated that the task has yet to be executed. The temporary change flag 542 is a flag indicating, when the execution priority 534 of the task has been changed on the basis of policy data described later, whether or not the change in the execution priority 534 is temporary.

The task revision 543 is data indicating a final revision of a policy applied to the task. The last completion time 544 is data indicating the time when the task of the task setting 531 has been executed last and completed successfully. The task registration time 545 is data indicating the time when the task setting 531 has been generated and registered for the first time.

Figure 17:
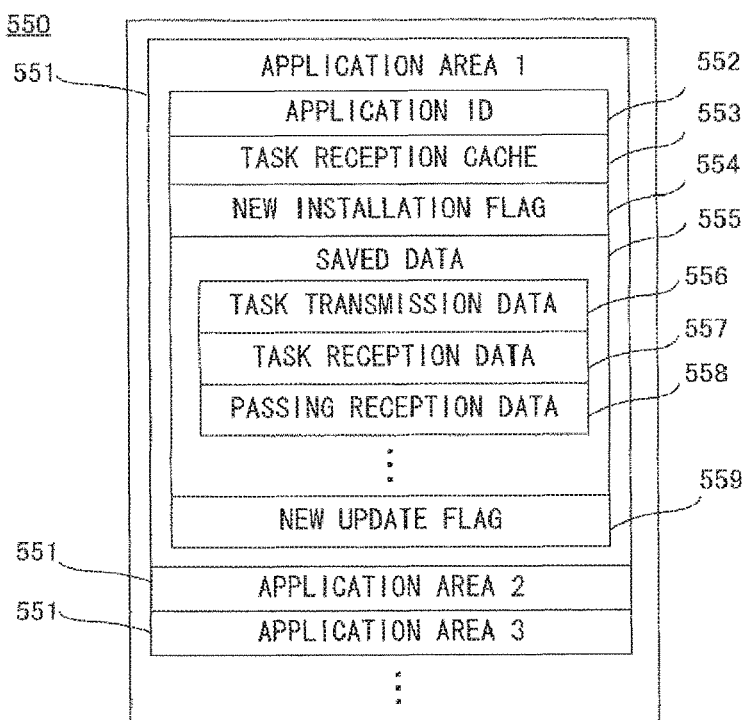
FIG. 17 is a diagram showing an example of the data structure of application-related data 550 in FIG. 14.

Referring back to FIG. 14, next, the application-related data 550 is data related to various applications installed on the game apparatus 1. FIG. 17 is a diagram showing an example of the data structure of the application-related data 550. The application-related data 550 includes a plurality of application areas 551. In each application area 551, an application ID 552, a task reception cache 553, a new installation flag 554, saved data 555, and a new update flag 559 are stored. The application ID 552 is an ID indicating an application corresponding to the application area 551. The task reception cache 553 is the area where data received as a result of the execution of the "reception task" described above is stored. Accordingly, in the case of the "reception task", information indicating the location of the task reception cache 553 (e.g., an address) is indicated by the file path 536 of the task setting 531.

The new installation flag 554 is a flag indicating whether or not the application is a newly installed application. When the flag is set to ON, it is indicated that the application indicated by the application ID 552 is a newly installed application (e.g., a trial version of a new game and a new free application).

The saved data 555 is saved data concerning the application indicated by the application ID 552, and includes task transmission data 556, task reception data 557, and passing reception data 558. In addition, for example, if the application is a game, the saved data 555 also includes data of player characters, data indicating the progression of the game, and the like.

The task transmission data 556 is data to be transmitted in the "transmission task". Information indicating the location of the data (e.g., an address) is indicated by the file path 536 of the task setting 531. The task reception data 557 is data acquired by copying data in the task reception cache 553 when the application is executed. As a result, the copied data is handled as a part of the saved data 555, and can be used in the processing of the application. Similarly, the passing reception data 558 is data acquired by copying data in the reception box 524 of the passing communication data 520 when the application is executed.

The new update flag 559 is a flag indicating whether or not an update file of the application has been downloaded. When the flag is set to ON, it is indicated that an update file of the application indicated by the application ID 552 has been downloaded.

Referring back to FIG. 14, the game apparatus setting data 560 is data of various settings and the like registered in the game apparatus 1. For example, user information, such as the name and the age of the user and country information, is included therein. In addition, for example, network settings, such as a password and an ESSID (Extended Service Set Identifier) of an AP set at the user's home, are also included therein. The network settings are made as appropriate and stored in accordance with an operation of the user, by a process of the network settings being performed as appropriate in the game apparatus 1. In addition to the above settings made by the user, the network settings also include an ESSID of an AP of a predetermined provider (e.g., a public wireless LAN spot) set in advance as a setting before shipment. In addition, the last updated date and time of the system software of the game apparatus 1 and the like are also stored.

Figure 18:
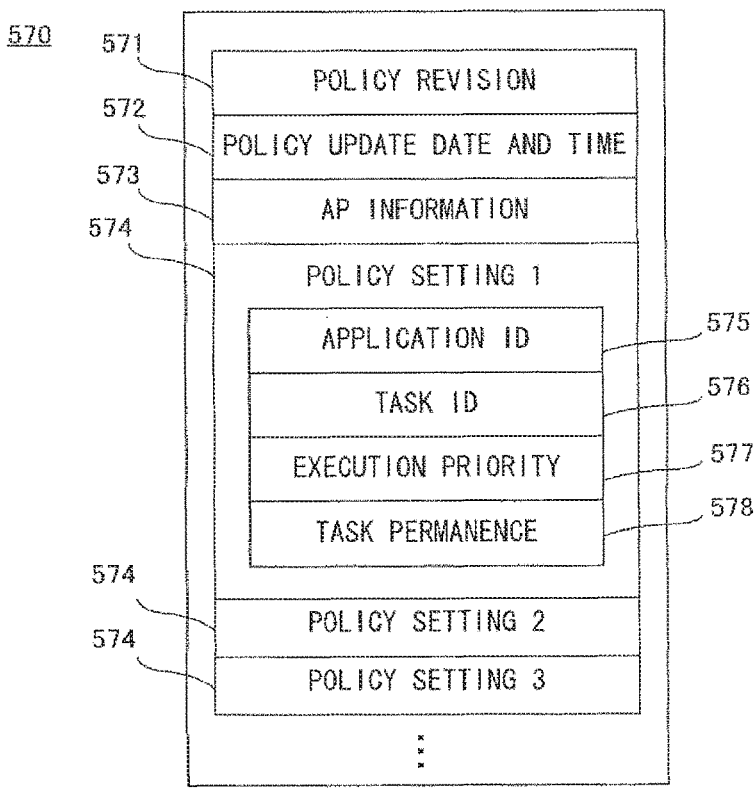
FIG. 18 is a diagram showing an example of the data structure of received policy data 570 in FIG. 14.

The received policy data 570 is policy data received from the policy server 103 as described above (thus, the structure of the policy data stored in the policy server 103 is similar to that of the received policy data 570). FIG. 18 is a diagram showing an example of the data structure of the received policy data 570. The received policy data 570 includes a policy revision 571, a policy updated date and time 572, AP information 573, and a plurality of policy settings 574.

The policy revision 571 is data indicating a revision of the received policy data 570. The policy updated date and time 572 is data indicating the date and time when the policy data has been updated (the date and time when the policy data has been uploaded to the policy server). The AP information 573 is information indicating an AP associated with the received policy data 570.

Each policy setting 574 is data defining a task whose execution priority is to be changed, and the contents of the change. Each policy setting 574 includes an application ID 575, a task ID 576, an execution priority 577, and task permanence 578. The application ID 575 is an ID indicating an application to which the policy data is to be applied. The task ID 576 is data indicating a task to which the policy data is to be applied. In the task ID 576, as well as data individually designating the task ID 533 of the task data 530, data indicating generic designation or indicating that a plurality of tasks are designated together, such as "all the tasks", may be stored.

The execution priority 577 indicates an execution priority after change. The task permanence 578 is a flag indicating whether the change is temporary or permanent. When the flag is set to ON, it is indicated that the change is permanent.

Referring back to FIG. 14, next, the installation list 580 is data indicating the contents of the installation when a certain application needs to be installed, such as the update of the system or the installation of a trial version application (the list indicates a sort of an index of the contents of the installation). Here, in the present embodiment, the task of "acquiring an installation list" is registered in advance in the task data 530 as one of initial settings before shipment of the game apparatus 1. In addition, a value determined in advance is defined as the task ID 533 so as to indicate that the task is an initially-set task. In the present embodiment, the installation list 580 is periodically acquired as a part of system functions of the game apparatus 1.

Figure 19:
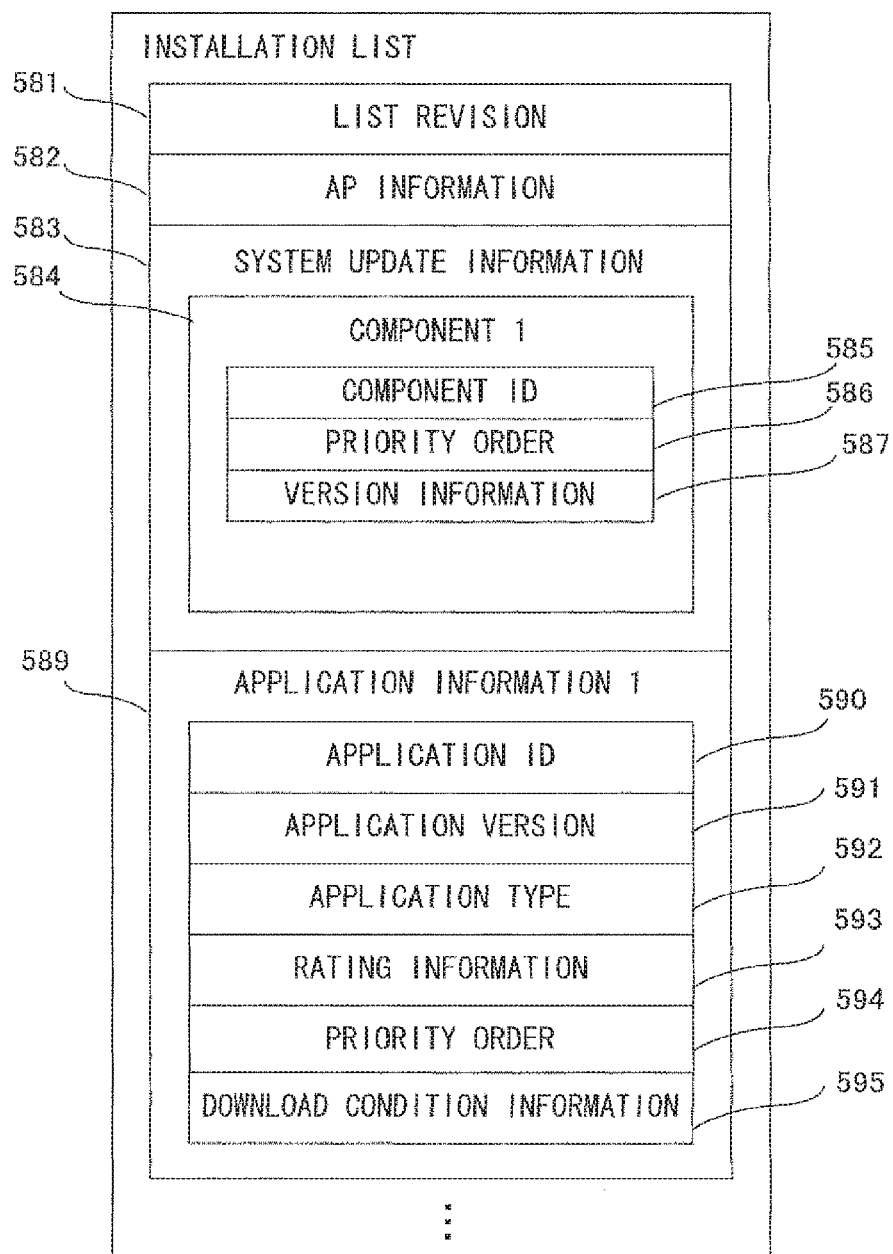
FIG. 19 is a diagram showing an example of the data structure of an installation list 580 in FIG. 14.

FIG. 19 is a diagram showing an example of the data structure of the installation list 580. In FIG. 19, the installation list 580 includes a list revision 581, AP information 582, system update information 583, and application information 589.

The AP information 582 is information indicating an AP associated with the installation list 580. That is, similarly to the policy data, different contents can be defined for each AP also in the installation list 580.

The system update information 583 is information indicating an updatable system program (module) among the various system programs included in the system. Here, the system program is represented as a component 584. When a plurality of update object system programs are present, a plurality of components 584 are included in the system update information 583. The component 584 includes a component ID 585, a priority order 586, and version information 587.

The component ID 585 is an ID for uniquely identifying each component. The priority order 586 is data indicating the priority order (the execution priority 534) of the task of downloading the component. The version information 587 is data indicating the version of the component.

The application information 589 is data defining an application that can be an installation object. Further, in the installation list 580, a plurality of pieces of application information 589 may be included (e.g., in the case where updates of a plurality of applications are present), or no application information 589 may be included (e.g., in the case where only an update of the system is present). The application information 589 includes an application ID 590, an application version 591, an application type 592, rating information 593, a priority order 594, download condition information 595, and the like.

The application ID 590 is an ID for identifying an application to be installed. The application version 591 indicates the version of the application or the like to be installed. The application type 592 is data indicating the type of the application concerning the installation. For example, it is indicated whether the application is a trial version application, a free application, a "bonus application" described later, or the like. The rating information 593 is information indicating the rating (target age) of the application concerning the installation. In accordance with the age information about the user included in the game apparatus setting data 560, it is determined whether or not an installation is to be actually performed.

The download condition information 595 is data indicating conditions for downloading the application. This assumes the case where, for example, a bonus application is downloaded as a "bonus" when a certain game has been played for a predetermined period of time or longer. In the present embodiment, as these conditions, the history of the play of the game is used. Specifically, the download condition information 595 includes information indicating the application ID of a game that needs to be owned for downloading the application, and the required play time of the game. It should be noted that in the case of an application for which there are no conditions for downloading it (an application for which download conditions are not set), no value is set in the information. It should be noted that in the following descriptions, such conditions are referred to as "play history conditions". Further, an application for which the play history conditions are set may particularly be referred to as a "bonus application".

Referring back to FIG. 14, the on-the-fly cache 600 is an area where, in the update of the system of the game apparatus 1, data for the update of the system whose installation method is a "transfer type" is stored. In the present embodiment, system update data is uploaded to a server as a compressed file. Then, when performing the update of the system whose installation method is a "transfer type", the game apparatus 1 expands the compressed file "on the fly", as it is said, in parallel with downloading the compressed file. The destination of the expansion is the on-the-fly cache 600. Further, the filename of the update data stored in the on-the-fly cache 600 is, as described above, stored with the same name as the filename of the update object. For example, if the filename of given system data is "firmware.bin", the update data is also stored with the filename "firmware.bin" in the on-the-fly cache 600. Although described later, in a "transfer-type" system update process, the file stored in the on-the-fly cache 600 is transferred to the system program area 515, whereby the reflection of the update is completed.

The rights information database 610 is a database including rights information, which is information used to perform a predetermined authentication when an application is executed. It should be noted that the rights information is prepared for each application, and is acquired in conjunction with the download of the application.

The system installation completion flag 620 is a flag indicating whether or not system update data has been acquired, but the update of the system has yet to be reflected. That is, the flag indicates whether or not the update of the system can be reflected. When the flag is set to ON, it is indicated that system update data yet to be reflected is present, that is, the system can be updated. When the flag is set to OFF, it is indicated that the system cannot be updated (does not need to be updated, or is already in the latest state).

The application installation necessity flag 630 is a flag indicating whether or not it is necessary to perform a process of installing an application. When the flag is set to ON, it is indicated that it is necessary to perform a process of installing an application.

The current system configuration detail list 640 is data indicating detailed information concerning each system program (module, component) included in the current system, such as the filename and the version of the system program.

The component comparison data 650 is information used to determine whether or not it is necessary to update the system. For example, the component comparison data 650 is a hash value of the entire current system program.

The deletion history 660 is data in which information (e.g., the application ID 590) indicating applications deleted by the user's intention is accumulated. In the present embodiment, the applications appearing on this list are not automatically downloaded or installed. That is, as a general rule, applications once deleted by the user's intention avoid being automatically installed.

The play history 670 is data indicating the play histories (usage histories) of various installed applications, such as a game. Although not shown in the figures, the data includes the application ID of a corresponding application, the (last) start time and end time of the application, the version information about the application, and the like.

Additionally, although not shown in the figures, in the data area 512, as well as the above, the following are stored: data (metadata, a database) assembling various information (so-called metadata) related to each application installed on the game apparatus 1, such as the version information, the date of addition, the last updated date and time, and the like of the application; a registry database, which is a collection of so-called registry information as described above; and the like.

Next, a description is given of details of the processes as described above performed by the game apparatus 1. Descriptions are given of the process performed by the microcomputer 37, the process performed by the wireless communication module 34, and the process performed by the CPU 31, in this order.

[Process Performed by Microcomputer 37]

Figure 20:
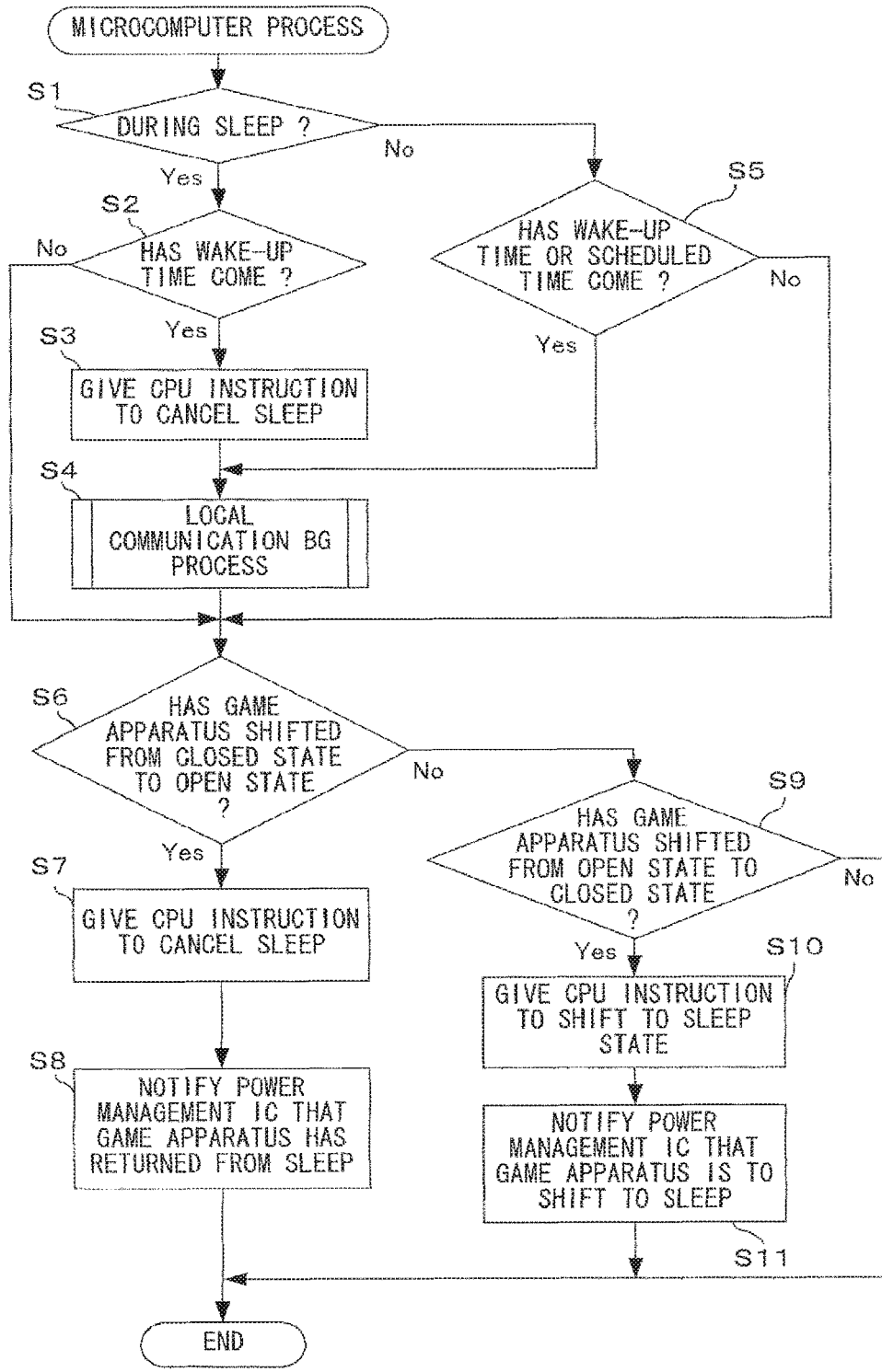
FIG. 20 is a flow chart showing a microcomputer process performed by the microcomputer 37.

FIG. 20 is a flow chart showing the microcomputer process performed by the microcomputer 37. The process shown in FIG. 20 is repeatedly performed as a background process at predetermined time intervals, unless the power of the game apparatus 1 is completely turned off.

In FIG. 20, first, in step S1, it is determined whether or not the game apparatus 1 is in the "sleep mode". Specifically, it is determined with reference to the power supply state flag 304 whether or not the game apparatus 1 is in the "sleep mode". As a result of the determination, when it is determined that the game apparatus 1 is in the "sleep mode" (YES in step S1), it is determined in step S2 whether or not a wake-up time (the time when the sleep mode is to be canceled) has come. Specifically, the determination is made by the RTC 39 in the microcomputer 37 comparing the current time to the next wake-up time 305 in the storage area in the microcomputer 37. As a result of the determination, when it is determined that the wake-up time has not come (NO in step S2), the processing proceeds to step S6 described later. On the other hand, when it is determined that the wake-up time has come (YES in step S2), in step S3, the microcomputer 37 gives the CPU 31 an instruction to cancel the "sleep mode" to shift to the "normal power mode", sets the power supply state flag 304 to ON, and notifies the power management IC 41 that the "sleep mode" is to be canceled. It should be noted that although, as an example, the game apparatus 1 is caused to shift to the "normal power mode" in this case, the game apparatus 1 may be caused to shift to the "monitor-off mode" as described above, in which power is not supplied to the LCD. That is, the game apparatus 1 may be caused to shift to a power control mode where power is supplied to the CPU 31.

Next, in step S4, the local communication BG process is performed by the CPU 31. Although this process will be described in detail later, an outline of the process performed here is briefly described. In the local communication BG process in this flow, a connection to a predetermined server via the general AP 102 and the Internet by "Internet communication", and the execution of the task, are performed accordingly. In addition, an installation process is performed where necessary. Then, when the local communication BG process has ended, the processing proceeds to step S6 described later.

On the other hand, as a result of the determination in step S1, when it is determined that the game apparatus 1 is not in the "sleep mode" (i.e., the game apparatus 1 is operating in the "normal power mode") (NO in step S1), subsequently, it is determined in step S5 with reference to the next wake-up time 305 and the next execution time 537 of the task data 530 whether or not the wake-up time or a scheduled time, which is a designated execution time of a task, has come. As a result of the determination, when it is determined that either time has come (YES in step S5), the processing proceeds to step S4. On the other hand, when it is determined that neither times have come (NO in step S5), the processing proceeds to step S6.

Next, in step S6, it is determined whether or not the game apparatus 1 has shifted from the closed state (the state where the housing is closed) to the open state (the state where the housing is open) (i.e., whether or not the game apparatus 1 has been opened). Specifically, the microcomputer 37 determines whether or not a detection signal indicating that the housing has been opened has been received from the open/close detector 40. As a result of the determination, when it is determined that the game apparatus 1 has shifted from the closed state to the open state (YES in step S6), in the subsequent step S7, the microcomputer 37 gives the CPU 31 an instruction to cancel the "sleep mode", sets the power supply state flag 304 to ON, and notifies the power management IC 41 that the "sleep mode" is to be canceled. In the subsequent step S8, the microcomputer 37 notifies the power management IC 41 that the game apparatus 1 has returned from the "sleep mode" (that the "sleep mode" has been canceled). In response to this, the power management IC 41 starts supplying power to each component of the game apparatus 1 as appropriate.

On the other hand, as a result of the determination in step S6, when it is determined that the game apparatus 1 has not shifted from the closed state to the open state (NO in step S6), subsequently, it is determined in step S9 on the basis of a signal from the open/close detector 40 whether or not the game apparatus 1 has shifted from the open state to the closed state (i.e., whether or not the game apparatus 1 has been closed). As a result, when it is determined that the game apparatus 1 has shifted from the open state to the closed state (YES in step S9), in the subsequent step S10, the microcomputer 37 gives the CPU 31 an instruction to shift to the "sleep mode", and sets the power supply state flag 304 to OFF. Further, in the subsequent step S11, the microcomputer 37 notifies the power management IC 41 that the game apparatus 1 is to shift to the "sleep mode". In response to this, the power management IC 41 stops the supply of power to the components of the game apparatus 1 other than certain components as appropriate. On the other hand, as a result of the determination in step S9, when it is determined that the game apparatus 1 has not shifted from the open state to the closed state (NO in step S9), the processes at the step S10 and S11 are skipped, and the microcomputer process ends.

[Process Performed by Wireless Communication Module 34]

Figure 21:
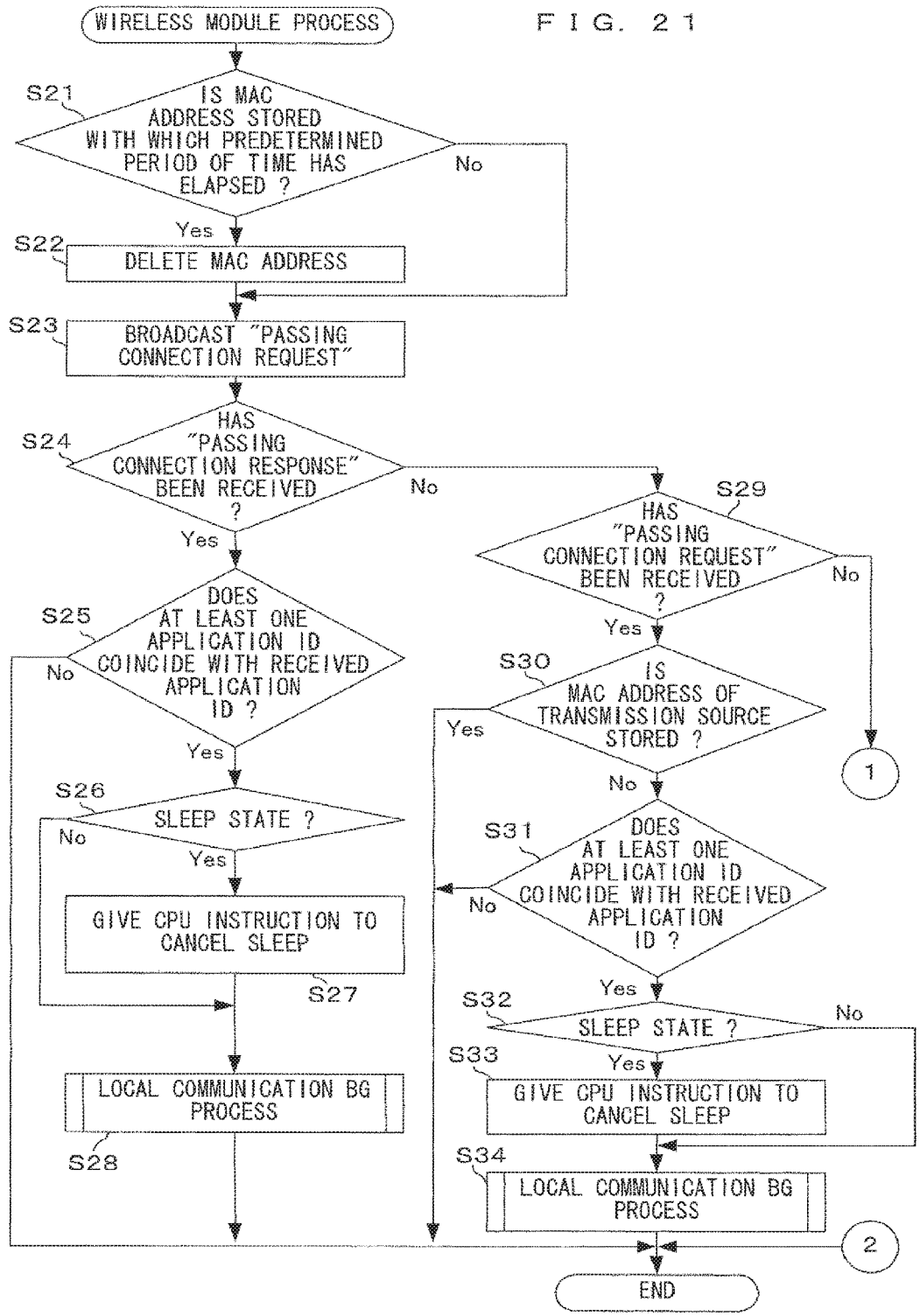
FIG. 21 is a flow chart showing a wireless module process.
Figure 22:
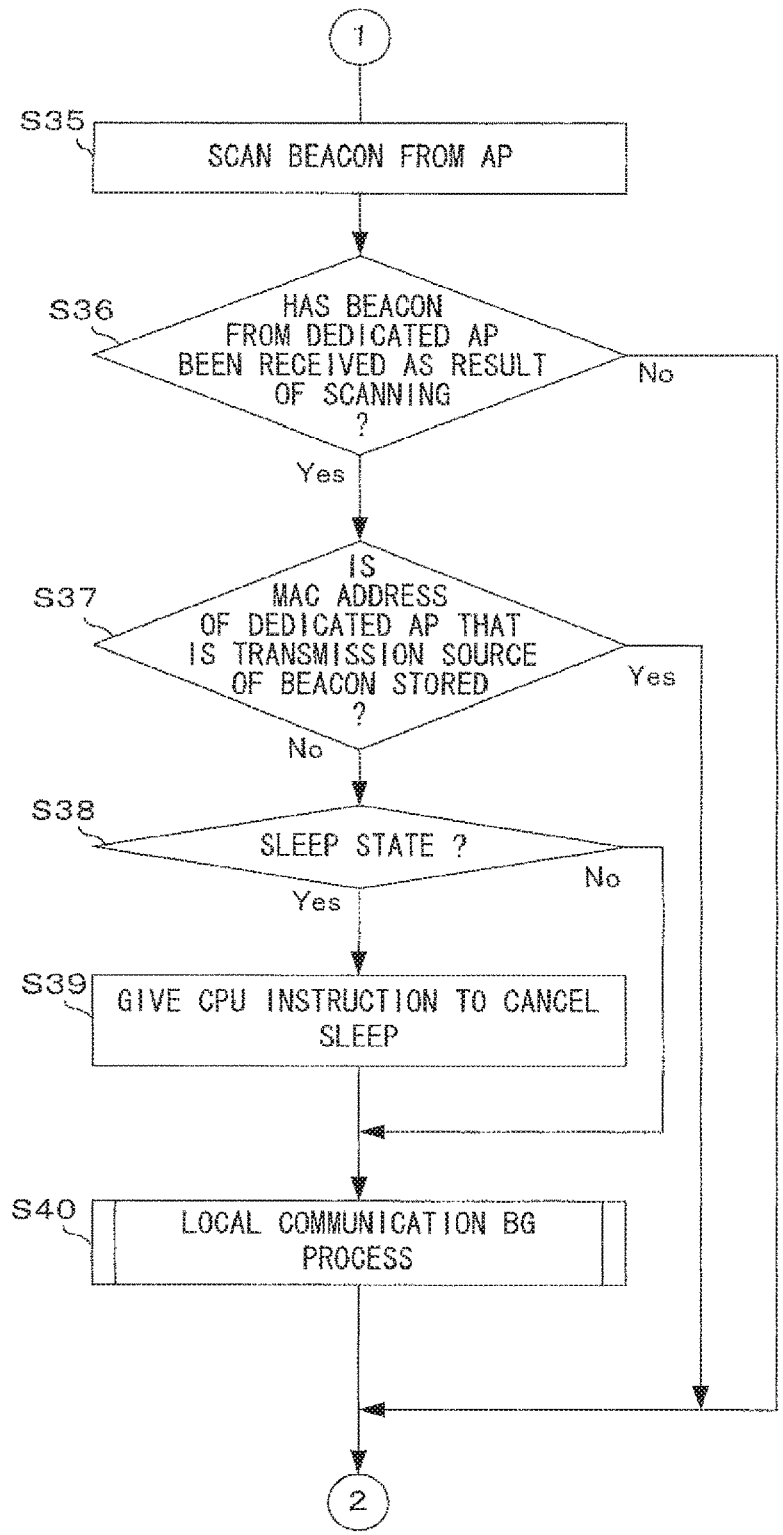
FIG. 22 is a flow chart showing the wireless module process.

Next, a description is given of the wireless module process performed by the wireless communication module 34. FIGS. 21 and 22 are flow charts showing the wireless module process. Similarly to the above microcomputer process, the process shown in FIG. 21 is also repeatedly performed as a background process at predetermined time intervals, unless the power of the game apparatus 1 is completely turned off.

In FIG. 21, first, in step S21, it is determined with reference to the already-communicated terminal/dedicated AP information 405 in the storage area in the wireless communication module 34 whether or not an MAC address is stored therein with which a predetermined period of time has elapsed from its last communication. Since the last communication time is stored in the already-communicated terminal/dedicated AP information 405 as described above, the presence or absence of an MAC address with which the predetermined period of time has elapsed is determined by comparing the last communication time to the current time.

As a result of the determination, when it is determined that a MAC address is stored with which the predetermined period of time has elapsed from its last communication (YES in step S21), in step S22, the MAC address that satisfies this condition, and data of the last communication time associated with the MAC address are deleted from the already-communicated terminal/dedicated AP information 405. Thereafter, the processing proceeds to step S23. On the other hand, when it is determined that no MAC address is stored with which the predetermined period of time has elapsed from its last communication (NO in step S21), the process of step S22 is skipped, and the processing proceeds to the next step S23.

In step S23, a "passing connection request" is broadcast. The "passing connection request" is a request signal for, when data is stored in the passing communication data 520, notifying another game apparatus 1 of a request for the "passing communication" as described above. The signal includes the MAC address of the game apparatus 1. In addition, the signal includes the application IDs indicated by the extracted application ID 406. That is, the "passing connection request" includes data indicating applications of which data is to be transmitted and received (which is desired to be transmitted and received), and is broadcast.

Next, in step S24, it is determined whether or not a "passing connection response" has been received. The "passing connection response" is a response signal from another game apparatus 1 that has received the "passing connection request" broadcast in step S23. The reception of the response signal indicates that it is possible to establish a connection by "local communication" to said another game apparatus 1 that has transmitted the response signal. As a result of the determination, when it is determined that the "passing connection response" has been received from another game apparatus 1 (YES in step S24), subsequently, it is determined in step S25 whether or not applications registered in the game apparatuses 1 as transmission and reception objects coincide with one another. Specifically, the application IDs included in the received "passing connection response" are matched with the extracted application ID 406. Then, it is determined whether or not there is at least one coinciding application ID.

As a result of the determination, when it is determined that there is no coinciding application ID (NO in step S25), the "passing communication" is not performed, and the wireless module process ends. On the other hand, when it is determined that there is at least one coinciding application ID (YES in step S25), a process is performed of transmitting and receiving passing communication data concerning the application ID. Specifically, first, in step S26, it is determined whether or not the game apparatus 1 is in the "sleep mode". Here, the power supply state flag 304 for determining whether or not the game apparatus 1 is in the "sleep mode" is present in the microcomputer 37, and the wireless communication module 34 and the microcomputer 37 are connected to each other via the CPU 31. Thus, in the state where power is not supplied to the CPU due to the "sleep mode" of the game apparatus 1, the wireless communication module 34 cannot access the power supply state flag 304. Therefore, on the basis of the result that the wireless communication module 34 cannot access the power supply state flag 304, it is possible to determine that the game apparatus 1 is in the "sleep mode". As a result, when it is determined that the game apparatus 1 is in the "sleep mode" (YES in step S26), in step S27, the CPU 31 is given an instruction to cancel the "sleep mode". In addition, here, the game apparatus 1 is only necessarily in a mode where power is supplied to the CPU 31, and thus may shift to the "monitor-off mode" described above. Then, in step S28, the local communication BG process is performed. On the other hand, when it is determined that the game apparatus 1 is not in the "sleep mode" (NO in step S26), it is considered that the game apparatus 1 is operating in the "normal power mode". Thus, the process of step S27 is skipped, and the processing proceeds to step S28.

In step S28, the local communication BG process is performed by the CPU 31. Although this process will be described in detail later, an outline of the local communication BG process in this flow is briefly described. The passing communication data 520 is transmitted using the "local communication", and thereafter received, accordingly. Then, when the local communication BG process has ended, the wireless module process ends.

On the other hand, as a result of the determination in step S24, when it is determined that a "passing connection response" to the request signal broadcast by the wireless communication module 34 has not been received (NO in step S24), it is determined in step S29 whether or not the wireless communication module 34 has received a "passing connection request" transmitted from another game apparatus 1. As a result of the determination, when it is determined that the wireless communication module 34 has received a "passing connection request" transmitted from another game apparatus 1 (YES in step S29), it is determined in the subsequent step S30 with reference to the already-communicated terminal/dedicated AP information 405 whether or not the MAC address of the transmission source is stored. That is, it is determined whether or not the "passing connection request" is one from a communication partner with which the "passing communication" has been performed immediately before. As a result of the determination, when it is determined that the MAC address of the transmission source is stored in the already-communicated terminal/dedicated AP information 405 (YES in step S30), communication is not performed with the transmission source, and the wireless module process ends.

On the other hand, when it is determined that the MAC address of the transmission source is not stored in the already-communicated terminal/dedicated AP information 405 (NO in step S30), it is determined in step S31, similarly to step S25, whether or not there is a coinciding application ID among the application IDs of applications registered as objects of the "passing communication". As a result of the determination, when it is determined that there is no coinciding application ID (NO in step S31), communication is not performed with the transmission source, and the wireless module process ends. On the other hand, when it is determined that there is at least one coinciding application ID (YES in step S31), it is determined in step S32, similarly to step S26, whether or not the game apparatus 1 is in the "sleep mode". As a result, when it is determined that the game apparatus 1 is in the "sleep mode" (YES in step S32), in step S33, similarly to step S27, the CPU 31 is given an instruction to cancel the "sleep mode". Then, in step S34, the local communication BG process is performed. On the other hand, when it is determined that the game apparatus 1 is not in the "sleep mode" (NO in step S32), it means that the game apparatus 1 is already operating in the "normal power mode". Thus, the process of step S33 is skipped, and the processing proceeds to step S34.

In step S34, similarly to step S28, the local communication BG process is performed. As an outline of the process in this case, data for the passing communication is transmitted, and thereafter received (the order of the transmission and reception is opposite to that in step S28).

Next, a description is given of a process performed when it is determined in step S29 that the wireless communication module 34 has not received a "passing connection request", either (NO in step S29). In this case, a process is performed of determining whether or not a dedicated AP 101 is present near the game apparatus 1, and when the dedicated AP 101 is present, a process is performed of communicating with the dedicated AP 101. Specifically, in step S35 in FIG. 22, the scanning of a beacon transmitted from an access point, so-called "passive scanning", is performed. Here, in the present embodiment, it is assumed that a communication channel used to communicate with the dedicated AP 101 is determined in advance. Thus, in this process, it is possible to perform passive scanning without starting the CPU 31, by setting the communication channel before shifting to the sleep mode.

Next, in step S36, based on a result of the scanning, it is determined whether or not a beacon transmitted from a dedicated AP 101 has been received. Specifically, it is determined whether or not the dedicated AP identification information 404 stored in the storage area in the wireless communication module 34 is included in the vendor specific information about the received beacon acquired by the scanning. As a result of the determination, when it is determined that a beacon from a dedicated AP 101 has not been received (NO in step S36), the wireless module process ends.

On the other hand, when it is determined that a beacon from a dedicated AP has been received (YES in step S36), it is determined in step S37 whether or not the MAC address of the dedicated AP 101 that is the transmission source of the beacon is stored in the already-communicated terminal/dedicated AP information 405. That is, it is determined whether or not the beacon is one from the dedicated AP 101 with which communication has already been performed immediately before. As a result of the determination, when it is determined that the MAC address of the dedicated AP 101 is stored in the already-communicated terminal/dedicated AP information 405 (YES in step S37), the wireless module process ends.

On the other hand, when it is determined that the MAC address of the dedicated AP 101 is not stored in the already-communicated terminal/dedicated AP information 405 (NO in step S37), subsequently, it is determined in step S38, similarly to steps S26 and S32, whether or not the game apparatus 1 is in the "sleep mode". As a result, when it is determined that the game apparatus 1 is in the "sleep mode" (YES in step S38), in step S39, similarly to steps S27 and S33, the CPU 31 is given an instruction to cancel the "sleep mode". Then, in step S40, the local communication BG process is performed. On the other hand, when it is determined that the game apparatus 1 is not in the "sleep mode" (NO in step S38), the process of step S39 is skipped, and the processing proceeds to step S40.

In step S40, the local communication BG process is performed. Although this process will be described in detail later, the contents executed in this flow are briefly described. For example, a process is performed of connecting to the policy server 103 via the dedicated AP 101, a process is performed of changing the priorities of tasks on the basis of the policy data, and various tasks are executed, accordingly. Then, when the local communication BG process has ended, the wireless module process ends.

[Process Performed by CPU 31]

A description is given below of the process performed by the CPU 31.

[Start-Up Process]

Figure 23:
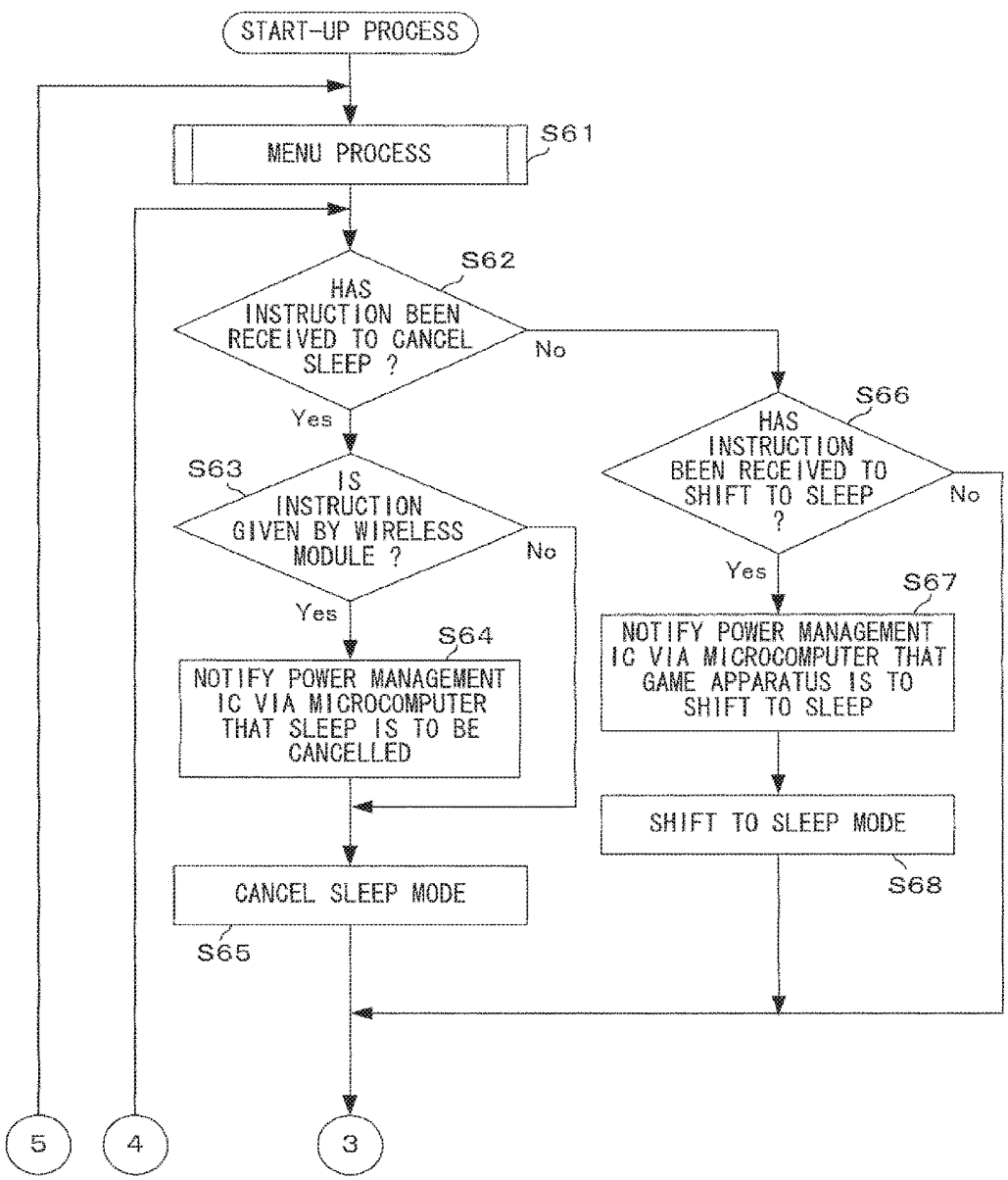
FIG. 23 is a flow chart showing a start-up process in detail.
Figure 24:
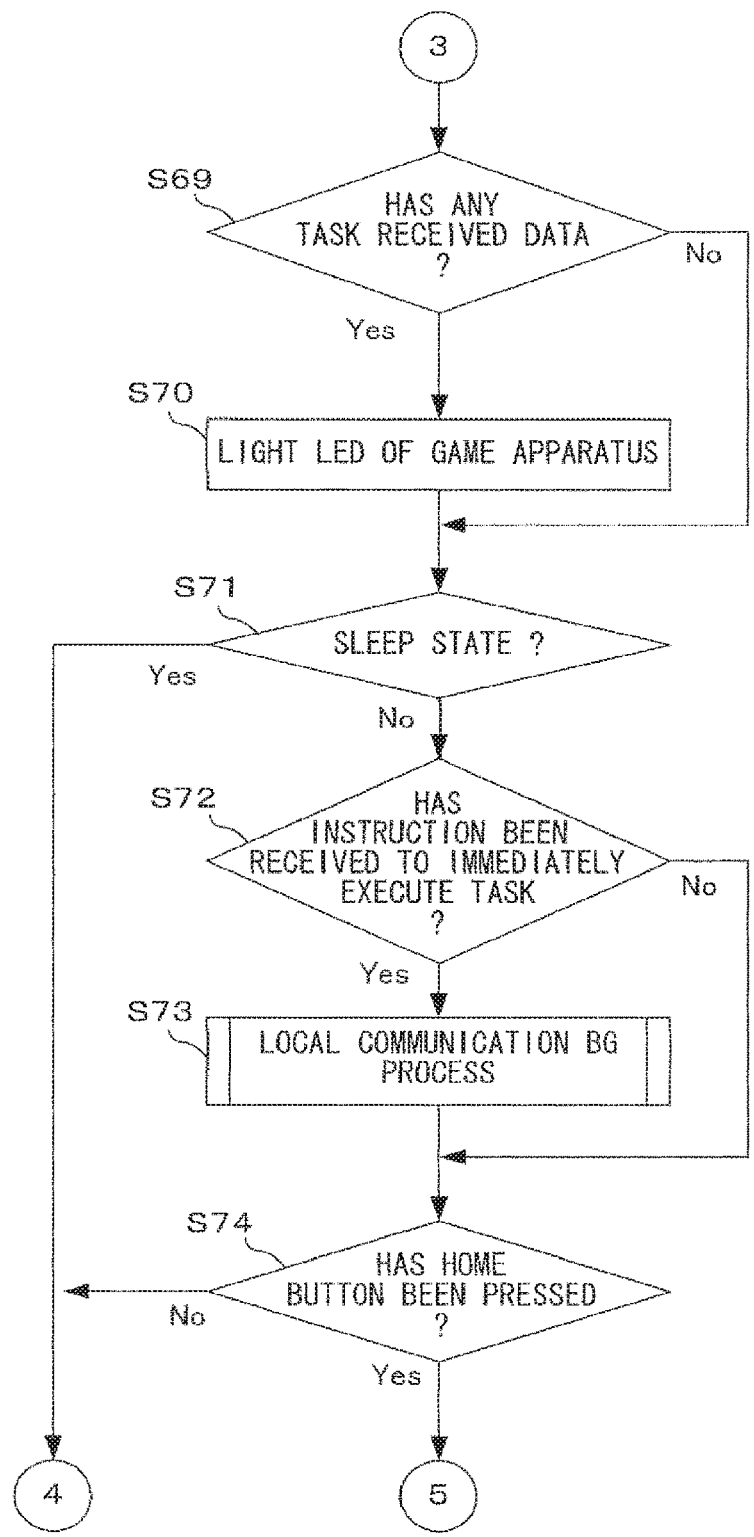
FIG. 24 is a flow chart showing the start-up process in detail.

FIGS. 23 and 24 are flow charts showing in detail the start-up process performed when the game apparatus 1 is started. When the game apparatus 1 is started for the first time after purchase, the process in the flow charts is started. Thereafter, unless the power is completely turned off, a process loop of steps S62 to S74 shown in FIG. 23 is repeatedly performed as a background process. For example, even while game processing or the like is being performed, the process in the flow charts shown in FIGS. 23 and 24 is performed as a background process in parallel (mainly, this is to monitor the home button 14I being pressed during the game processing or the like, and to perform an interrupt process at that time).

In FIG. 23, first, in step S61, a menu process is performed. Although this process will be described in detail later, an outline of the process is briefly described. For example, a process concerning the display of a menu screen is performed, and a process is performed of starting and executing an application selected by the user in the menu screen.

Next, in step S62, it is determined whether or not the CPU 31 has received an instruction to cancel the "sleep mode". Specifically, in the following cases, it is determined that the CPU 31 has received an instruction to cancel the "sleep mode".

(1) When, in the "sleep mode", the wireless communication module 34 has received a "passing connection request" or a "passing connection response" and the CPU 31 has received an instruction from the wireless communication module 34 to cancel the "sleep mode" (step S27 or S33 in FIG. 21).

(2) When, in the "sleep mode", the wireless communication module 34 has received a beacon from the dedicated AP 101 and the CPU 31 has received an instruction from the wireless communication module 34 to cancel the "sleep mode" (step S39 in FIG. 22).

(3) When the microcomputer 37 (RTC 39) has detected the coming of the next wake-up time and the CPU 31 has received an instruction from the microcomputer 37 to cancel the "sleep mode" (step S3 in FIG. 20).

(4) When the game apparatus 1 has shifted from the closed state to the open state and the CPU 31 has received an instruction from the microcomputer 37 to cancel the "sleep mode" (step S7 in FIG. 20).

As a result of the determination, when it is determined that the CPU 31 has received an instruction to cancel the "sleep mode" (YES in step S62, subsequently, it is determined in step S63 whether or not the cancellation instruction is one given by the wireless communication module 34. As a result, when it is determined that the cancellation instruction is one given by the wireless communication module 34 (YES in step S63), in step S64, the power management IC 41 is notified, via the microcomputer 37, that the "sleep mode" is to be canceled, and the power supply state flag 304 in the microcomputer 37 is set to ON. In response to this, the power management IC 41 starts supplying power to the CPU 31, and the "sleep mode" is canceled in step S65. On the other hand, as a result of the determination in step S63, when it is determined that the cancellation instruction is not one given by the wireless communication module 34 (NO in step S63), the cancellation instruction is considered to be one from the microcomputer 37. When, however, the cancellation instruction is one from the microcomputer 37, the power management IC 41 has already received the notification, and the power supply state flag 304 has already changed. Thus, the process of step S64 is skipped, and the processing proceeds to step S65. Thereafter, the processing proceeds to step S69 described later.

On the other hand, as a result of the determination in step S62, when it is determined that the CPU 31 has not received an instruction to cancel the "sleep mode" (NO in step S62), it is determined in step S66 whether or not the CPU 31 has received an instruction to shift to the "sleep mode". Specifically, in the following cases, it is determined that the CPU 31 has received an instruction to shift to the "sleep mode".

(1) When an instruction has been given to return to the "sleep mode" again, after the "sleep mode" has been canceled and the "passing communication" has been performed (step S166 in FIG. 36 described later).

(2) When the "sleep mode" has been canceled and communication has been performed with the dedicated AP, and thereafter, an instruction has been given to return to the "sleep mode" again (step S195 in FIG. 38 described later).

(3) When an instruction has been given to return to the "sleep mode" again, after the "sleep mode" has been canceled due to the coming of the wake-up time and communication has been performed (step S195 in FIG. 38 described later).

(4) When the game apparatus 1 has shifted from the open state to the closed state and the CPU 31 has received an instruction from the microcomputer 37 to shift to the "sleep mode" (step S10 in FIG. 20).

The instructions in the above (1) to (3) are given in the "local communication BG process" or the "Internet communication BG process" described later.

As a result of the determination in step S66, when it is determined that the CPU 31 has received an instruction to shift to the "sleep mode" (YES in step S66), in step S67, the power management IC 41 is notified, via the microcomputer 37, that the game apparatus is to shift to the "sleep mode", and the power supply state flag 304 in the microcomputer 37 is set to OFF. Then, in step S68, the shift to the "sleep mode" is performed. On the other hand, as a result of the determination in step S66, when it is determined that the CPU 31 has not received an instruction to shift to the "sleep mode" (NO in step S66), the processes in steps S67 and S68 are skipped, and the processing proceeds to step S69 described below.

Next, in step S69 in FIG. 24, it is determined whether or not data has been received as a result of the execution of any task. As a result, when it is determined that any data has been received in any task (YES in step S69), in step S70, at least any one of the LEDs 15A to 15C of the game apparatus 1 is lit. This operation corresponds to a so-called "new arrival notification". On the other hand, when it is determined that no data has been received (NO in step S69), the process of step S70 is skipped, and the processing proceeds to the next step S71.

Next, in step S71, it is determined whether or not the game apparatus 1 is in the "sleep mode". Specifically, the determination can be made with reference to the power supply state flag 304. As a result, when it is determined that the game apparatus 1 is in the "sleep mode" (YES in step S71), the processing returns to step S62, and the same process is repeated. On the other hand, as a result of the determination in step S71, when it is determined that the game apparatus 1 is not in the "sleep mode" (NO in step S71), subsequently, it is determined in step S72 whether or not the CPU 31 has received an instruction to immediately execute a predetermined task. As a result of the determination, when it is determined that the CPU 31 has not received an instruction to immediately execute a predetermined task (NO in step S72), the processing proceeds to step S74 described later. On the other hand, when it is determined that the CPU 31 has received an instruction to immediately execute a predetermined task (YES in step S72), in step S73, the local communication BG process is performed. Although this process will be described in detail later, an outline of the process in this flow is briefly described. For example, a process is performed of attempting to connect to an AP registered in advance in the game apparatus 1, and a process is performed of transmitting and receiving data using the "Internet communication" if the connection is successful (i.e., of executing the task).

Next, in step S74, it is determined whether or not the home button 14I has been pressed. As a result of the determination, when it is determined that the home button 14I has been pressed (YES in step S74), the processing returns to step S61, and the same process is repeated. When it is determined that the home button 14I has not been pressed (NO in step S74), the processing returns to step S62, and the same process is repeated. This is the end of the description of the start-up process.

[Menu Process]

Next, a description is given of the menu process shown in step S61. In this process, processes concerning the display of a menu screen and the start of an application are performed. In particular, for example, a process is performed of reflecting and displaying an "new arrival element", such as a newly installed application, on a menu screen. Further, a process concerning the update or the like of the system of the game apparatus 1 and the update of an application is also performed.

Figure 25:
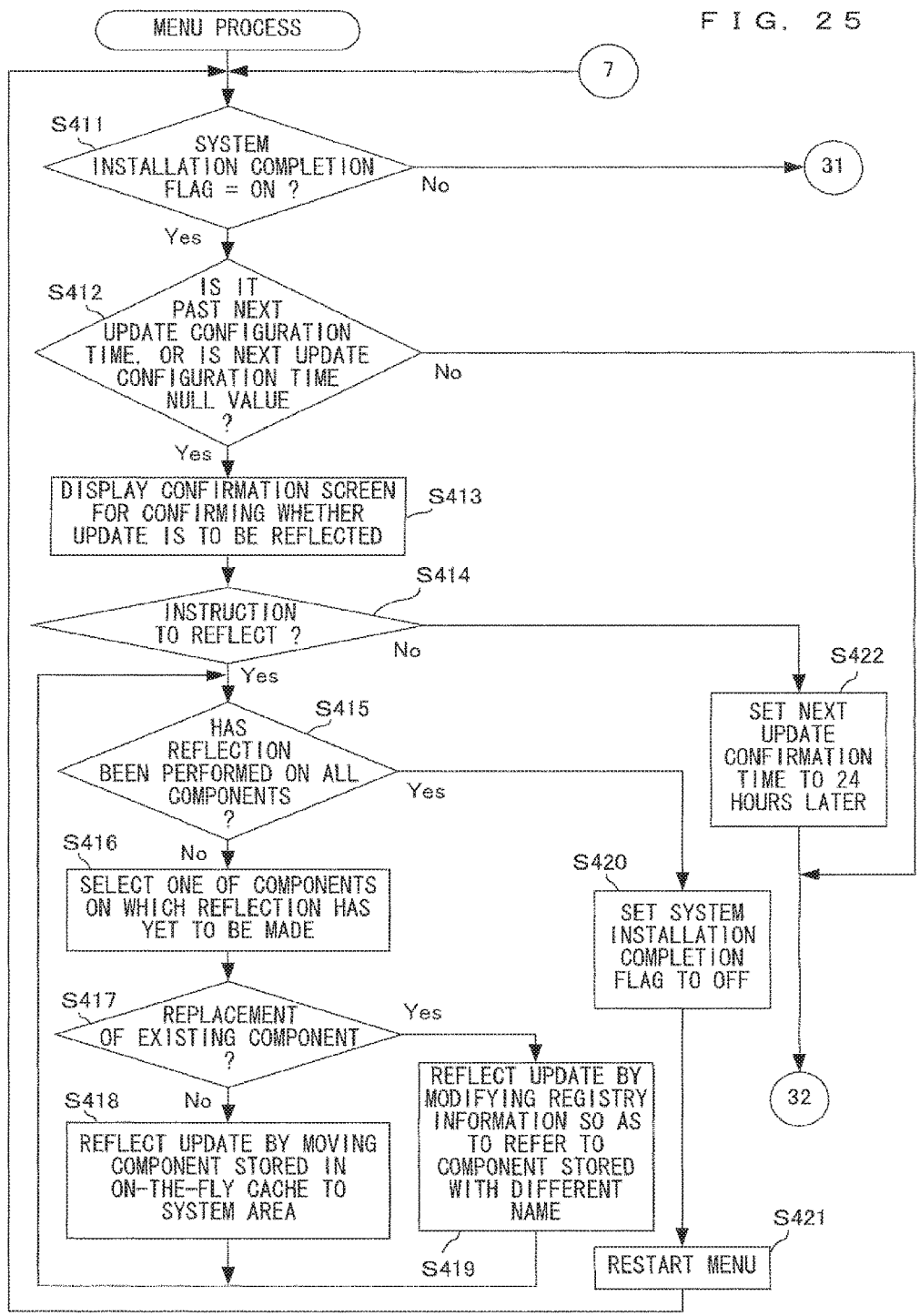
FIG. 25 is a flow chart showing in detail a menu process shown in step S61 in FIG. 23.
Figure 26:
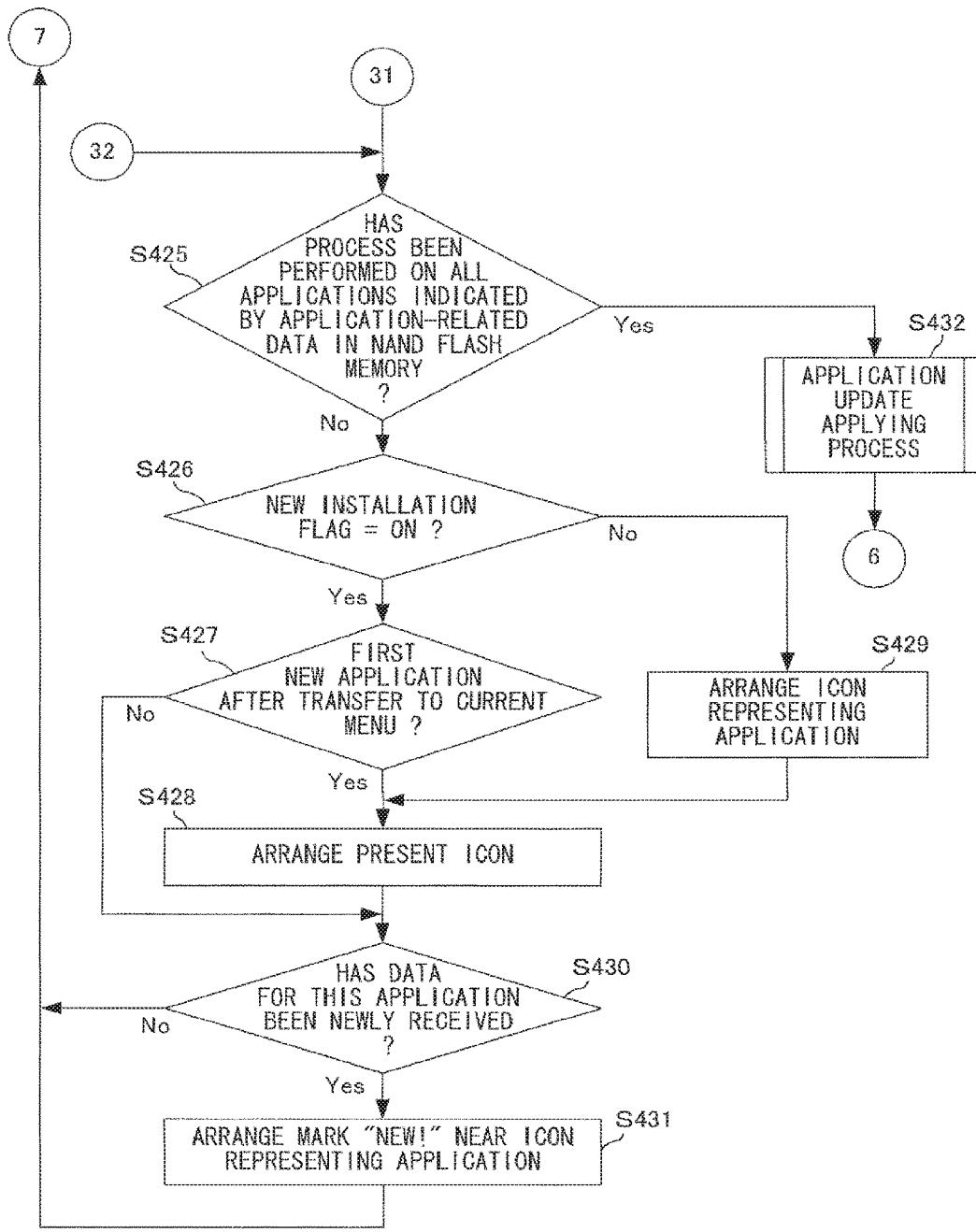
FIG. 26 is a flow chart showing in detail the menu process shown in step S61 in FIG. 23.
Figure 27:
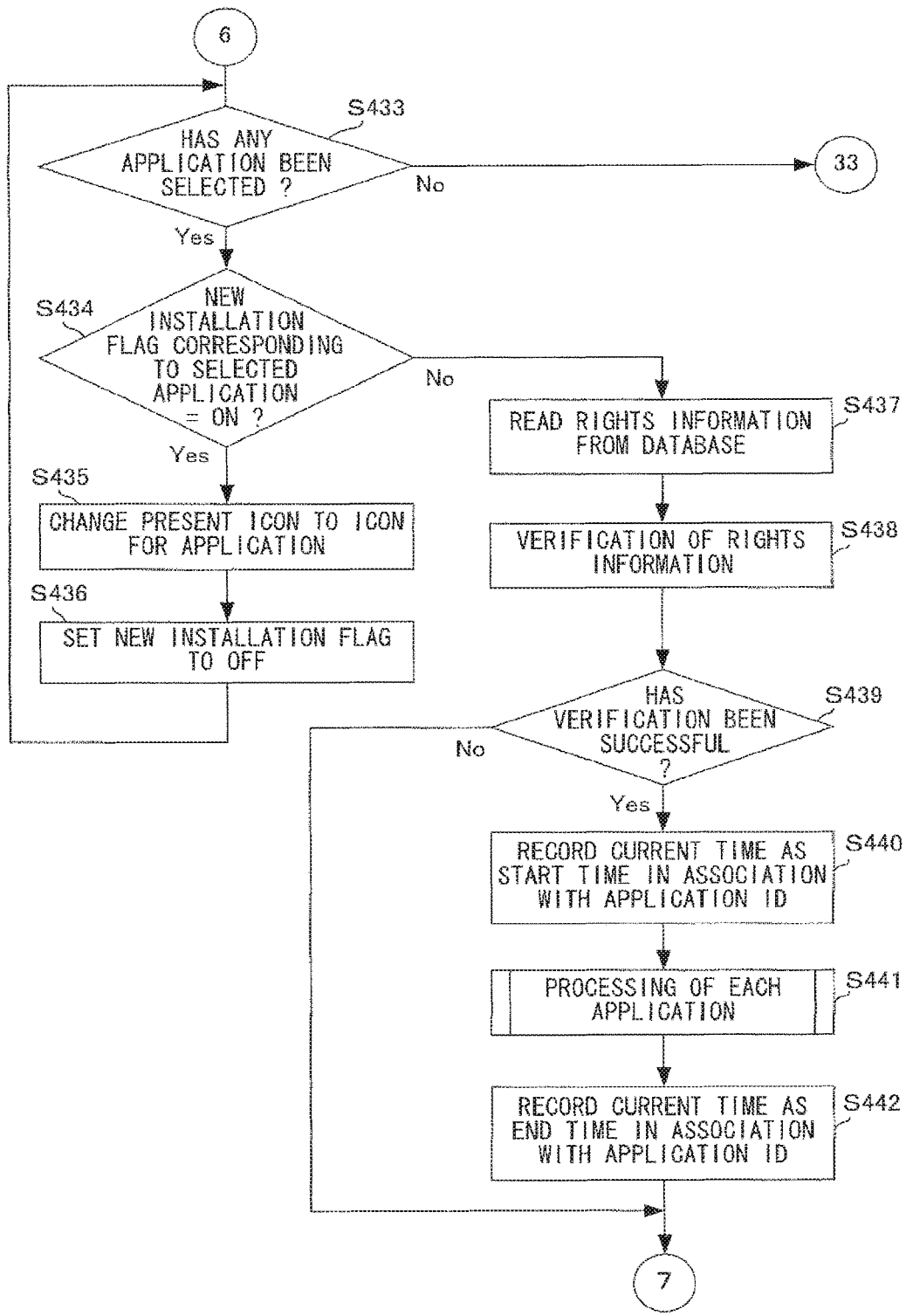
FIG. 27 is a flow chart showing in detail the menu process shown in step S61 in FIG. 23.
Figure 28:
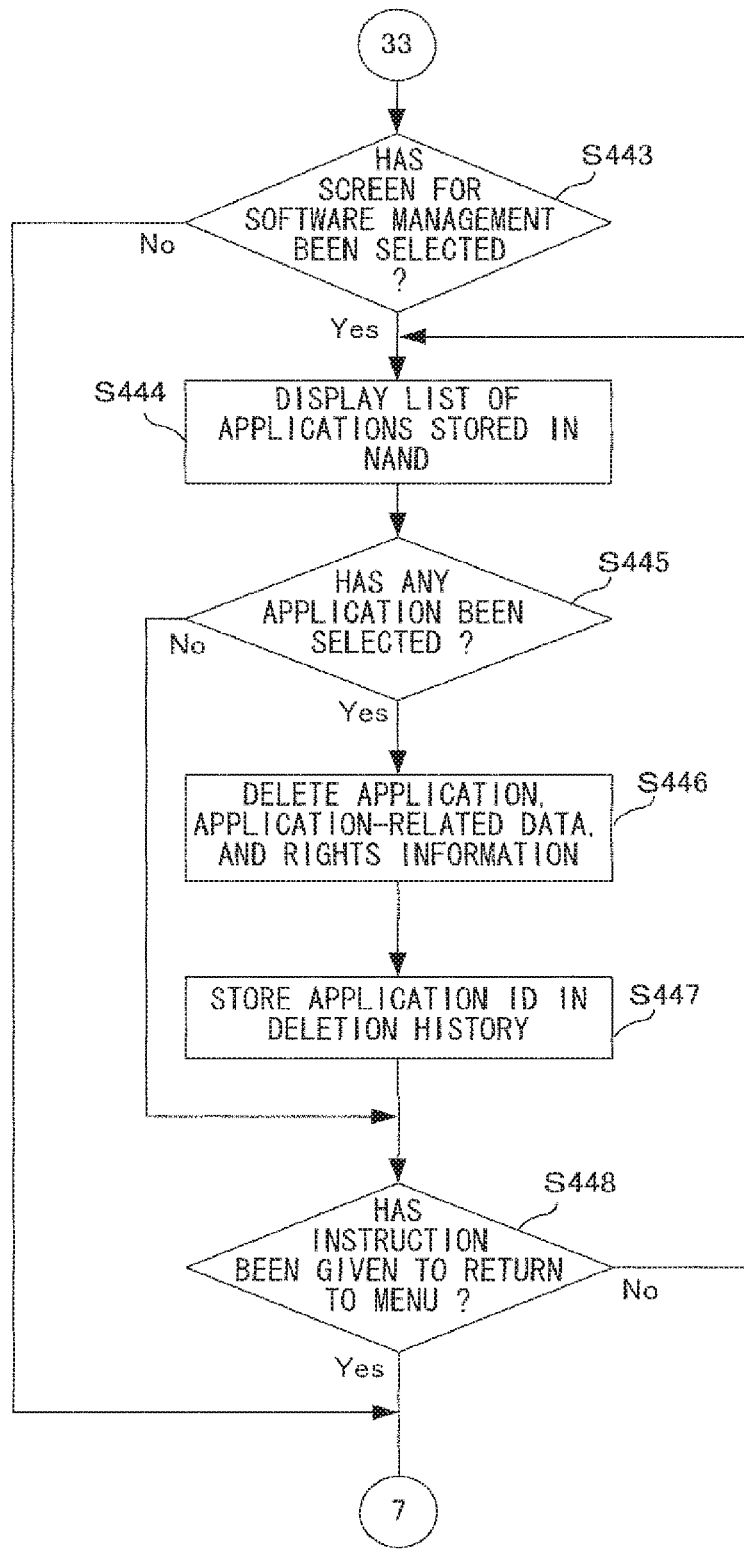
FIG. 28 is a flow chart showing in detail the menu process shown in step S61 in FIG. 23.

FIGS. 25 to 28 are flow charts showing the menu process in detail. In FIG. 25, first, in step S411, it is determined whether or not the system installation completion flag 620 is set to ON. This is a process of determining whether or not update data of the system has been downloaded in a system installation process described later (whether or not the system program can be updated). As a result of the determination, when the system installation completion flag 620 is not set to ON (NO in step S411), the system does not need to be updated, and therefore, the processing proceeds to step S425 described later.

On the other hand, when the system installation completion flag 620 is set to ON (YES in step S411), subsequently, it is determined in step S412 whether it is past the next update confirmation time (the time to inquire whether or not the update of the system program is to be reflected), or no value is set (a null value is set) as the time to inquire whether or not the update of the system program is to be reflected. When the determination is negative (NO in step S412), the processing proceeds to step S425 described later. On the other hand, when the determination is positive (YES in step S412), a process concerning the update of the system of the game apparatus 1 is performed. Specifically, first, in step S413, a confirmation screen is generated so as to confirm with the user whether or not update data of the system is to be reflected, and is displayed on the lower LCD 12. Then, an instruction input is received from the user. The reason why such a confirmation screen is provided is as follows. That is, the update of the system concerns the foundation of the game apparatus 1, and therefore may greatly affect the user depending on its contents. Thus, a confirmation is made with the user as described above.

Next, in step S414, it is determined whether or not the contents of the instruction given to the confirmation screen by the user are those of an instruction to reflect the update data. As a result of the determination, when it is determined that the contents are those of an instruction not to reflect the update (NO in step S414), in step S422, the next update confirmation time, that is, the time to display the confirmation screen again in step S413 is set to 24 hours later. Then, the processing proceeds to step S425 described later. That is, in the state where the update of the system program can be reflected, even if an instruction has been given not to reflect the update, the confirmation screen of step S413 is displayed every 24 hours until an instruction is given to reflect an update.

On the other hand, as a result of the determination in step S414, when the contents are those of an instruction to reflect the update (YES in step S414), it is determined in step S415 with reference to the installation list 580 whether or not the process of reflection as described below has been performed on all the components 584 of the system included in the system update information 583. As a result, when there remain components 584 on which the update has yet to be reflected (NO in step S415), in step S416, any one of the components 584 on which the reflection has yet to be made is selected. Subsequently, in step S417, it is determined whether or not the selected component is one that does not replace an existing component, that is, whether a new component is to be introduced, or an existing component is to be updated. As a result of the determination, when an existing component is not to be replaced (a new component is to be introduced) (NO in step S417), in step S418, an update file stored in the on-the-fly cache 600 is moved to the system program area 515. That is, a "transfer-type" update as described above is performed. Thereafter, the processing returns to step S415, and the same process is repeated. On the other hand, when an existing component is to be replaced (i.e., the component is to be updated) (YES in step S417), in step S419, the update of the component is reflected with reference to registry information not shown in the figures and modifying the "substantial program reference information" about the component, which indicates the filename before the update, such that the information indicates the filename of the downloaded update file. Further, when the modification in the "substantial program reference information" is completed, the file before the update is deleted (it should be noted that the file before the update may not be deleted, and may be saved in a predetermined area in the NAND flash memory 33 so as to enable a rollback of the system). Then, the processing returns to step S415 described above.

On the other hand, as a result of the determination in step S415, when it is determined that the process of reflection as described above has been performed on all the components 584 of the system indicated by the installation list 580 (YES in step S415), in step S420, the system installation completion flag 620 is set to OFF. Subsequently, in step S421, a process of restarting the menu is performed, and as a result, the processing returns to the process of step S411 described above.

Next, a description is given of a process performed when the system installation completion flag is not set to ON, as a result of the determination in step S411 (NO in step S411). In this case, in step S425, it is determined with reference to the application-related data 550 in the NAND flash memory 33 whether or not the process described below (the scanning of an application) has been performed on all the applications installed on the game apparatus 1. As a result of the determination, when it is determined that there remain unprocessed applications (NO in step S425), subsequently, any one of the unprocessed applications is selected as an execution object (hereinafter referred to as a "scanning object application"), and in step S426, it is determined whether or not the scanning object application is a newly installed application, that is, an application that has yet to be caused to appear on the menu (hereinafter referred to as a "new application"). This determination is made with reference to the application-related data 550 and on the basis of whether or not the new installation flag 554 of the application area corresponding to the scanning object application is set to ON. It should be noted that the process of newly installing an application is performed as a separate process independent of and in parallel with the menu process. The process of installing an application will be described later.

As a result of the determination, when it is determined that the scanning object application is not a new application (NO in step S426), in step S429, an icon corresponding to the scanning object application is generated and arranged on the menu screen as appropriate. On the other hand, when it is determined that the scanning object application is a new application (YES in step S426), it is determined in step S427 whether or not the scanning object application corresponds to a first new application (a new application that has been scanned first) in the menu to be currently displayed. As a result of the determination, the scanning object application corresponds to the first new application in the currently displayed menu, in step S428, a present icon 112 as shown in FIG. 5 is generated and arranged on the menu screen as appropriate. On the other hand, when the scanning object application corresponds to a second new application or thereafter (a new application that has been scanned second or thereafter) (NO in step S427), the process of step S428 described above is skipped, and the processing proceeds to step S430 described later. As a result of such a process, when a plurality of new applications have been downloaded and installed, not all the new applications are displayed at one time, but the new applications are displayed one by one every time the menu is displayed. For example, when two new applications have been acquired, either one of the applications are displayed as a present icon in a first display of the menu after the acquisition, and the other is not yet displayed in the menu at this time. Thereafter, when the present icon has been selected; the first new application has been executed; the application has been ended; and the display has returned to the menu screen, that is, when a second display of the menu has been performed, the other new application is displayed as a present icon. This causes a present icon to be displayed every time the menu is displayed, and therefore makes it possible to continuously give the user the fun of the acquisition of a new application.

Figure 6:
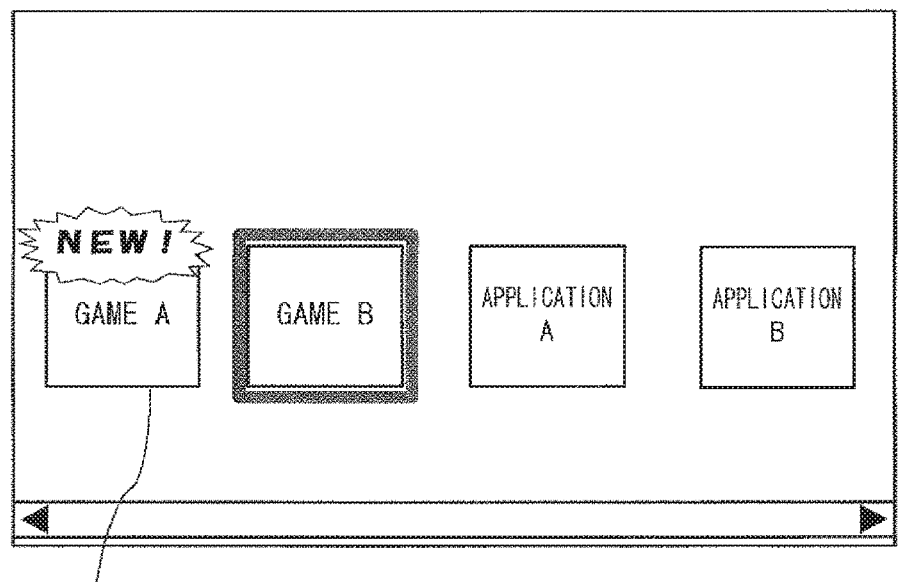
FIG. 6 shows another example of the menu screen.

Next, in step S430, it is determined whether or not data for the scanning object application (e.g., a notification of an announcement, or an additional content) has been received. This determination is made, for example, with reference to the task reception cache 553 in the application area 551, or the reception box 524 in the passing communication data 520 associated with the scanning object application (the determination may be made with reference to either or both). As a result of the determination, when it is determined that newly received data is present (YES in step S430), in step S431, a mark "New!" as shown in FIG. 6 is arranged near the icon corresponding to the scanning object application. Then, the processing returns to step S411. On the other hand, as a result of the determination in step S430, when it is determined that newly received data is not present (NO in step S430), the process of step S431 is skipped, and the processing returns to the process of step S411.

Figure 32:
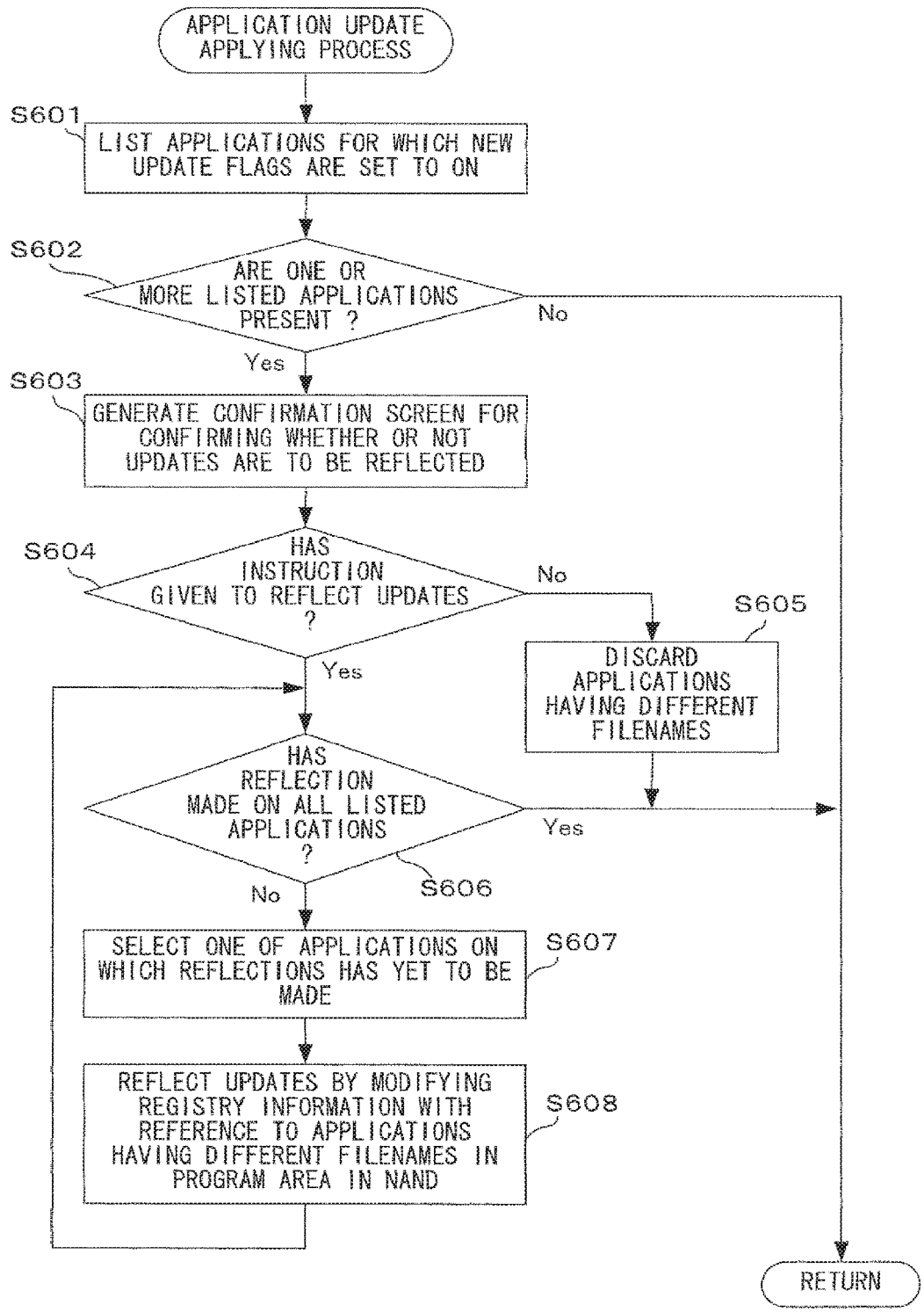
FIG. 32 is a flow chart showing in detail an application update applying process shown in step S432 in FIG. 26.

Next, a description is given of a process performed when it is determined in step S425 that all the applications have been processed (scanned) (YES in step S425). In this case, in step S432, an application update applying process is performed. FIG. 32 is a flow chart showing in detail the application update applying process shown in step S432. In FIG. 32, first, in step S601, applications for which the new update flags 559 are set to ON are listed with reference to the application-related data 550.

Next, in step S602, it is determined whether or not one or more listed applications are present. As a result, when one or more listed applications are not present (NO in step S602), it means that there is no update of an application, and therefore, the application update applying process ends.

On the other hand, when it is determined that one or more listed applications are present (YES in step S602), in step S603, a confirmation screen is generated so as to confirm with the user whether or not the updates of the applications are to be reflected, and is displayed on the lower LCD 12. Then, an instruction input is received from the user.

Next, in step S604, it is determined whether or not the contents of the instruction given to the confirmation screen by the user are those of an instruction to reflect the updates. As a result, when the contents are not those of an instruction to perform the updates (NO in step S604), in step S605, update files of the applications stored with different filenames as described above are discarded. It should be noted that although described in detail later, if the applications are to be updated, the downloaded update files are stored in the program area 500 with different filenames. Then, the application update applying process ends.

On the other hand, when the contents are those of an instruction to reflect the updates (YES in step S604), subsequently, it is determined in step S606 whether or not an update reflection process as described below has been performed on all the listed applications. As a result, when there are applications on which the reflection has yet to be made (NO in step S606), in step S607, one of the applications on which the reflections has yet to be made is selected among the listed applications. In the subsequent step S608, the applications on which the reflection has yet to be made are updated by modifying the registry information about the applications. Specifically, the updates of the applications are reflected with reference to the registry information not shown in the figures and modifying the "substantial program reference information" about the applications, such that the information indicates the filenames of the update files stored with the different filenames. Then, the processing returns to the process of step S606.

On the other hand, as a result of the determination in step S606, when the updates of all the listed applications have been reflected (YES in step S606), the application update applying process ends.

Referring back to FIG. 26, when the application update applying process has ended, subsequently, a process concerning the start and the execution of an application is performed. Specifically, first, in step S433 in FIG. 27, it is determined whether or not an icon representing any of the applications has been selected from the menu screen. For example, it is determined whether or not the user has performed a touch operation on a predetermined icon in the menu screen as shown in FIG. 4. As a result of the determination, when it is determined that (an icon for) none of the applications in the menu screen has been selected (NO in step S433), the processing proceeds to step S443 described later.

On the other hand, when it is determined that (an icon for) any of the applications in the menu screen has been selected (YES in step S433), subsequently, it is determined in step S434 whether or not the new installation flag 554 corresponding to the selected application is set to ON. That is, it is determined whether or not the selected application is a newly installed application. As a result, when it is determined that the new installation flag 554 is set to ON (YES in step S434), the icon corresponding to the application is displayed as a present icon 112. Thus, in step S435, the present icon 112 is changed to an icon originally defined as an icon for the application (and stored as a part of the application program). At this time, an animation display of opening the box of the present icon 112 is also performed.

Next, in step S436, the new installation flag 554 for the application is set to OFF, and the processing returns to step S433.

On the other hand, as a result of the determination in step S434, when it is determined that the new installation flag is set to OFF (NO in step S434), subsequently, the legitimacy of the selected application is checked at the start of the application. Specifically, in step S437, the rights information corresponding to the currently selected application is read from the rights information database 610. Subsequently, in step S438, the read rights information is verified. This is a process of preventing the execution of an illegitimate application that has been installed for some reason. Subsequently, in step S439, it is determined whether or not the verification of the rights information has been successful. When the verification has been successful (YES in step S439), in step S440, a process is performed of recording the start time of the application in the play history 670. Specifically, the version information about the selected application and the current time (start time) are recorded in the play history 670 in association with the application ID 552 of the application.

Next, in step S441, processing concerning the selected application (hereinafter referred to as "processing of each application") is performed. Here, when the application is started, the rights information corresponding to the application to be started is acquired with reference to the rights information database 610. Then, an authentication process is performed using the rights information. Only when the authentication has been successful, the execution of the application is started. Thereafter, when the process concerning the application has ended, in step S442, a process is performed of recording the end time of the application in the play history 670. That is, the version information about the executed application and the current time (end time) are recorded in the play history 670 in association with the application ID 552 of the application. Thereafter, the processing returns to step S411.

On the other hand, as a result of the determination in step S439, when the verification has not been successful (NO in step S439), the processes of steps S440 through S442 are skipped, and the processing returns to step S411. That is, the selected application is not to be started.

Next, a description is given of a process performed when it is determined that none of the applications has been selected, as a result of the determination in step S433 (NO in step S433). In this case, a process concerning the deletion (uninstallation) of the applications is performed. First, in step S443 in FIG. 28, it is determined whether or not an operation has been performed of giving an instruction to start a screen for software management (it should be noted that to be exact, a program for the software management may be implemented as a type of application; however, it is assumed that the determination objects in step S433 do not include an application for the software management, for convenience of description).

As a result of the determination, when an instruction has not been given to start a screen for software management (NO in step S443), the processing returns to step S411, and the same process is repeated. On the other hand, when an instruction has been given to start a screen for software management (YES in step S443), in step S444, a list of the applications stored in the NAND flash memory 33 is generated and displayed. The list is generated by scanning the applications store in the NAND flash memory 33. Thereafter, an input from the user is received.

Next, in step S445, it is determined whether or not the user has given an instruction to delete any application from the list of the applications. As a result, when an instruction has been given to delete any application (YES in step S445), in step S446, the following are deleted: the selected application; the rights information corresponding to the selected application; the information in the application area 551 of the corresponding application in the application-related data 550; and other data (e.g., metadata) related to the application. Further, in step S447, the deletion history 660 is updated by adding to the deletion history 660 the application ID 552 indicating the deleted application. This makes it possible to prevent an application that has once been deleted (by the user's intention) from being automatically installed after deletion. When the process of step S447 has ended, the processing proceeds to step S448 described later.

On the other hand, as a result of the determination in step S445, when an instruction has not given to delete any application (NO in step S445), the processes of steps S446 and S447 are skipped.

Next, in step S448, it is determined whether or not the user has given an instruction to return to the menu. As a result, when an instruction has not been given to return to the menu (NO in step S448), the processing returns to step S444. When an instruction has been given to return to the menu (YES in step S448), the processing returns to step S411.

This is the end of the description of the game apparatus menu process.

[Application Installation Process]

Here, a description is given of an application installation process performed in parallel with the menu process described above. This is a process separate from the menu process, and is repeatedly performed in predetermined cycles during the operation of the game apparatus 1.

Figure 29:
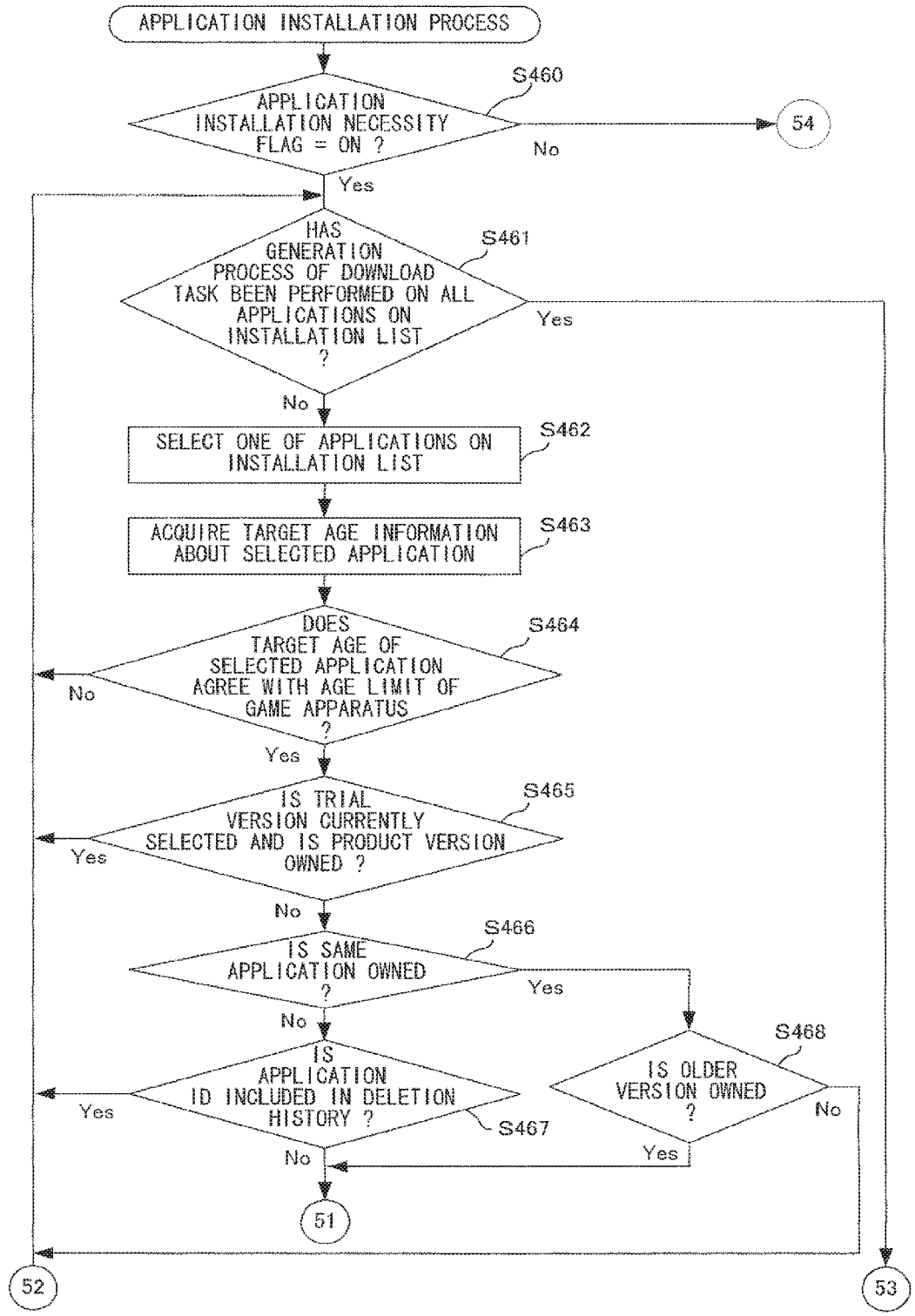
FIG. 29 is a flow chart showing in detail an application installation process.
Figure 30:
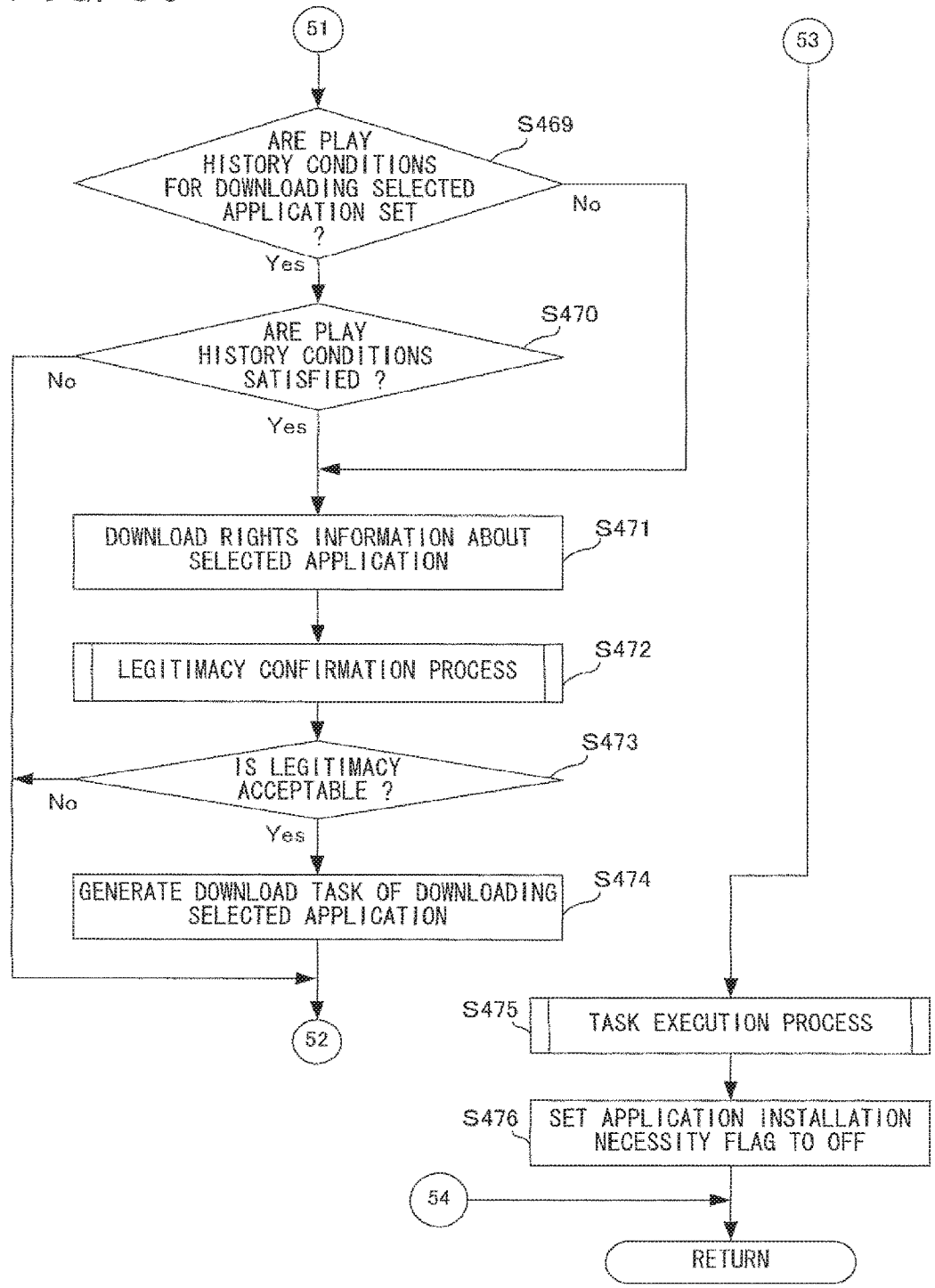
FIG. 30 is a flow chart showing in detail the application installation process.

FIGS. 29 and 30 are flow chart showing the application installation process in detail. First, in step S460, it is determined whether or not the application installation necessity flag 630 is set to ON. As a result, when the flag is set to ON (NO in step S460), it is indicated that it is not necessary to install an application, and therefore, the application installation process ends.

On the other hand, when the application installation necessity flag 630 is set to ON (YES in step S423), it is indicated that the reflection of the update of the system is completed, and therefore, the processing proceeds to a process of downloading and installing an application. In step S461, it is determined whether or not the generation process of a download task (DL task) as will be described below has been performed on all the applications indicated by the application information 589 included in the installation list 580. As a result of the determination, when there remain applications on which the generation process of the DL task has yet to be performed (NO in step S461), in step S462, among pieces of the application information 589 included in the installation list, one of the pieces of the application information 589 on which the DL task generation process has yet to be performed is selected.

Next, in step S463, with reference to the rating information 593 of the selected piece of the application information 589, target age information about the application is acquired. Subsequently, in step S464, it is determined, by comparing the target age of the selected application to the user's age (stored in the game apparatus setting data 560) registered in the game apparatus 1, whether or not the target age agrees with the age limit of the game apparatus 1. For example, when the rating information 593 indicates that the application is targeted at people aged 18 or over, it is determined whether or not the user registered in the game apparatus setting data 560 is aged 18 or over. As a result of the determination, the target age does not agree with the age limit (NO in step S464), it is determined that the DL task generation process of the currently selected application has already been performed. The processing returns to step S461, and the same process is repeated.

On the other hand, as a result of the determination in step S464, when the target age agrees with the age limit (YES in step S464), it is determined in the subsequent step S465 whether or not the currently selected application is a so-called "trial" version and a "product version" of the currently selected application is already owned (has already been installed). This is to prevent the "trial" version of the application from being downloaded even though the "product version" is already owned. As a result of the determination, when it is determined that the currently selected application is the "trial" version and the "product version" of the currently selected application is already owned (YES in step S465), it is determined that the DL task generation process of the currently selected application has already been performed. The processing returns to step S461, and the same process is repeated.

On the other hand, when the determination in step S465 is negative (NO in step S465), subsequently, it is determined in step S466 whether or not the same application is already owned. This determination is made based on, for example, whether or not an application ID that is the same as the application ID 590 of the selected application is present in the play history 670. As a result of the determination, when it is determined that the same application is not owned (NO in step S466), it is determined in step S467 with reference to the deletion history 660 whether or not the application ID of the selected application is included in the deletion history 660. As a result, when the application ID of the application is included in the deletion history 660 (YES in step S467), the processing returns to step S461. This prevents an application that has been deleted before by the user's intention from being automatically installed again. On the other hand, when the application ID of the application is not in the deletion history 660 (NO in step S467), the processing proceeds to step S469 described later.

On the other hand, as a result of the determination in step S466, when it is determined that the same application is owned (YES in step S466), it is determined in step S468 whether or not an older version of the same application is owned. This determination is made, for example, with reference to the play history 670, and on the basis of whether or not the application ID of the older version is present. As a result, when it is determined that an older version is not owned (NO in step S468), it is considered that the latest version has already been installed. Thus, the processing returns to step S461.

On the other hand, when it is determined that an older version of the application is owned (YES in step S468), the application is to be upgraded (updated), and therefore, the processing proceeds to the subsequent step S469.

In step S469, it is determined whether or not the play history conditions for downloading the selected application are set. That is, it is determined whether or not the selected application is a "bonus application". This assumes the case where a bonus application is downloaded as, for example, a "bonus" when a given game has been played for a predetermined period of time or longer, as described above. This determination is made with reference to the application information 589 of the installation list 580, and on the basis of whether or not certain condition information is set in the download condition information 595. As a result of the determination, when it is determined that the play history conditions are not set (NO in step S469), it is considered that the selected application is an application for which no particular conditions are set for downloading it. Thus, the processing proceeds to step S471 described later.

On the other hand, when it is determined that the play history conditions are set (YES in step S469), the selected application is a "bonus application". Thus, in the subsequent step S470, it is determined whether or not the play history conditions for downloading the bonus application are satisfied. This determination is made by comparing the play history 670 to the download condition information 595. As a result of the determination, when it is determined that the play history conditions for downloading the bonus application are not satisfied (NO in step S470), it is determined that the DL task generation process of the currently selected application has already been performed. The processing returns to step S461, and the same process is repeated. On the other hand, when it is determined that the play history conditions are satisfied (YES in step S470), the processing proceeds to the subsequent step S471. It should be noted that it is also possible, by the process of step S470, to implement the process of eliminating the installation of the trial version if the product version is owned, as a result of the determination in step S465. That is, conditions may be set such that an installation is to be performed if the play history of the product version is present in the download condition information 595 concerning the trial version of the application.

Next, a process is performed of checking the legitimacy of the application (whether or not the application is a legitimate program) to be downloaded. Specifically, first, in step S471, the rights information corresponding to the selected application is downloaded from a predetermined server. The rights information is information used to perform an authentication process at the execution of the application. It should be noted that the rights information is directly and immediately download without using the task as described above.

Figure 31:
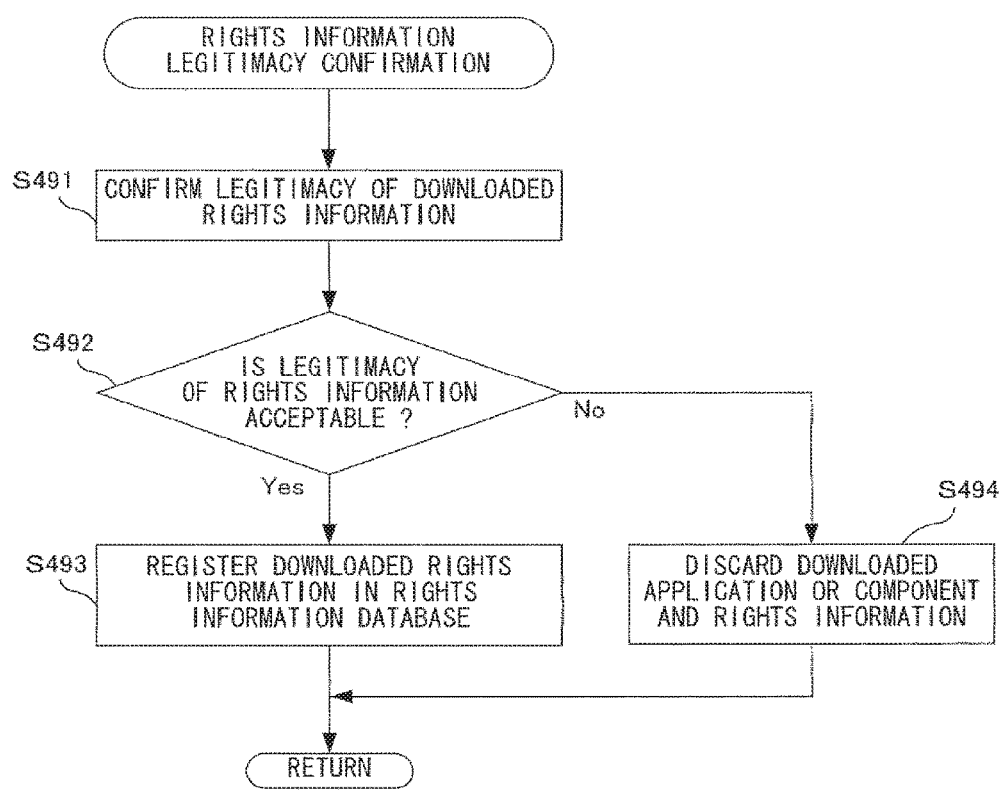
FIG. 31 is a flow chart showing in detail a legitimacy confirmation process shown in step S471 in FIG. 30.

Next, in step S472, a legitimacy confirmation process of the rights information is performed. FIG. 31 is a flow chart showing in detail the legitimacy confirmation process shown in step S472. In FIG. 31, first, in step S491, a process is performed of confirming the legitimacy of the downloaded rights information. This is implemented by a process of confirming, for example, a so-called electronic signature or an electronic certificate.

Next, in step S492, it is determined whether or not the legitimacy of the rights information is acceptable (i.e., whether or not the application is legitimate). As a result, when the legitimacy is acceptable (YES in step S492), in step S493, the downloaded rights information is registered in the rights information database 610. On the other hand, when the legitimacy is not acceptable (NO in step S492), in step S494, the downloaded rights information and the application corresponding to the rights information are discarded. This is the end of the legitimacy confirmation process.

Referring back to FIG. 30, in step S473 subsequent to the legitimacy confirmation process, it is determined whether or not the legitimacy is acceptable as a result of the legitimacy confirmation process. That is, it is determined whether or not the rights information has been registered in the rights information database 610 in step S493 in FIG. 31 described above. As a result, when it is determined that the legitimacy is acceptable (YES in step S473), in step S474, a download task (reception task) of downloading the selected application is generated. Here, an execution priority is set for the generated task in accordance with the value of the priority order 594 included in the application information 589 corresponding to the application in the installation list 580. Thereafter, the processing returns to step S461, and the same process is repeated.

On the other hand, as a result of the determination in step S473, when it is determined that the legitimacy is not acceptable (NO in step S473), the process of step S474 is not performed. Thus, the processing returns to step S461, and the same process is repeated.

Next, referring back to FIG. 29, a description is given of a process performed when it is determined that the process as described above has been performed on all the applications indicated by the application information 589 included in the installation list 580, as a result of the determination in step S461 (YES in step S461). At this time, in step S475 in FIG. 30, a task execution process is performed so as to execute each download task generated for downloading the application. Although the task execution process will be described in detail later, this process is performed, whereby the program file of each application is downloaded from a predetermined server, and is stored in the NAND flash memory 33.

When the process of step S475 has ended, subsequently, in step S476, the application installation necessity flag 630 is set to OFF. This is the end of the application installation process.

[Processing of Each Application]

Next, a description is given of the processing of each application shown in step S441. It should be noted that as a matter of course, specific process contents of the applications are different from those of other applications. Thus, a description concerning the differences are omitted, and a description is given of a part related to the present embodiment, such as a process concerning the task and a process related to each type of communication described above, as process contents common to the applications, that is, as processing considered to be performed generally in any of the applications.

Figure 33:
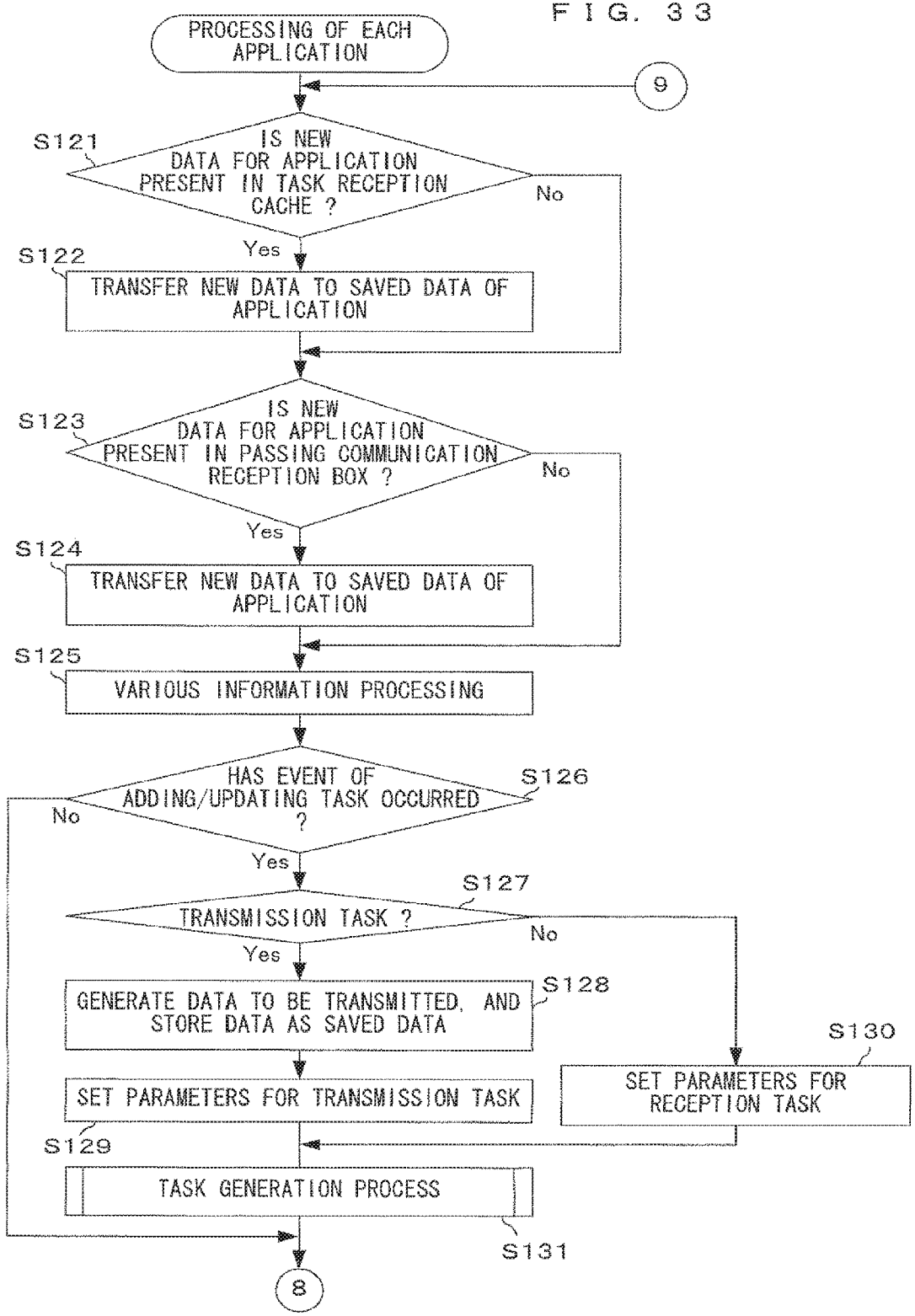
FIG. 33 is a flow chart showing in detail the processing of each application shown in step S441 in FIG. 27.
Figure 34:
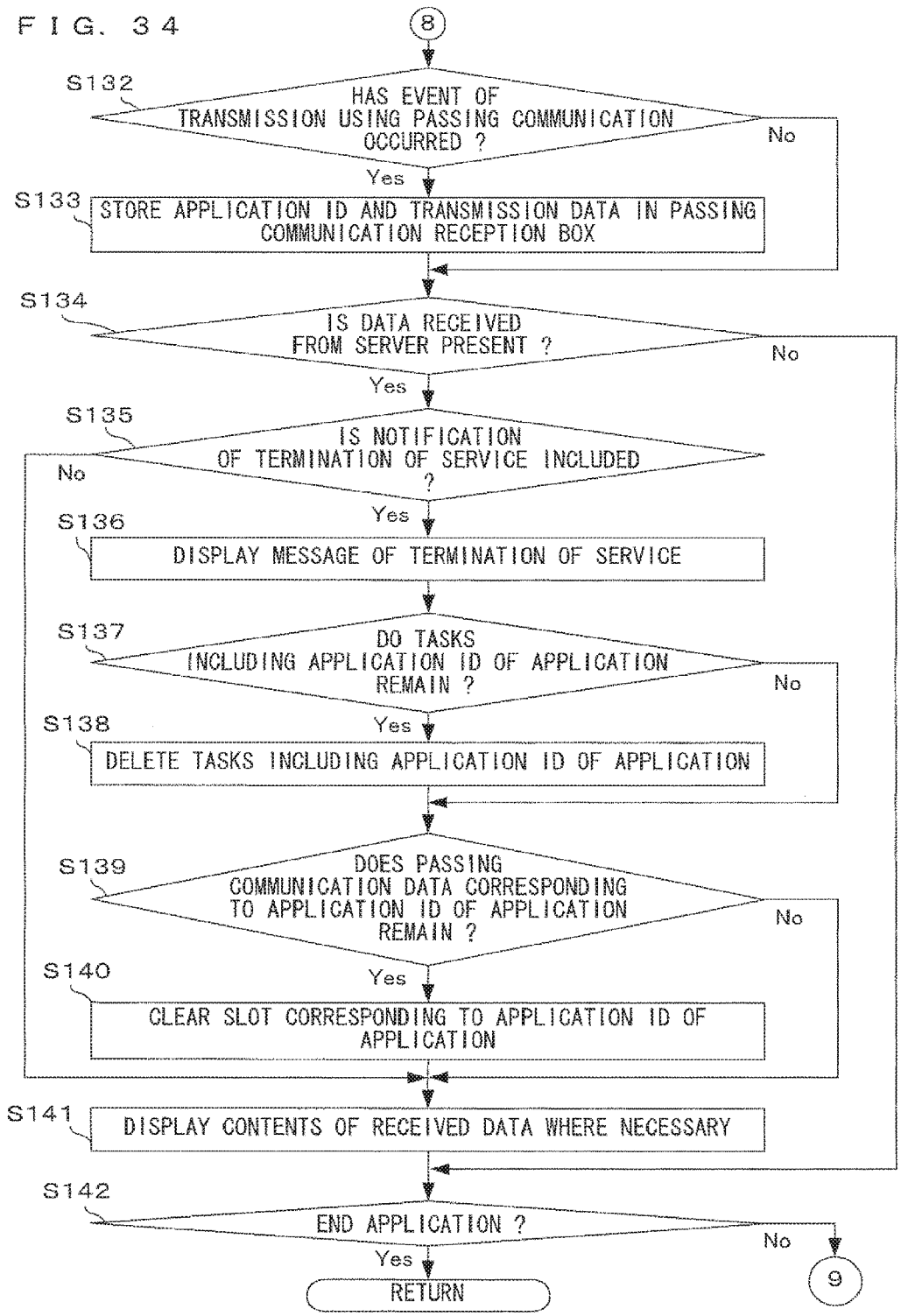
FIG. 34 is a flow chart showing in detail the processing of each application shown in step S441 in FIG. 27.

FIGS. 33 and 34 are flow charts showing the processing of each application in detail. In FIG. 33, first, in step S121, it is determined whether or not, as a result of the execution of a task, newly received data for the application is present in the task reception cache 553. As a result of the determination, when it is determined that newly received data is present (YES in step S121), in step S122, the data in the task reception cache 553 is transferred to the task reception data 557 of the saved data 555 of the application (as a result, the task reception cache 553 is emptied). Thereafter, the processing proceeds to step S123. On the other hand, when no newly received data is present (NO in step S121), the process of step S122 is skipped, and the processing proceeds to step S123.

Next, in step S123, it is determined whether or not newly received data is present in the reception box 524 of the passing communication data 520 associated with the application. As a result of the determination, when it is determined that newly received data is present in the reception box 524 (YES in step S123), in step S124, the data in the reception box 524 is transferred to the passing reception data 558 of the saved data 555 of the application (as a result, the reception box 524 is emptied). Thereafter, the processing proceeds to step S125. On the other hand, when no newly received data is present in the reception box 524 (NO in step S123), the process of step S124 is skipped, and the processing proceeds to step S125.

Next, in step S125, various information processing corresponding to the contents of each application is performed. For example, game processing, painting software processing, or camera application processing are performed. In the information processing, it is possible to use the data in the task reception data 557 and the passing reception data 558, which has been newly transferred thereto in steps S122 and S124.

Next, in step S126, it is determined whether or not an event of newly adding a task or an event of updating the contents of a task has occurred as a result of the various information processing in step S125. As a result, when it is determined that such an event has not occurred (NO in step S126), the processing proceeds to step S132 described later.

On the other hand, when it is determined that an event of newly adding a task or an event of updating a task has occurred (YES in step S126), it is determined in step S127 whether the contents concerning the event having occurred are related to a "transmission task" or a "reception task". As a result of the determination, when it is determined that the contents are the addition or the update of a "transmission task" (YES in step S127), in the subsequent step S128, data to be transmitted is generated and stored as the task transmission data 556 of the saved data 555. In addition, in step S129, various parameters for the "transmission task" are set. The parameters set here are those for setting the items constituting the task setting 531 as shown in FIG. 16. Specifically, the following parameter settings are made.

(1) Application ID→the ID of the application.
(2) Task ID→in the case of the new addition of a task, a new value; and in the case of the update of a task, the same value as the task ID of the task to be updated.
(3) Execution priority→an optional value.
(4) Communication destination URL→the URL of a server that is a transmission destination.
(5) File path→a value indicating the location of the task transmission data 556.
(6) Next execution time→an optional value.
(7) Execution interval→an optional value.
(8) Transmission/reception identification flag→a value indicating "transmission".
(9) Number of uses→an optional value.

After the above parameter settings are made, the processing proceeds to step S131 described later.

On the other hand, as a result of the determination in step S127, when it is determined that the contents of the event having occurred are related to a "reception task" (NO in step S127), in step S130, various parameters for the "reception task" are set. This process is a process of setting parameters for setting the items of the task setting 531, similarly to step S129. Specifically, the following parameter settings are made.

(1) Application ID→the ID of the application.
(2) Task ID→in the case of the new addition of a task, a new value; and in the case of the update of a task, the same value as the task ID of the task to be updated.
(3) Execution priority→an optional value.
(4) Communication destination URL→the URL of a server that is a reception destination.
(5) File path→a value indicating a storage destination of received data (the task reception cache 553).
(6) Next execution time→an optional value.
(7) Execution interval→an optional value.
(8) Transmission/reception identification flag→a value indicating "reception".
(9) Number of uses→an optional value.

After the above parameter settings are made, the processing proceeds to step S131 described later.

Figure 35:
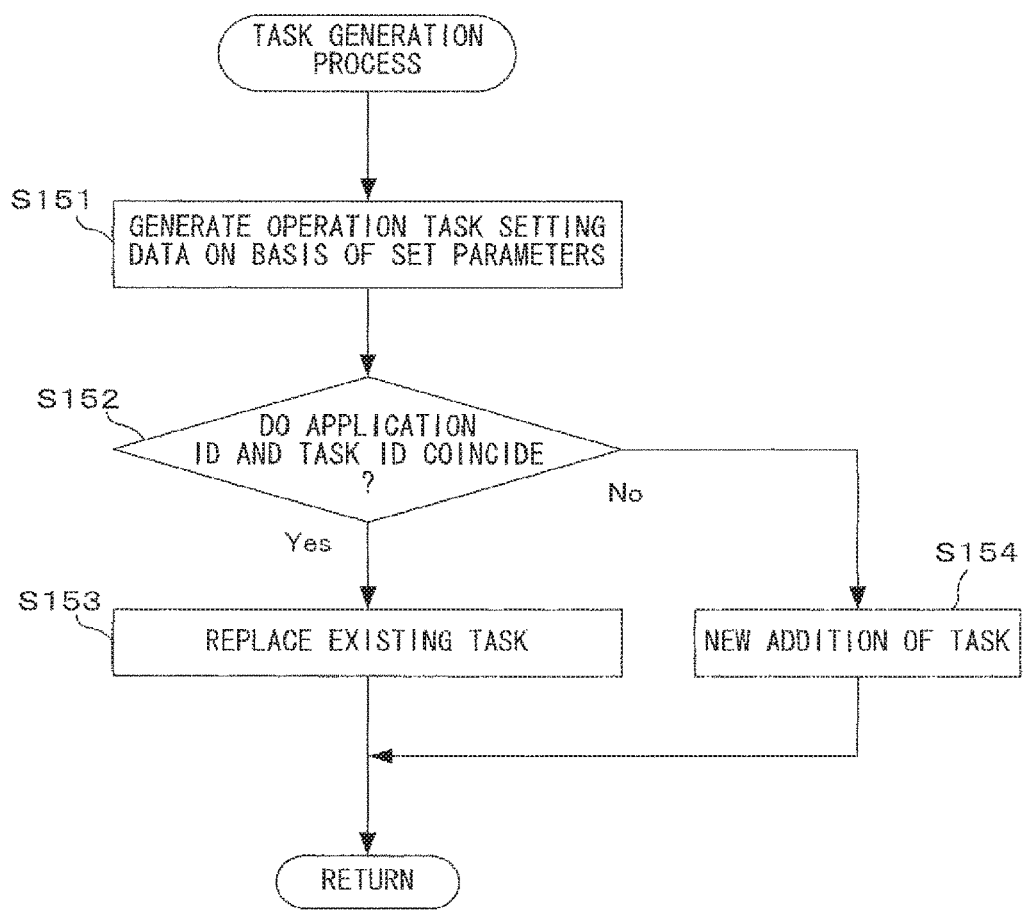
FIG. 35 is a flow chart showing in detail a task generation process shown in step S131 in FIG. 33.

Next, in step S131, a task generation process is performed for newly adding a task or updating an existing task on the basis of the above set parameters. FIG. 35 is a flow chart showing in detail the task generation process shown in step S131. In FIG. 35, first, in step S151, operation task setting data is generated on the basis of each item of the above parameters. The operation task setting data is temporary data generated in the main memory 32, and has the same data structure as that of the task setting 531. It should be noted that for the items which have optional values and whose parameters have yet to be determined, values determined as initial values are set.

Next, in step S152, it is determined whether or not the combination of the application ID and the task ID of the operation task setting data coincides with any combination of the application ID 532 and the any task ID 533 in the task settings 531 stored in the task data 530. That is, it is determined whether a task is newly added or an existing task is updated. As a result of the determination, when there is a coinciding combination of IDs (YES in step S152), the contents of the coinciding task setting 531 are replaced by (i.e., updated with) the operation task setting data in step S153. On the other hand, when there is no coinciding combination of IDs (NO in step S152), in step S154, the operation task setting data is additionally registered as a new task setting 531 in the task data 530. Then, the operation task setting data is deleted, and the task generation process ends.

Referring back to FIG. 33, after the process of step S131 has ended, it is determined in step S132 in FIG. 34 whether or not a certain event concerning transmission using the "passing communication" has occurred as a result of the various information processing in step S125. For example, in the various information processing, it is determined whether or not an instruction has been given by the user to transmit data using the "passing communication". As a result of the determination, when it is determined that an event of transmitting data using the "passing communication" has occurred (YES in step S132), in step S133, transmission data corresponding to the contents of the event is generated as appropriate. Then, the generated transmission data is stored in the transmission box 523 of the slot 521 in the passing communication data 520, the slot 521 corresponding to the application. Then, the processing proceeds to step S134 described later. On the other hand, as a result of the determination in step S132, when it is determined that such an event has not occurred (NO in step S132), the process of step S133 is skipped, and the processing proceeds to step S134.

Next, in step S134, it is determined whether or not data received from a server is present. That is, it is determined whether or not new data has been received as a result of the execution of the "reception task" (thus, when the determination in step S121 is YES, the determination in this step is also YES). For example, when new data has been received from a server, the new data has been transferred to the saved data 555 in step S122. Thus, this determination is made with reference to the saved data 555.

As a result of the determination, when it is determined that no new data received from the server is present (NO in step S134), the processing proceeds to step S142 described later. On the other hand, when it is determined that new data received from the server is present (YES in step S134), subsequently, it is determined in step S135 whether or not a notification announcing the termination of a network service concerning the currently executed application is included in the received data. As a result, when it is determined that a notification announcing the termination of the network service is not included (NO in step S135), the processing proceeds to step S141 described later.

On the other hand, when a notification announcing the termination of the network service is included (YES in step S135), in step S136, a message announcing the termination of the network service is displayed on the upper LCD 22 or the lower LCD 12. Subsequently, in step S137, it is determined whether or not there remain any task settings 531 including the application ID 532 of the currently executed application in the task data 530. When it is determined that there remain such task settings 531 (YES in step S137), all the task settings 531 including the application ID 532 of the currently executed application are deleted. On the other hand, when it is determined that there remain no such task settings 531 (NO in step S137), the process of step S138 is skipped.

Next, in step S139, it is determined with reference to the passing communication data 520 whether or not a slot 521 is present, to which the application ID 522 of the currently executed application is assigned. When it is determined that there remains such a slot 521 (YES in step S139), in step S140, the contents of the slot 521 corresponding to the currently executed application are cleared. As a result, the association of the slot 521 with the application is canceled. On the other hand, when it is determined that there remains no such a slot (NO in step S139), the process of step S140 is skipped.

Next, in step S141, a process is performed of displaying the contents of the newly received data, where necessary.

Next, in step S142, it is determined whether or not conditions for ending the processing of the application that is being performed are satisfied. As a result, when the conditions are not satisfied (NO in step S142), the processing returns to step S121, and the same process is repeated. When the conditions are satisfied (YES in step S142), the processing of the application is ended. This is the end of the description of the processing of each application.

[Local Communication BG Process]

Next, a description is given of the local communication BG process (specifically, step S4 in FIG. 20, steps S28 and S34 in FIG. 21, step S40 in FIG. 22, and step S73 in FIG. 24), which is called up as appropriate in each process as described above. In this process, the following are mainly performed: a transmission/reception process in the "passing communication"; and control of the scanning of the predetermined AP, and a process of connecting to the AP, and the like. In addition, when a connection has been made to a predetermined AP as described above, the "Internet communication BG process", which is a process of performing the "Internet communication" and the like are called up as appropriate.

Figure 36:
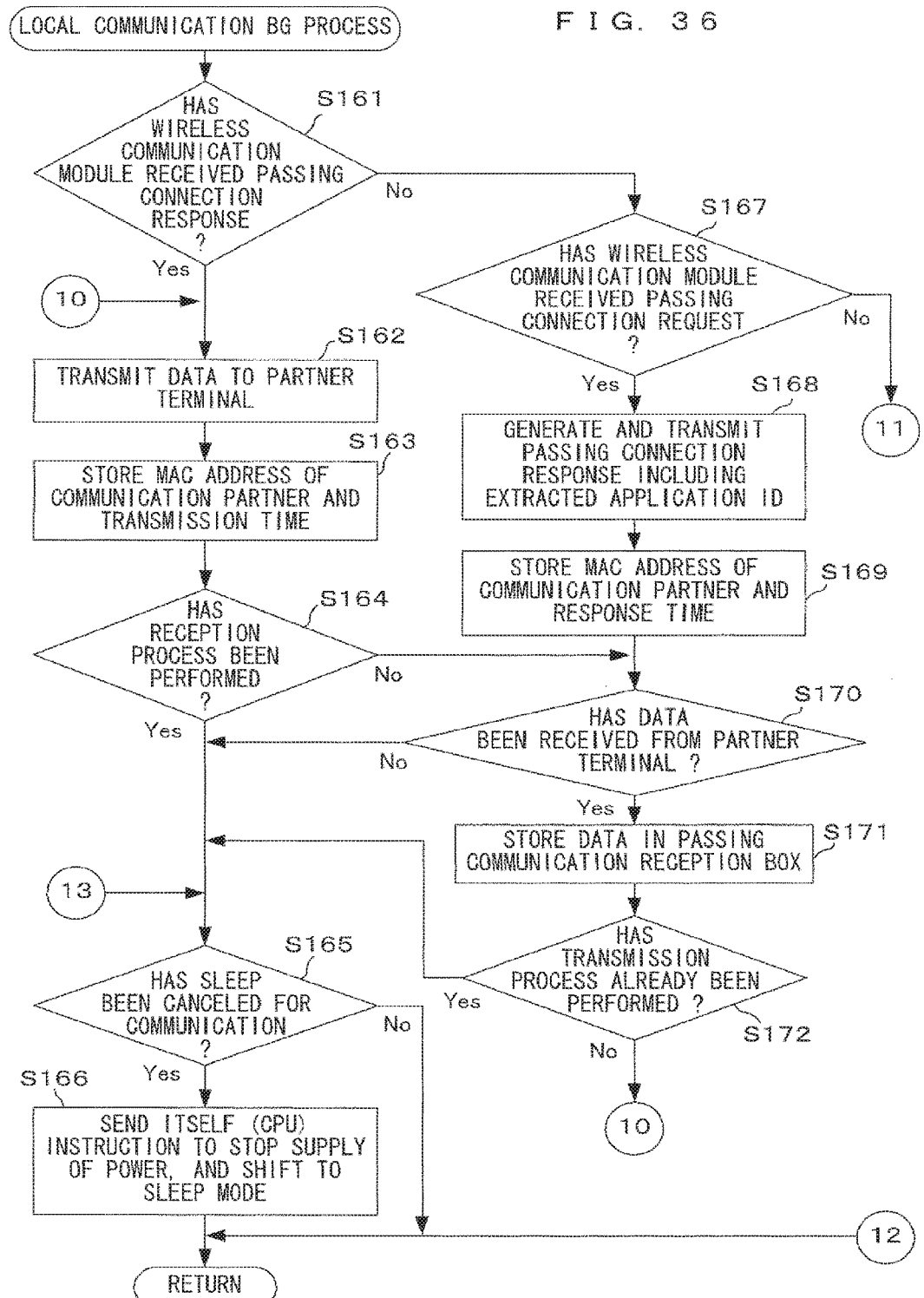
FIG. 36 is a flow chart showing a local communication BG process in detail.
Figure 37:
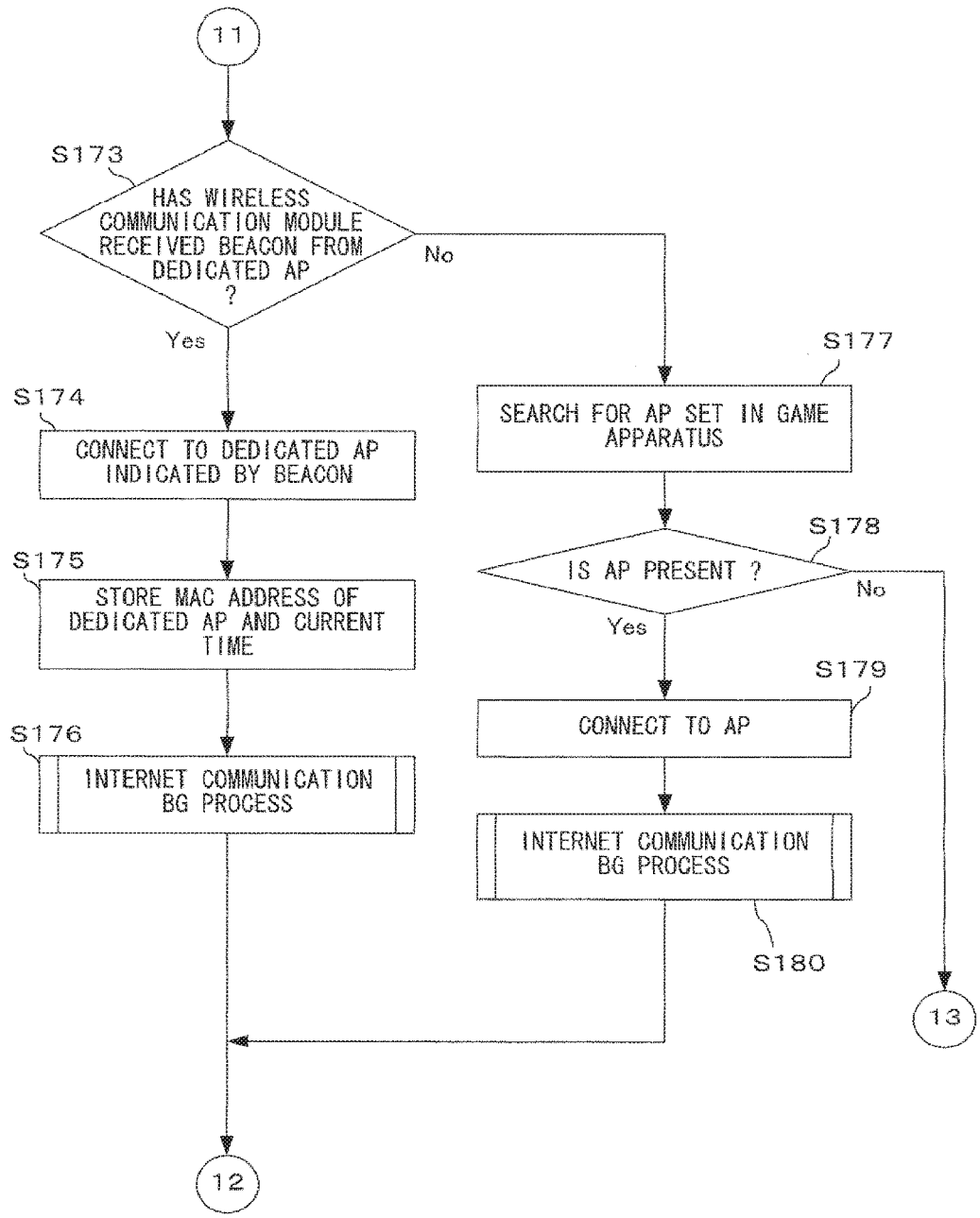
FIG. 37 is a flow chart showing the local communication BG process in detail.

FIGS. 36 and 37 are flow charts showing the local communication BG process in detail. First, in step S161, it is determined whether or not the wireless communication module 34 has received a passing connection response. For example, the determination is made by a process of the CPU 31 inquiring of the wireless communication module 34 about whether or not the wireless communication module 34 has received a passing connection response. As a result of the determination, when it is determined that the wireless communication module 34 has not received a passing connection response (NO in step S161), the processing proceeds to step S167 described later. On the other hand, when it is determined that the wireless communication module 34 has received a passing connection response (YES in step S161), it is indicated that there is another game apparatus 1 which can respond to a request made by the game apparatus 1 (i.e., to which a connection has been established for the local communication) (step S28 in FIG. 21 is performed in this flow). Thus, in the subsequent step S162, data in the transmission box 523 of the passing communication data 520 is transmitted to said another game apparatus 1 that is the communication partner. It should be noted that as described above, data to be transmitted is limited to data in a slot 521 whose application ID 522 coincides with that in the passing communication data 520 of the communication partner.

Next, in step S163, a transmission time and the MAC address of said another game apparatus 1 that is the communication partner are stored in the already-communicated terminal/dedicated AP information 405 in the wireless communication module 34.

Next, in step S164, it is determined whether or not a process of "reception" in the passing communication has been performed. In the present embodiment, in the passing communication, as a general rule, "transmission" and "reception" are performed as a set. Thus, in this determination, it is determined whether both "transmission" and "reception" have been completed or neither "transmission" nor "reception" have been completed. As a result of the determination, when it is determined that the reception process has yet to be performed (NO in step S164), the processing proceeds to step S170 described later, and data transmitted from the communication partner is received.

On the other hand, when it is determined that the reception process has already been performed (YES in step S164), it is determined in step S165 whether or not the "sleep mode" has been canceled in order to perform the current communication (including the "Internet communication" described later as well as the "local communication"). As a result of the determination, when it is determined that the "sleep mode" has been canceled for the current communication (YES in step S165), it is considered that the game apparatus 1 has been in the "sleep mode" before the current communication. Thus, in order to return to the "sleep mode", in step S166, an instruction to stop the supply of power to the CPU 31 is sent from the CPU 31 itself, and a process of shifting to the "sleep mode" is performed. In addition, the power supply state flag 304 in the microcomputer 37 is set to OFF, and the power management IC 41 is notified that the game apparatus 1 is to shift to the "sleep mode". On the other hand, as a result of the determination in step S165, when it is determined that the "sleep mode" has not been canceled for the current communication (NO in step S165), it is considered that the game apparatus 1 has been originally operating in the "normal power mode". Thus, the process of step S166 is skipped. Then, the local communication BG process ends.

Next, a description is given of a process performed when it is determined that the wireless communication module 34 has not received a passing connection response, as a result of the determination in step S161. In this case, first, in step S167, it is determined whether or not the wireless communication module 34 has received a passing connection request, that is, a request for passing communication from another game apparatus 1. As a result, when it is determined that the wireless communication module 34 has not received a passing connection request (NO in step S167), the processing proceeds to step S173 described later. On the other hand, when it is determined that the wireless communication module 34 has received a passing connection request (YES in step S167), in step S168, a passing connection response is generated and transmitted to said another game apparatus 1 that is the transmission source of the passing connection request (it should be noted that the process of step S34 in FIG. 21 is performed in this flow). In this case, the passing connection response includes the contents of the extracted application ID 406 stored in the wireless communication module 34, and is transmitted (i.e., the communication partner is notified of an application that is an object of the passing communication).

Next, in step S169, a response time and the MAC address of said another game apparatus 1 that is the communication partner are stored in the already-communicated terminal/ dedicated AP information 405 in the wireless communication module 34.

Next, in step S170, it is determined whether or not data has been received from the communication partner. In the present embodiment, only an item whose application ID 522 coincides with that in the communication partner is a transmission/reception object. Thus, this determination is made as to the case where a request for passing communication has been received from another game apparatus 1 and a connection thereto has been established, but no data to be transmitted or received is present because there is no coinciding application ID 522 between the game apparatuses 1. That is, when the connection response transmitted in step S169 has been received by the partner terminal but the determination is NO in step S25 in FIG. 21 in the partner terminal, no data is transmitted. When it is determined that no data has been received from the partner terminal (within a predetermined period of time) (NO in step S170), it is considered that this case corresponds to one where there is no coinciding application ID 522. Thus, the processing proceeds to step S165, and it is determined whether or not the power control mode is to return to the "sleep mode". On the other hand, when it is determined that data has been received from the partner terminal (YES in step S170), the received data is stored in the reception box 524 of the slot 521 corresponding to the application ID 522. It should be noted that when the processing proceeds from step S164 to step S170, it is indicated that there is at least one transmission/reception object having a coinciding application ID 522, and data is transmitted from the partner terminal. Thus, unless a transmission error occurs during the transmission, the determination is YES in step S170.

Next, in step S172, it is determined whether or not the transmission process in the passing communication has already been performed. As a result, when it is determined that the transmission process in the passing communication has yet to be performed (NO in step S172), the processing proceeds to step S162, and the transmission process in the passing communication is performed. On the other hand, when it is determined that the transmission process has already been performed (YES in step S172), the processing proceeds to step S165.

Next, a description is given of a process performed when it is determined that a passing connection request has not been received, as a result of the determination in step S167. In this case, a process concerning the "Internet communication" is performed. First, in step S173 in FIG. 37, it is determined whether or not the wireless communication module 34 has received a beacon from a dedicated AP 101. As a result of the determination, when it is determined that the wireless communication module 34 has received a beacon from a dedicated AP 101 (YES in step S173), in step S174, a process is performed of connecting to the dedicated AP 101 that is the transmission source of the beacon. It should be noted that the process of step S40 in FIG. 22 is performed in this flow.

Next, in step S175, the current time and the MAC address of the connected dedicated AP 101 are stored in the already-communicated terminal/dedicated AP information 405 in the wireless communication module 34.

Next, in step S176, the Internet communication BG process is performed. In this process, the following are performed: the acquisition of policy data; a process based on the policy data; and a process of executing a task. This process will be described in detail later. When this process ends, the local communication BG process ends.

On the other hand, as a result of the determination in step S173, when it is determined that the wireless communication module 34 has not received a beacon from a dedicated AP 101 (NO in step S173), in step S177, a process is performed of searching for a predetermined AP registered and set in the game apparatus 1, with reference to the game apparatus setting data 560. For example, a process is performed of searching for an AP set at the user's home, an AP of a public wireless LAN service defined in advance as a setting before shipment, or the like. The search method is typically passive scanning, but the game apparatus 1 can connect directly to an AP if the ESSID of the AP and a frequency used for communication with the AP are stored in advance in the game apparatus 1.

Next, in step S178, based on a result of the search in step S177, it is determined whether or not an AP is present. As a result, when it is determined that an AP is not present (no AP has been detected as a result of the search) (NO in step S178), the processing proceeds to step S165. On the other hand, when it is determined that an AP is present (YES in step S178), in step S179, a process of connecting to the searched AP is performed. Then, in step S180, the Internet communication BG process described later is performed. When this process ends, the local communication BG process ends. This is the end of the description of the local communication BG process.

[Internet Communication BG Process]

Next, a description is given of the Internet communication BG process shown in step S176 and the like. In this process, a process concerning the transmission and reception of various data using the "Internet communication", and the like, are performed.

Figure 38:
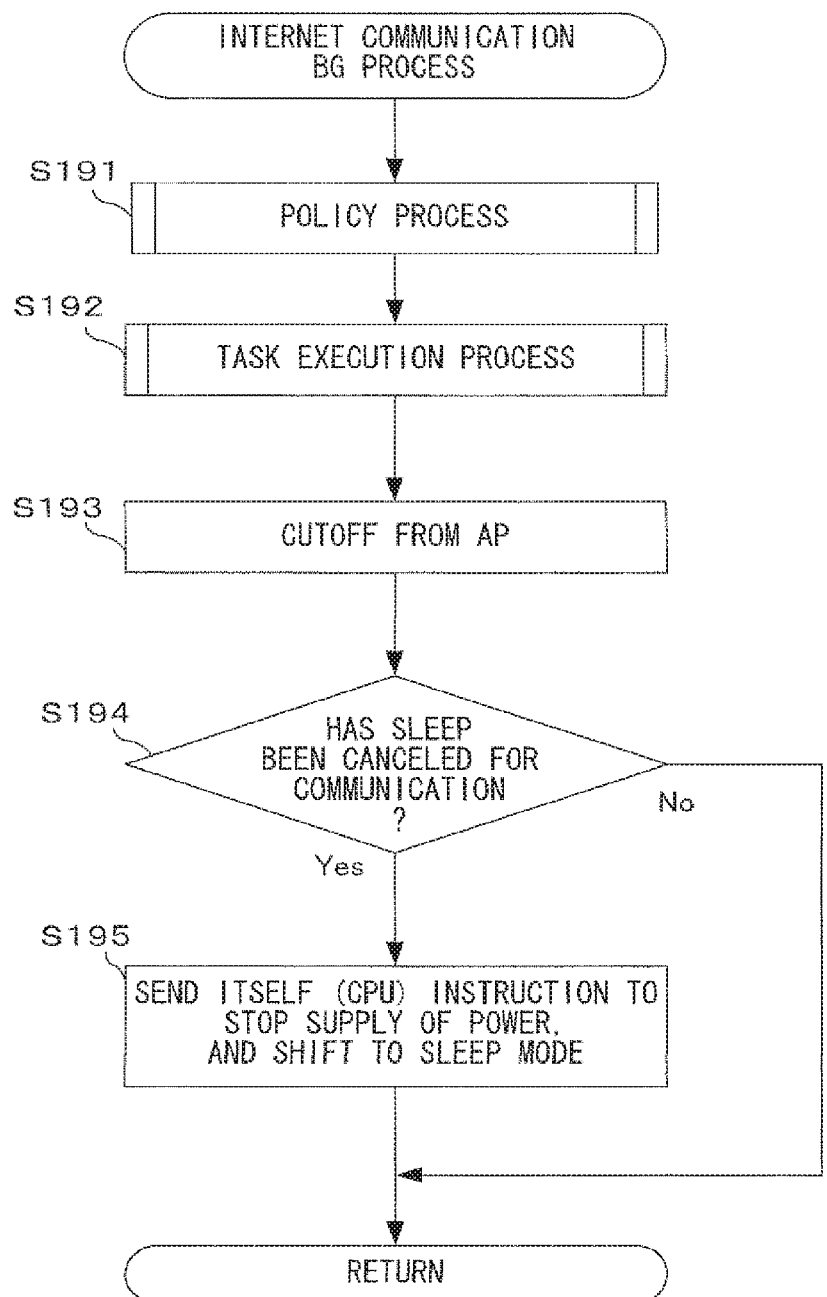
FIG. 38 is a flow chart showing an Internet communication BG process in detail.

FIG. 38 is a flow chart showing the Internet communication BG process in detail. First, in step S191, a policy process is performed. Although this process will be described in detail later, the acquisition of policy data and the adjustments of the execution priorities of tasks based on the policy data are mainly performed here.

Next, in step S192, a task execution process is performed. Although this process will also be described in detail later, the execution of tasks, an installation process, and the like, are performed in this process.

When the task execution process has ended, the communication with the AP 101 or 102 is cut off in step S193. In the subsequent step S194, it is determined whether or not the "sleep mode" has been canceled for the current communication. As a result, when it is determined that the "sleep mode" has been canceled (YES in step S194), in order to return to the "sleep mode", in step S195, an instruction to stop the supply of power to the CPU 31 is sent from the CPU 31 itself, and a process of shifting to the "sleep mode" is performed. In addition, the power supply state flag 304 in the microcomputer 37 is set to OFF, and the power management IC 41 is notified that the game apparatus 1 is to shift to the "sleep mode". On the other hand, as a result of the determination in step S194, when it is determined that the "sleep mode" has not been canceled for the current communication (NO in step S194), the process of step S195 is skipped. Then, the Internet communication BG process ends.

[Policy Process]

Figure 39:
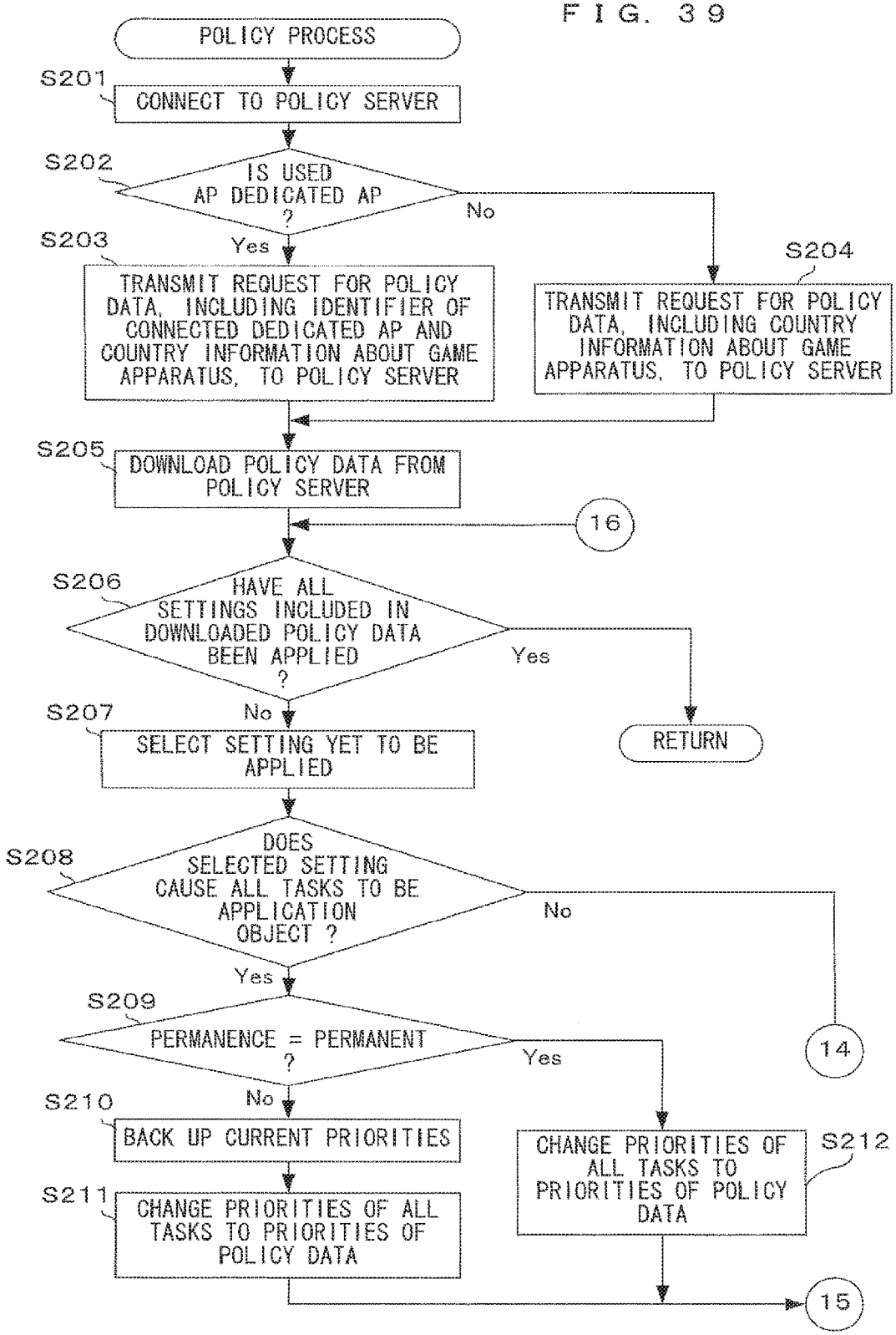
FIG. 39 is a flow chart showing in detail a policy process shown in step S191 in FIG. 38.
Figure 40:
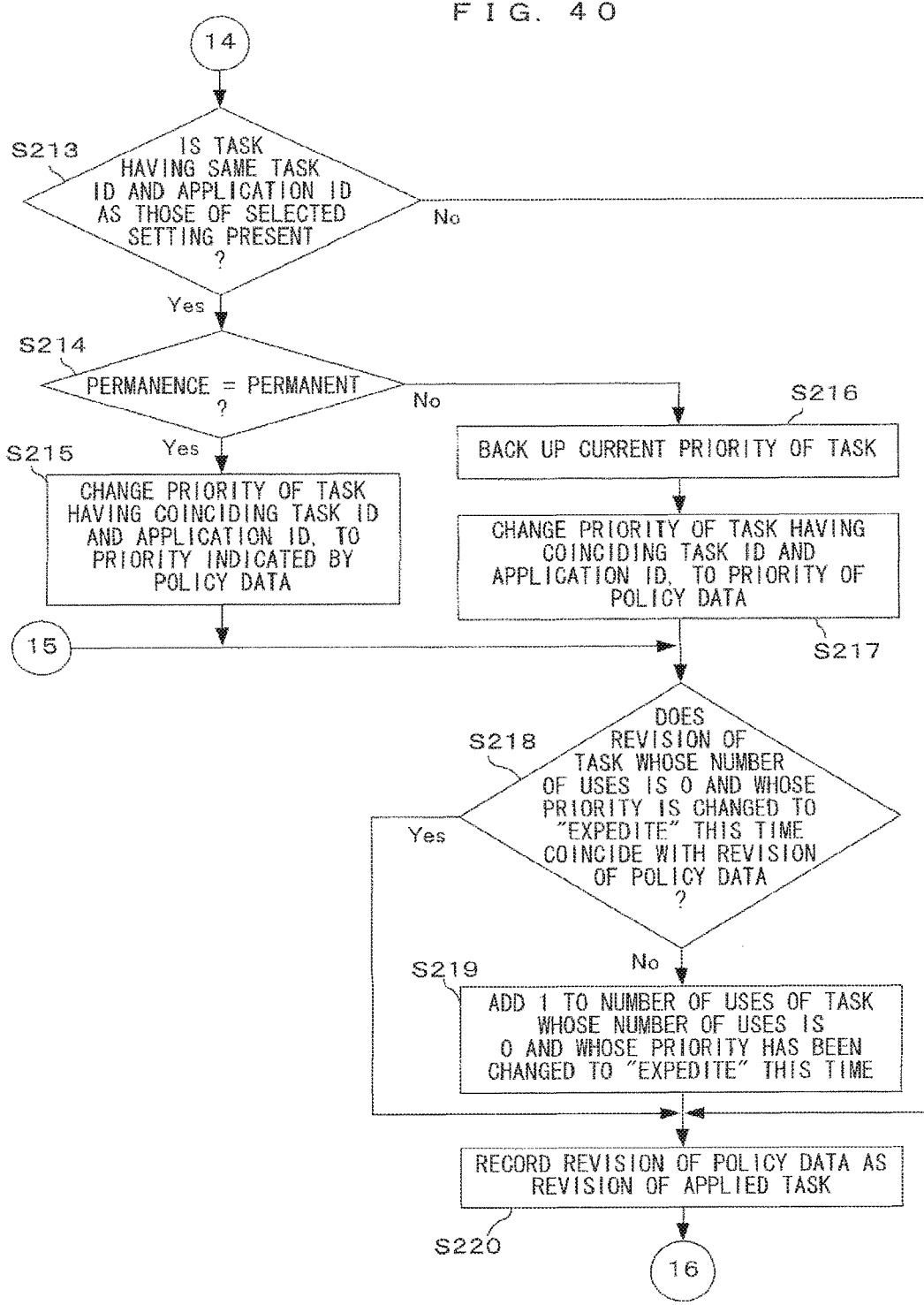
FIG. 40 is a flow chart showing in detail the policy process shown in step S191 in FIG. 38.

Next, a description is given of the policy process shown in step S191. FIGS. 39 and 40 are flow charts showing the policy process in detail. First, in step S201, a process is performed of establishing a connection to the policy server 103 as described above. Subsequently, in step S202, it is determined whether or not the AP currently used for communication is a dedicated AP 101. This determination is made on the basis of whether or not the vendor specific information as described above is included in the beacon used for the connection to the AP. As a result of the determination, when it is determined that a dedicated AP 101 is used (YES in step S202), in step S203, a request for policy data, including an identifier of the dedicated AP 101 currently used and the country information set in the game apparatus 1 (and included in the game apparatus setting data 560), is generated and transmitted to the policy server 103. The request is, for example, an HTTP request as follows.

"https://xxx.net/character string indicating country information/AP identifier/"

On the other hand, when it is determined that the AP currently used for communication is not a dedicated AP 101 (NO in step S202), in step S204, a request for policy data, including the country information, is generated and transmitted to the policy server 103. For example, this request is as follows.

"https://xxx.net/character string indicating country information/"

In response to the request as described above, the policy data is transmitted from the policy server 103. Thus, subsequently, in step S205, the policy data is downloaded from the policy server 103 and stored as the received policy data 570 in the main memory 32 or the NAND flash memory 33.

After the download is completed, a process is performed of applying the downloaded received policy data 570. Specifically, first, in step S206, it is determined whether or not the following process has been performed for all the policy settings 574 included in the received policy data 570, that is, changes in the execution priorities and the number of uses have been applied to all the policy settings 574. As a result of the determination, when it is determined that changes have been applied to all the policy settings 574 (all the policy settings 574 have been processed) (YES in step S206), the policy process ends. On the other hand, when there remain any (unprocessed) policy settings 574 to which the changes have yet to be applied (NO in step S206), in step S207, any one of the policy settings 574 to which the changes have yet to be applied is selected. Hereinafter, the selected policy setting 574 is referred to as a "process object policy setting".

Next, in step S208, it is determined whether or not the contents of the process object policy setting are those that cause all the tasks to be application objects. The determination is made on the basis of whether or not a character string indicating that all the tasks are caused to be application objects is indicated in the task ID 576 of the process object policy setting. As a result of the determination, when it is determined that the contents of the process object policy setting are not those that cause all the tasks to be application objects (NO in step S208), the processing proceeds to step S213 described later.

On the other hand, as a result of the determination, when it is determined that all the tasks are caused to be application objects (YES in step S208), it is determined in step S209 whether or not the task permanence 578 of the process object policy setting is set to ON, that is, the task permanence 578 is contents indicating "permanent". As a result of the determination, the determination is "permanent" (YES in step S209), in step S212, the execution priorities 534 of all the tasks registered in the game apparatus 1 (i.e., in the task data 530) are changed to values indicated by the execution priority 577 of the process object policy setting. Thereafter, the processing proceeds to step S218 described later.

On the other hand, as a result of the determination in step S209, when the determination is not "permanent" (NO in step S209), in step S210, the current execution priorities 534 of all the tasks in the task data 530 are backed up in the main memory 32. Then, in step S211, the execution priorities 534 of all the tasks registered in the game apparatus 1 are changed to values indicated by the execution priority 577 of the process object policy setting. Thereafter, the processing proceeds to step S218 described later.

Next, a description is given of a process performed when it is determined that the contents of the process object policy setting are those that cause all the tasks to be application objects, as a result of the determination in step S208. In this case, in step S213, it is determined with reference to the task data 530 whether or not a task setting 531 having the same values as those of the task ID 576 and the application ID 575 of the process object policy setting is present in the task data 530. As a result of the determination, when it is determined that such a task setting 531 is not present (NO in step S213), it is determined that the process object policy setting has already been processed, and the processing returns to step S206. As a result, an unprocessed policy setting 574 is selected as the next process object policy setting from the received policy data 570, and the same process is repeated.

On the other hand, when it is determined that a task setting 531 having the coinciding task ID and application ID is present (YES in step S213), subsequently, it is determined in step S214 whether or not the task permanence 578 of the process object policy setting has a value indicating "permanent". As a result, when the task permanence 578 indicates "permanent" (YES in step S214), the execution priority 534 of the task setting 531 having the coinciding task ID and application ID is set to a value indicated by the execution priority 577 of the process object policy setting in step S215. Then, the processing proceeds to step S218 described later.

On the other hand, as a result of the determination in step S214, when it is determined that the task permanence 578 does not indicate "permanent" (NO in step S214), in step S216, the execution priority 534 of the task setting 531 having the coinciding task ID and application ID is backed up in the main memory 32. Then, in step S217, the execution priority 534 of the task setting 531 having the coinciding task ID and application ID is set to a value indicated by the execution priority 577 of the process object policy setting.

Next, in step S218, it is determined whether or not, as a result of a change in the execution priority 534, the task setting 531 that has become an application object of the change satisfies the following conditions: (1) the number of uses 540 is 0; (2) the execution priority 534 after the change is "EXPEDITE"; and (3) the value of the task revision 543 coincides with that of the policy revision 571 of the received policy data 570 acquired this time. When it is determined that not all these three conditions are satisfied (NO in step S218), in step S219, 1 is added to the number of uses 540 of the task setting 531. That is, in order to change a task that is not executed because its number of uses has become 0 to a task whose execution priority is "EXPEDITE", that is, a task to be most preferentially executed, the value of the number of uses 540 is changed. Then, in step S220, the value of the policy revision 571 of the received policy data 570 is recorded as the value of the task revision 543 of the applied task setting 531. Then, the processing returns to step S206.

On the other hand, as a result of the determination in step S218, when it is determined that all the three conditions are satisfied (YES in step S218), it is considered that the policy data of the same revision has been received before and the task has been executed at that time. In this case, when the policy data of the same revision has been received, the processing proceeds to step S220 without performing the addition to the number of uses 540 as described above, so that the task is not performed again. This is the end of the description of the policy process.

[Process by Policy Server]

Figure 41:
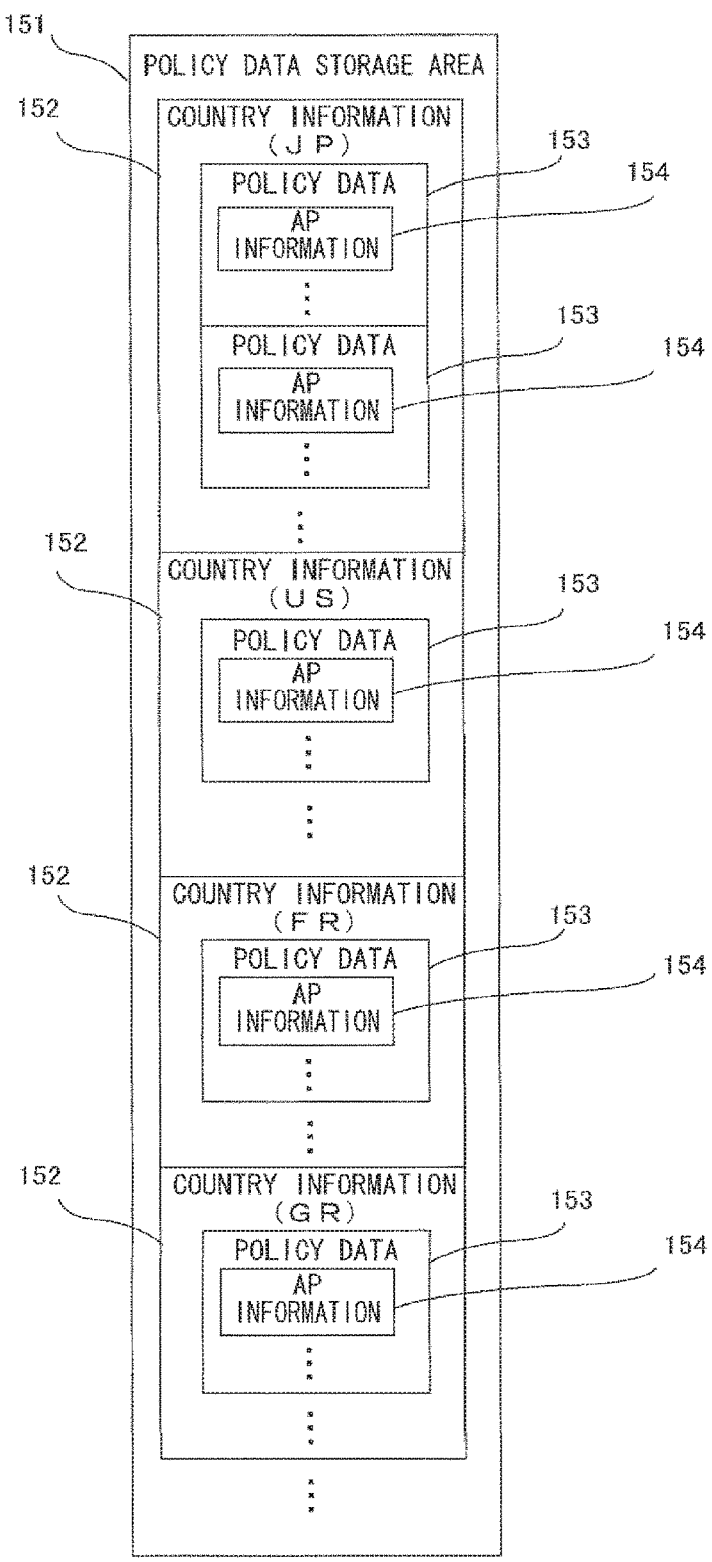
FIG. 41 is a diagram showing a memory map of a policy sever 103.

Here, a description is given also of a process performed by the policy server 103, which is a communication partner in the policy process. First, prior to a specific description of the process, a brief description is given of a memory map of the policy server 103 in which policy data is stored. FIG. 41 is a diagram showing the memory map of the policy server 103. As shown in FIG. 41, in the policy server 103, a plurality of pieces of policy data 153 are stored for pieces of country information 152, respectively. The structure of each piece of policy data 153 is the same as that of the received policy data 570 shown in FIG. 18. In FIG. 41, only pieces of AP information 154 are shown for convenience of description. Each piece of AP information 154 is information to which a value indicating a predetermined dedicated AP 101 is assigned, or information in which a NULL value is set. In the present embodiment, a plurality of pieces of policy data 153, to each of which a value indicating a dedicated AP 101 is assigned, are present for pieces of country information, respectively (it should be noted that the pieces of AP information 154 of the plurality of pieces of policy data 153 do not coincide with one another). In addition, there is only one piece of policy data 153 in which a NULL value is set in the corresponding piece of AP information 154. On the premise that such pieces of policy data 153 are stored in the policy server 103, the following process is performed.

Figure 42:
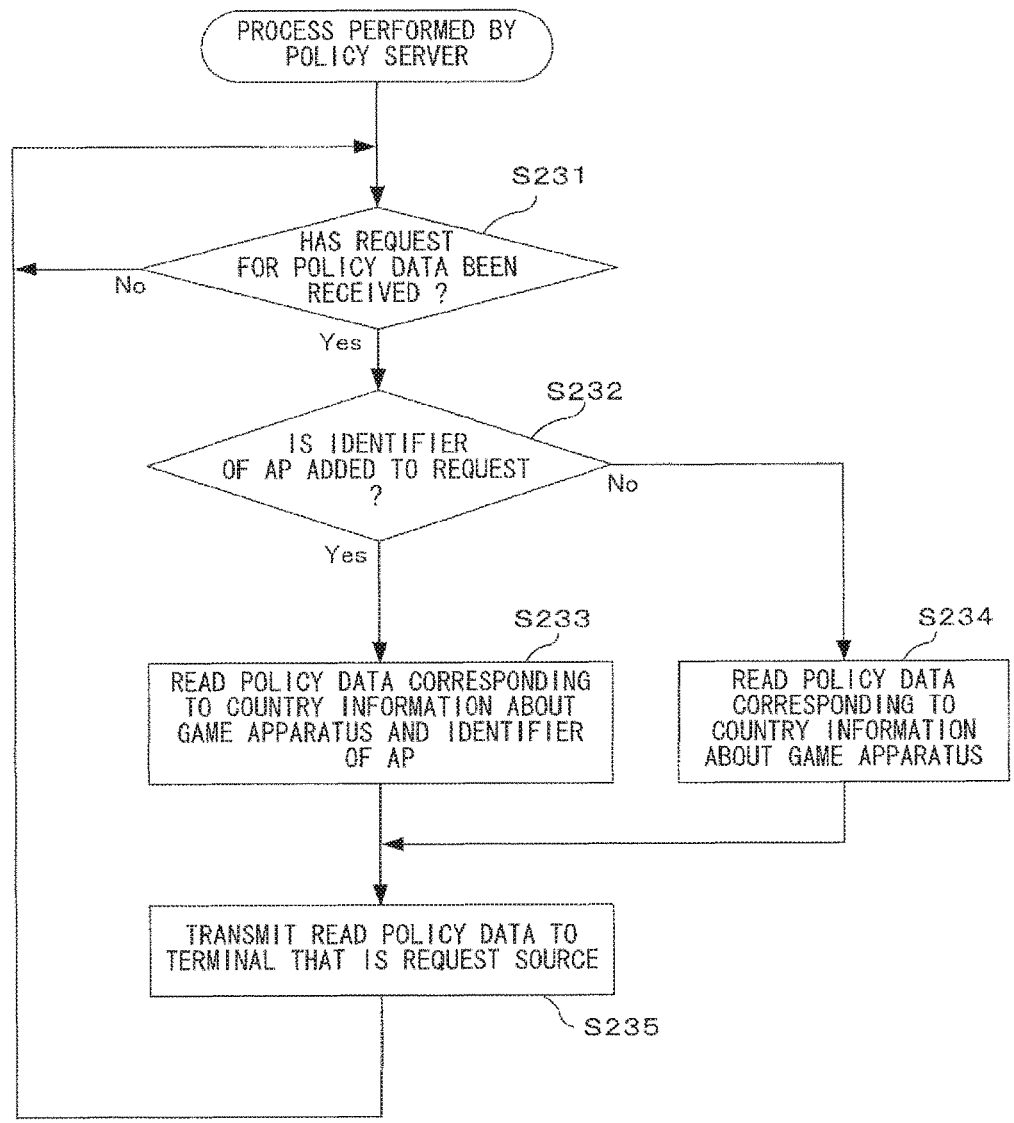
FIG. 42 is a flow chart showing a process performed by the policy server 103.

FIG. 42 is a flow chart showing the process performed by the policy server 103. In FIG. 42, first, in step S231, it is determined whether or not a request for the policy data 153 as described above has been received. As a result, when it is determined that such a request has not been received (NO in step S231), the process of step S231 is repeated. That is, such a request is waited for. On the other hand, when it is determined that a request for the policy data 153 has been received (YES in step S231), subsequently, it is determined in step S232 whether or not the identifier of an AP is added to the received request. As a result, when the identifier is added (YES in step S232), it is considered that the game apparatus 1 is accessing the policy server 103 via the dedicated AP 101. In this case, in step S233, the country information about the game apparatus 1 that is included in the request, and the policy data 153 corresponding to the identifier of the AP, are read. That is, the country information included in the request is matched with the country information 152 stored in the policy server 103. When coinciding country information is present, the AP identifier included in the request is matched with the AP information 154, and policy data 153 having the coinciding AP information 154 is searched for and read. Then, in step S235, the read policy data 153 is transmitted to the game apparatus 1 that is the transmission source of the request.

On the other hand, as a result of the determination in step S232, when it is determined that the identifier of the AP is not added to the request (NO in step S232), it is considered that the game apparatus 1 is accessing the policy server 103 not via the dedicated AP 101. Thus, in this case, in step S234, first, the country information included in the request is matched with the country information 152 of the policy server 103 to search for coinciding country information 152. Then, the policy data 153 is read, in which a NULL value is set in the AP information 154. Then, in step S235, the policy data 153 is transmitted. This is the end of the description of the process of the policy server.

[Task Execution Process]

Next, a description is given of the task execution process shown in step S192 in FIG. 38. In this process, the transmission and reception of predetermined data are performed on the basis of the setting contents of a task. In addition, an installation process is also performed. FIGS. 43 to 48 are flow charts showing the task execution process in detail. First, in step S511, an execution order sorting process is performed. In this process, a process is performed of: extracting tasks to be executed, taking into account the execution priorities, the next execution times, the numbers of uses, and the like, of tasks; and determining the execution order of the tasks. In addition, as a result of the following process, temporary data, such as an "execution order list", is generated in the main memory 32.

Figure 49:
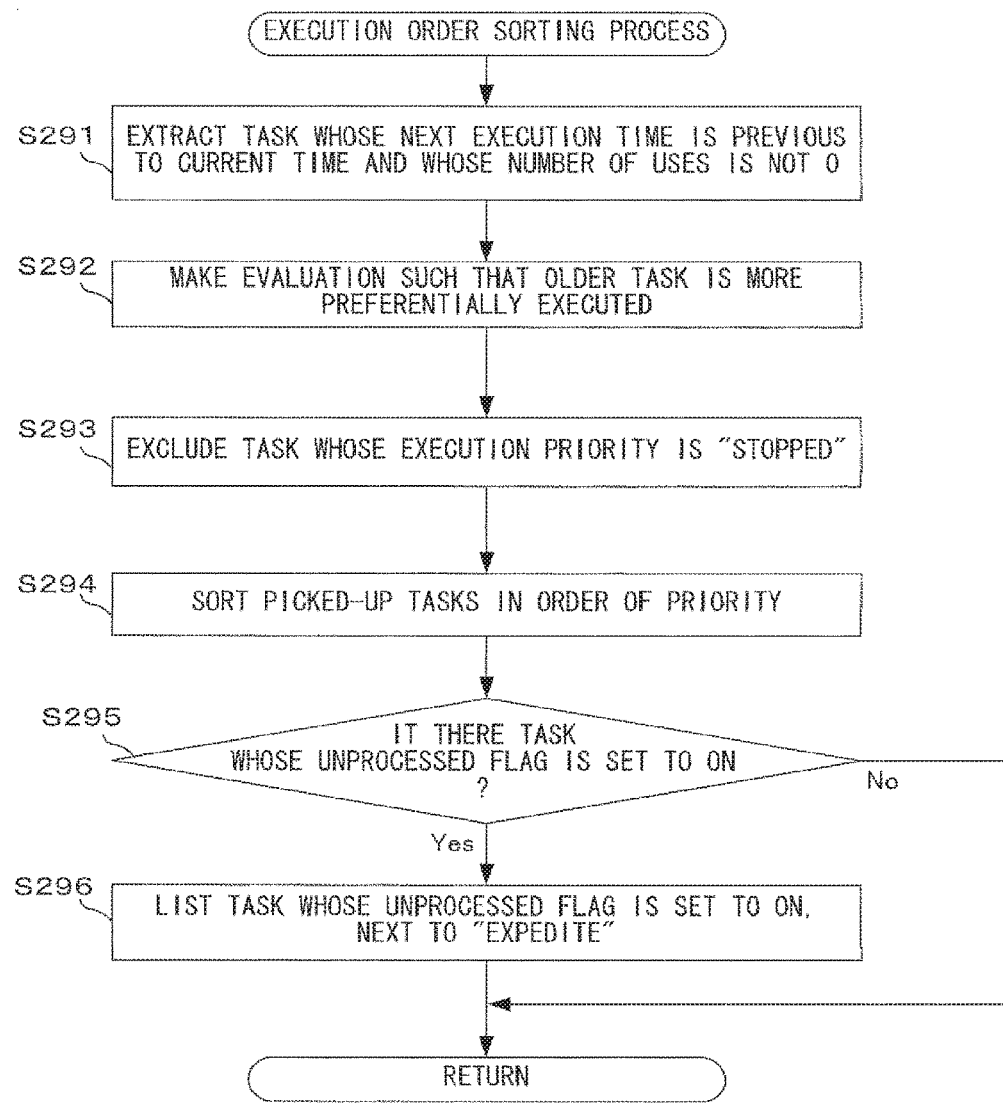
FIG. 49 is a flow chart showing in detail an execution order sorting process in step S511.

FIG. 49 is a flow chart showing in detail the execution order sorting process in step S511. In FIG. 49, first, in step S291, with reference to the task data 530, task settings 531 are extracted, whose next execution times 537 are previous to the current time and whose numbers of uses 540 are not 0. The reason why the task settings 531 whose next execution times 537 are "previous" to the current time are extracted, is that the time of connecting to the dedicated AP 101 is the time when a beacon has been received by chance, and therefore, the process of a task is hardly performed at exactly the same time as the scheduled execution time of the task. Thus, the task setting is extracted at this time even when it is already past the execution time of the task.

Next, in step S292, each of the extracted task settings 531 is evaluated. This is intended to make adjustments such that a task that has not been executed for a longer period of time is more preferentially executed. Thus, in the present embodiment, an "evaluation point" is used. The "evaluation point" indicates that the higher the value of the point, the more preferentially the task is to be executed. In this process, the last completion time 544 of each extracted task setting 531 is compared to the current time, and an "evaluation point" having a higher point is given to an extracted task setting 531 having a longer period of time from its last completion time 544 to the current time. That is, the longer period of time the task has not been executed for, the higher the "evaluation point" is set for the task setting 531.

Next, in step S293, a task whose execution priority 534 is "STOPPED" is excluded from the extracted tasks. This is because "STOPPED" means the stoppage of execution.

Next, in step S294, on the basis of the execution priorities 534 and the "evaluation points", the task settings 531 picked up in the previous process are sorted. Specifically, the task settings 531 are sorted on the basis of the execution priorities 534. Next, sorting based on the "evaluation points" is performed between the task settings 531 having the same execution priority. As a result, ordering is performed such that, among the task settings 531 having the same execution priority, a task that has not been executed for a longer period of time is more preferentially executed. It should be noted that for the task setting 531 of a task yet to be executed, that is, for a task setting 531 in which no value is set in the last completion time 544, sorting is performed on the basis of the task registration time 545, which is the time when the task setting 531 has been registered. That is, sorting is performed such that a task whose registration time is earlier is more preferentially executed.

Next, in step S295, it is determined whether or not there is a task setting 531 in which the unprocessed flag 541 is set to ON. As a result, when it is determined that there is a task setting 531 in which the unprocessed flag 541 is set to ON (YES in step S295), in step S296, adjustments are made such that the execution priority of the unprocessed task setting 531 becomes "HIGH", and the unprocessed task setting 531 proceeds to a higher rank in the execution order than any other task settings 531 having an execution priority of "HIGH". That is, it is considered that a task that is unprocessed at this time has not been executed for some reason when the task has previously been executable. Thus, such a task is adjusted so as to be executed with a priority next to "EXPEDITE", such that a so-called "resume"-like operation is performed. On the other hand, as a result of the determination in step S295, when there is no task setting 531 in which the unprocessed flag 541 is set to ON (NO in step S295), the process of step S296 is skipped, and the execution order sorting process ends. As a result, the "execution order list" is generated in the main memory 32. In the "execution order list", as a result of the process as described above, the tasks picked up in the above process are sorted and shown in the order of execution from highest to lowest.

Referring back to FIG. 43, after the execution order sorting process has ended, subsequently, it is determined in step S512 whether or not the execution of all the tasks listed in the "execution order list" is completed. As a result of the determination, when it is determined that the execution of all the tasks is completed (YES in step S512), the processing proceeds to step S551 described later. On the other hand, when it is determined that there remain tasks yet to be executed (NO in step S512), subsequently, in step S513, the task that is highest in the execution order is selected from the uncompleted tasks. Hereinafter, the selected task is referred to as a "process object task".

Next, in step S514, the unprocessed flag 541 of the task setting 531 corresponding to the selected process object task is set to ON.

Next, in step S515, an HTTP request is generated with reference to the communication destination URL 535 of the task setting 531 corresponding to the process object task. In the subsequent step S516, with reference to the game apparatus setting data 560, the country information set in the game apparatus 1 is added to a character string of the generated HTTP request.

Next, in step S517, it is determined whether or not the currently performed "Internet communication" is communication using a dedicated AP 101, that is, the game apparatus 1 is connected to the Internet via a dedicated AP 101. As a result, when it is determined that the currently performed "Internet communication" is communication using a dedicated AP 101 (YES in step S517), the AP identifier of the currently used AP is further added to the character string of the HTTP request in step S518. On the other hand, when it is determined that a dedicated AP is not used (NO in step S517), the process of step S518 is skipped.

Figure 44:
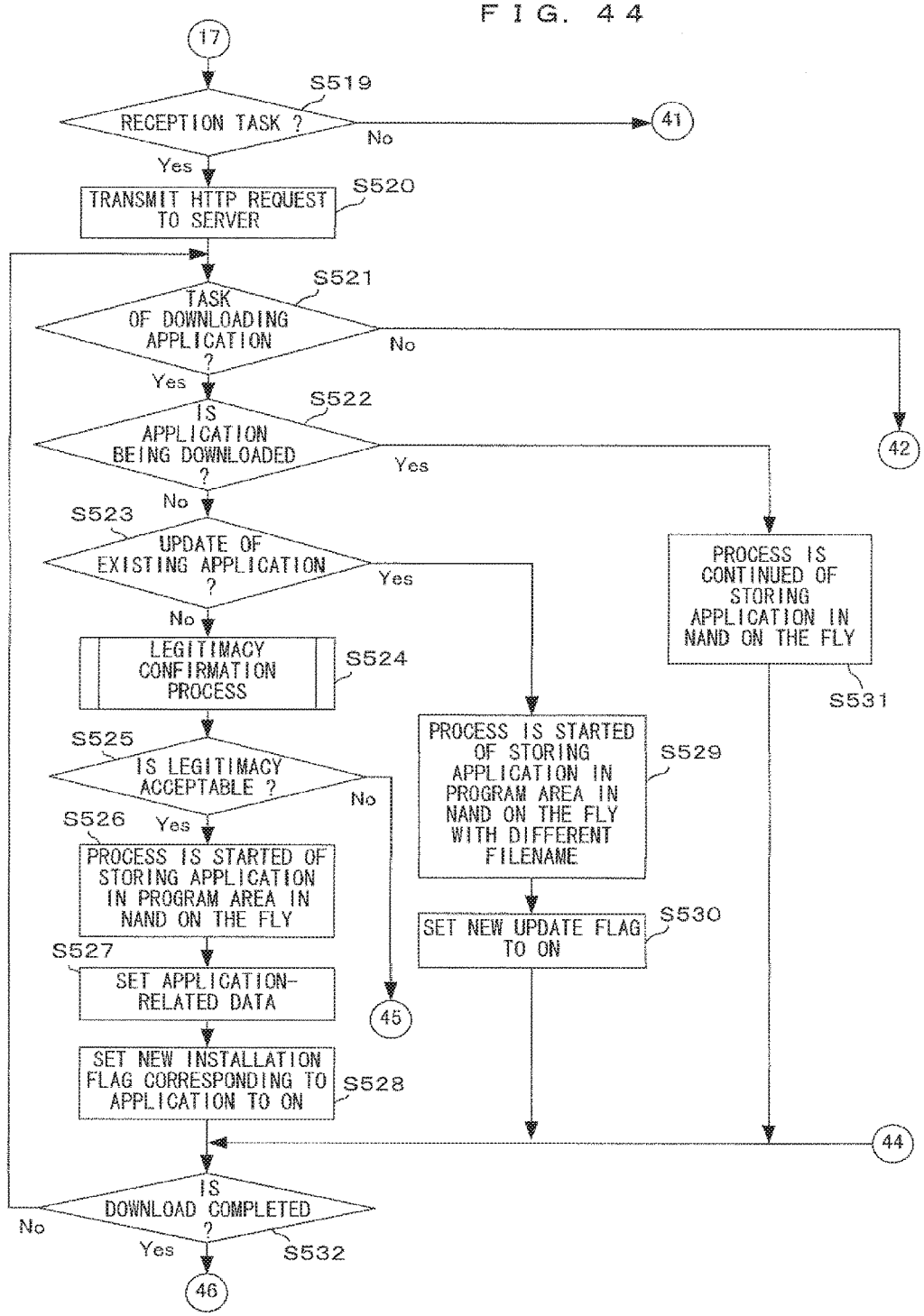
FIG. 44 is a flow chart showing in detail the task execution process shown in step S192 in FIG. 38.

Next, in step S519 in FIG. 44, it is determined, with reference to the transmission/reception identification flag 539 of the task setting 531 corresponding to the process object task, whether or not the process object task is a "reception task". That is, it is determined whether the process object task is a task of receiving data or a task of transmitting data. As a result, when it is determined that the process object task is a "reception task" (YES in step S519), in step S520, the HTTP request generated in the above process is transmitted to a server indicated by the communication destination URL 535 of the task setting 531 corresponding to the process object task. At this time, an "If-Modified-Since" field of the HTTP header of the request includes "the last execution time of the task", and is transmitted. Thus, the server transmits data only when an update has been performed since the date and time written in the If-Modified-Since. The server sends back only the response code 304 when an update has not been performed.

Next, in step S521, it is determined whether or not the contents of the process object task are a task of downloading an application. As a result of the determination, when the contents are the task of downloading an application (YES in step S521), it is determined in step S522 whether or not the application is being downloaded (whether or not the download of the application has been started in the process of step S526 or S529 described later). As a result, when the application is not being downloaded (NO in step S522), it is determined in step S523 whether or not the case corresponds to the update of an existing application. This determination is made with reference to the application-related data 550 (or the program area 500), and on the basis of whether or not an application having the same application ID 552 as that of the download object application has actually been installed. It should be noted that as well as such a determination, for example, the following determination may be performed. It may be determined in the application installation process (see FIGS. 29 and 30 described above) whether or not the same application is owned and an older version is owned. A flag may be created that indicates that an update is performed when the determination is positive. Then, a determination may be made with reference to the flag. Further, when even applications of the same type are provided with different IDs depending on their versions, it is possible to confirm an update with reference to the IDs.

As a result of the above determination, when it is determined that the case corresponds to the update of an existing application (YES in step S523), in step S529, a process is started of storing (a file of) the download object application in the program area 500 in the NAND flash memory 33 on the fly with a filename different from the filename of the existing application. Further, in step S530, the new update flag 559 is set to ON, and the processing proceeds to step S532.

On the other hand, as a result of the determination in step S523, when it is determined that the case does not correspond to the update of an existing application (i.e., the introduction of a new application) (NO in step S523), subsequently, in step S524, a legitimacy confirmation process is performed. In this process, a process similar to that of step S472 is performed. That is, the rights information concerning the file that is the download object this time is downloaded, and the legitimacy of the rights information is confirmed.

Next, in step S525, it is determined whether or not the legitimacy is acceptable. As a result, when the legitimacy is not acceptable (NO in step S525), the processing proceeds to step S543 described later. On the other hand, when the legitimacy is acceptable (YES in step S525), subsequently, in step S526, a process is started of storing (the file of) the download object application in the program area 500 in the NAND flash memory 33 on the fly. This case corresponds to a new installation, and therefore, the application is stored without using a different filename.

In the subsequent step S527, various data (e.g., metadata) related to the application is generated and set as appropriate, and is stored in the NAND flash memory 33 as the application-related data 550.

Next, in step S528, the new installation flag 554 of the application area 551 corresponding to the application is set to ON.

Thereafter, in step S532, it is determined whether or not the download is completed. As a result, when the download is not completed, the processing returns to the process of step S521. When the download is completed (YES in step S532), subsequently, in step S5321 in FIG. 45, it is determined whether or not the contents of the completed download are those of the download of an application or the download of a component of the system. As a result of the determination, when the contents are those of the download of an application or a system component (YES in step S5321), in step S5322, a process of checking the legitimacy of the downloaded file is performed. In this process, a process substantially the same as that described with reference to FIG. 31 is performed. The check object, however, is not the legitimacy of the rights information, but the legitimacy of the downloaded file. Then, when the legitimacy is acceptable, the file is appropriately stored in the NAND flash memory 33. Further, when the legitimacy is not acceptable, the file is discarded. Thereafter, the processing proceeds to step S543 described later.

On the other hand, when the contents are those of the download of an application or a system component (NO in step S5321), the process of step S5322 is skipped, and the processing proceeds to step S543 described later.

On the other hand, as a result of the determination in step S522, when it is determined that the application is being downloaded (YES in step S522), in step S531, a process is continued of storing the file of the application that is being downloaded, in the NAND flash memory 33 on the fly. Then, the processing proceeds to step S532.

Next, a description is given of a process performed when it is determined that the contents of the process object task are the task of downloading an application, as a result of the determination in step S521. In this case, in step S533 in FIG. 45, it is determined whether or not the contents of the process object task are a task of downloading a component of the system (system program). As a result of the determination, when the contents are a task of downloading a system program (YES in step S533), subsequently, it is determined in step S534 whether or not the download object component is one other than an existing component. That is, it is determined whether the case corresponds to the update of an existing component or the acquisition of a new component. As a result of the determination, when the case corresponds to the update of an existing component (is an existing component) (NO in step S534), in step S536, a process is performed of storing (starting to download, or, if already started, continuing to download) the download object component in the system program area 515 on the fly with a name different from the filename of the actual (currently operating) system program (e.g., if the filename of the actual system program is "firmware001.bin", the download object component is stored with the name "firmware002.bin"). Then, the processing returns to step S532.

On the other hand, when the download object component is not an existing component, that is, the component is a new component (YES in step S534), in step S535, a process is performed of storing the component in the on-the-fly cache 600 on the fly (without changing the filename). Then, the processing returns to step S532.

Figure 46:
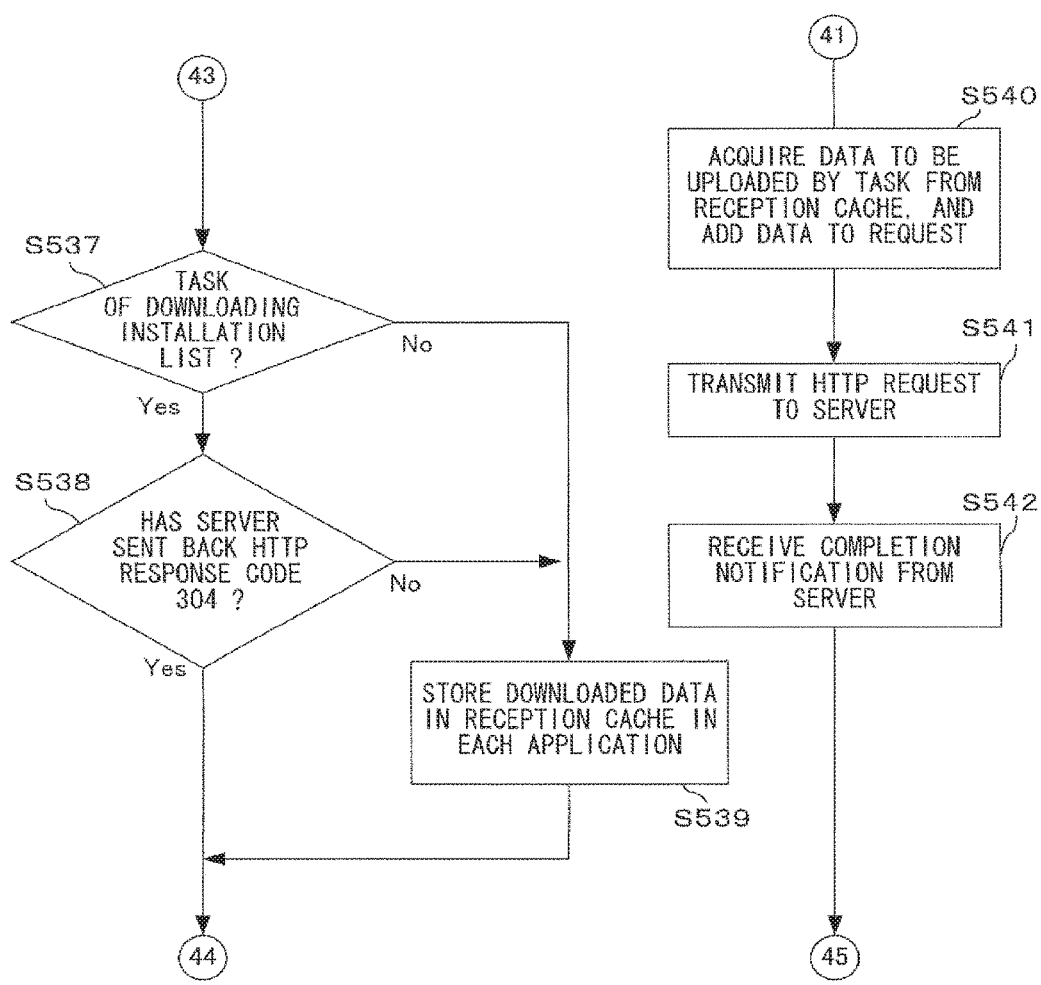
FIG. 46 is a flow chart showing in detail the task execution process shown in step S192 in FIG. 38.

On the other hand, as a result of the determination in step S533, when the reception task is not a task of downloading a system program (NO in step S533), it is determined in step S537 in FIG. 46 whether or not the reception task is the task of "acquiring an installation list". As a result, when the reception task is the task of "acquiring an installation list" (YES in step S537), it is determined in step S538 whether or not a response indicating that there is no change, namely, the HTTP response code 304 ("Not Modified", that is, a response code indicating that an update is not to be performed), has been sent back from the server. As a result of the determination, when the HTTP response code 304 has been sent back (YES in step S538), it is considered that the installation list has not been updated since the last update. Thus, the installation list is not downloaded, and the processing proceeds to process of step S532.

On the other hand, as a result of the determination in step S537, when it is determined that the reception task is not the task of "acquiring an installation list" (NO in step S537), or when the HTTP response code 304 has not been sent back in step S538 (NO in step S538), in step S539, the downloaded data is stored in a storage location indicated by the file path 536 of the task setting 531 corresponding to the process object task, that is, the task reception cache 553 in the application area 551 of the application corresponding to the application ID 532 of the task setting 531. Specifically, when the determination in step S537 has been NO and this process has been performed, data related to each application corresponding to the process object task (various data not related to an installation as described above) is stored. Further, when the determination in step S538 has been NO and this process has been performed, the installation list 580 is acquired from the server and stored in the data area 512. Thereafter, the processing proceeds to the process of step S532.

Referring back to FIG. 44, on the other hand, as a result of the determination in step S519, when it is determined that the process object task is not a "reception task", that is, the task is a "transmission task" (NO in step S519), in step S540 in FIG. 46, data to be transmitted (uploaded) is acquired from the storage location indicated by the file path 536 of the process object task, that is, acquired from the task transmission data 556 of the application area 551 corresponding to the process object task, in the present embodiment. Then, the data is added to the HTTP request.

Next, in step S541, the HTTP request to which the transmission data has been added is transmitted to the server. That is, a process is started of uploading the data to the URL indicated by the communication destination URL 535. Thereafter, when the upload is completed, a completion notification (a notification indicating that the upload of the data is successfully completed) transmitted from the server is received in step S542. Thereafter, the processing proceeds to step S543.

Figure 47:
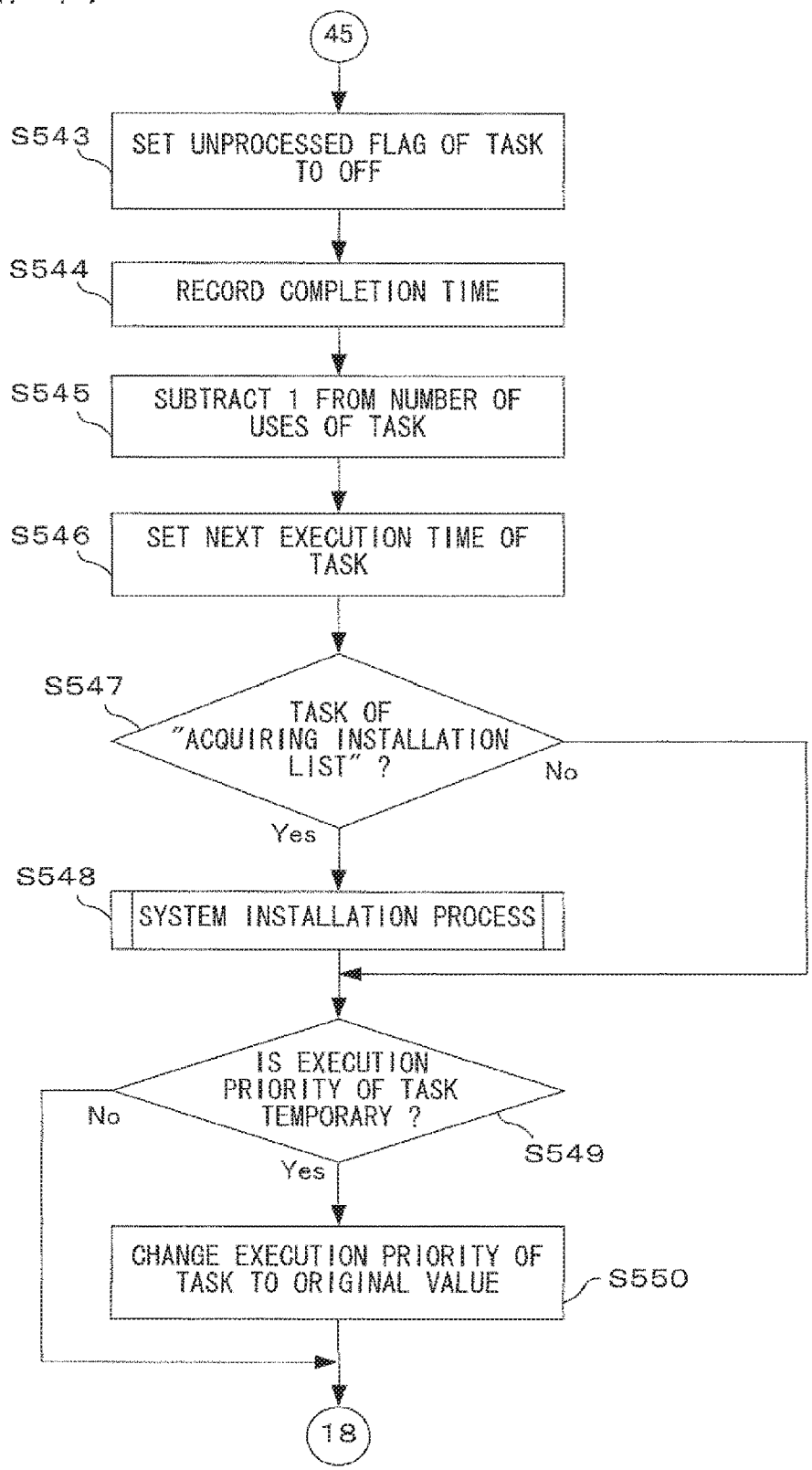
FIG. 47 is a flow chart showing in detail the task execution process shown in step S192 in FIG. 38.
Figure 48:
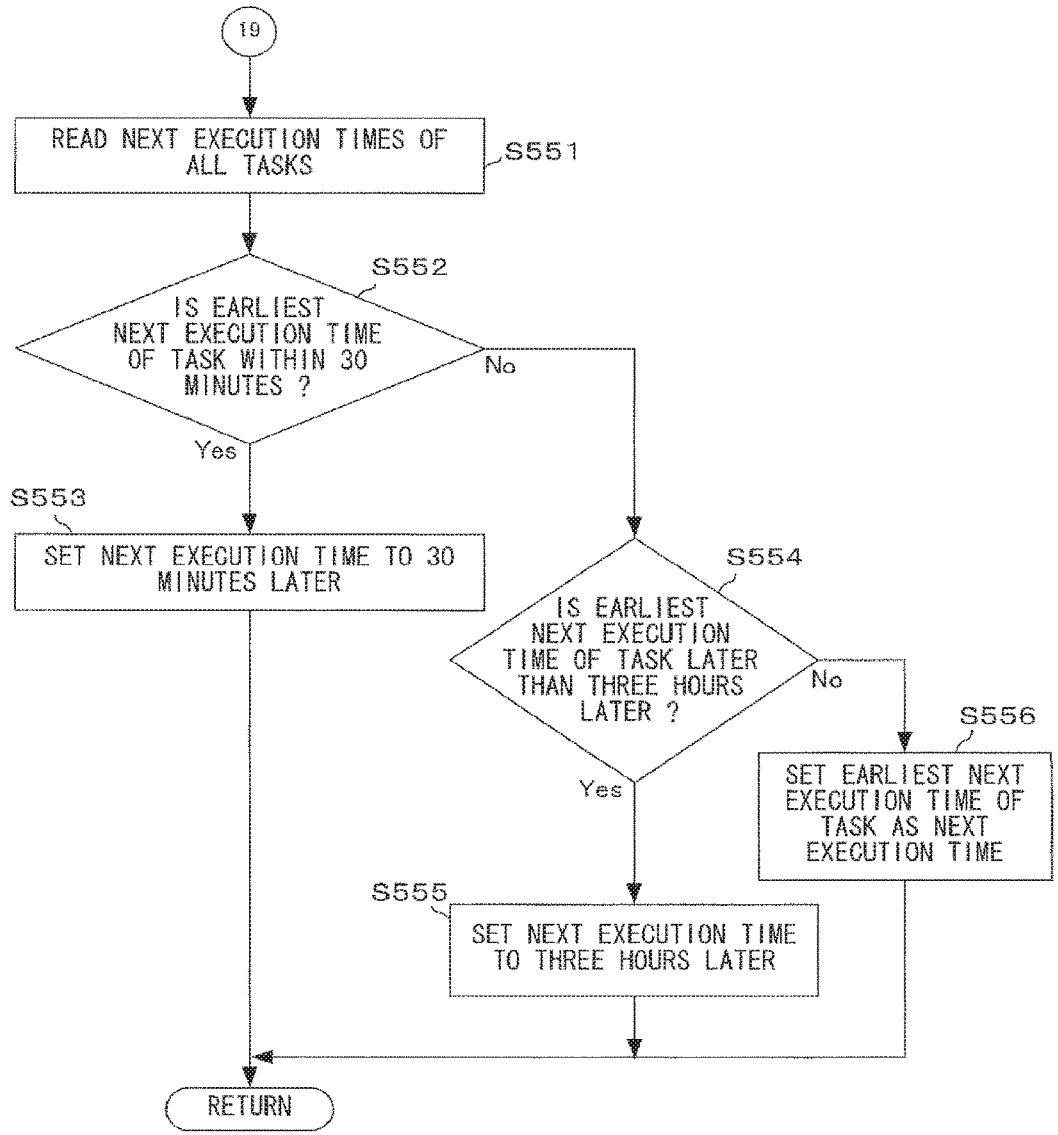
FIG. 48 is a flow chart showing in detail the task execution process shown in step S192 in FIG. 38.

Next, in step S543 in FIG. 47, the unprocessed flag 541 of the task setting 531 corresponding to the process object task is set to OFF. In the subsequent step S544, the current time is stored as a completion time in the last completion time 544. Further, in step S545, 1 is subtracted from the value of the number of uses 540.

Next, in step S546, a next execution time is calculated with reference to the execution interval 538 of the task setting 531, and is stored as the next execution time 537. It should be noted that the task of "acquiring an installation list" is set such that the neat execution time is 24 hours later.

Next, in step S547, it is determined whether or not the process object task is the task of "acquiring an installation list". As described above, the task of "acquiring an installation list" is one set in advance as a setting before shipment of the game apparatus 1. In the task setting 531, the fixed task ID 533 determined in advance is assigned, and settings are made such that the task is periodically (every 24 hours, in the present embodiment) executed. Thus, it is determined with reference to the task ID 533 whether or not the process object task is the task of "acquiring an installation list". As a result of the determination, when it is determined that the process object task is the task of "acquiring an installation list" (YES in step step S547), in step S548, a system installation process is performed. This process will be described in detail later. On the other hand, when it is determined that the process object task is not the task of "acquiring an installation list" (NO in step S547), the process of step S548 is skipped.

Next, in step S549, it is determined, with reference to the temporary change flag 542 of the task setting 531 corresponding to the process object task, whether or not the change in the execution priority 534 of the process object task is temporary. As a result, when it is determined that the change in the execution priority 534 of the process object task is temporary (YES in step S549), in step S550, the execution priority 534 of the process object task is changed to the original value, using backed-up execution priority data. On the other hand, when it is determined that the change in the execution priority 534 of the process object task is temporary (NO in step S549), the process of step S550 is skipped. Thereafter, the processing returns to step S512 in FIG. 43, and the same process is repeated by selecting a task yet to be executed, as appropriate.

Figure 43:
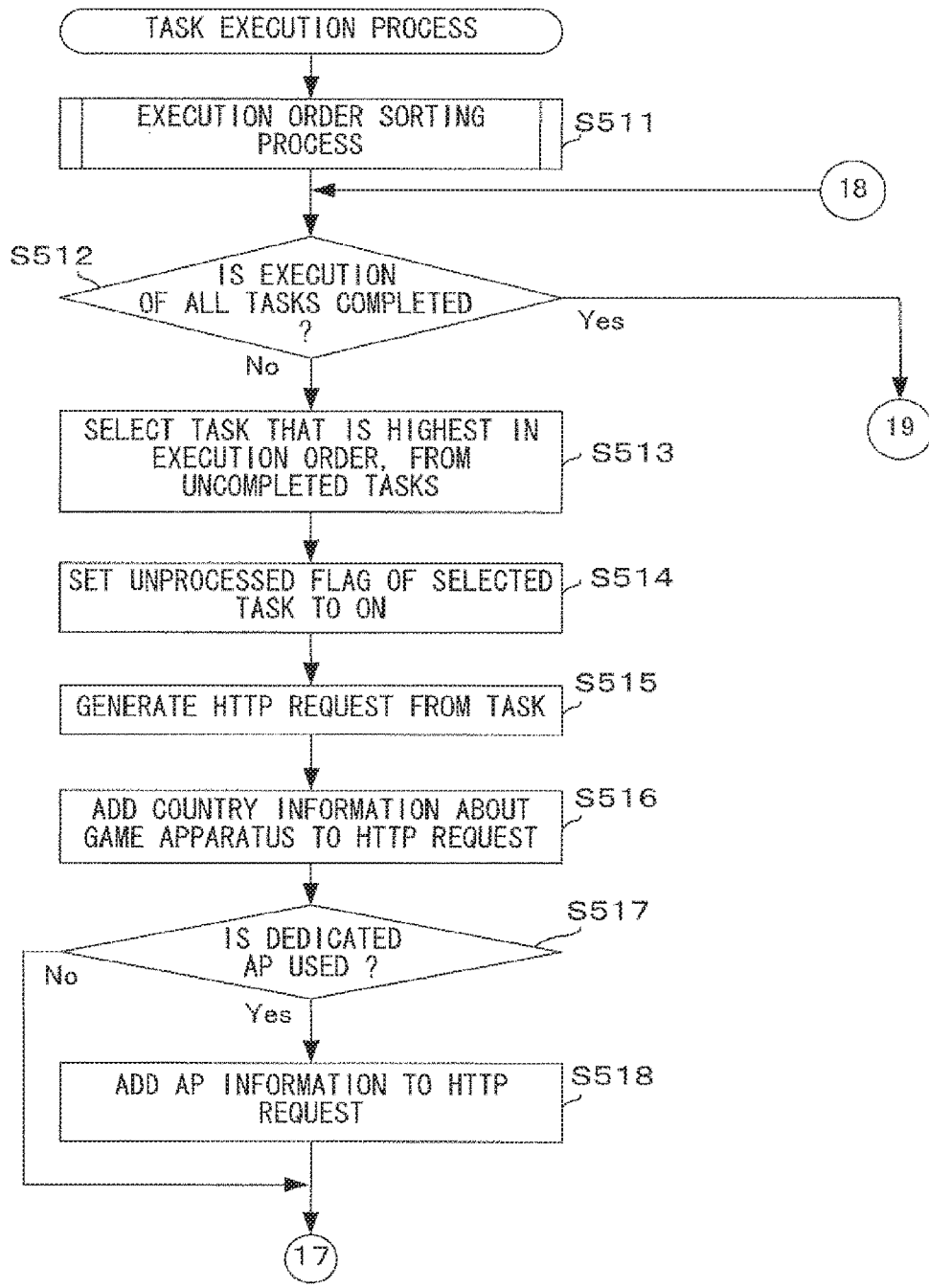
FIG. 43 is a flow chart showing in detail a task execution process shown in step S192 in FIG. 38.

Next, a description is given of a process performed when it is determined in step S512 in FIG. 43 that the execution of all the tasks is completed (YES in step S512). In this case, a process of setting the next wake-up time 305 is performed. Specifically, first, in step S551 in FIG. 48, the next execution times 537 of all the task settings 531 in the task data 530 are read. In the subsequent step S552, among all the tasks, the task having the earliest next execution time 537 is detected. Then, it is determined whether or not the earliest next execution time 537 is within 30 minutes from the current time. As a result of the determination, when it is determined that the earliest next execution time 537 is within 30 minutes (YES in step S552), in step S553, the time 30 minutes after the current time is set as the next wake-up time 305. That is, it is set such that once a task has been executed, no task is to be executed at least in 30 minutes thereafter. This prevents a connection from being made too frequently, and therefore makes it possible to further save the power of the game apparatus 1 and reduce the load of network traffic. Then, the task execution process ends.

On the other hand, as a result of the determination in step S552, when it is determined that the earliest next execution time 537 is not within 30 minutes from the current time (NO in step S552), it is determined in step S554 whether or not the earliest next execution time 537 is later than the time three hours after the current time. As a result, when it is determined that the earliest next execution time 537 is later than the time three hours after the current time (YES in step S554), in step S555, the time three hours after the current time is set as the next wake-up time 305. This means that the game apparatus 1 attempts a connection at least three hours later, and therefore, this makes it possible to cause the game apparatus 1 to periodically attempt a connection. It should be noted that values as described above, such as 30 minutes and three hours, are merely examples, and setting times are not limited to these values.

On the other hand, when it is determined that the earliest next execution time 537 is not later than the time three hours after the current time (NO in step S554), it is indicated that the earliest next execution time 537 is between 30 minutes and three hours from the current time, and the earliest next execution time 537 is set as the next wake-up time 305 in step S556. Then, the task execution process ends. This is the end of the description of the task execution process.

[System Installation Process]

Figure 50:
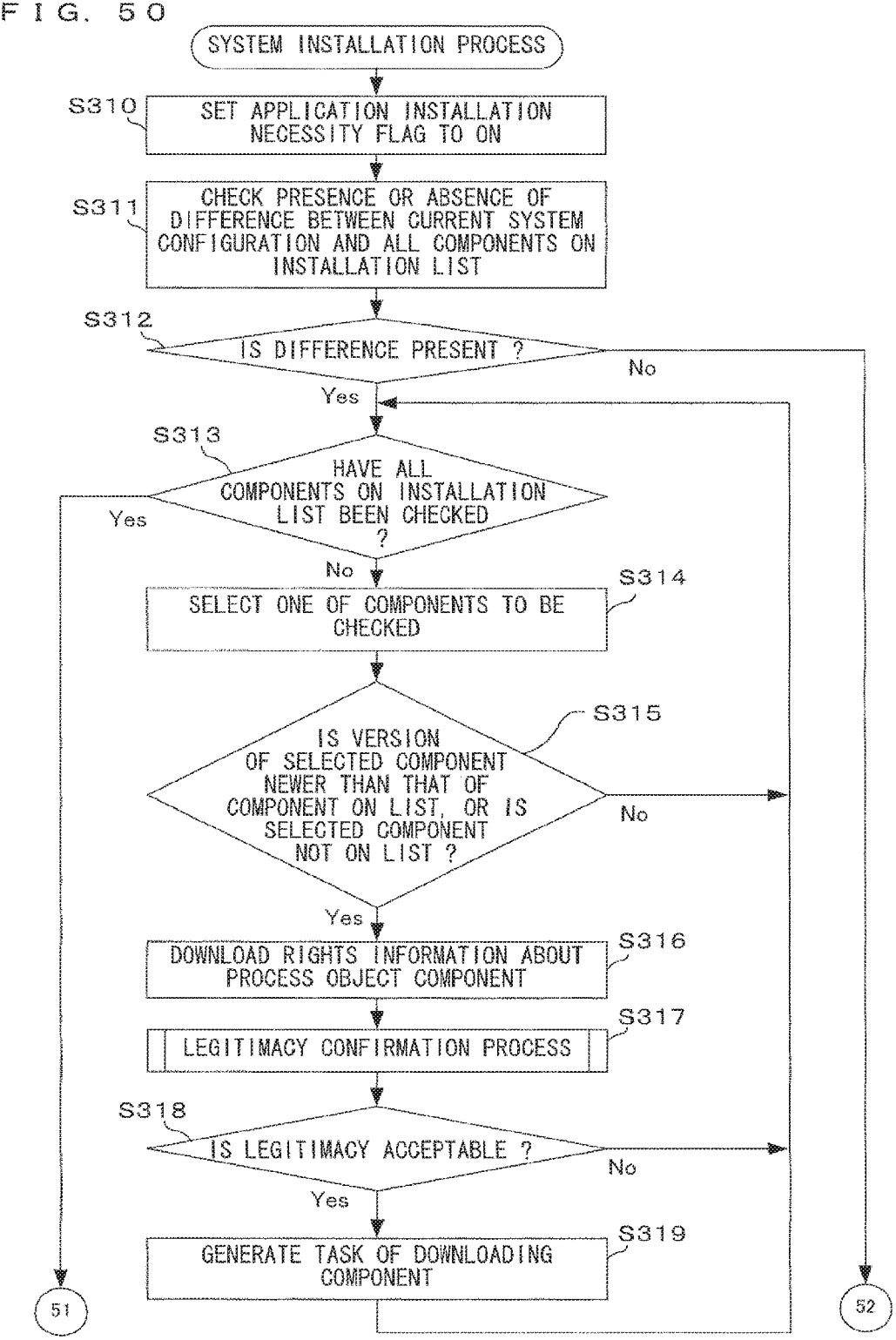
FIG. 50 is a flow chart showing in detail a system installation process shown in step S548 in FIG. 47.
Figure 51:
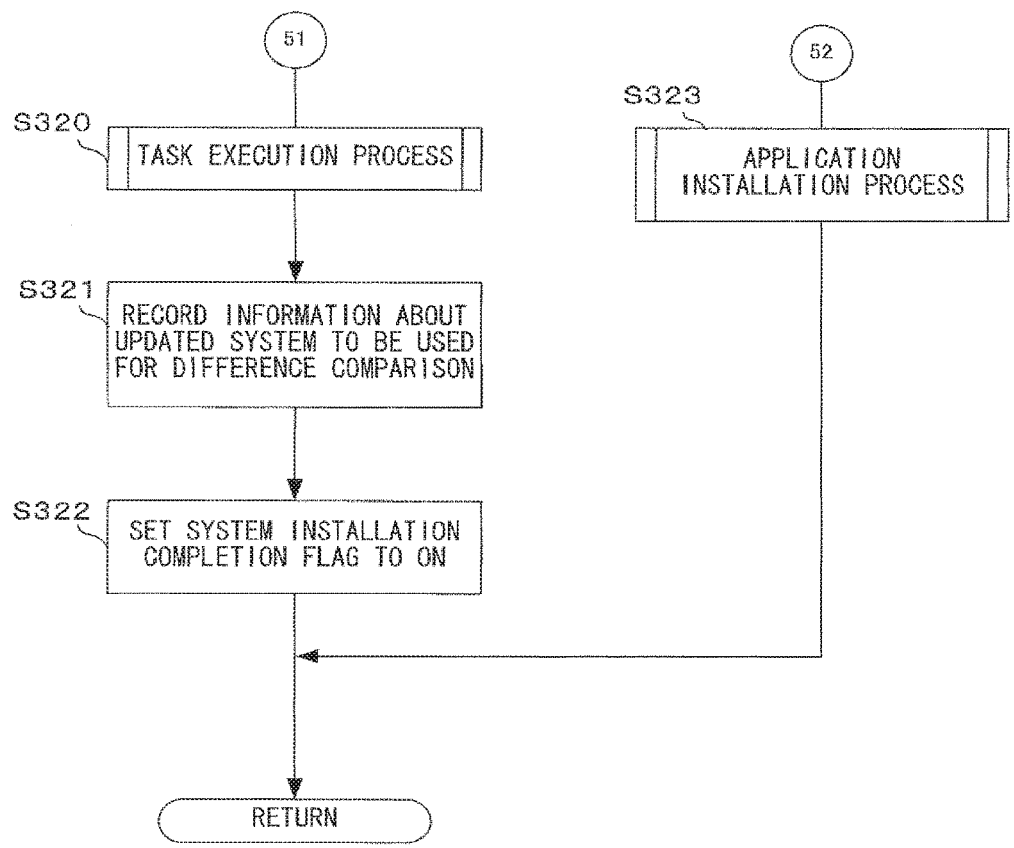
FIG. 51 is a flow chart showing in detail the system installation process shown in step S548 in FIG. 47.

Next, a description is given of details of the system installation process shown in step S548 described above. In this process, mainly, a process concerning the update of the system program. FIGS. 50 and 51 are flow charts showing the system installation process in detail. First, in step S310, the application installation necessity flag 630 is set to ON. Subsequently, in step S311, with reference to the system update information 583 of the installation list 580, the presence or absence is checked of a difference between a current system configuration and a system configuration indicated on the basis of all the components 584 of the system included in the installation list 580. The presence or absence of such a difference is checked by, for example, comparing the hash value calculated on the basis of all the components. It should be noted that not only the method using a hash value but also any method may be used, so long as it is possible to determine the presence or absence of a difference between the system configurations (i.e., whether or not there is an update in the system).

Next, in step S312, as a result of the check of the presence or absence of such a difference, it is determined whether or not a difference is present between the system configurations. As a result, when no difference is present (NO in step S312), it is considered that there is no update in the system (the system is the same version). Thus, the processing proceeds to step S323, and an application installation process is performed. This process is similar to that of the application installation process described above with reference to FIGS. 26, 29, and 30. That is, the task of downloading an application is generated and immediately executed as appropriate, whereby an application is installed as appropriate. Then, the system installation process ends. Here, when there is no update in the system, the application installation process is immediately performed.

On the other hand, as a result of the determination in step S312, when a difference is present (YES in step S312), it is considered that a new version of the system is provided. In this case, a process of updating the system is performed. First, in step S313, it is determined whether or not a process has been performed of checking all the components 584 of the system appearing on the installation list 580 as described below. As a result, when there remain components 584 yet to be checked (NO in step S313), in step S314, one of the components 584 appearing on the installation list 580 is selected as a check object component 584 (hereinafter referred to as a "process object component").

Next, in step S315, it is determined whether or not the process object component is an installation object. Specifically, it is determined with reference to the current system configuration detail list 640 whether or not information indicating the process object component appears on the list. As a result, when such information does not appear on the list, that is, when the process object component is a component that has not currently been installed, it is determined that the process object component is a new installation object of the component. Further, when the process object component appears on the list, the versions of both components are checked, and it is determined whether or not the version of the process object component is newer than the version appearing on the current system configuration detail list 640. As a result, also when the version of the process object component is newer, it is determined that the process object component is an installation object for the update of the component.

As a result of the determination in step S315, when it is determined that the process object component is not an installation object (NO in step S315), the processing returns to step S313. On the other hand, when it is determined that the process object component is an installation object (YES in step S315), subsequently, the rights information is checked. First, in step S316, the rights information about the process object component is downloaded from a predetermined server. Next, in step S317, a legitimacy confirmation process is performed. In this process, a process similar to that of step S472 described above with reference to FIGS. 30 and 31 is performed. That is, the legitimacy of the downloaded rights information is checked. Then, in accordance with the result of the check, the rights information database 610 is registered, or the downloaded rights information is discarded.

When the legitimacy confirmation process in step S317 has ended, subsequently, in step S318, as a result of the legitimacy confirmation process, it is determined whether or not the legitimacy is acceptable. As a result, when the legitimacy is acceptable (YES in step S318), in step S319, a "reception task" is generated of downloading a component (system program) corresponding to the component ID 585 (see FIG. 19) of the process object component. At this time, with reference to the priority order 586, the indicated priority order is set as the execution priority 534 of the reception task. On the other hand, as a result of the determination in step S318, when the legitimacy is not acceptable (NO in step S318), the process of step S319 is not performed, and the processing returns to step S313.

Next, a description is given of a process performed when it is determined that the process has been performed of checking all the components 584 appearing on the installation list 580 as described above, as a result of the determination in step S313 (YES in step S313). It should be noted that concerning the determination of step S313, the determination is YES also when the system update information 583 per se is not included in the installation list 580 (when there is no update in the system, and there is only an update of an application or a newly distributed application is present).

Figure 45:
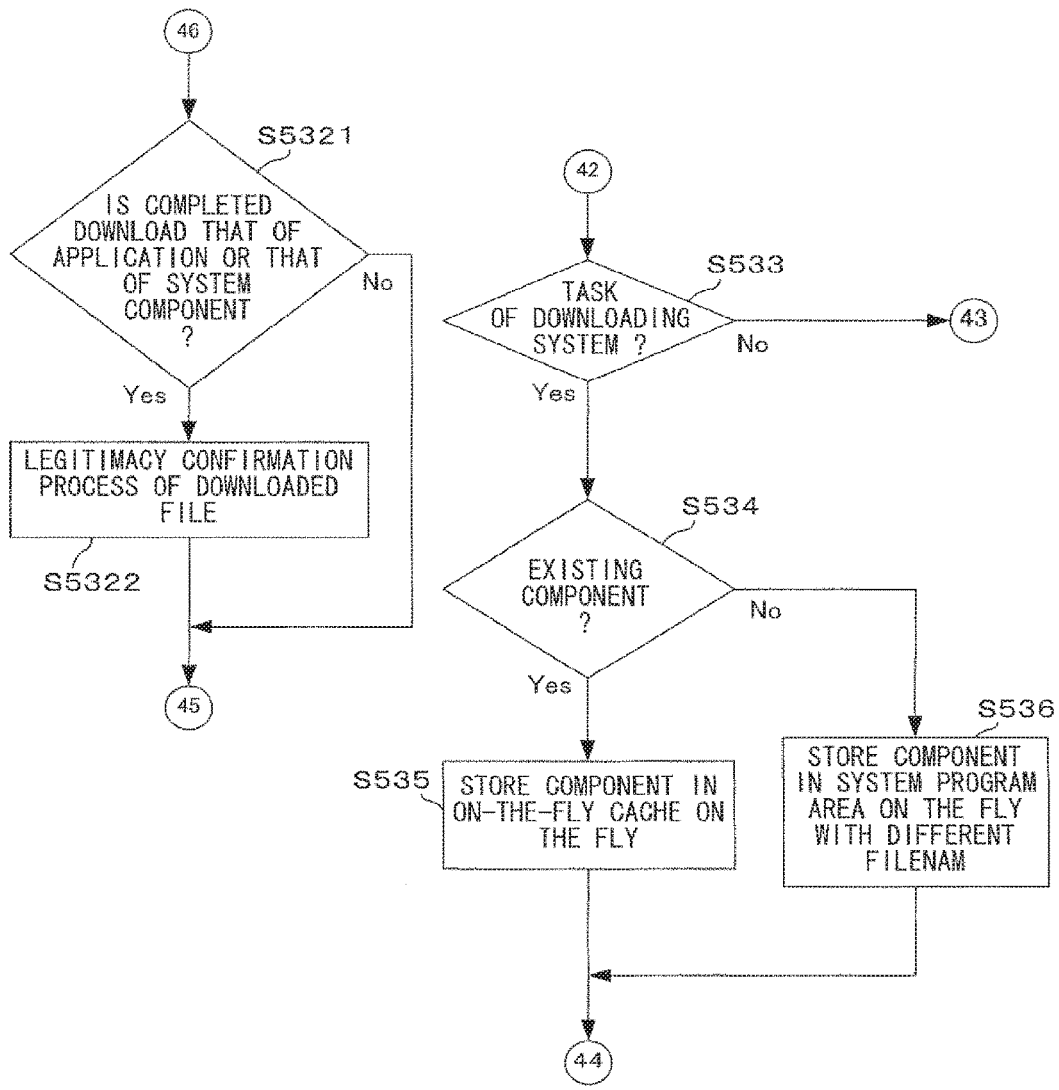
FIG. 45 is a flow chart showing in detail the task execution process shown in step S192 in FIG. 38.

In this case, in step S320 in FIG. 51, a task execution process is performed so as to execute the task generated in step S319 described above (i.e., the task of downloading the system program). This process is a process similar to that of step S192 in FIG. 38 (in this case, the determination in step S533 shown in FIG. 45 is YES, and the process is performed). It should be noted that in step S320, the task is immediately executed. When, however, the immediate execution of the task has failed, the task may be executed, for example, an hour later. Specifically, when the determination in step S178 in FIG. 37 is NO, it is determined whether or not the task is that of downloading an application or the system. When the task is that of downloading an application or the system, it may be set such that the same task is executed an hour later.

When the process of step S320 has ended, subsequently, in step S321, information to be used in the process of step S311 described above is generated on the basis of the component (system program) of the updated system, and is stored in the data area 512 as the component comparison data 650. The component comparison data 650, however, may be updated after the reflection of the update of the system described with reference to FIG. 25.

Next, in step S322, the system installation completion flag 620 is set to ON.

This is the end of the system installation process. As a result, when the menu is displayed thereafter, an inquiry is made about the update of the system in the process of step S413 (FIG. 25).

This is the end of the description of various processes according to the first embodiment.

As described above, in the above embodiment, even when power is not supplied to the CPU 31, if conditions as described above for executing a task are satisfied, power is automatically supplied to the CPU 31 and a connection to an AP is attempted. As a result, it is possible to connect to a network without the user's knowledge. In addition, unless conditions for executing a task are satisfied, power is not supplied to the CPU 31. This makes it possible to save power consumption. Thus, even an information terminal that does not assume a constant connection, such as a hand-held game apparatus, can behave as if being constantly in connection, and can also save power consumption.

Further, a network connection is made without the user's knowledge, and in addition, the download and installation of an application as described above and the like are also performed. In a conventional technique, generally, in a mobile information terminal or the like, when a new application is distributed, only a notification of the distribution is given to the user. Then, an installation process is performed only when the user has taken a certain action concerning the installation process (an operation performed on the basis of an intention of installing the new application). On the other hand, in the present embodiment, when a new application is distributed, an installation process is performed without requesting the user to perform such an operation, and it is set such that the application is readily available to user. This makes it possible to bring a surprise to the user by the fact that a new application has been added without the user's knowledge, when the user causes the game apparatus 1 to operate next time. Furthermore, such an application has already been installed, and is readily available. This does not request the user to perform an operation concerning the installation as described above, and therefore does not give the user a waiting time for a process that occurs during download or an installation process. This makes it possible to increase convenience.

Further, it is also possible to give the user a motivation to play a game or an application longer by: defining and preparing an application, e.g., the "bonus application" as described above, that is available only when predetermined conditions are satisfied, such as when the play time of a predetermined game is a predetermined period of time or longer; and automatically installing the application.

Further, in the above embodiment, when the rating is checked, the rating information 593 is included in the installation list 580 as an example. Alternatively, the rating information 593 may not be included in the installation list 580, a file including rating information may be stored on a predetermined server as a separate file, and this file may be acquired separately from the installation list 580.

Further, as a result of the execution of the "reception task", it is possible to receive a notification announcing the termination of a network service concerning a predetermined application, and the user is notified of the termination of the network service. In addition, in this case, tasks concerning the network service are deleted. This enables the user to learn the termination of a predetermined network service without voluntarily collecting information. In addition, this makes it possible to save the memory capacity by deleting unnecessary tasks.

Further, in the above embodiment, it is also possible to distribute policy data different depending on the dedicated AP 101. Thus, it is possible to change the execution priorities of tasks for each AP used for a connection to the policy server. This makes it possible to change tasks to be executed and the execution order of the tasks to some extent in accordance with various locations, and therefore makes it possible to provide to the user the enjoyment of carrying the game apparatus 1. That is, it is possible to provide to the user the enjoyment of going out to various places with the game apparatus 1.

Further, in the above embodiment, when the game apparatus 1 has connected to the policy server, country information set in the game apparatus 1, as well as an identifier different depending on the dedicated AP 101, is used to determine policy data to be distributed. Thus, for example, even when a plurality of game apparatuses 1 have connected to the same dedicated AP 101, policy data different depending on the country information set in each game apparatus 1 can be received.

Further, even when the game apparatus 1 has accessed the policy server, for example, via the AP 102 at the user's home, which is not the dedicated AP 101, it is possible to distribute policy data different depending on the country information.

Further, in the above embodiment, since the application ID and the task ID are used when the policy data is applied, the execution priorities of tasks can be changed for each application. Thus, with the combination of the country information and the application, it is possible to change the execution priorities with increased flexibility.

Further, concerning the installation process, in the case of the update of the system, the installation is performed on the fly, but a confirmation is made with the user whether the installation is to be reflected. When a confirmation is obtained, the update of the system is reflected by renaming the filename and restarting the system. This makes it possible to reduce a waiting time given to the user for the update of the system. In addition, the installation of an application having a small effect, such as a free application, other than the update of the system is performed without the user's confirmation. This makes it possible to further increase convenience for the user. Since the installation is performed and the software configuration of the game apparatus 1 is changed without the user's knowledge, it is possible to bring a new surprise to the user, and also provide to the user a motivation to play a newly installed application.

Further, when the next execution time of a task (the next wake-up time) is too close to the current time, adjustments are made such that the task is not executed in a predetermined period of time. This prevents tasks from being executed frequently at too short time intervals, and therefore makes it possible to omit a wasteful process and wasteful network traffic. In addition, time adjustments are made also when the next execution time is too far from the current time, and therefore, it is possible to cause a connection to be attempted periodically to some extent.

Further, as the execution priority, the following are used: "HIGH", "MEDIUM", and "LOW", which simply indicate priorities; "STOPPED", which indicates that the task is not executed; and "EXPEDITE", which indicates a highest priority. Then, it is possible to change these execution priorities by causing the policy data to be received. This also enables the server (the provider of the network service) to control tasks executed by the game apparatus 1 to some extent, using "STOPPED" and "EXPEDITE".

It should be noted that in the above embodiment, an operation of closing or opening the game apparatus 1 having the foldable housings is exemplified as an operation of shifting to the "sleep mode" or an operation of canceling the "sleep mode". The present invention, however, is not limited to these operations, and the shift or the cancellation may be performed with a button operation.

Further, in the above embodiment, to determine in the wireless module process whether or not the game apparatus 1 is in the "sleep mode", when it is not possible to access the power supply state flag 304, it is determined that the game apparatus 1 is in the "sleep mode", and an instruction is given to the CPU 31 to cancel the "sleep mode". To cancel the "sleep mode", in addition to this example, the following process may be performed without directly determining whether or not the game apparatus 1 is in the "sleep mode". For example, regardless of whether or not the game apparatus 1 is currently in the "sleep mode", the wireless communication module 34 gives to the CPU 31 an instruction to cancel the "sleep mode". Then, if the game apparatus 1 is in the "sleep mode" when the CPU 31 has received the instruction, the CPU 31 cancels the "sleep mode". If the game apparatus 1 is not in the "sleep mode" when the CPU 31 has received the instruction, the CPU 31 neglects the instruction. In addition, such a process can be performed not only between the wireless communication module 34 and the CPU 31, but also between the microcomputer 37 and the CPU 31. That is, a process method as described above can be used in a general process of determining whether or not the game apparatus 1 is in the "sleep mode" and canceling the "sleep mode" when the game apparatus 1 is in the "sleep mode".

Further, in the above embodiment, the task of only "transmitting" or "receiving" predetermined data is exemplified as one "task". The present invention, however, is applicable even to the case where a process of performing both "transmission and reception" is performed as one task.

Further, in the above embodiment, the next wake-up time 305 is set on the basis of the next execution time 537 of the task. Alternatively, regardless of the next execution time of the task, the scanning of an AP may be performed periodically at predetermined time intervals.

Further, in the above embodiment, the dedicated AP 101 is identified on the basis of whether or not the vendor specific information as described above is included in a beacon, as an example. Alternatively, a general AP 102 (e.g., an AP at the user's home) that does not have such vendor specific information may be caused to operate similarly to the dedicated AP. In this case, the ESSID of such a general AP 102 is stored as the dedicated AP identification information 404. Then, a similar process to that in the case of the dedicated AP 101 may be performed by determining whether or not the ESSID included in a received beacon coincides with the stored ESSID.

Further, to identify the dedicated AP 101, the MAC address or the IP address of the dedicated AP 101 may be used instead of the vendor specific information.

Further, in the above embodiment, when the policy data is acquired, the country information in the game apparatus setting data 560 is used as an example. Alternatively, other types of information may be used, such as the manufacturing number and the serial number of the game apparatus 1, the IP address, the resident area of the user, the user name, the gender and the birthday of the user, and the user' favorite color. These pieces of information may be stored in the game apparatus setting data 560, and the contents of the pieces of information may be changeable as appropriate by the user.

Further, in the above embodiment, to receive the policy data, in the case where the policy data is received via the dedicated AP 101, the policy data is selected on the basis of the country information and the AP identifier indicating the dedicated AP 101. In the case where the policy data is received not via the dedicated AP 101, the policy data is selected on the basis of only the country information. Alternatively, without reference to the information about the game apparatus setting data 560, for example, in the case where the policy data is received via the dedicated AP 101, the policy data may be selected on the basis of only the AP identifier. In the case where the policy data is received not via the dedicated AP 101, common policy data prepared in advance may be selected, or the reception of policy data per se may not be performed.

Further, in the above embodiment, the policy data is stored in the policy server, as an example. Alternatively, the policy data may be stored in advance in the dedicated AP, and after a connection to the dedicated AP 101 has been established, the policy data may be downloaded to the game apparatus 1. Still alternatively, the policy data may be included in a beacon transmitted from an AP. In this case, even when a connection to the AP is not established, it is possible to receive and use the policy data while searching for the AP. In addition, also in such a case, policy data different for each dedicated AP 101 may be stored. However, in view of the management of policy data, policy data is preferably stored in one policy server 103 so as to be managed in an integrated manner.

To generate a task, data for generating the task may be included in the policy data. In this case, after the policy data has been received, in the game apparatus 1, a new task is generated on the basis of data (parameters) for the generation of a task, which is included in the policy data, and the new task is executed.

Further, to perform the update process of the system, in the above embodiment, the latest update date and time of the system is used to determine whether or not the update of the system is to be performed. The present invention, however, is not limited to this, and version information may be used. In this case, the version information may be included in system update data.

Further, in the above embodiment, when it is confirmed whether or not the update of the system is to be reflected, if the selection is made not to reflect the update of the system, the update data is discarded immediately. The present invention, however, is not limited to this. For example, a confirmation is made several times, and when an instruction is given predetermined consecutive times not to reflect the update of the system, the update data may be discarded. This makes it possible to prevent the update data from being discarded by an erroneous operation of the user.

Further, in the above embodiment, the "number of uses" is set for a task. Even for a task whose number of uses is 0, the number of uses may be increased as a result of the application of policy data (i.e., the task becomes executable again). The present invention is not limited to this. In addition, the system of the game apparatus 1 may perform a process of: randomly selecting a task from tasks whose numbers of uses are 0; and increasing the number of uses of the selected task.

Alternatively, control may be performed such that the execution frequency of a task is gradually decreased using the number of uses. For example, the following control may possibly be performed.

(1) First, it is assumed that there is a task whose number of uses is set to 30 as an initial value, and the task is executed daily. In this case, as a method of determining whether or not the task has been executed daily, it may be confirmed daily whether or not the number of uses has been decreased, or it may be confirmed whether or not the number of uses is 0 at the elapse of 30 days. Alternatively, it may be allowed that there are even several days when the task is not executed.

(2) After the task has been executed daily and the number of uses has become 0, the task is caused to be executed once in 10 days for 30 days. For example, the task may be executed with a one-in-ten probability every time, or execution dates may be determined as appropriate, for example, the task may be executed on a 10th day, a 20th day, and a 30th day.

(3) Further, for 90 days thereafter, the task is caused to be executed once in 30 days. For example, the task may be executed with a one-in-thirty probability, or execution dates may be determined in advance.

(4) Further, for 120 days thereafter, the task is caused to be executed once in 60 days. For example, the task may be executed with a one-in-sixty probability, or execution dates may be determined in advance.

(5) Then, after the elapse of 120 days, the task is caused not to be executed. For example, the task may be deleted, or the possibility may be left open of executing the task with another trigger, such as control by policy data, without deleting the task.

With a certain trigger, this increases the number of uses of a task concerning an application that has not been used for a while, and the task is executed. This makes it possible to bring a surprise to the user.

Further, in the above embodiment, as a result of the menu process in the start-up process performed when the game apparatus 1 is started, the scanning of the applications installed on the game apparatus 1 are performed, and their list is displayed as a menu. Thus, for example, when the user has pressed the power button 14F (i.e., has started the game apparatus 1) in the state where the game apparatus 1 is in the "sleep mode", the "sleep mode" is canceled, and a menu screen is immediately displayed in which application icons are arranged as shown in FIG. 4 and the like. In addition, the same applies to the case where the user has pressed the power button 14F to turn on the game apparatus 1 in the state where power is not supplied to the game apparatus 1 (the power is off). As described above, the menu screen, which is a list of applications, is displayed when the game apparatus 1 is started. The "start-up" of the game apparatus 1 is not limited to the immediate display as described above. For example, also the case is included where, when the game apparatus 1 is started, first, a logo of the manufacturer and a notice, such as "precautions to the user", are displayed, and thereafter, the menu screen is displayed as described above. In addition, also the case is included where the menu has a hierarchical structure. For example, also the case is included where, when the game apparatus 1 is started, a genre menu is displayed that indicates the genres of various applications installed on the game apparatus 1, such as "game", "music", and "picture". When any of the genres is selected, a list of applications belonging to the selected genre is displayed. Further, the menu may have a plurality of hierarchical levels.

Further, in the above embodiment, when a task is generated (steps S129 and S130), its execution priority is set to an optional value, as an example. Alternatively, a certain value does not necessarily need to be set to the execution priority when the task is generated, and the task may be generated in the state where the execution priority has yet to be set. Then, the execution priority may be set for the first time using the policy data. Further, in addition to the execution priority, the task may be generated in the state where the number of uses and the like have yet to be set, and then, the number of uses and the like may be set for the first time using the policy data.

Further, in the above embodiment, the hand-held game apparatus is used as an example of the information terminal. The present invention, however, is useful for other mobile information terminals, such as a PDA and a notebook computer that have a wireless LAN function.

Further, in the above embodiment, when the user has declined to use the update of the system, a confirmation is repeatedly prompted every predetermined period of time until the user permits the update of the system to be applied. Alternatively, (1) a confirmation may be prompted every time the menu is displayed, without waiting for the elapse of a predetermined period of time; or (2) a confirmation may be prompted several times, and if all the promptings have been declined, the file for the update of the system may be discarded.

Further, in the above embodiment, when a plurality of new applications have been downloaded and transferred to the menu, a present icon 112 representing only one of the new applications is displayed, and the other applications are not displayed in the menu. Then, after the present icon 112 currently displayed to represent the application has been touched and has entered a specific icon state, another present icon 112 representing another application (one application) is displayed when the screen has transferred to the menu again. As well as this, present icons 112 representing a plurality of newly received applications may be all displayed simultaneously.

Further, concerning the menu process in the above embodiment, the determination of whether or not "a confirmation is made for using the update of the system" and the determination of whether or not "a transfer is made to the application installation process" are made based respectively on the conditions: "whether or not" the system installation completion flag is set to OFF (in the case of OFF, a downloaded update is not used, and therefore, a confirmation of use is to be made)"; and "whether or not the system installation completion flag is set to ON (in the case of ON, it is indicated that downloaded update of the system has been reflected), and the application installation necessity flag is set to ON (in the case of ON, the update of an application appears on the installation list acquired last time, and therefore, the download and the installation are performed)". As well as these, a menu process program may inquire of an installation program, and in response to the inquiry, the installation program may give an instruction "to make a confirmation because the downloaded system has not been used" or an instruction "to install an application because the update of the system is completed but an application has not been installed".

Further, in the system installation process and the application installation process in the above embodiment, the reception task of downloading the system and an application is immediately executed, as an example. As well as this, it may be set such that the reception task is executed several tens of minutes to several hours later.

Further, in the above embodiment, at the time of a download, it is determined with reference to the HTTP response code whether or not the installation list 580 has been updated. As well as this, after the installation list 580 has been downloaded, the determination may be made by comparing the downloaded installation list 580 to a past installation list stored in the game apparatus 1.

Second Embodiment

Next, a description is given of a second embodiment of the present invention. In the second embodiment, an application process termed a "bottle mail application" is described as an example of an application using the processes as described in the above first embodiment. It should be noted that a game apparatus according to the second embodiment is the same as that of the above first embodiment. Thus, the same components are designated by the same reference numerals, and therefore are not described in detail.

Figure 52:
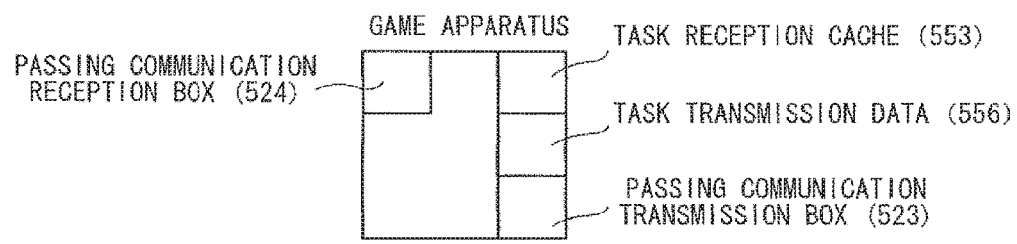
FIG. 52 is a diagram schematically showing a bottle male application according to a second embodiment.
Figure 53:
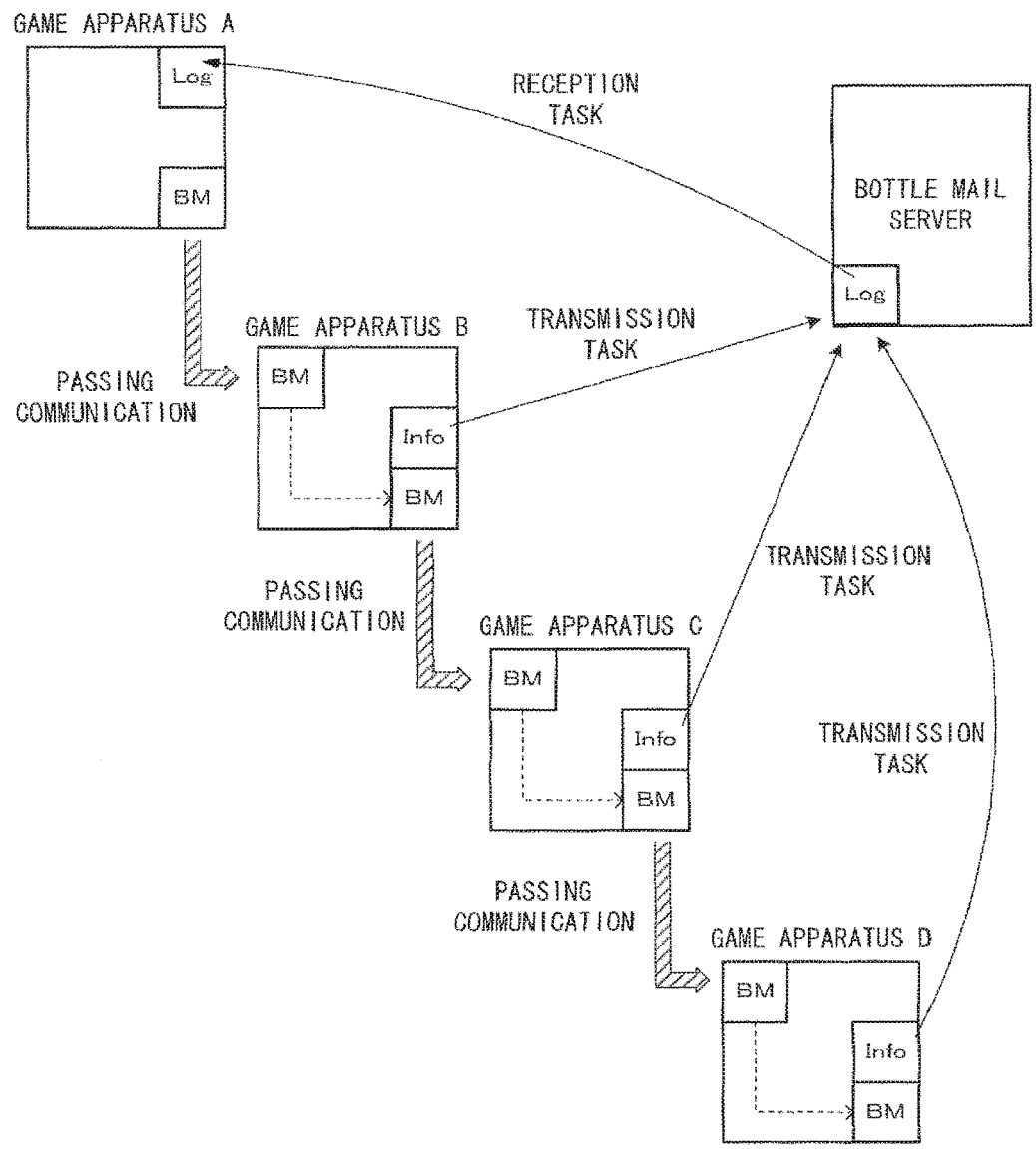
FIG. 53 is a diagram schematically showing the bottle male application according to a second embodiment.

FIGS. 52 and 53 are diagram showing an outline of a process of the bottle mail application according to the second embodiment of the present invention. FIG. 52 is a diagram schematically showing: the game apparatus 1; the transmission box 523 and the reception box 524 for passing communication (hereinafter referred to as a "passing communication transmission box" and a "passing communication reception box", respectively) that are described in the above first embodiment with reference to FIG. 15; and the task reception cache 553 and the task transmission data 556 that are used for communication in a task. In FIG. 52, the passing communication reception box 524 is shown in an upper left portion of a square representing the game apparatus 1. The task reception cache 553, the task transmission data 556, and the passing communication transmission box 523 are aligned vertically on the right side of the square, in order from top to bottom.

On the premise of such a schematic diagram, a description is given of an outline of the process according to the second embodiment with reference to FIG. 53. In FIG. 53, game apparatuses A to D are shown. In each game apparatus, the bottle mail application is installed. In addition, a bottle mail server is also shown in FIG. 53. In the bottle mail application according to the present embodiment, a mail termed a "bottle mail" (shown as "BM" in FIG. 53) created in the game apparatus A is transferred from game apparatus to game apparatus. That is, this application allows a mail to be released to drift.

In FIG. 53, first, the bottle mail is created in the game apparatus A and stored in its passing communication transmission box. At this time, "generation information" is set for the bottle mail. The bottle mail can be transferred the number of times indicated by the "generation information". When the "generation information" is not set, the bottle mail can be transferred regardless of the number of times. Thereafter, the bottle mail is transferred from the game apparatus A to the game apparatus B by performing passing communication. That is, the bottle mail is transferred from the passing communication transmission box of the game apparatus A to the passing communication reception box of the game apparatus B.

Thereafter, when the bottle mail application has been executed in the game apparatus B, the bottle mail is transferred from the passing communication reception box to the passing communication transmission box of the game apparatus B. At this time, in the game apparatus B, a predetermined value is added to the generation information about the bottle mail. Further, in the game apparatus B, additional information (shown as "Info" in FIG. 53) to be transmitted to the bottle mail server is generated. The "Info" includes the bottle mail, the name of the owner of the game apparatus B, the generation information after the addition, and the like. Then, a "transmission task" of transmitting the "Info" to the bottle mail server at an appropriate time is also generated and registered. As a result, the "transmission task" is executed at an appropriate time, and the "Info" is transmitted from the game apparatus B to the bottle mail server. The bottle mail server accumulates the information as history information (shown as "Log" in FIG. 53).

Thereafter, passing communication occurs between the game apparatus B and the game apparatus C, and the bottle mail is transferred from the game apparatus B to the game apparatus C. Subsequently, when the bottle mail application is executed in the game apparatus C, similarly to the case of the game apparatus B, the bottle mail is transferred from the passing communication reception box to the passing communication transmission box, addition is performed on the generation information, and the "Info" and the "transmission task" concerning the "Info" are also generated. Then, the "Info" is also transmitted from the game apparatus C to the bottle mail server at an appropriate time, and accumulated as the "Log".

Thereafter, passing communication occurs between the game apparatus C and the game apparatus D, and the bottle mail is transferred from the game apparatus C to the game apparatus D. Also in the game apparatus D, as a result of the execution of the bottle mail application, the bottle mail is transferred from the passing communication reception box to the passing communication transmission box, addition is performed on the generation information, and the "Info" is transmitted by the "transmission task".

As described above, the bottle mail created in the game apparatus A is transferred from game apparatus to game apparatus by passing communication. Meanwhile, each of the game apparatuses B, C, and D that has received the bottle mail transmits the "Info" to the bottle mail server at an appropriate time. Thus, the user of the game apparatus A can learn a later state of the released bottle mail, such as how many people the released bottle mail has been distributed to, and who is the last recipient, by acquiring the "Log" accumulated in the bottle mail server. Then, in the present embodiment, a "reception task" is generated to acquire such a "Log", and the "Log" is received at an appropriate time.

That is, in the second embodiment, it is possible to provide an application that allows a new way of enjoyment, by performing "local communication (passing communication)" and "Internet communication" in a cooperative manner.

A description is given below of details of the process according to the second embodiment. The process as described above is implemented by performing, in a cooperative manner, a "bottle mail application process" performed by the game apparatus 1 and a "bottle mail server process" performed by the bottle mail server. First, data used in the process is described. In the process performed by the game apparatus 1, basically, the same data as that of the above first embodiment is used. As data of the "bottle mail application", however, data indicating the "bottle mail" and the additional information ("Info" in FIG. 53) are generated as appropriate.

Figures 54, 55:
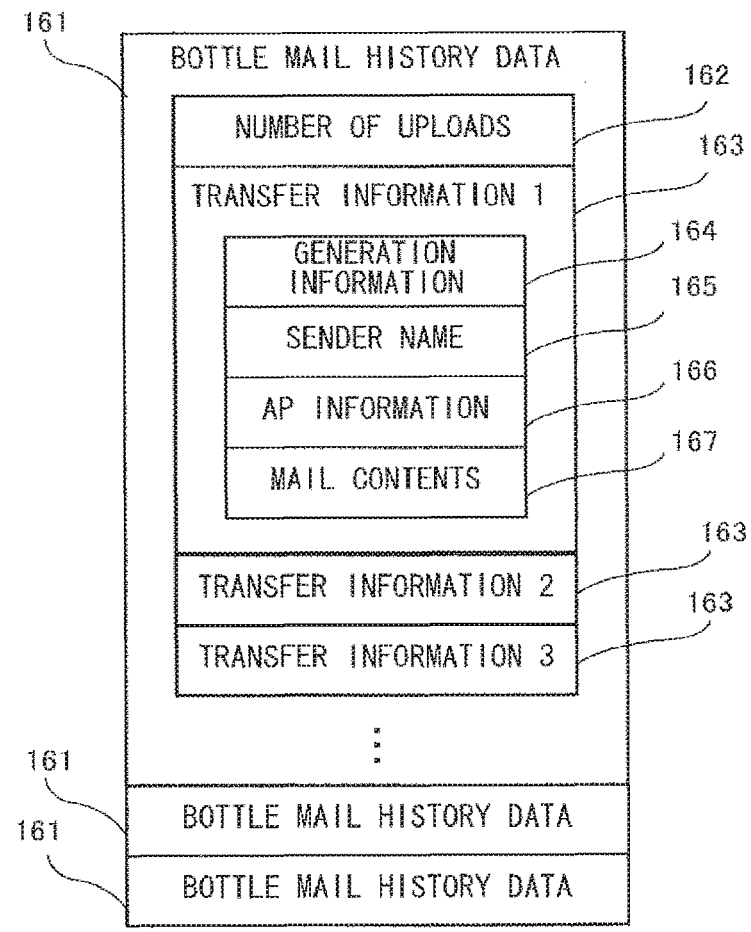
FIG. 54 is a diagram showing an example of the data structure of history information data stored in a bottle mail server.
FIG. 55 shows an example of an AP area table stored in the bottle mail server.

On the other hand, in the bottle mail server, the history information data ("Log" in FIG. 53) described above is stored, as well as programs for performing the process as described above. FIG. 54 is a diagram showing an example of the data structure of the history information data. As shown in FIG. 54, the history information data is constituted of a set of pieces of bottle mail history data 161, and each piece of bottle mail history data 161 includes the number of uploads 162 and a plurality of pieces of transfer information 163. The number of uploads 162 indicates the number of times the additional information or the like has been uploaded from the game apparatus 1. In other words, the value indicates the number of times the bottle mail has been transferred. The transfer information 163 is information concerning the game apparatuses 1 (the game apparatuses B to D in FIG. 53) that are transfer destinations of the bottle mail, and is constituted of a set of generation information 164, a sender name 165, AP information 166, and mail contents 167. The generation information 164 and the sender name 165 are data transmitted as the additional information from the game apparatus 1. The AP information 166 is information indicating an AP used when the additional information has been transmitted. On the basis of this information and an AP area table described later, it is possible to identify the area where the game apparatus 1 has been located when the additional information has been transmitted. The mail contents 167 are the contents (text) of a bottle mail transmitted together with the additional information. These are the contents of a bottle mail transmitted from each transfer destination, such that on the assumption that the contents of the bottle mail are changed at each transfer destination, the change history is referable. In addition, although not shown in the figures, information for uniquely identifying each bottle mail, and the like are also included.

Further, in the bottle mail server, data for identifying the area where an AP is set is also stored. FIG. 55 shows an example of an AP area table defining the correspondence relations between APs and the areas where the APs are set. On the basis of data corresponding to the table as shown in FIG. 55, the bottle mail server can identify an area based on the AP information 166.

Figure 56:
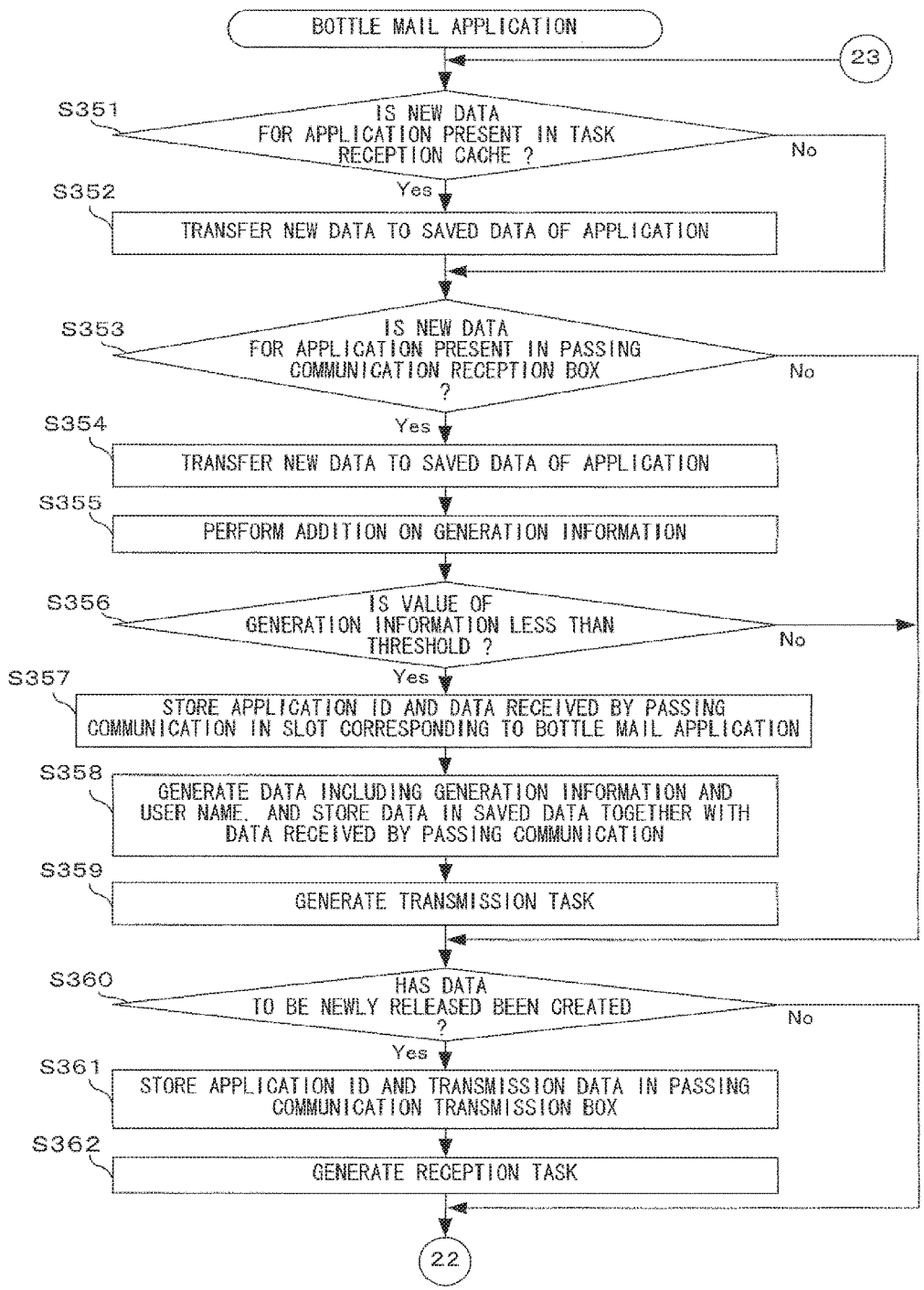
FIG. 56 is a flow chart showing in detail a bottle mail application process performed by the game apparatus 1.
Figure 57:
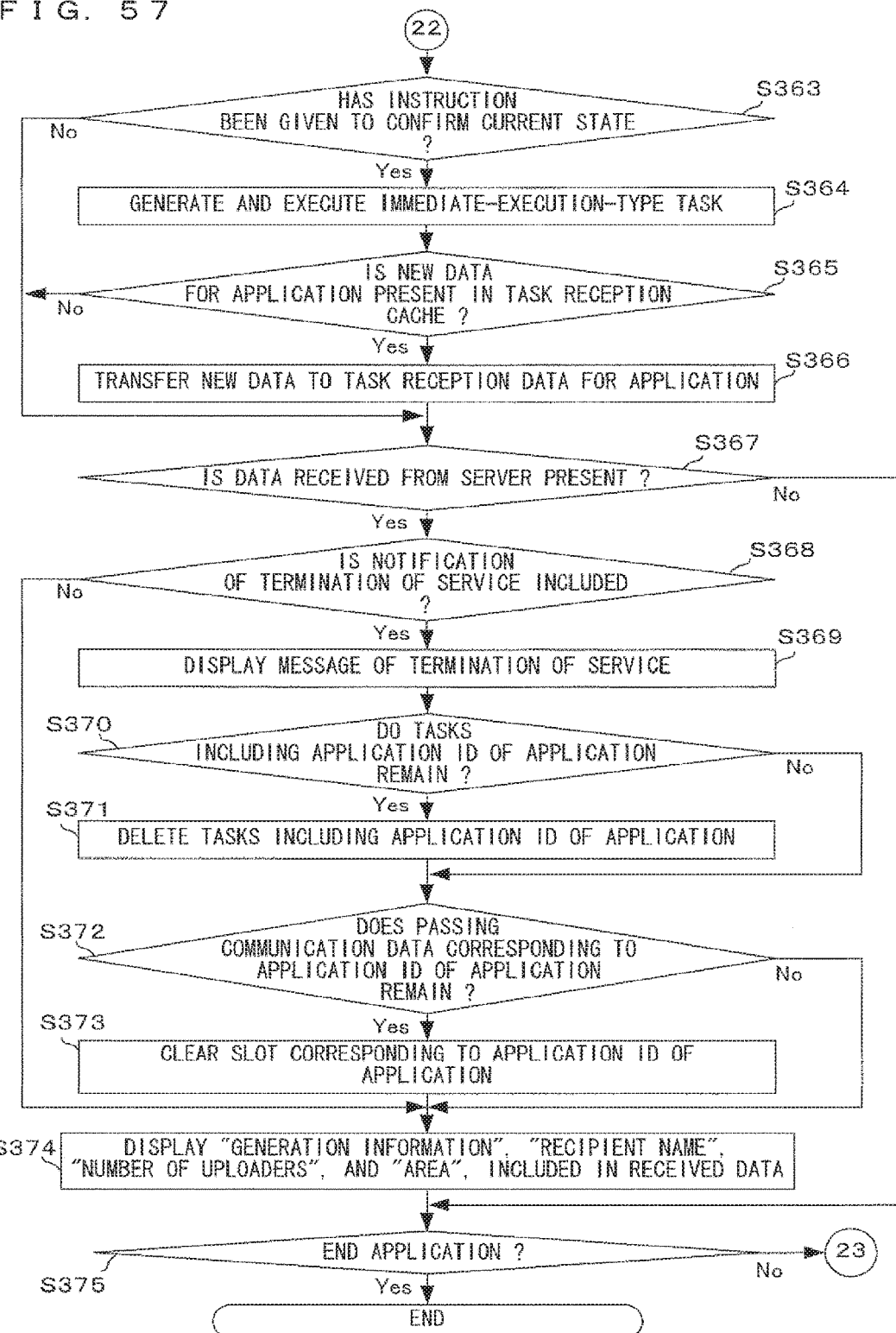
FIG. 57 is a flow chart showing in detail the bottle mail application process performed by the game apparatus 1.

FIGS. 56 and 57 are flow charts showing in detail the bottle mail application process performed by the game apparatus 1. It should be noted that the processes of steps S351 through S354 in FIG. 56 and the processes of steps S367 through S373 in FIG. 56 are the same as the processes of steps S121 through S124 and steps S134 through S140 in FIGS. 33 and 34 (data used in these processes is data concerning a bottle mail as described above). Thus, these processes are not described in detail.

In FIG. 56, in step S355 subsequent to step S354, a predetermined value is added to generation information set in (appended to) a bottle mail. Subsequently, in step S356, it is determined whether or not the value of the generation information is less than a threshold. For example, the threshold is set in advance as a defined value in the bottle mail application. As a result of the determination, when it is determined that the value of the generation information is not less than the threshold (NO in step S356), it is determined that the bottle mail can no longer be transferred, and the processing proceeds to step S360 described later.

On the other hand, when it is determined that the value of the generation information is less than the threshold (YES in step S356), it is indicated that the bottle mail can be transferred, and therefore, a process is performed in step S357 of transferring the bottle mail to another game apparatus, using passing communication. That is, a value indicating the bottle mail application is stored in the application ID 522 of the slot 521 associated with the bottle mail application. In addition, the bottle mail acquired in step S354 (which is stored in the passing reception data 558 in the saved data 555) is transferred to the transmission box 523 of the slot 521.

Next, in step S358, additional information data ("Info" in FIG. 53) to be transmitted to the bottle mail server is generated and stored in the saved data 555. That is, data including the generation information and the user name acquired from the game apparatus setting data 560 is created and stored in the task transmission data 556 together with the bottle mail. Subsequently, in step S359, a "transmission task" is generated of transmitting the data prepared in step S358 to the bottle mail server at an appropriate time.

Next, in step S360, it is determined whether or not a bottle mail to be newly released has been created (by the user). As a result, when the new bottle mail has not been created (NO in step S360), the processing proceeds to step S363 described later. On the other hand, when the new bottle mail has been created (YES in step S360), subsequently, in step S361, preparations are made for transferring the newly created bottle mail to another game apparatus 1 by passing communication. That is, a value indicating the bottle mail application is stored in the application ID 522. Further, the newly created bottle mail is stored in the transmission box 523. It should be noted that when a bottle mail has been stored also in step S357, the bottle mail received from said another game apparatus 1 and the bottle mail created by the user are stored together accordingly.

Next, in step S362, a "reception task" is generated of acquiring, from the bottle mail server, history information data ("Log" in FIG. 53) indicating the state of the released bottle mail created by the user.

Next, in step S363 in FIG. 57, it is determined whether or not an instruction has been given by the user to confirm the state of the released bottle mail. As a result, when it is determined that such an instruction has not been given (NO in step S363), the processing proceeds to step S367 described later.

On the other hand, when it is determined that such an instruction has been given by the user (YES in step S363), in step S364, an immediate-execution-type task is generated of receiving, from the bottle mail server, the history information data indicating the state of the released bottle mail, and is immediately executed. Subsequently, in step S365, as a result of the immediate execution of the task, it is determined whether or not new data (here, the received history information data) for the bottle mail application is present in the task reception cache 553. As a result, when it is determined that such data is not present (NO in step S365), the processing proceeds to step S367 described later. On the other hand, when it is determined that new data for the bottle mail application is present (YES in step S365), in step S366, the new data is transferred to the task reception data 557 in the saved data 555 of the bottle mail application. Since the new data is transferred to the saved data 555 as described above, the history information data can be accessed through the bottle mail application.

Thereafter, in step S367, it is determined whether or not new data for the bottle mail application is present as a result of the "reception task" generated in step S362 in FIG. 56 or in step S364 in FIG. 57. As a result, when such new data is not present (NO in step S367), the processing returns to the step S351, and the same process is repeated. On the other hand, when such new data is present (YES in step S367), in steps S368 to S373, a process is performed of determining whether or not a network service concerning the bottle mail application is terminated, and a process is performed of clearing tasks and data for passing communication when the network service is terminated. These processes are the same as the processes of steps S135 through S140 in FIG. 34, and therefore are not described in detail.

After the process of step S373 has ended, in step S374, information, such as "generation information", "recipient name", "the number of uploaders", and "area", is displayed with reference to the received history information data. Here, the "area" is information determined and added by the bottle mail server in a process described later performed by the bottle mail server.

Next, in step S375, it is determined whether or not the bottle mail application is to be ended. When it is determined that the bottle mail application is not to be ended (NO in step S375), the processing returns to the step S351, and the same process is repeated. When it is determined that the bottle mail application is to be ended (YES in step S375), the bottle mail application process is ended. This is the end of the description of the bottle mail application.

Figure 58:
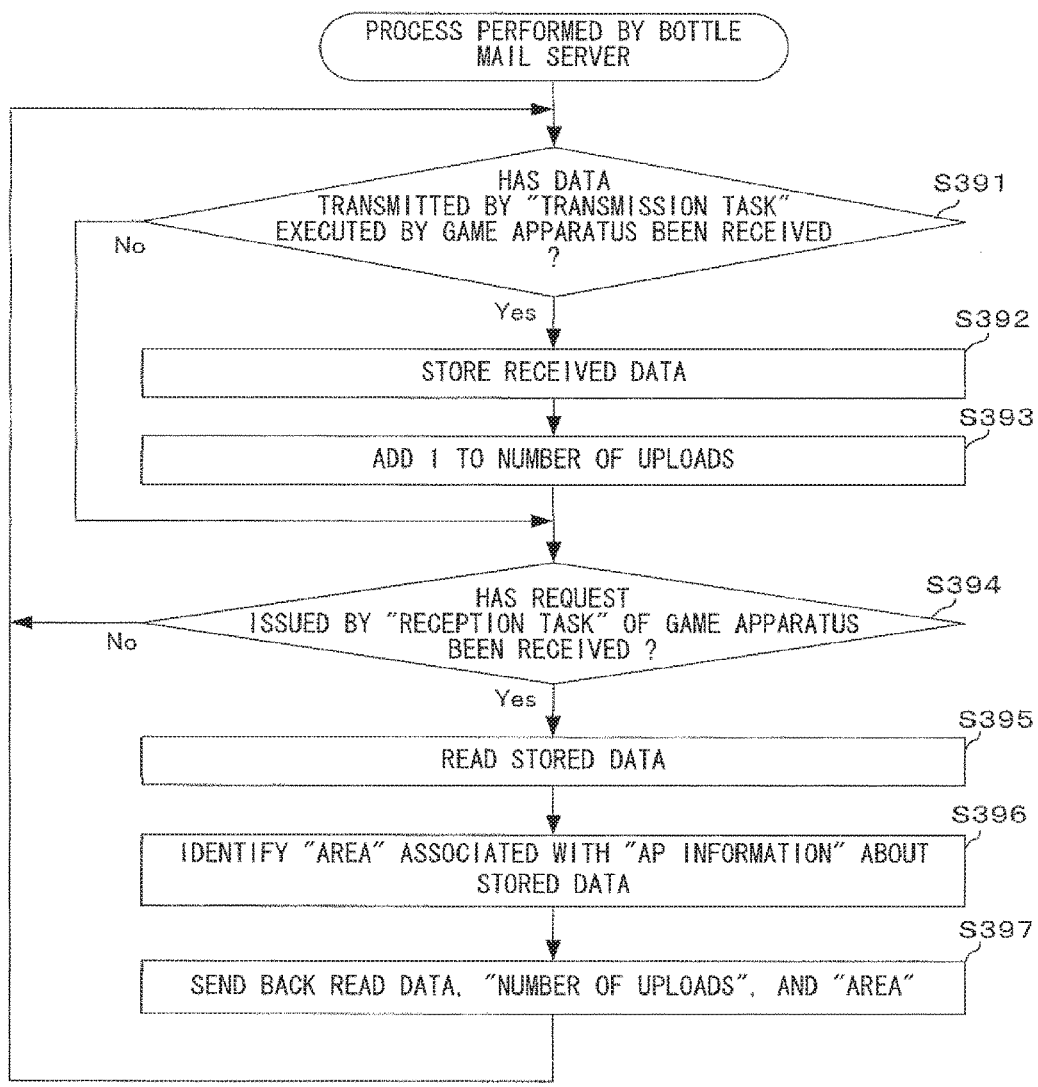
FIG. 58 is a flow chart showing in detail a process performed by the bottle mail server.

Next, a description is given of a process performed by the bottle mail server in response to the bottle mail application. FIG. 58 is a flow chart showing in detail the process performed by the bottle mail server. In FIG. 58, first, in step S391, it is determined whether or not data ("Info" in FIG. 53) transmitted from the game apparatus 1 by executing the "transmission task" (the task generated in step S359 in FIG. 56) as described above has been received. As a result, when it is determined that such data has not been received (NO in step S391), the processing proceeds to step S394 described later. On the other hand, when it is determined that such data has been received (YES in step S391), the received data is stored as the bottle mail history data 161 (stored as "Log" in FIG. 53) in step S392.

Next, in step S393, 1 is added to the number of uploads 162 corresponding to the received bottle mail.

Next, in step S394, it is determined whether or not a request for the history information data has been received from the game apparatus 1. The request is issued by executing the "reception task" (the task generated in step S362 in FIG. 56 or in step S364 in FIG. 57). As a result of the determination, when it is determined that such a request has not been received (NO in step S394), the processing returns to step S391, and the same process is repeated. On the other hand, when it is determined that such a request has been received (YES in step S394), in step S395, the bottle mail history data 161 corresponding to the contents of the request is read with reference to the history information data. It should be noted that as a method of identifying the bottle mail history data 161, for example, a predetermined ID number is generated on the basis of the creator and the created date and time of the bottle mail and a number unique to the game apparatus 1 used to create the bottle mail, and is buried in data of the bottle mail per se. Then, when the request is issued, the ID number is included in the request, and therefore is used to identify the bottle mail history data 161.

Next, the AP information 166 of the read bottle mail history data 161 is acquired, whereby an area 172 associated with the AP information 166 is acquired with reference to the AP area table (see FIG. 55).

Next, history information data is created on the basis of the contents of the read bottle mail history data 161 and the area 172, and is transmitted to the game apparatus 1 that is the request source. Thereafter, the processing returns to step S391, and the same process is repeated. This is the end of the description of the process performed by the bottle mail server.

As described above, in the second embodiment, a bottle mail created in a game apparatus 1 is transferred to another game apparatus 1, using passing communication. Then, in the game apparatus 1 that has received the bottle mail by the passing communication, additional information, such as the user name and the AP information, is added to the received data, and the received data is transmitted to the bottle mail server. This enables the creator of the bottle mail to confirm the current state of the released bottle mail created by themselves, by inquiring of the bottle mail server. Further, it is possible to confirm not only a final state but also information concerning users involved in the transfer of the bottle mail. It is possible to provide a new way of enjoyment to the user, by performing "local communication" (passing communication) and "Internet communication" (communication with the bottle mail server) in a cooperative manner.

It should be noted that in the above embodiment, when the creator of the bottle mail confirms the current state of the bottle mail created by themselves, the "reception task" is generated. A "task", however, does not necessarily need to be used, and the history information data may be acquired by accessing the bottle mail server as appropriate in accordance with an operation of the user (without using a task). Here, the current state of the bottle mail may be confirmed not only from the game apparatus 1 that has released the bottle mail, but also from other game apparatuses 1 involved in the transfer of the bottle mail.

Further, to identify the "area", in the above embodiment, the "area" is identified in the bottle mail server on the basis of the AP information 166. Alternatively, the AP information 166 may be transmitted from the bottle mail server to the game apparatus 1, and the "area" may be identified in the process performed by the game apparatus 1 on the basis of the AP information 166.

Third Embodiment

Next, a description is given of a third embodiment of the present invention. In the third embodiment, an example is shown of a process of performing transmission and reception by a task (Internet communication) and "passing communication" (local communication) in a cooperative manner as described in the above first embodiment. Specifically, descriptions are given of: an example where data received in a task is transmitted to another game apparatus, using "passing communication"; and an example where data received from another game apparatus by "passing communication" is uploaded to a predetermined server, using a task.

First, a description is given of a process of transmitting data received from a server or the like via an AP by executing a task, to another game apparatus, using "passing communication". For example, the case is assumed where a trial version, a free game, or the like that has been acquired by executing a task is transmitted to another game apparatus 1, using "passing communication". In this case, for example, it is assumed that as a result of the execution of the task in the game apparatus A, the trial version, the free game, or the like, is installed. At this time, in the game apparatus A, data of the trial version, the free game, or the like, is configured to be set in the passing communication data 520. This makes it possible to transmit the data to another game apparatus by "passing communication". Further, in the game apparatus that has received the data, the trial version, the free game, or the like that has been acquired by the "passing communication" may be automatically installed. The data received by the execution of the task and transmitted to said another game apparatus 1 by the "passing communication" is not limited to the trial version, the free game, and the like, and may be data used for a certain game application.

Next, a description is given of, as another example, a process of uploading data acquired from another game apparatus by "passing communication" to a predetermined server, using a "transmission task". For example, it is assumed that the game apparatus B is set so as to be allowed to perform only "local communication" because, for example, the user has not registered any AP in the game apparatus B. In such a case, in the game apparatus B, upload data to be uploaded to the predetermined server is created, and task generation data for generating a "transmission task" of transmitting the upload data is created. For example, this data is considered to have the same structure as that of the policy data. Then, both the upload data and the task generation data are configured to be stored in the passing communication data 520. As a result, both the upload data and the task generation data are transmitted to the game apparatus A by "passing communication". In the game apparatus A, a "transmission task" is generated on the basis of the task generation data received by the "passing communication" (the same processes as those of steps S129 and S130 may only need to be performed). As a result, the execution of this task enables the game apparatus A, in place of the game apparatus B, to transmit the upload data generated in the game apparatus B to the predetermined server.

As described above, it is possible to exchange various data between a plurality of game apparatuses 1 by performing "Internet communication" and "local communication" in a cooperative manner. Further, even a game apparatus 1 set so as not to perform "Internet communication" can indirectly perform "Internet communication" by transmitting and receiving data via another game apparatus using "local communication" (passing communication).

Fourth Embodiment

Next, a description is given of a fourth embodiment of the present invention. In the above first embodiment, to update the system and to update an application, the flow of the process is such that: first, a process concerning the update of the system; and then, a process of updating the application is performed. That is, when there is an update of the system, the update of the system is preferentially performed. In contrast, in the fourth embodiment, first, a process concerning the update of an application is performed, and a process of updating the system is performed where necessary. Specifically, the flow of the process is such that: the version of the system necessary for a new installation or the operation of the updated application is determined; and when the determined version is newer than the version of the current system, the update of the system is performed. For example, it is assumed that the version of the current system is "1.0". On the other hand, there is a certain application concerning new distribution, and the version of the system necessary for the operation of the application is "2.0". In such a case, when the application is downloaded, the system is also updated. Further, when an application has been updated, the system is installed collaterally. Thus, even if the system is updated, the update may not necessarily be reflected, so long as an application is not updated.

Figure 59:
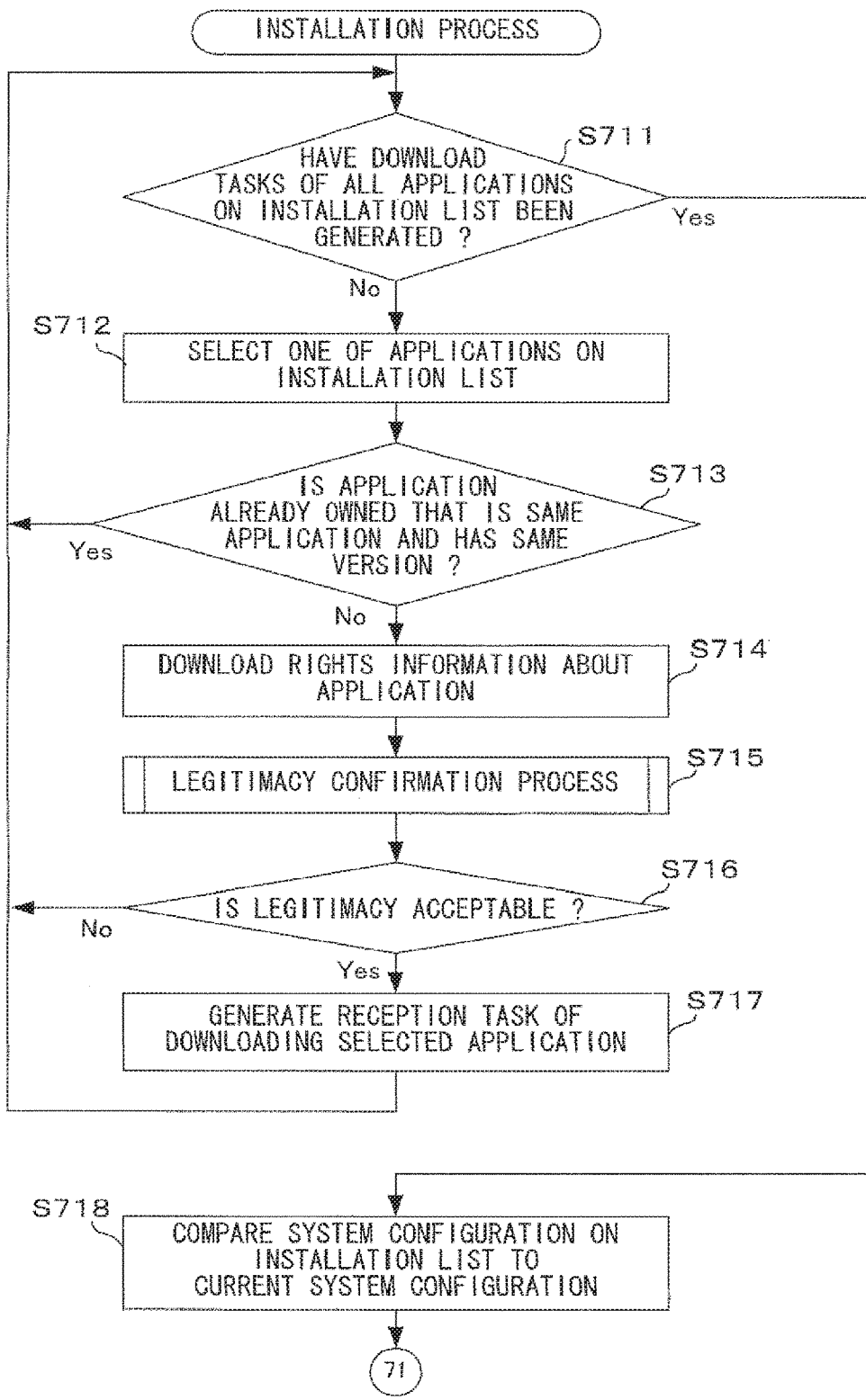
FIG. 59 is a flow chart showing in detail an installation process according to a fourth embodiment.

To implement the process as described above, in the fourth embodiment, a process as shown in, for example, FIG. 59 is performed instead of the system installation process (and the application installation process) in the first embodiment. FIG. 59 is a flow chart showing an installation process according to the fourth embodiment. The process of this flow chart is performed instead of the system installation process of step S548 in FIG. 47 in first embodiment. That is, the process is performed when an installation list has been acquired. First, in step S711, it is determined whether or not a process of generating a task of download as described below has been performed on all the applications appearing on the installation list 580. As a result, when there remain applications on which the process has yet to be performed (NO in step S711), in step S712, one of the applications on which the process has yet to be performed is selected from the applications appearing on the installation list 580.

Next, in step S713, it is determined whether or not an application has already been installed that is the same as the selected application and has the same version thereof. As a result, when an application has already been installed that is the same application and has the same version (YES in step S713), the selected application does not need to be installed or updated, and therefore, the processing returns to step S711. On the other hand, when an application that is the same as the selected application has not been installed, or has been installed but has a version different from that of the selected application (the installed one has an older version) (NO in step S713), in step S714, the rights information about the application is downloaded from a predetermined server. In the subsequent step S715, a legitimacy confirmation process of the rights information is performed. This process is similar to that described in the first embodiment. Thereafter, in step S716, it is determined whether or not the legitimacy is acceptable. When the legitimacy is acceptable (YES in step S716), in step S717, a reception task of downloading the selected application is generated, and the processing returns to step S711. On the other hand, when the legitimacy is not acceptable (NO in step S716), the process of step S717 is not performed, and the processing returns to step S711. Further, in the present embodiment, step S464 (the process of determining the target age), step S465 (the process of eliminating the installation of the trial version when the product version is owned), step S469 (the process of determining the play history conditions), in the first embodiment are omitted, but may be added.

Figure 60:
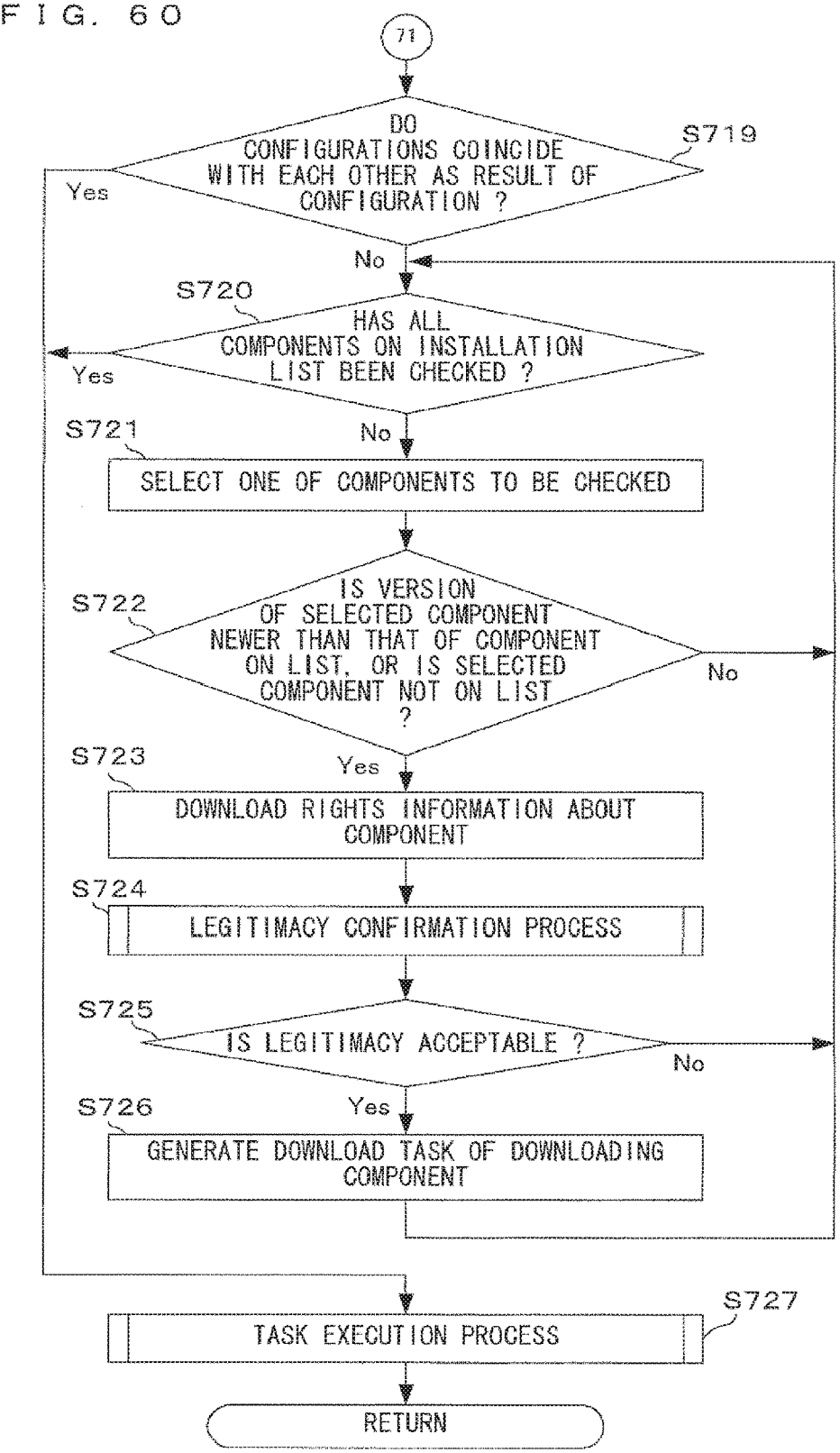
FIG. 60 is a flow chart showing in detail the installation process according to the fourth embodiment.

On the other hand, as a result of the determination in step S711, when it is determined that a task generation process as described above has been performed on all the application appearing on the installation list 580 (YES in step S711), in step S718, the system configuration indicated by the installation list 580 is compared to the current system configuration of the game apparatus 1. Subsequently, in step S719 in FIG. 60, as a result of the comparison, it is determined whether or not the configurations coincide with each other (whether or not there is no difference). As a result, when it is determined that the configurations coincide with each other (YES in step S719), the system does not need to be updated, and therefore, the processing proceeds to step S727. On the other hand, when it is determined that the configurations do not coincide with each other (NO in step S719), it is considered that the system needs to be updated, and therefore, a process concerning the update of the system is performed. First, in step S720, it is determined whether or not a process has been performed of checking all the components 584 of the system appearing on the installation list 580 as described below. As a result, when there remain components yet to be checked (NO in step S720), in step S721, one of the components yet to be checked is selected as a check object component.

Next, in step S722, it is determined whether or not the component selected as a check object is to be installed. Specifically, it is determined with reference to the current system configuration detail list 640 whether or not the version of the check object component is newer than the version of the component in the current system, or whether or not the check object component has yet to be included in the current system configuration. As a result, when the version of the check object component is newer, or when the check object component has yet to be introduced in the current system (YES in step S722), subsequently, in step S723, the rights information about the component is downloaded from a predetermined server. In the subsequent step S724, a legitimacy confirmation process of the rights information is performed. This process is similar to the legitimacy confirmation process described in the above first embodiment. Subsequently, in step S725, as a result of step S724, it is determined whether or not the legitimacy is acceptable. When the legitimacy is acceptable (YES in step S725), in step S726, a reception task of downloading the selected system component is generated, and the processing returns to step S720. On the other hand, when the legitimacy is acceptable (NO in step S725), the process of step S726 is not performed, and the processing returns to step S720.

On the other hand, as a result of the determination in step S722, when the version of the check object component and the version of the current system component is the same (NO in step S722), the processes of steps S723 through S726 are not performed, and the processing returns to step S720.

Next, when it is determined that the process has been performed of checking all the components 584 of the system appearing on the installation list 580 as described above, as a result of the determination in step S720 (YES in step S720), in step S727, a task execution process is performed so as to execute the reception task generated in steps S717 and S726 described above. This process is similar to that described in the first embodiment with reference to FIGS. 43 to 48, and therefore is not described. This is the end of the installation process according to the fourth embodiment.

As described above, in the fourth embodiment, the process of installing an application is performed before the process of installing the system. This makes it possible to update the system only where necessary in accordance with the state of an application. In other words, it is possible to perform the process of updating the system to a system necessary for the operation of an application with increased certainty, and therefore possible to prevent an erroneous operation from occurring due to the disagreement between the version of the system necessary for the operation of the application and the version of the system actually installed on the game apparatus.

It should be noted that in the fourth embodiment, the reception task of downloading the application and the reception task of downloading the system are generated, and then are executed together (step S727). In this process, however, either one of the reception task of the application and the reception task of the system may be executed first. In view of the fact that it takes a long time to download (communicate) a file (in addition, when the user carrying the game apparatus body is travelling), the advantage of executing the reception task of the application first is that it is possible to preferentially acquire the application, which is more effective than the system, because the application brings a surprise to the user. Alternatively, if the reception task of the system is executed first, the advantage is that at least the download and the update of the system are completed even when a download has stopped in the middle, and therefore, it is possible to prevent an erroneous operation from occurring due to the operation of an application in an old version of the system.

Fifth Embodiment

Next, a description is given of a fifth embodiment. In the first embodiment, the application and the system are automatically downloaded and installed, as an example. Alternatively, a manual download may possibly be used in combination with this. In particular, to acquire an application, the use of a manual download in combination can provide the user with more opportunities to access a wide variety of applications. Or, in the case where an application deleted by the user will not be automatically installed thereafter, if the user wishes to use the application again, the use of a manual download is very convenient for the user. In this case, the manual download may be implemented as a manual download application (e.g., an online shopping application) that is one of the applications to be started from the menu.

Figure 61:
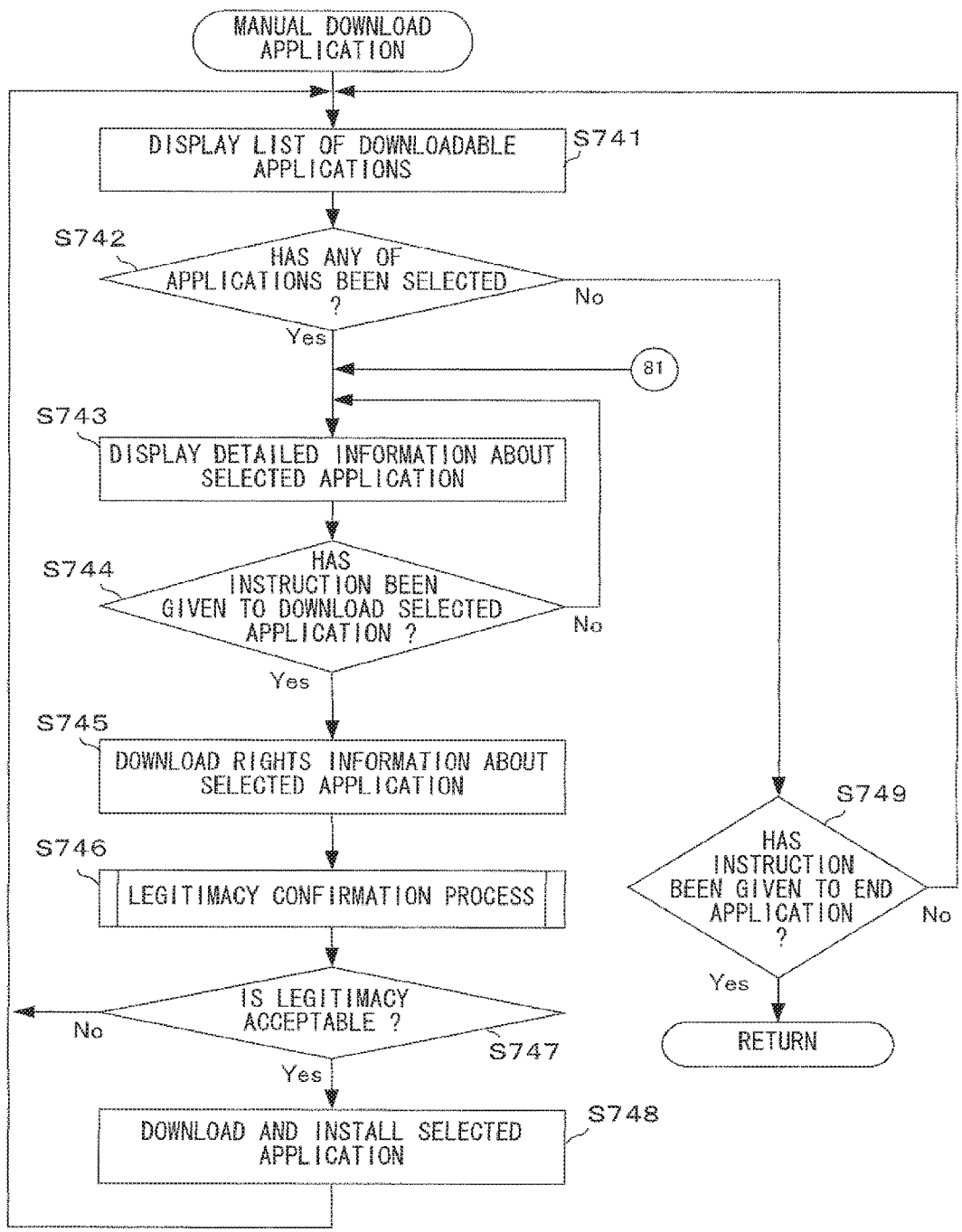
FIG. 61 is a flow chart showing in detail a manual download process according to a fifth embodiment.

FIG. 61 is a flow chart showing an example of the processing of such a manual download application. When the manual download application has been started from the menu, first, in step S741, a list of downloadable applications are displayed. Then, an input is received from the user.

Next, in step S742, it is determined whether or not the user has selected any of the applications from the list. As a result, when any of the applications has been selected (YES in step S742), in step S743, detailed information about the selected application is displayed. The detailed information may be, for example, a screenshot of the selected application, an introductory comment, various information such as the object age, and a review of another user. Further, if the detailed information concerns an application to be purchased online, information concerning its price is also displayed. Subsequently, in step S744, it is determined whether or not the user has given an instruction to download the selected application. If the application is to be purchased online, it is determined whether or not the user has given an instruction to purchase and download the selected application. When an instruction has not been given to download the application (NO in step S744), the processing returns to step S743. On the other hand, when an instruction has been given to download the application (YES in step S744), the processing proceeds to step S745. It should be noted that if the application is to be purchased online, when the determination in step S744 is YES, a purchase process of the selected application is added before step S745. Specifically, if the purchase process uses a method of inputting purchase information, such as a credit card number, or charging points necessary for purchase in advance, remaining points are checked, for example. Then, it is desirable that thereafter, a screen should be displayed to confirm whether or not this application is to be truly purchased, and the user should be inquired of about the final intention of the purchase. When the final intention has been obtained, an actual settlement process using a credit card, and a process of subtracting points necessary for the purchase are performed, and the processing proceeds to step S745.

In step S745, the rights information about the selected application is downloaded. Subsequently, in step S746, a legitimacy confirmation process of the rights information is performed. This process is similar to the legitimacy confirmation process in step S472 or the like.

Next, in step S747, as a result of step S746, it is determined whether or not the legitimacy is acceptable. When the legitimacy is acceptable (YES in step S747), in step S748, the selected application is downloaded. Here, it is not necessary to perform a process of generating and executing a task. It is, however, necessary to perform various setting processes concerning the application that are performed in a task execution process. Thereafter, the processing returns to step S741. On the other hand, when the legitimacy is not acceptable (NO in step S747), the process of step S748 is not performed, and the processing returns to step S741.

On the other hand, as a result of the determination in step S742, when none of the applications has been selected from the application list (NO in step S742), it is determined in step S749 whether or not the user has given an instruction to end the manual download application. When an instruction has not been given to end the manual download application (NO in step S749), the processing returns to step S741, and the same process is repeated. When an instruction has given to end the manual download application (YES in step S749), the manual download process ends.

As described above, in the fifth embodiment, it is possible to perform a manual download in combination with an automatic download and an automatic installation. This makes it possible to increase convenience for the user, and provide the user with more opportunities to be exposed to various applications.

Sixth Embodiment

Next, a description is given of a sixth embodiment. In the first embodiment, the application and the system are automatically downloaded and installed, as an example. Alternatively, it is possible to automatically download and install a content application, which is a set (unit) including a content and an application for reproducing the content. Examples of such a content application include: a set including a content of a still image and a display viewer application for displaying the still image; and a set including a content of a moving image (video image) and a reproduction viewer application for reproducing the moving image. Further, the types of contents include: video image (or image) data for introducing and advertising an article, such as game software and a movie; and coupon data that can be used for redeeming for, or a discount on, an article.

Figure 62:
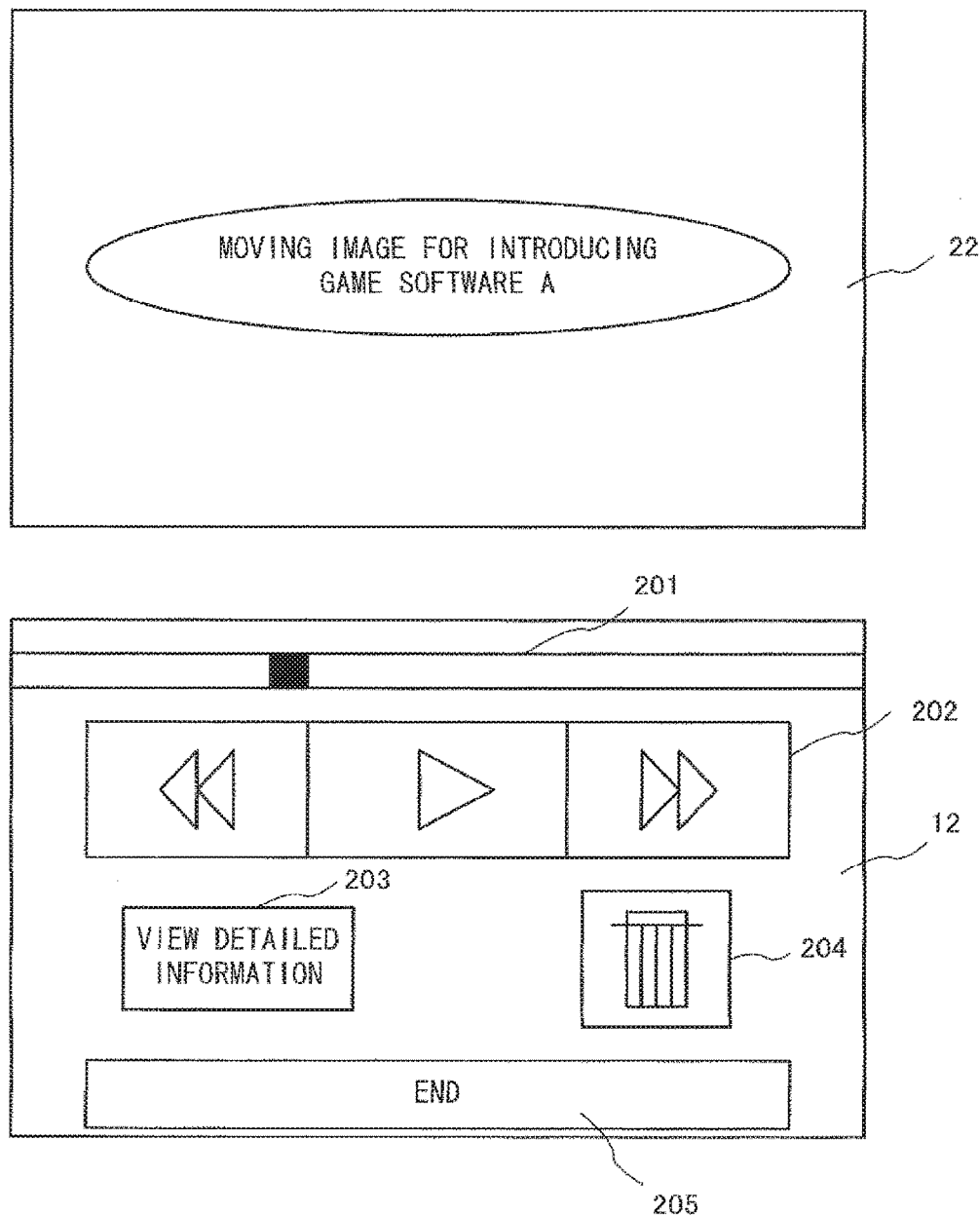
FIG. 62 shows an example of a screen of a content application.

FIG. 62 shows an example of a screen displayed on a display section of the game apparatus 1 when such a content application has been executed. On the upper LCD 22, a video image of game software A, which is an example of the content, is displayed. On the lower LCD 12, an operation screen, which is an example of the reproduction viewer application, is displayed. The operation screen displayed on the lower LCD 12 includes a reproduction timeline bar 201, reproduction control buttons 202, a "view detailed information" button 203, a trash box (deletion) button 204, and an "end" button 205. The reproduction timeline bar 201 is an indicator indicating the elapsed time since the start of the video image that is being reproduced on the upper LCD 22, or indicating which position of the entire video image is being reproduced. It is possible to reproduce the video image from a given position by directly touching the reproduction timeline bar 201. The reproduction control buttons 202 are buttons used to give instructions to reproduce (or pause), fast-forward, and rewind the video image. The "view detailed information" button 203 is a button used to view detailed information about the content displayed on the upper LCD 22. It is possible to proceed to step S743 described above to display the detailed information about the content, and to purchase and download the content, by touching the "view detailed information" button 203. The trash box button 204 is a button used to delete the content application per se from the game apparatus 1. The deletion process of the content application is performed by touching the trash box button 204. The "end" button 205 is a button used to give an instruction to end the execution of the content application.

Figure 63:
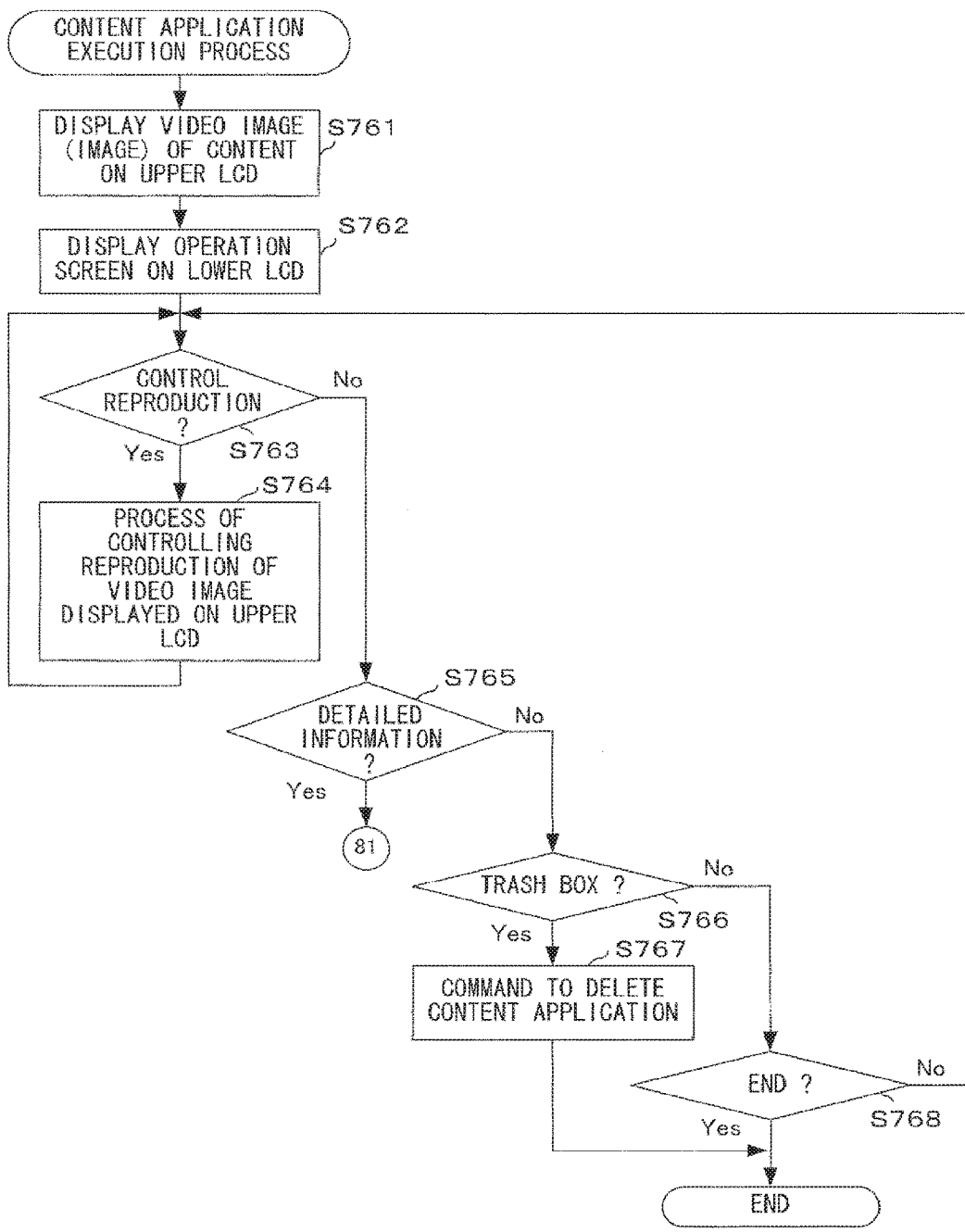
FIG. 63 is a flow chart showing a reproduction application included in a content application.

FIG. 63 is a flow chart showing an example of a process of the CPU 31 executing a program (reproduction application) included in such a content application. When the content application has been started from the menu, first, in step S761, an image of a content included in the content application is displayed on the upper LCD 22. Here, when the content is a video image, the beginning of the video image is displayed. In the subsequent step S762, an operation screen as shown in FIG. 62 is displayed on the lower LCD 12.

Next, in step S763, it is determined whether or not the user has given an instruction to control reproduction, that is, has touched the reproduction timeline bar 201 or any of the reproduction control buttons 202. As a result, when the reproduction timeline bar 201 or any of the reproduction control buttons 202 has been touched (YES in step S763), in step S764, a process is performed of controlling the reproduction of the video image displayed on the upper LCD 22. For example, when a given position on the reproduction timeline bar 201 has been specified, the video image corresponding to the specified position is read, and is displayed on the upper LCD 22. When any of the reproduction control buttons 202 has been specified, the reproduction (pause, during reproduction), the fast-forwarding, or the rewinding of the video image is performed in accordance with the type of the specified button. Thereafter, the processing returns to step S763.

On the other hand, as a result of the determination in step S763, when the user has not given an instruction to control reproduction (NO in step S763), it is determined in step S765 whether or not the user has given an instruction to display detailed information about the content, that is, has touched the "view detailed information" button 203. As a result, when the "view detailed information" button 203 has been touched (YES in step S765), the processing proceeds to step S743 described above, and the display of the detailed information, a process of purchasing and downloading the content, or the like, is performed.

On the other hand, as a result of the determination in step S765, when the user has not given an instruction to display the detailed information about the content (NO in step S765), it is determined in step S766 whether or not the user has given an instruction to delete the content application, that is, has touch the trash box button 204. As a result, when the trash box button 204 has been touched (YES in step S766), in step S767, a command to delete the content application is issued. Specifically, when a command has been received from the user to delete the content application, the CPU of the game apparatus 1 issues, to a deletion program included in the menu process program 501, a command to delete the program of the game apparatus 1. Thereafter, the execution of the content application ends.

Figure 64:
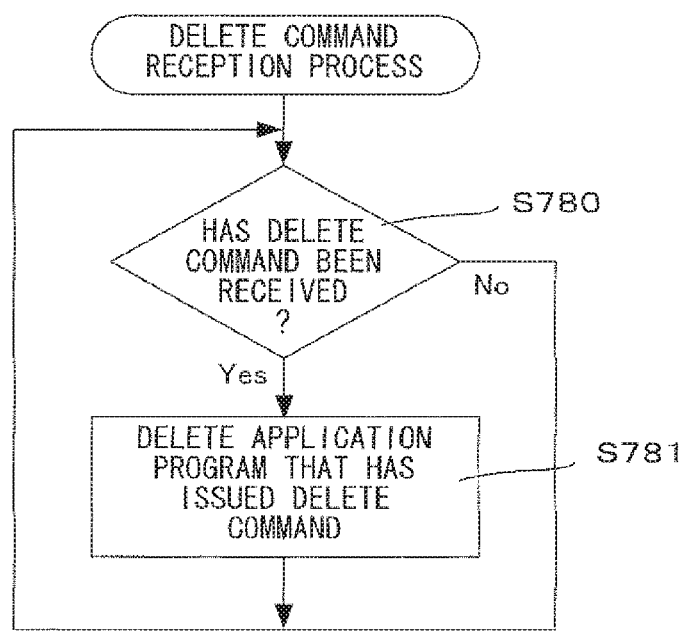
FIG. 64 is a flow chart showing a delete command reception process in detail.

Here, with reference to FIG. 64, a description is given of a delete command reception process. The flow of the delete command reception process shown in FIG. 64 is present as a part of the menu process program, and is constantly executed during the operation of the game apparatus 1.

In step S780, it is determined whether or not any of other application programs, including the content application, has issued a delete command. As a result, when a delete command has been issued (YES in step S780), in step S781, the application program that has issued the delete command is deleted. Specifically, the delete command includes information specifying the application of the application program that is the issuing source, and the application program 511 specified by the information is deleted from the program area 515 in the NAND flash memory 33.

On the other hand, as a result of the determination in step S780, when a delete command has not been issued (NO in step S780), the processing returns to step S780, and the same determination is repeatedly made.

On the other hand, as a result of the determination in step S766, when the user has not given an instruction to delete the content application (NO in step S766), it is determined in step S768 whether or not the user has given an instruction to end the content application, that is, has touched the "end"

button 205. As a result, when the "end" button 205 has been touched (YES in step S768), the execution of the content application ends.

On the other hand, as a result of the determination in step S768, when the user has not given an instruction to end the content application (NO in step S768), the processing returns to step S763 described above.

It should be noted that in the above embodiment, when the "view detailed information" button 203 has been specified, the detailed information about the content is displayed, and the content is purchased and downloaded, as an example. Alternatively, a "purchase" button may be provided in advance in the operation screen displayed on the lower LCD 12 shown in FIG. 62, and a content may be directly purchased and downloaded by specifying the "purchase" button, without displaying the detailed information about the content.

Further, in the above embodiment, the content application is deleted by the CPU 31 executing the menu process program 501, as an example. Alternatively, a deletion program may be provided in the program per se of the content application, and the content application may be deleted by executing the deletion program included in the program of the content application.

Further, in the above embodiment, the display of the detailed information about the content and the process of purchasing and downloading the content are performed by programs different from the program of the content application, as an example. Alternatively, programs for performing the display of the detailed information about the content and the process of purchasing and downloading the content may be provided in the program per se of the content application, and the display of the detailed information about the content and the process of purchasing and downloading the content may be performed by executing the programs.

As described above, in the sixth embodiment, during the execution of a content application that has been automatically downloaded and automatically installed, it is possible to delete the content application with a simple operation of specifying a deletion button. This enables the user to easily delete an unnecessary content application. Particularly when the content application is automatically downloaded and the installed as in the present embodiment, many content applications may be installed without the user's knowledge. Thus, the mechanism of easily deleting a content application as described above is useful.

Further, in the sixth embodiment, by executing a content that has been automatically downloaded and automatically installed, it is possible to present to the user an introductory video image of the content, and provide a coupon to the user. It is also possible with a simple operation to display detailed information about the content, and purchase and download the content. This makes it possible to create opportunities to let more users know of the content, and lead to the promotion of the content.

It should be noted that in each of the above embodiments, a series of processes performed by the game apparatus 1 may be performed in an information processing system including a plurality of information processing apparatuses. For example, in an information processing system including a terminal apparatus and a server apparatus communicable with the terminal apparatus via a network, a part of the series of the processes performed by the game apparatus 1 (e.g., a part of the processing of an application) may be performed by the server apparatus. Alternatively, in an information processing system including a terminal apparatus and a server apparatus communicable with the terminal apparatus via a network, a main process of the series of the processes may be performed by the server apparatus, and a part of the series of the processes may be performed by the terminal apparatus. Still alternatively, in the information processing system, a server system may include a plurality of information processing apparatuses, and the process to be performed in the server system may be shared and performed by the plurality of information processing apparatuses.

While the invention has been described in detail, the foregoing description is in all aspects illustrative and not restrictive. It will be understood that numerous other modifications and variations can be devised without departing from the scope of the invention.

What is claimed is:

1. An information processing apparatus comprising:
   communication circuitry; and
   a processor configured to control the information processing apparatus to at least:
      automatically connect, using the communication circuitry, to a server;
      automatically receive, from the server, one or more programs without a user selection of the one or more programs;
      automatically install, on the information processing apparatus, the received one or more programs not already installed without a user request to install;
      create and output a list of the installed one or more programs;
      accept a selection of a program on the list of the installed one or more programs based on a predetermined operation performed on the information processing apparatus; and
      uninstall the selected program on the list of the installed one or more programs,
   wherein
      the processor is further configured to control the information processing apparatus to switch between a display state and a non-display state, wherein a display in the display state of the information processing apparatus is stopped in the non-display state of the information processing apparatus,
      the automatic connecting to the server is performed at least when the information processing apparatus is in the non-display state,
      the automatic receiving the one or more programs is performed at least when the information processing apparatus is in the non-display state, and
      the automatic installing the received one or more programs not already installed is performed at least when the information processing apparatus is in the non-display state.

2. The information processing apparatus according to claim 1, wherein
   less power is consumed in the non-display state of the information processing apparatus than in the display state of the information processing apparatus.

3. The information processing apparatus according to claim 1, wherein
   the information processing apparatus is configured to be opened and closed, and
   a state of the information processing apparatus is switched to the display state when the information processing apparatus is opened, and to the non-display state when the information processing apparatus is closed.

4. The information processing apparatus according to claim 1, wherein
power is supplied to the display in the display state of the information processing apparatus, and power is not supplied to the display in the non-display state of the information processing apparatus.

5. The information processing apparatus according to claim 1, wherein
the information processing apparatus is a mobile information terminal, and the processor is further configured to control the information processing apparatus to:
automatically and repeatedly search for an access point, and
based on an access point being found by the searching, connect to the access point, and connect to the server via the access point.

6. The information processing apparatus according to claim 5, wherein the processor is further configured to control the information processing apparatus to:
store respective reception states for the receiving of the one or more programs, each reception state indicating whether or not the corresponding receiving of the one or more programs is completed, wherein
when any of the respective reception states indicates that the corresponding receiving of the one or more programs is not completed, the corresponding receiving of the one or more programs is performed again.

7. The information processing apparatus according to claim 6, wherein the processor is further configured to control the information processing apparatus to:
set one or more tasks for defining the receiving of the one or more programs, respectively, wherein
the storing stores the respective reception states for the receiving of the one or more programs on a task-by-task basis, each reception state indicating whether or not the corresponding receiving of the one or more programs defined by a corresponding task is completed, and
when any of the respective reception states indicates that the corresponding receiving of the one or more programs defined by the corresponding task is not completed, the corresponding receiving of the one or more programs is performed again.

8. The information processing apparatus according to claim 1, wherein the processor is further configured to control the information processing apparatus to:
when the information processing apparatus connects to the server, receive currently-distributed program information about receivable programs from the server, and
when the currently-distributed program information is received, determine based on specified conditions whether or not to receive a receivable program specified by the currently-distributed program information, wherein
when the information processing apparatus determines to receive the receivable program, the information processing apparatus receives the receivable program.

9. The information processing apparatus according to claim 8, wherein the processor is further configured to control the information processing apparatus to:
store execution history data indicating an execution history of a predetermined program, wherein
the currently-distributed program information includes: information specifying the receivable program having reception conditions; and conditions concerning the execution history of the predetermined program that are necessary for receiving the receivable program, and
when the execution history of the predetermined program indicated by the execution history data satisfies the conditions for reception, the information processing apparatus determines that the receivable program having the reception conditions is to be received; and when the execution history of the predetermined program indicated by the execution history data does not satisfy the conditions for the reception, the information processing apparatus determines that the receivable program having the reception conditions is not to be received.

10. The information processing apparatus according to claim 8, wherein the processor is further configured to control the information processing apparatus to:
store in the information processing apparatus user age as user age information, wherein
the currently-distributed program information includes information indicating target ages of the receivable programs, respectively, and
the information processing apparatus compares the user age information to a target age of each receivable program, and, when the comparison result satisfies specified conditions, the information processing apparatus receives the receivable program.

11. The information processing apparatus according to claim 1, wherein the processor is further configured to control the information processing apparatus to:
when the information processing apparatus connects to the server, receive currently-distributed program information about receivable programs from the server, and
determine whether or not the receivable programs specified by the currently-distributed program information are already installed on the information processing apparatus, wherein
when the information processing apparatus determines that a program among the received programs is already installed, the information processing apparatus updates the program; and when the information processing apparatus determines that a program among the received programs is not installed, the information processing apparatus installs the program.

12. The information processing apparatus according to claim 1, wherein the processor is further configured to control the information processing apparatus to:
when the information processing apparatus connects to the server, receive currently-distributed application information indicating a list of receivable application programs from the server, and
when the currently-distributed application information is received, determine based on specified conditions whether or not to receive a receivable application program specified by the currently-distributed application information, wherein
when the information processing apparatus determines that the receivable application program is to be received, receiving the receivable application program.

13. The information processing apparatus according to claim 1, wherein the processor is further configured to control the information processing apparatus to:
when the information processing apparatus connects to the server, receive from the server, currently-distributed program information about receivable programs; and priority information indicating an order of receiving the receivable programs indicated by the currently-distributed program information, wherein
the information processing apparatus receives the receivable programs indicated by the currently-distributed program information in the order of receiving the receivable programs indicated by the priority information.

14. The information processing apparatus according to claim 13, wherein the processor is further configured to control the information processing apparatus to:
store deleted program specification information specifying the uninstalled selected program, wherein
the information processing apparatus does not receive, among programs indicated by the currently-distributed program information, a program specified by the deleted program specification information.

15. The information processing apparatus according to claim 14, wherein
in accordance with a user operation, the information processing apparatus connects to a server in which programs for the information processing apparatus are registered, and
receives a user-designated program, regardless of whether or not the user-designated program is included in the deleted program specification information.

16. The information processing apparatus according to claim 1, wherein the processor is further configured to control the information processing apparatus to:
store the received one or more programs, and complete the automatic installing by making the received one or more programs executable.

17. The information processing apparatus according to claim 1, wherein the processor is further configured to control the information processing apparatus to:
store the installed one or more programs;
when the information processing apparatus is started, create and output a list of the stored one or more programs;
accept a selection of any of the one or more programs from the list of the stored one or more programs in accordance with an operation performed on the information processing apparatus; and
execute the selected program from the list of the stored one or more programs.

18. The information processing apparatus according to claim 1, wherein the processor is further configured to control the information processing apparatus to:
store the installed one or more programs;
create and output a list of the stored one or more programs in accordance with an operation performed on the information processing apparatus;
accept a selection of any of the one or more programs from the list of the stored one or more programs in accordance with the operation performed on the information processing apparatus; and
execute the selected program from the list of the stored one or more programs.

19. The information processing apparatus according to claim 18, wherein
the automatic installing is completed by automatically making a setting such that the received one or more programs are to appear on the list of the stored one or more programs.

20. The information processing apparatus according to claim 1, wherein the processor is further configured to control the information processing apparatus to:
store a rights information database and a plurality of programs, wherein the information processing apparatus:
receive the plurality of programs together with rights information for executing the plurality of programs;
automatically store the received plurality of programs, and automatically register the received rights information in the rights information database;
receive an instruction to execute at least one of the automatically stored plurality of programs;
when the execution instruction has been received, authenticate the received rights information using the received rights information registered in the rights information database; and
when the authentication is successful, execute the at least one of the automatically stored plurality of programs when the instruction has been given to execute.

21. The information processing apparatus according to claim 1, wherein the processor is further configured to control the information processing apparatus to:
store a rights information database and a plurality of programs, wherein the plurality of programs are received together with rights information for executing the plurality of programs;
when the plurality of programs and the rights information are received, automatically determine whether or not the received rights information is legitimate;
when it is determined that the received rights information is legitimate, automatically store the plurality of programs and the received rights information;
when it is determined that the received rights information is illegitimate, discard contents of the received rights information;
accept an instruction to execute at least one of the stored plurality of programs;
when the execution instruction is received, read the automatically stored rights information, and authenticate the automatically stored rights information; and
when the authentication is successful, execute the at least one of the stored plurality of programs when the instruction has been given to execute.

22. The information processing apparatus according to claim 1, wherein the processor is further configured to control the information processing apparatus to:
when the one or more programs are received, automatically determine whether or not the received one or more programs are legitimate;
when it is determined that the received one or more programs are legitimate, automatically store the received one or more programs;
when it is determined that the received one or more programs are illegitimate, discard the received one or more programs;
accept an instruction to execute at least one of the stored one or more programs; and
when the execution instruction is received, execute the at least one of the stored one or more programs when the instruction has been given to execute.

23. The information processing apparatus according to claim 1, wherein the information processing apparatus automatically connects to the server without requesting a user to perform any operation concerning the automatically connecting; automatically receives the one or more programs without requesting the user to perform any operation concerning the automatically receiving; and automatically installs the received one or more programs on the information processing apparatus without requesting the user to perform any operation concerning the automatically installing.

24. The information processing apparatus according to claim 1, wherein the processor is further configured to control the information processing apparatus to:

when the information processing apparatus connects to the server, receive, from the server, currently-distributed application information indicating a list of receivable application programs;

determine whether or not the list of receivable application programs indicated by the currently-distributed application information are already installed on the information processing apparatus;

receive the list of receivable application programs indicated by the currently-distributed application information;

when an application program among the list of received application programs is already installed, update the application program; and when an application program among the list of received application programs is not installed, install the application program.

25. The information processing apparatus according to claim 1, wherein
the one or more programs received from the server include system programs and application programs.

26. A non-transitory computer-readable storage medium having stored thereon a program which, when executed by a computer of an information processing apparatus comprising communication circuitry and a processor, causes the information processing apparatus to at least:

automatically connect, using the communication circuitry, to a server;

automatically receive, from the server, one or more programs without a user selection of the one or more programs;

automatically install, on the information processing apparatus, the received one or more programs not already installed without a user request to install;

create and output a list of the installed one or more programs;

accept a selection of a program on the list of the installed one or more programs based on a predetermined operation performed on the information processing apparatus; and uninstall the selected program on the list of the installed one or more programs, wherein
the processor is configured to control the information processing apparatus to switch between a display state and a non-display state, wherein a display in the display state of the information processing apparatus is stopped in the non-display state of the information processing apparatus, the automatic connecting to the server is performed at least when the information processing apparatus is in the non-display state, the automatic receiving the one or more programs is performed at least when the information processing apparatus is in the non-display state, and the automatic installing the received one or more programs not already installed is performed at least when the information processing apparatus is in the non-display state.

27. An information processing method for controlling a computer of an information processing apparatus comprising communication circuitry and a processor, the information processing method comprising:

automatically connecting, using the communication circuitry, to a server;

automatically receiving, from the server, one or more programs without a user selection of the one or more programs;

automatically installing, on the information processing apparatus, the received one or more programs not already installed without a user request to install;

creating and outputting a list of the installed one or more programs;

accepting a selection of a program on the list of the installed one or more programs based on a predetermined operation performed on the information processing apparatus; and uninstalling the selected program on the list of the installed one or more programs, wherein
the processor is configured to control the information processing apparatus to switch between a display state and a non-display state, wherein a display in the display state of the information processing apparatus is stopped in the non-display state of the information processing apparatus, the automatic connecting to the server is performed at least when the information processing apparatus is in the non-display state, the automatic receiving the one or more programs is performed at least when the information processing apparatus is in the non-display state, and the automatic installing the received one or more programs not already installed is performed at least when the information processing apparatus is in the non-display state.

28. A system including an information processing apparatus and a server, the information processing apparatus comprising communication circuitry and a processor configured to control the information processing apparatus to at least:

automatically connect, using the communication circuitry, to the server;

automatically receive, from the server, one or more programs without a user selection of the one or more programs;

automatically install, on the information processing apparatus, the received one or more programs not already installed without a user request to install;

create and output a list of the installed one or more programs;

accept a selection of a program on the list of the installed one or more programs based on a predetermined operation performed on the information processing apparatus; and uninstall the selected program on the list of the installed one or more programs, wherein
the processor is further configured to control the information processing apparatus to switch between a display state and a non-display state, wherein a display in the display state of the information processing apparatus is stopped in the non-display state of the information processing apparatus, the automatic connecting to the server is performed at least when the information processing apparatus is in the non-display state, the automatic receiving the one or more programs is performed at least when the information processing apparatus is in the non-display state, and the automatic installing the received one or more programs not already installed is performed at least when the information processing apparatus is in the non-display state.

* * * * *